(12) United States Patent
Parker et al.

(10) Patent No.: US 12,535,489 B2
(45) Date of Patent: Jan. 27, 2026

(54) MULTIPLEXED PROTEIN ASSAY FOR THE DETECTION OF MITOCHONDRIAL PROTEIN SIGNATURES

(71) Applicant: CEDARS-SINAI MEDICAL CENTER, Los Angeles, CA (US)

(72) Inventors: Sarah Parker, Los Angeles, CA (US); Aleksandr Stotland, Encino, CA (US); Roberta Gottlieb, Los Angeles, CA (US); Jennifer Van Eyk, Los Angeles, CA (US); Weston Spivia, West Hollywood, CA (US)

(73) Assignee: CEDARS-SINAI MEDICAL CENTER, Los Angeles, CA (US)

( * ) Notice: Subject to any disclaimer, the term of this patent is extended or adjusted under 35 U.S.C. 154(b) by 806 days.

(21) Appl. No.: 16/647,396

(22) PCT Filed: Sep. 25, 2018

(86) PCT No.: PCT/US2018/052737
§ 371 (c)(1),
(2) Date: Mar. 13, 2020

(87) PCT Pub. No.: WO2019/060915
PCT Pub. Date: Mar. 28, 2019

(65) Prior Publication Data
US 2020/0217854 A1      Jul. 9, 2020

Related U.S. Application Data

(60) Provisional application No. 62/562,704, filed on Sep. 25, 2017.

(51) Int. Cl.
*G01N 33/68* (2006.01)

(52) U.S. Cl.
CPC ..... *G01N 33/6848* (2013.01); *G01N 2560/00* (2013.01)

(58) Field of Classification Search
CPC ............... G01N 33/6848; G01N 2560/00
See application file for complete search history.

(56) References Cited

U.S. PATENT DOCUMENTS

2005/0153381 A1   7/2005   Marusich et al.

FOREIGN PATENT DOCUMENTS

| CA | 2836750 A1 * | 6/2015 | ........... G01N 33/483 |
| WO | WO-2015120287 A2 * | 8/2015 | ........... C12N 15/102 |
| WO | 2019060915 A2 | 3/2019 | |

OTHER PUBLICATIONS

"O95169• NDUB8_HUMAN." [online]. 2023. [retrieved on Jan. 5, 2023]. Retrieved from UNIPROT using Internet: <https://www.uniprot.org/uniprotkb/O95169/entry>. 11 pages. (Year: 2023).*
"P00156• CYB_HUMAN." [online]. 2023. [retrieved on Jan. 5, 2023]. Retrieved from UNIPROT using Internet: <https://www.uniprot.org/uniprotkb/P00156/entry>. 8 pages. (Year: 2023).*
"P03915• NU5M_HUMAN." [online]. 2023. [retrieved on Jan. 5, 2023]. Retrieved from UNIPROT using Internet: <https://www.uniprot.org/uniprotkb/P03915/entry>. 11 pages. (Year: 2023).*
"P04179• SODM_HUMAN." [online]. 2023. [retrieved on Jan. 5, 2023]. Retrieved from UNIPROT using Internet: <https://www.uniprot.org/uniprotkb/P04179/entry#names_and_taxonomy>. 9 pages. (Year: 2023).*
"P07954• FUMH_HUMAN." [online]. 2023. [retrieved on Jan. 5, 2023]. Retrieved from UNIPROT using Internet: <https://www.uniprot.org/uniprotkb/P07954/entry>. 11 pages. (Year: 2023).*
"P08237• PFKAM_HUMAN." [online]. 2023. [retrieved on Jan. 5, 2023]. Retrieved from UNIPROT using Internet: <https://www.uniprot.org/uniprotkb/P08237/entry>. 11 pages. (Year: 2023).*
Vestergaard, H et al. Glycogen synthase and phosphofructokinase protein and mRNA levels in skeletal muscle from insulin-resistant patients with non-insulin-dependent diabetes mellitus. Journal of Clinical Investigation. 1993. 91(6): 2342-2350. (Year: 1993).*
"P08559• ODPA_HUMAN." [online]. 2023. [retrieved on Jan. 5, 2023]. Retrieved from UNIPROT using Internet: <https://www.uniprot.org/uniprotkb/P08559/entry>. 14 pages. (Year: 2023).*
"P13073• COX41_HUMAN." [online]. 2023. [retrieved on Jan. 5, 2023]. Retrieved from UNIPROT using Internet: <https://www.uniprot.org/uniprotkb/P13073/entry>. 9 pages. (Year: 2023).*
"P17152• TMM11_HUMAN." [online]. 2023. [retrieved on Jan. 5, 2023]. Retrieved from UNIPROT using Internet: <https://www.uniprot.org/uniprotkb/P17152/entry>. 6 pages. (Year: 2023).*
"P25705• ATPA_HUMAN." [online]. 2023. [retrieved on Jan. 5, 2023]. Retrieved from UNIPROT using Internet: <https://www.uniprot.org/uniprotkb/P25705/entry>. 10 pages. (Year: 2023).*
"P40926• MDHM_HUMAN." [online]. [retrieved on Jan. 5, 2023]. Retrieved from UNIPROT using Internet: <https://www.uniprot.org/ uniprotkb/P40926/entry>. 9 pages. (Year: 2023).*
"Q02218• ODO1_HUMAN." [online]. [retrieved on Jan. 5, 2023]. Retrieved from UNIPROT using Internet: <https://www.uniprot.org/ uniprotkb/Q02218/entry>. 13 pages. (Year: 2023).*
"Q9UDW1• QCR9_HUMAN." [online]. [retrieved on Jan. 5, 2023]. Retrieved from UNIPROT using Internet: <https://www.uniprot.org/ uniprotkb/Q9UDW1/entry>. 10 pages. (Year: 2023).*
Wolters, JC et al. Translational targeted proteomics profiling of mitochondrial energy metabolic pathways in mouse and human samples. Journal of Proteome Research. 2016. 15: 3204-3213. Including Support Information, pp. S-1 to S-9. Published Jul. 22, 2016. (Year: 2016).*

(Continued)

*Primary Examiner* — David W Berke-Schlessel
*Assistant Examiner* — Susan E. Fernandez
(74) *Attorney, Agent, or Firm* — NIXON PEABODY LLP

(57) ABSTRACT

Provided herein are methods, kits, and assays for identifying and quantifying a mitochondrial protein in a sample using mass spectrometry. Also provided herein are methods, kits, and assays for determining a mitochondrial protein biomarker signature for a subject using mass spectrometry.

23 Claims, 31 Drawing Sheets

Specification includes a Sequence Listing.

(56) References Cited

OTHER PUBLICATIONS

Gomez-Serrano, M et al. Differential proteomic and oxidative profiles unveil dysfunctional protein import to adipocyte mitochondria in obesity-associated aging and diabetes. Redox Biology. 2017. 11: 415-428. Available online Dec. 18, 2016. (Year: 2016).*

Supplementary Tables 1A and 1B in Gomez-Serrano, M et al. Redox Biology. 2017. 11:415-428. Available online Dec. 18, 2016. [online]. [retrieved on Jan. 11, 2023]. Retrieved from the Internet :<https://www.ncbi.nlm.nih.gov/pmc/articles/PMC5220168/bin/ mmc2.xls>. 566 pages. (Year: 2016).*

Gasteiger, E et al. "Protein identification and analysis tools on the ExPaSy Server." in: Walker, JM (eds). The Proteomics Protocols Handbook. (Totowa, NJ, Humana Press, 2005), pp. 571-607. (Year: 2005).*

PeptideCutter tool. Results for UniProt Accession Nos. O00429, O60313, O75306, P00156, P03915, P08237, P11498, Q8IWA4, and Q99643. [online]. 2023. [retrieved on Jan. 13, 2023]. Retrieved from the Internet: <https://web.expasy.org/cgi-bin/peptide_cutter/peptidecutter.pl>. (Year: 2023).*

UniProtKB Accession No. O00429 "Dynamin-1-like protein (DNM1L), Human" Feb. 6, 2007 [Retrieved on Feb. 4, 2019]. Retrieved from <https://www.uniprot.org/uniprot/O00429>.

International Search Report and Written Opinion of PCT Application No. PCT/US2018/52737, Issued Apr. 9, 2019, 7 Pages.

\* cited by examiner

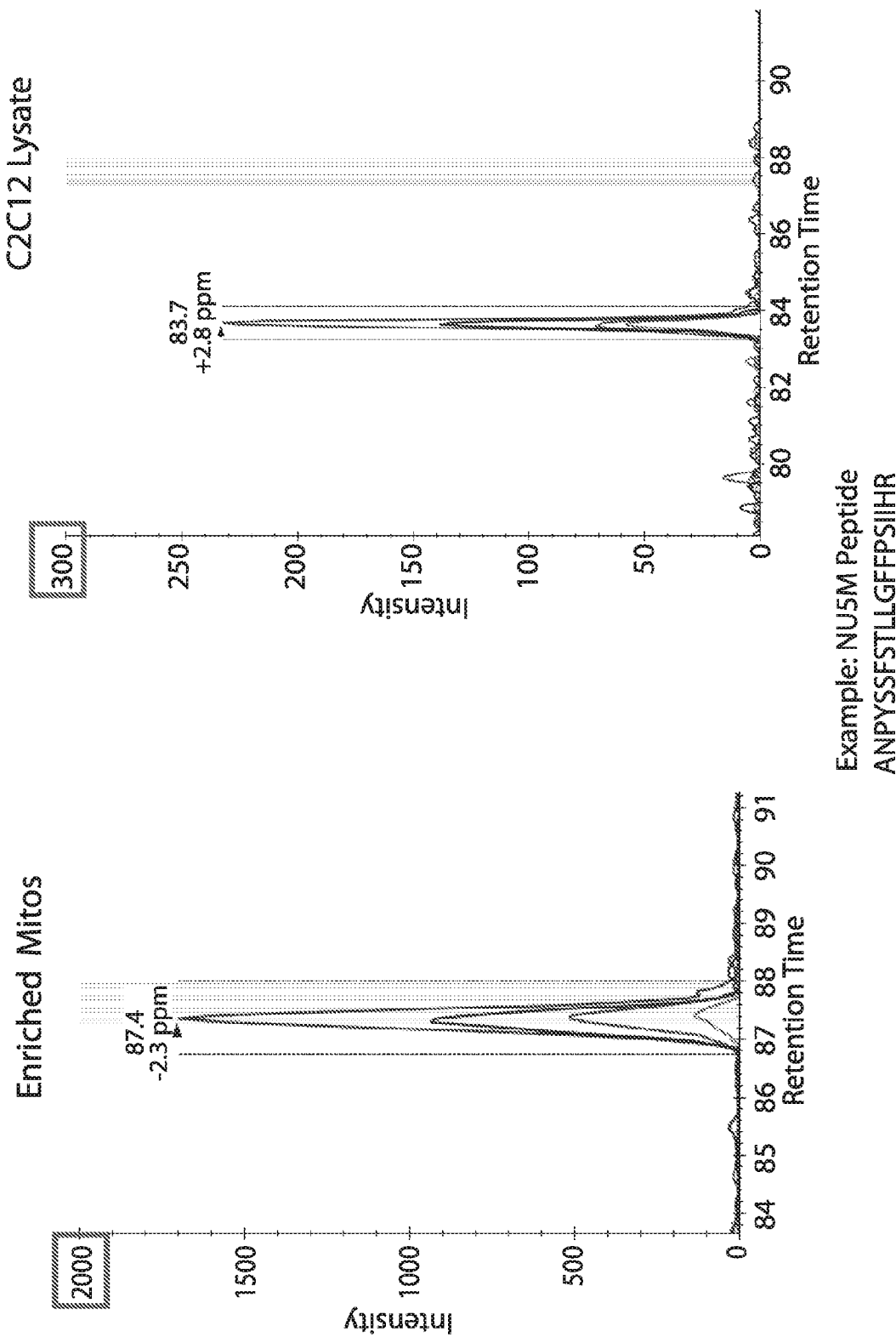

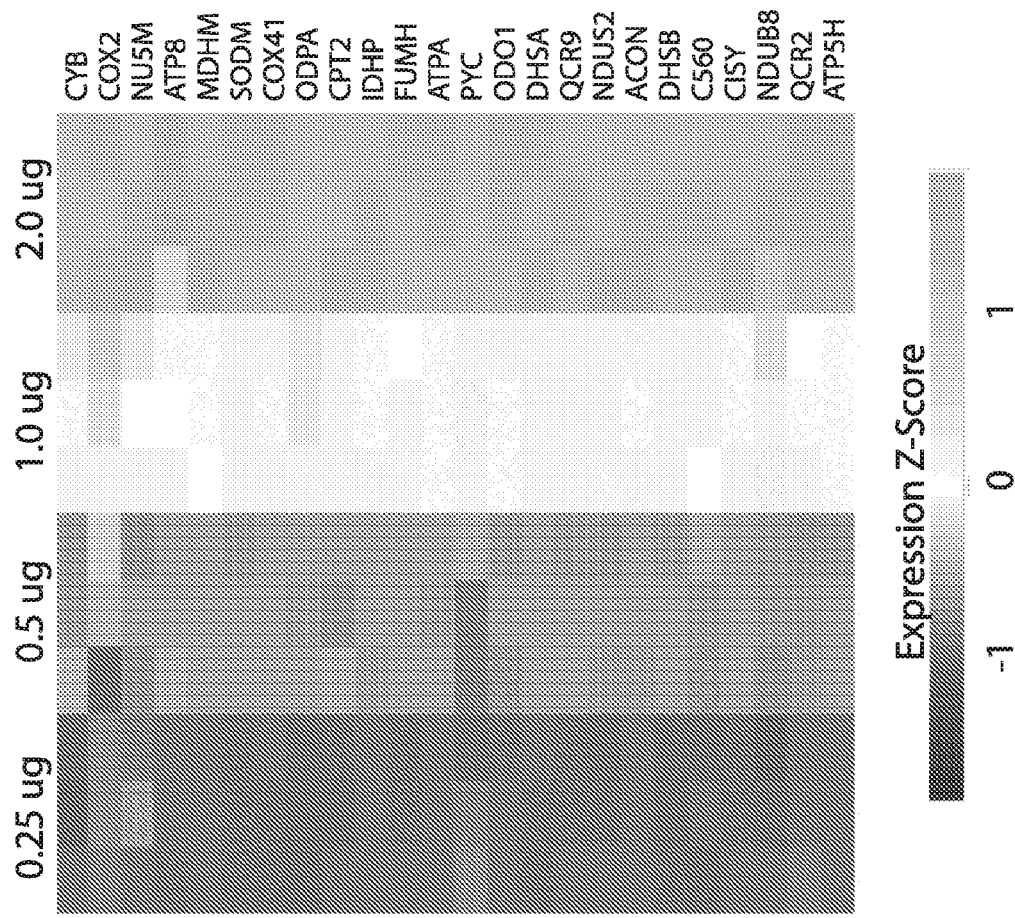

O = Oligomycin; F = FCCP; A & R = Antimycin/Rotenone

Quantitative Multi-Omic Profiling of C2C12 Metabolism

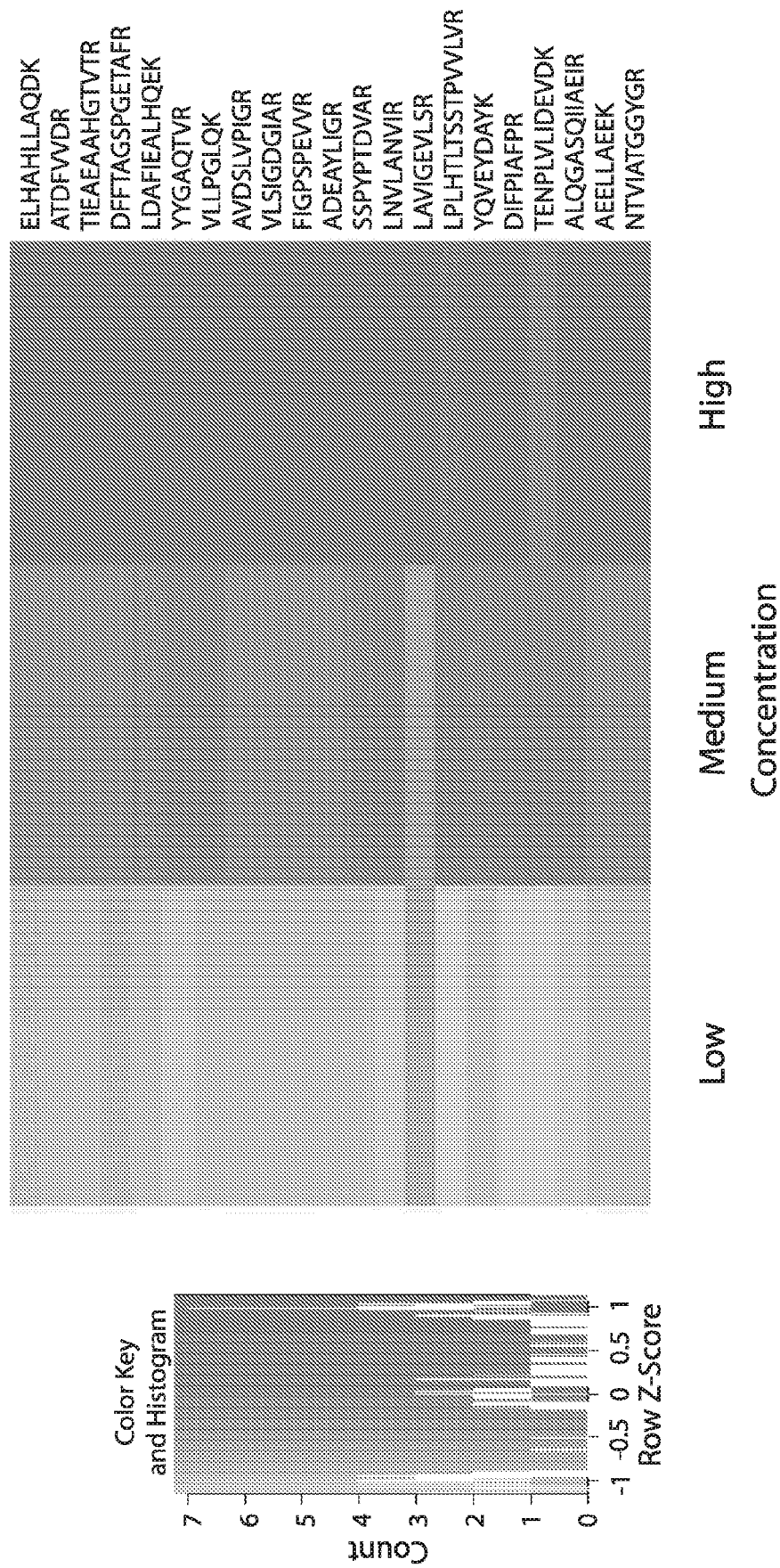

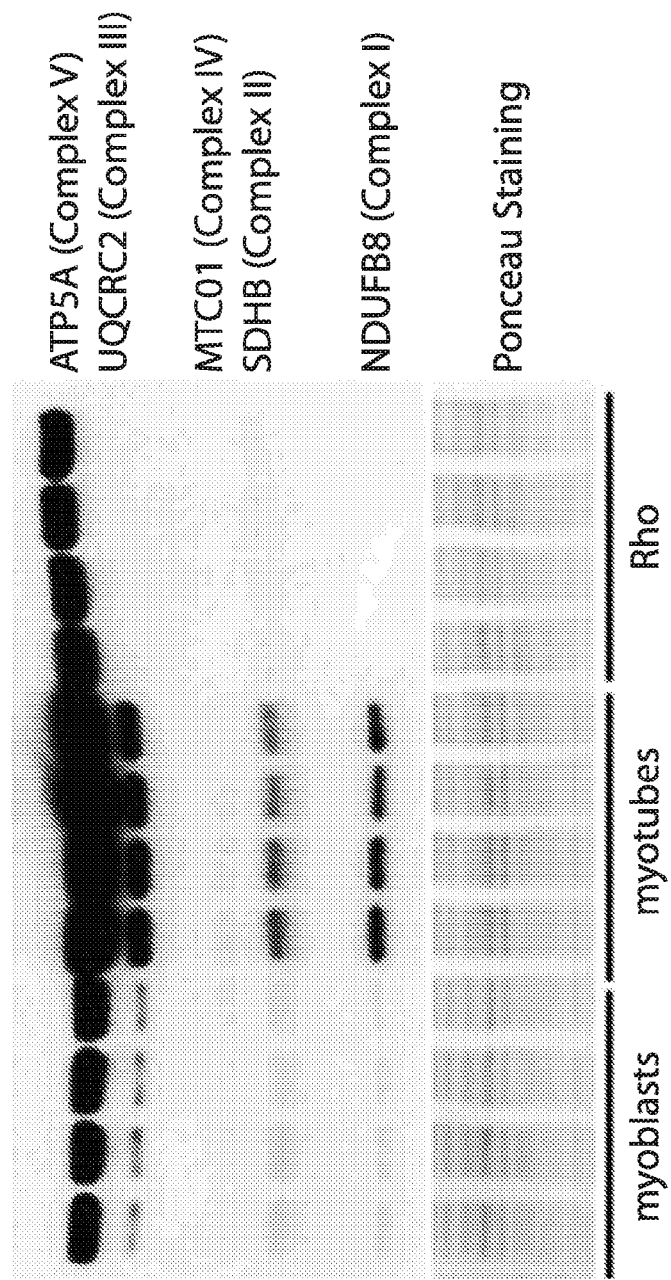

Technical %CV

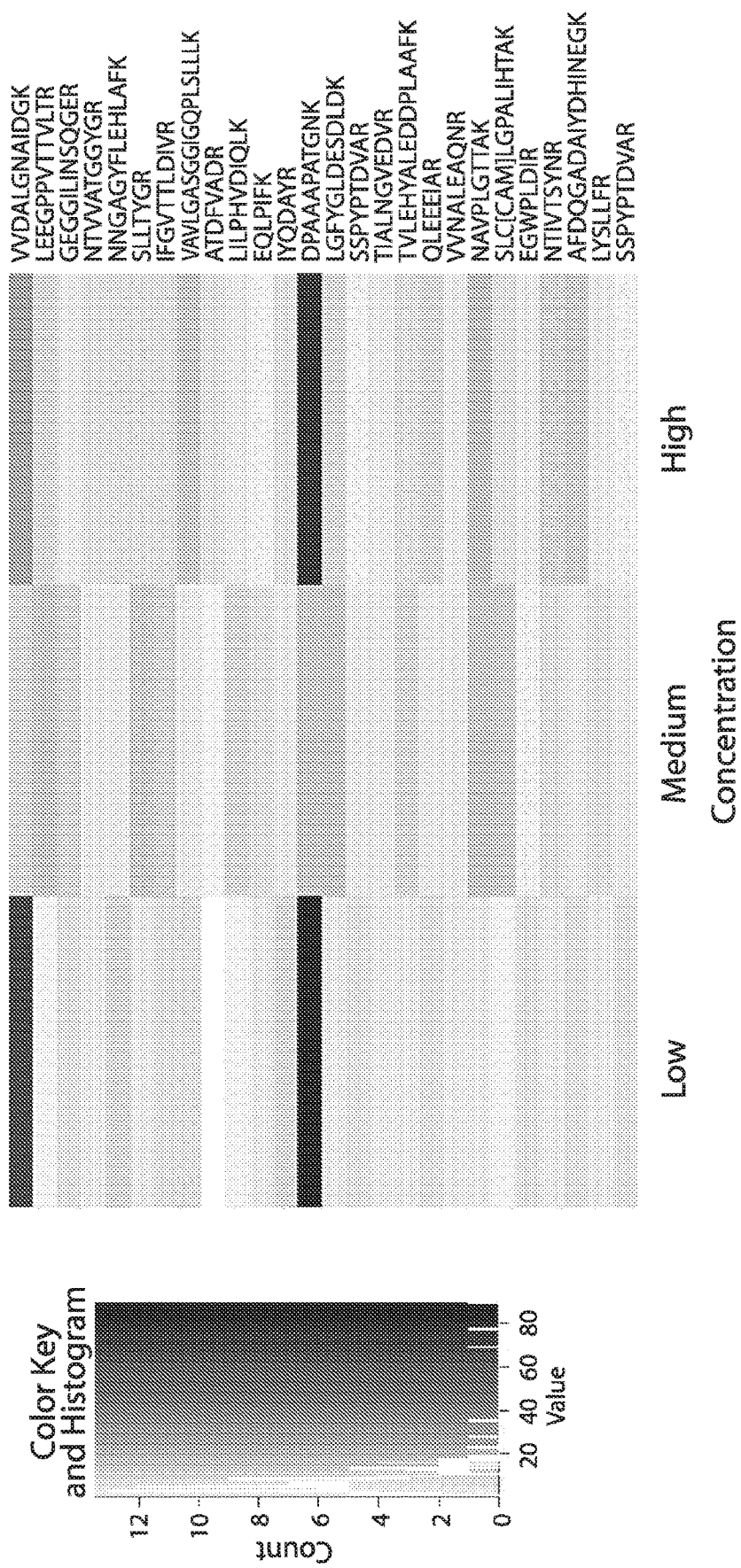
FIG. 9B (continued) Technical %CV

MULTIPLEXED PROTEIN ASSAY FOR THE DETECTION OF MITOCHONDRIAL PROTEIN SIGNATURES

CROSS-REFERENCE TO RELATED APPLICATIONS

This application is a National Phase of International Application No. PCT/US2018/052737, filed Sep. 25, 2018, which designated the U.S. and that International Application was published under PCT Article 21 (2) in English. This application also claims the benefit under 35 U.S.C. 119 (e) of U.S. Provisional Patent Application No. 62/562,704 filed Sep. 25, 2017, which is incorporated herein by reference in its entirety.

STATEMENT REGARDING FEDERALLY SPONSORED RESEARCH OR DEVELOPMENT

This invention was made with government support under Grant Nos. HL128787, HL132075, and HL112730 awarded by National Institutes of Health. The government has certain rights in the invention.

SEQUENCE LISTING

The instant application contains a Sequence Listing which has been filed electronically in ASCII format and is hereby incorporated by reference in its entirety. Said ASCII copy, created on Sep. 12, 2018, is named 065472-000701WO00_SL.txt and is 24,430 bytes in size.

FIELD OF THE INVENTION

Methods, kits, and assays for identifying and quantifying a mitochondrial protein in a sample using mass spectrometry. Methods, kits, and assays for determining a mitochondrial protein biomarker signature for a subject using mass spectrometry.

BACKGROUND

All publications herein are incorporated by reference to the same extent as if each individual publication or patent application was specifically and individually indicated to be incorporated by reference. The following description includes information that may be useful in understanding the present invention. It is not an admission that any of the information provided herein is prior art or relevant to the presently claimed invention, or that any publication specifically or implicitly referenced is prior art.

Mitochondria are the major generators of energy for the cell. Mitochondria also play a central role in fundamental biology. As such, there is a need for methods for profiling of mitochondrial proteins and mitochondrial biology across subjects

SUMMARY OF THE INVENTION

The following embodiments and aspects thereof are described and illustrated in conjunction with systems, compositions, kits, assays, and methods which are meant to be exemplary and illustrative, not limiting in scope.

In various embodiments, the present invention provides a method for identifying and quantifying at least one human mitochondrial protein in a sample, comprising: i) obtaining the sample, wherein the sample has been treated with a protease that digests the human mitochondrial protein into at least one target peptide, wherein the target peptide is selected from the group consisting of SEQ ID NOs: 1-77, and combinations thereof; wherein the protease is trypsin, and wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; ii) adding an internal standard to the sample, wherein the internal standard comprises 77 reference peptides having SEQ ID NOs: 1-77, and each reference peptide is labeled with a stable isotope, wherein each reference peptide is present in the internal standard in a known quantity, and wherein each reference peptide has a known mass-to-charge ratio (m/z) and retention time (rt); iii) analyzing the sample from step ii) by mass spectrometry; iv) identifying the target peptide by comparing the target peptide mass-to-charge ratio (m/z) and retention time (rt) to the known reference peptide mass-to-charge ratio (m/z) and retention time (rt); v) identifying the human mitochondrial protein in the sample by correlating the target peptide to the human mitochondrial protein according to Table 1; vi) calculating a peak area and an area ratio for the target peptide and for each reference peptide; vii) determining a molar ratio for the target peptide from the known quantity of the reference peptide; viii) calculating a concentration of the target peptide from the molar ratio; and ix) quantifying the human mitochondrial protein in the sample from the concentration of the target peptide.

In some embodiments, the mass spectrometry is selected from the group consisting of LC-MS, LC-MS/MS, LC-SRM-MS, LC-MRM-MS, and LC-PRM-MS. In some embodiments, the sample is from a human subject, and the sample is selected from the group consisting of cells, tissue, and combinations thereof. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$.

In various embodiments, the present invention provides a method of determining a mitochondrial protein biomarker signature for a human subject, the method comprising: i) obtaining a sample from the human subject, wherein the sample comprises at least one human mitochondrial protein, wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; ii) contacting the sample with a protease that digests the human mitochondrial protein into at least one target peptide, wherein the target peptide is selected from the group consisting of SEQ ID NOs: 1-77, and combinations thereof; and wherein the protease is trypsin; iii) adding an internal standard to the sample, wherein the internal standard comprises 77 reference peptides having SEQ ID NOs: 1-77 and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); and vi) determining the human mitochondrial protein biomarker signature for the human subject by correlating the target peptide to the human mitochondrial protein according to Table 1.

In some embodiments, the method further comprises comparing the human mitochondrial protein biomarker signature from the human subject to a human mitochondrial protein biomarker signature from a reference sample, wherein a change in the human mitochondrial protein biomarker signature from the human subject compared to the human mitochondrial protein biomarker signature from the reference sample is indicative of a change in mitochondrial function in the human subject. In some embodiments, the mitochondrial function is selected from the group consisting of tricarboxylic acid cycle (TCA cycle), oxidative phosphorylation (OxPhos), MitoGeneral, MitoDynamics, and combinations thereof.

In some embodiments, the mass spectrometry is selected from the group consisting of LC-MS, LC-MS/MS, LC-SRM-MS, LC-MRM-MS, and LC-PRM-MS. In some embodiments, the sample is selected from the group consisting of cells, tissue, and combinations thereof. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$.

In various embodiments, the present invention provides a kit for identifying and quantifying at least one human mitochondrial protein in a sample by mass spectrometry, comprising: (a) reagents and instructions for tryptic digestion of the human mitochondrial protein, wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; and wherein the tryptic digestion of the human mitochondrial protein provides at least one target peptide, wherein the target peptide is selected from the group consisting of SEQ ID NOs: 1-77, and combinations thereof; (b) an internal standard, wherein the internal standard comprises 77 reference peptides having SEQ ID NOs: 1-77 and each reference peptide is labeled with a stable isotope, wherein each reference peptide is present in the internal standard in a known quantity, and wherein each reference peptide has a known mass-to-charge ratio (m/z) and retention time (rt); (c) reagents and instructions for preparing and processing the sample; and (d) reagents and instructions for using the kit to identify and quantify the human mitochondrial protein in the sample by mass spectrometry.

In some embodiments, the reagents for typtic digestion of the human mitochondrial protein comprise a reducing agent, an alkylating agent, trypsin, a buffer, and an acid. In some embodiments, the reagents for preparing and processing the sample comprise C18 clean up tips and/or plates, acetonitrile, and 0.1% formic acid in water. In some embodiments, the mass spectrometry is selected from the group consisting of LC-MS, LC-MS/MS, LC-SRM-MS, LC-MRM-MS, and LC-PRM-MS. In some embodiments, the sample is from a human subject, and the sample is selected from the group consisting of cells, tissue, and combinations thereof. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^2H$.

In various embodiments, the present invention provides a mass spectrometry multiplex assay for identifying and quantifying at least one human mitochondrial protein in a sample, comprising: i) obtaining the sample, wherein the sample has been treated or contacted with a protease that digests the human mitochondrial protein into at least one target peptide, wherein the target peptide is selected from the group consisting of SEQ ID NOs: 1-77, and combinations thereof; wherein the protease is trypsin, and wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; ii) adding an internal standard to the sample, wherein the internal standard comprises 77 reference peptides having SEQ ID NOs: 1-77, and each reference peptide is labeled with a stable isotope, wherein each reference peptide is present in the internal standard in a known quantity, and wherein each reference peptide has a known mass-to-charge ratio (m/z) and retention time (rt); iii) analyzing the sample from step ii) by mass spectrometry; iv) identifying the target peptide by comparing the target peptide mass-to-charge ratio (m/z) and retention time (rt) to the known reference peptide mass-to-charge ratio (m/z) and retention time (rt);) identifying the human mitochondrial protein in the sample by correlating the target peptide to the human mitochondrial protein according to Table 1; vi) calculating a peak area and an area ratio for the target peptide and for each reference peptide; vii) determining a molar ratio for the target peptide from the known quantity of the reference peptide; viii) calculating a concentration of the target peptide from the molar ratio; and ix) quantifying the human mitochondrial protein in the sample from the concentration of the target peptide.

In some embodiments, the mass spectrometry is selected from the group consisting of LC-MS, LC-MS/MS, LC-SRM-MS, LC-MRM-MS, and LC-PRM-MS. In some embodiments, the sample is from a human subject. In some embodiments, the sample is selected from the group consisting of cells, tissue, and combinations thereof. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof.

BRIEF DESCRIPTION OF THE DRAWINGS

Exemplary embodiments are illustrated in referenced figures. It is intended that the embodiments and figures disclosed herein are to be considered illustrative rather than restrictive.

FIG. 3A-FIG. 3C depicts in accordance with various embodiments of the invention, representative data demonstrating the chromatographic behavior and quantitative approach used for each analyte in the multiplexed acquisition (FIG. 3A & FIG. 3B) and provides evidence of the linear behavior across four different mitochondrial protein sample concentrations of each curated analyte as evidence supporting the careful selection and optimization of each peptide sequence ultimately used within the mouse mitoplex kit (FIG. 3C). FIG. 3A discloses SEQ ID NO 85.

FIG. 7A discloses SEQ ID NOs 78, 79, 81, 80, 82, 86, 88, 87, 89, 90, 92, 91, 94, 93, 96, 95, 97, 98, 99, 100, 102, 101, 104, 103, 105, 106, 107, 109, 110, 111, 113, 112, 115, 114, 117, 116, 118, 120, 119, 122, 121, 124, 123, 125, 126, 127, 129, 128, 130, 131, 133, 132, 135, 134, 137, 136, 139, 138, 140, 141, 143, 146, 147, and 149, respectively, in order of appearance. FIG. 7B discloses SEQ ID NOs 78, 79, 81, 80, 82, 86, 88, 87, 89, 90, 92, 91, 94, 93, 96, 95, 97, 98, 99, 100, 102, 101, 104, 103, 105, 106, 107, 109, 110, 111, 113, 112, 115, 114, 117, 116, 118, 120, 119, 122, 121, 124, 123, 125, 126, 127, 129, 128, 130, 131, 133, 132, 135, 134, 137, 136, 139, 138, 140, 141, 143, 146, 147, and 149, respectively, in order of appearance.

FIG. 8A-FIG. 8C depicts in accordance with various embodiments of the invention, mouse mitoplex performance in vitro: C2C12 cells—Blasts, Rho, and Tubes. Three cell types were used to test the performance of the mouse mitoplex in terms of quantifying meaningful biology in mice whole cell lysate. C2C12s 'Rho⁰' cells lack mitochondrial DNA and therefore are unable to undergo mitochondrial biogenesis, have very low mitochondrial protein expression, and minimal respiration. C2C12 'myoblasts' are in a proliferative, non-contractile stage that is well known to exhibit low mitochondrial content, and C2C12 myotubes which have a large upregulation of mitochondria relative to C2C12 myoblast cells. The mitochondrial data across these three cell types was also assayed by western blot, the otherwise 'state of the art' in which only 5 proteins could be quantified in the antibody-based 'multiplex'. While in general the western blot data corroborate the mitoplex data, the mouse mitoplex confirms these expression patterns across a substantially larger number of targets (in this study, N=26 proteins) all acquired simultaneously for each sample.

FIG. 9A discloses SEQ ID NOs 1, 2, 5, 3, 4, 8, 6, 7, 10, 9, 12, 11, 14, 13, 15, 16, 18, 19, 17, 20, 21, 23, 22, 24, 25, 26, 27, 29, 28, 30, 31, 33, 32, 34, 35, 37, 38, 39, 40, 41, 42, 43, 45, 44, 47, 46, 50, 49, 48, 51, 52, 54, 53, 36, 56, 55, 57, 58, 59, 60, 62, 61, 63, 64, 67, 65, 66, 68, 69, 71, 70, 72, 73, 74, 75, 77, 76, and 66, respectively, in order of appearance. FIG. 9B discloses SEQ ID NOs 1, 2, 5, 3, 4, 8, 6, 7, 10, 9, 12, 11, 14, 13, 15, 16, 18, 19, 17, 20, 21, 23, 22, 24, 25, 26, 27, 29, 28, 30, 31, 33, 32, 34, 35, 37, 38, 39, 40, 41, 42, 43, 45, 44, 47, 46, 50, 49, 48, 51, 52, 54, 53, 36, 56, 55, 57, 58, 59, 60, 62, 61, 63, 64, 67, 65, 66, 68, 69, 71, 70, 72, 73, 74, 75, 77, 76, and 66, respectively, in order of appearance.

DETAILED DESCRIPTION OF THE INVENTION

Figure 1:
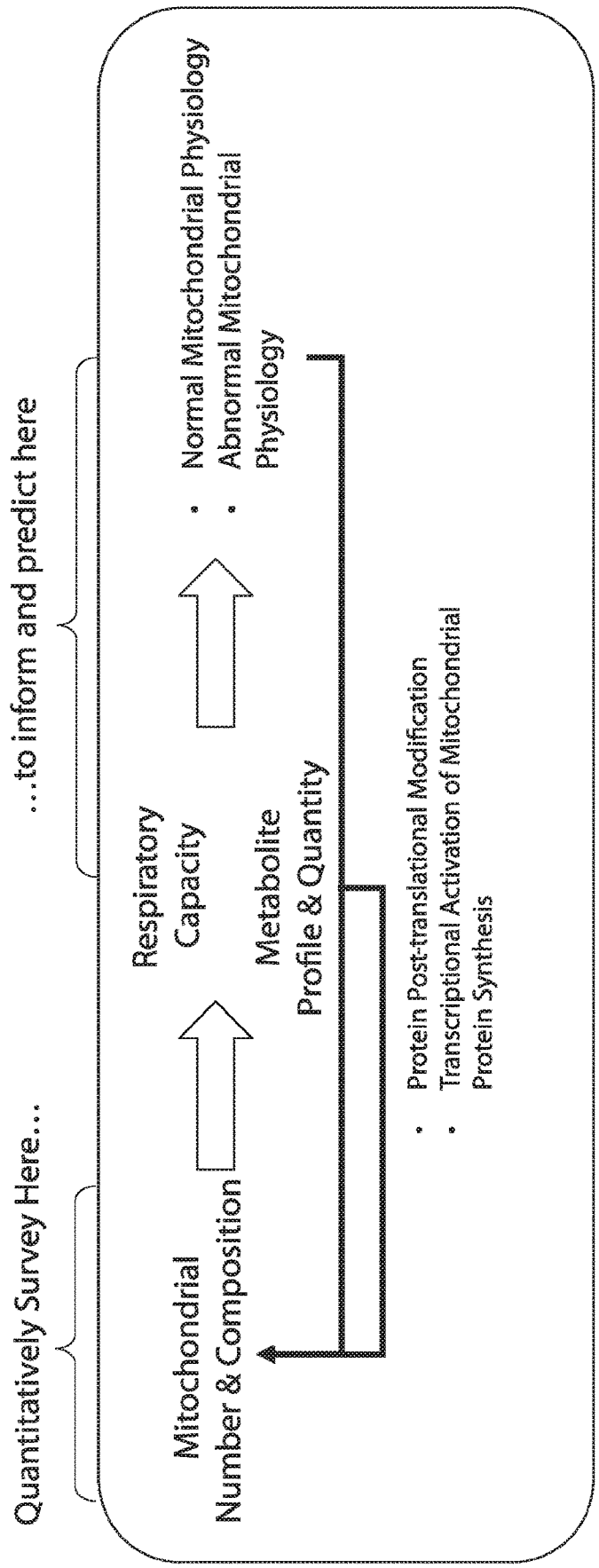
FIG. 1 depicts in accordance with various embodiments of the invention, conceptual approach that links the importance of quantitative mitochondrial protein expression and qualitative mitochondrial protein composition to understanding, predicting, and monitoring normal and abnormal mitochondrial physiology.
Figure 2A:
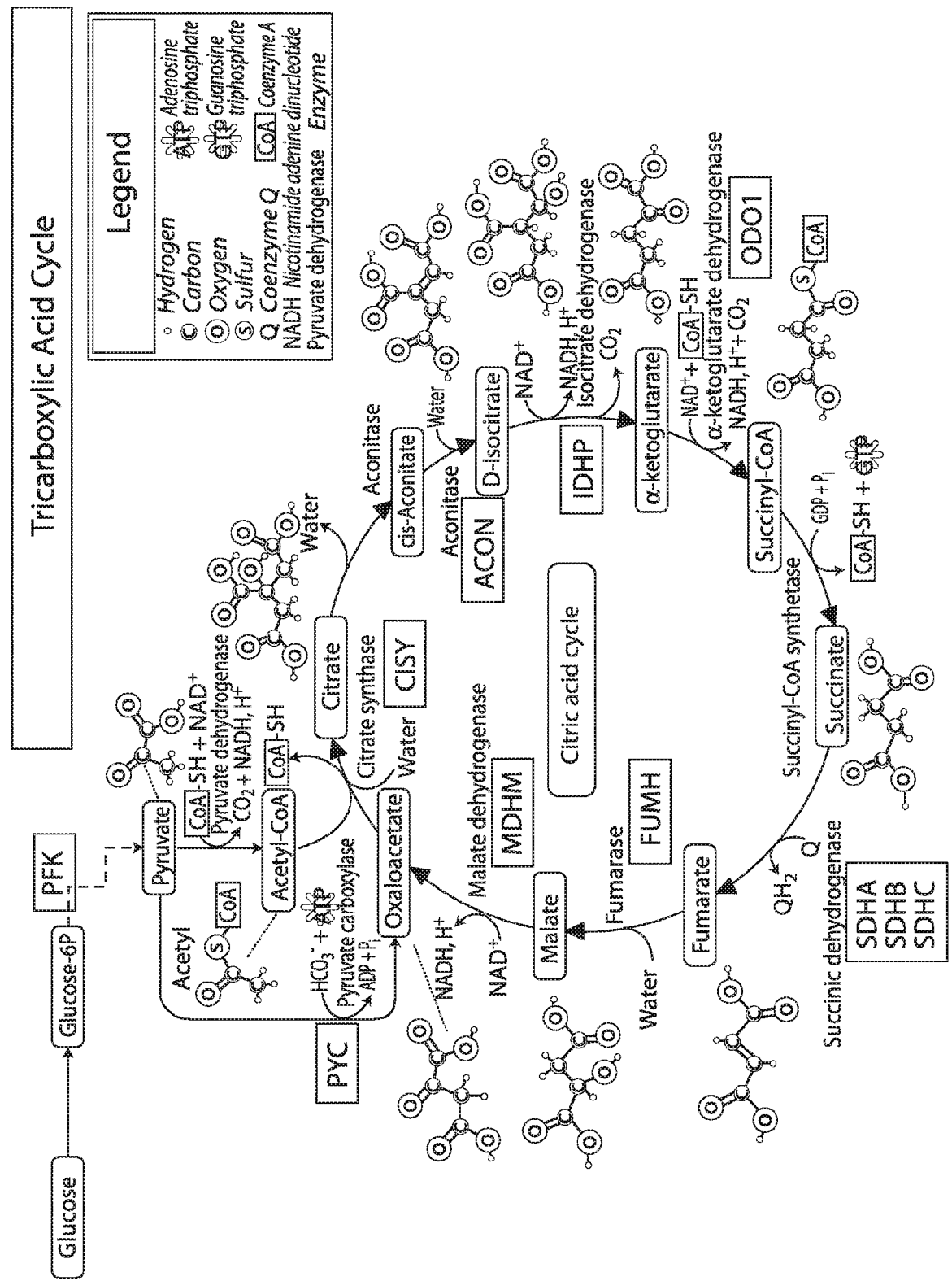
FIG. 2A-FIG. 2D depicts in accordance with various embodiments of the invention, the targeted mitochondrial proteins and their general functional classification.
Figure 2B:
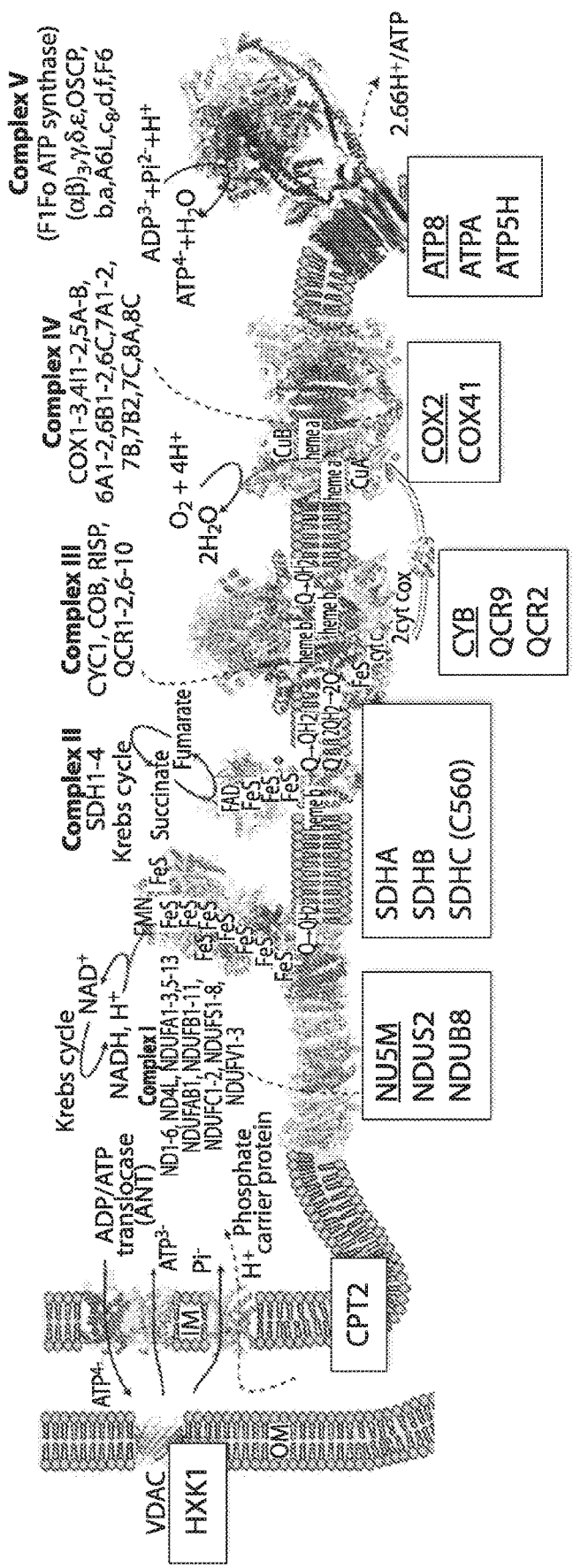
Figure 2C:
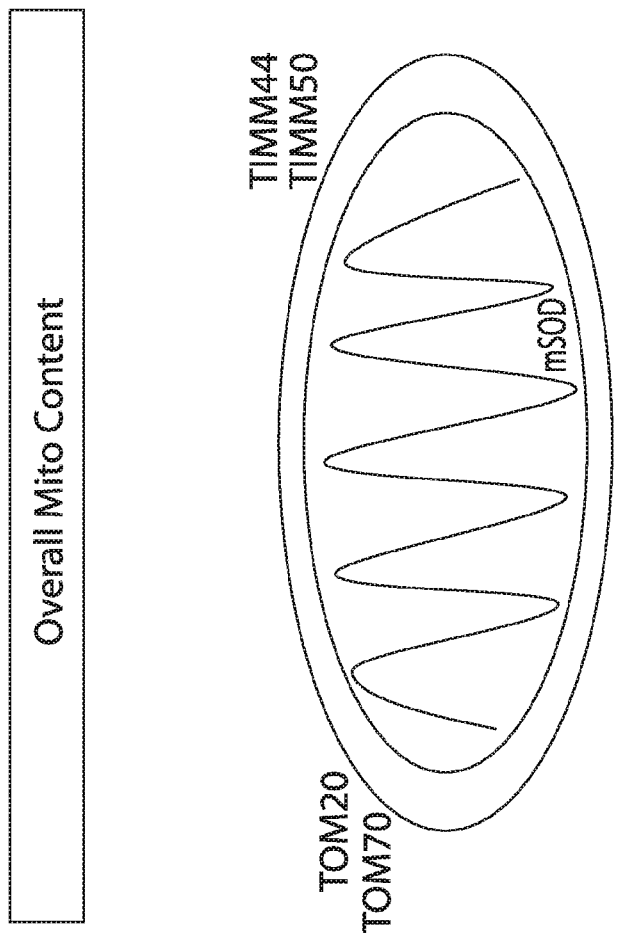
Figure 2D:
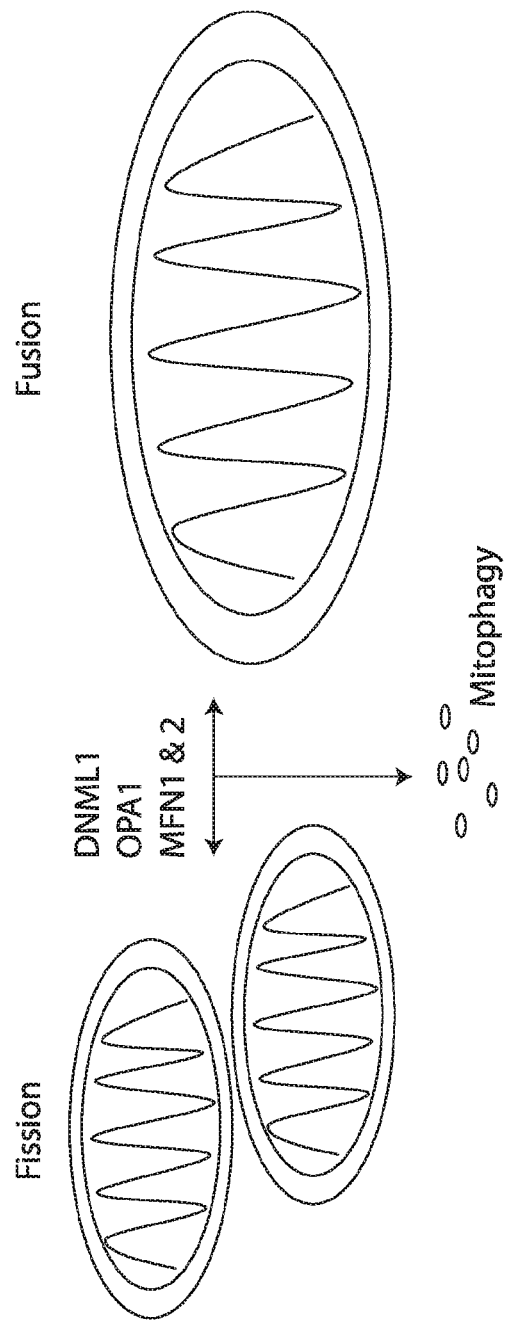
Figure 3B:
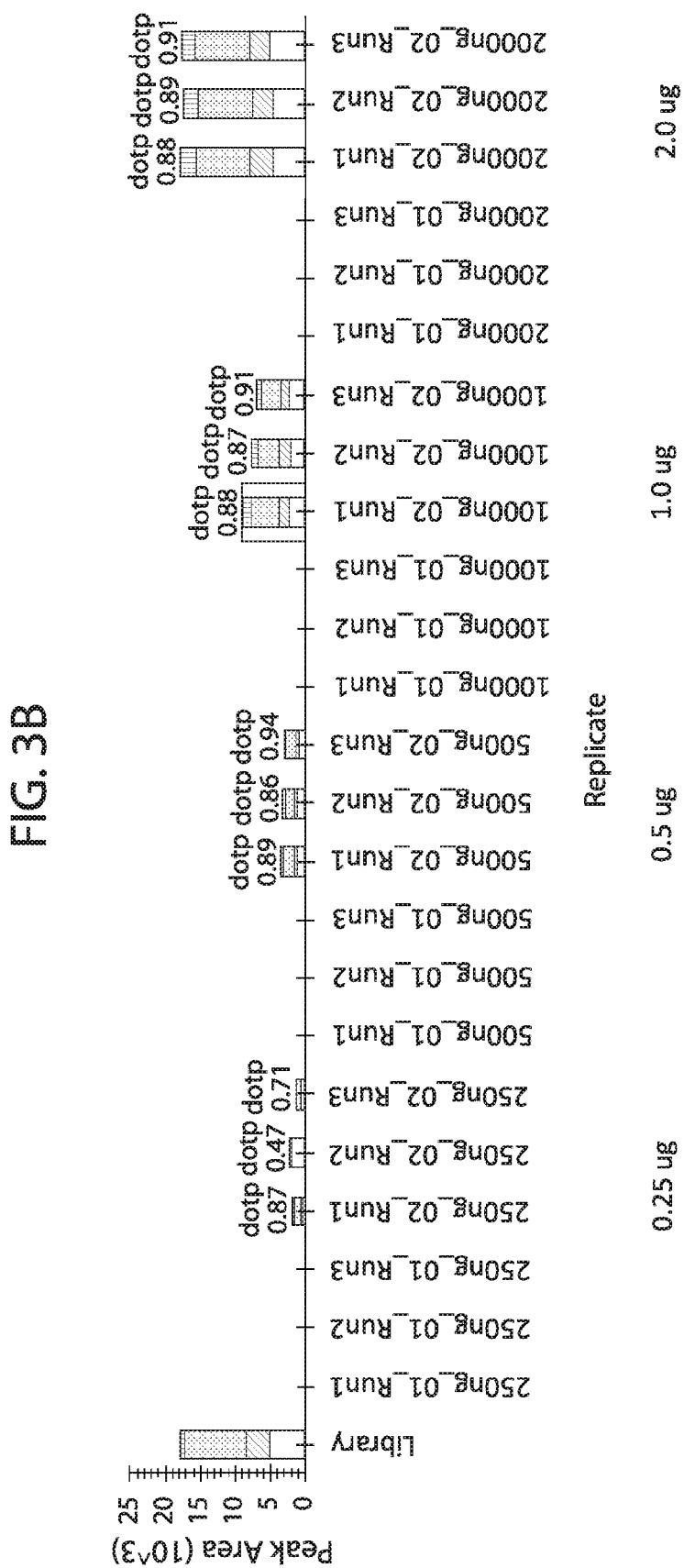
Figure 4B:
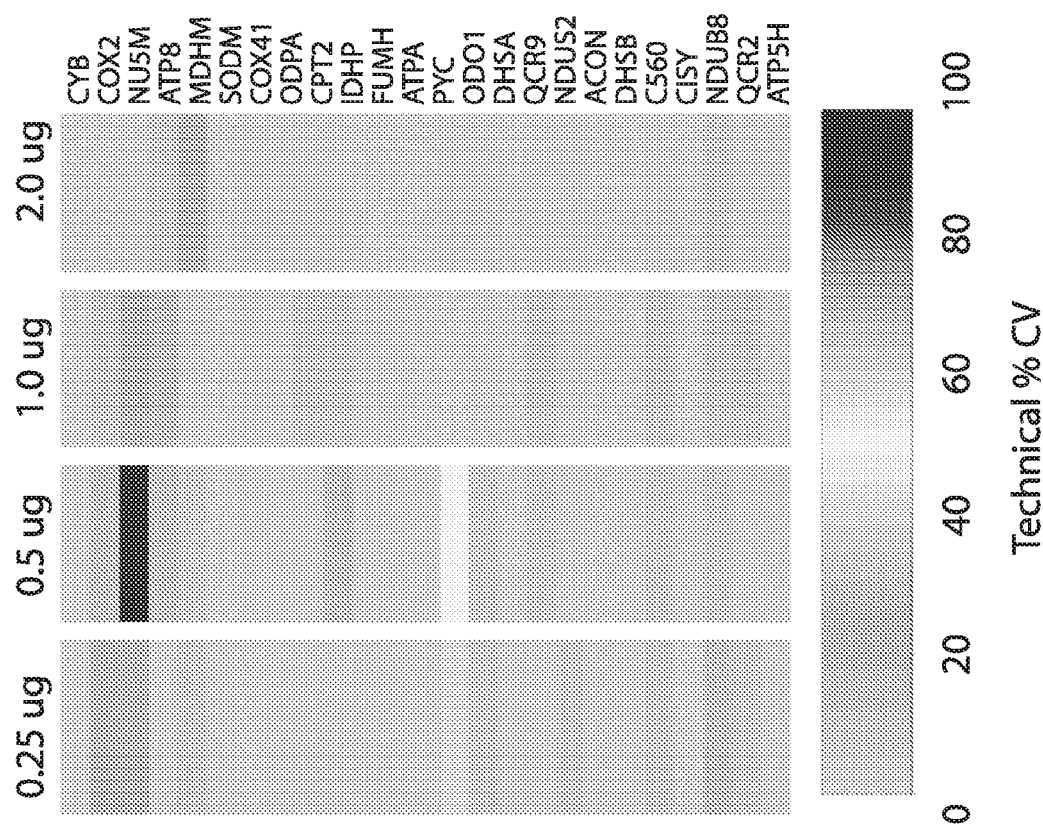
FIG. 4A-FIG. 4B depicts in accordance with various embodiments of the invention, the high reproducibility of the quantitation of each of a set of preliminary analytes from the mouse mitoplex kit, both at the level of the individual curated peptides selected for inclusion (FIG. 4A), and the aggregated quantity of each mitochondrial protein target calculated from the curated peptide values (FIG. 4B). Reproducibility of quantification is a product of optimized peptide selection, sample preparation, Q3/fragment selection, and instrument methodology.
Figure 4A:
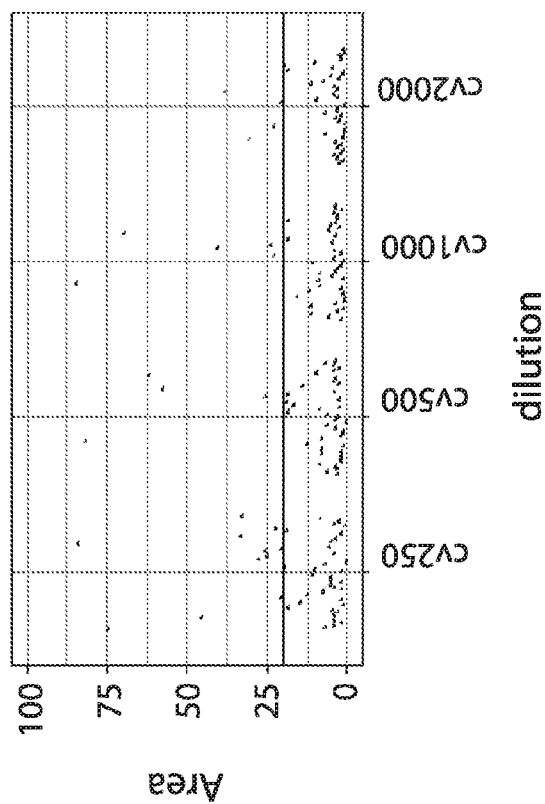
Figure 5A:
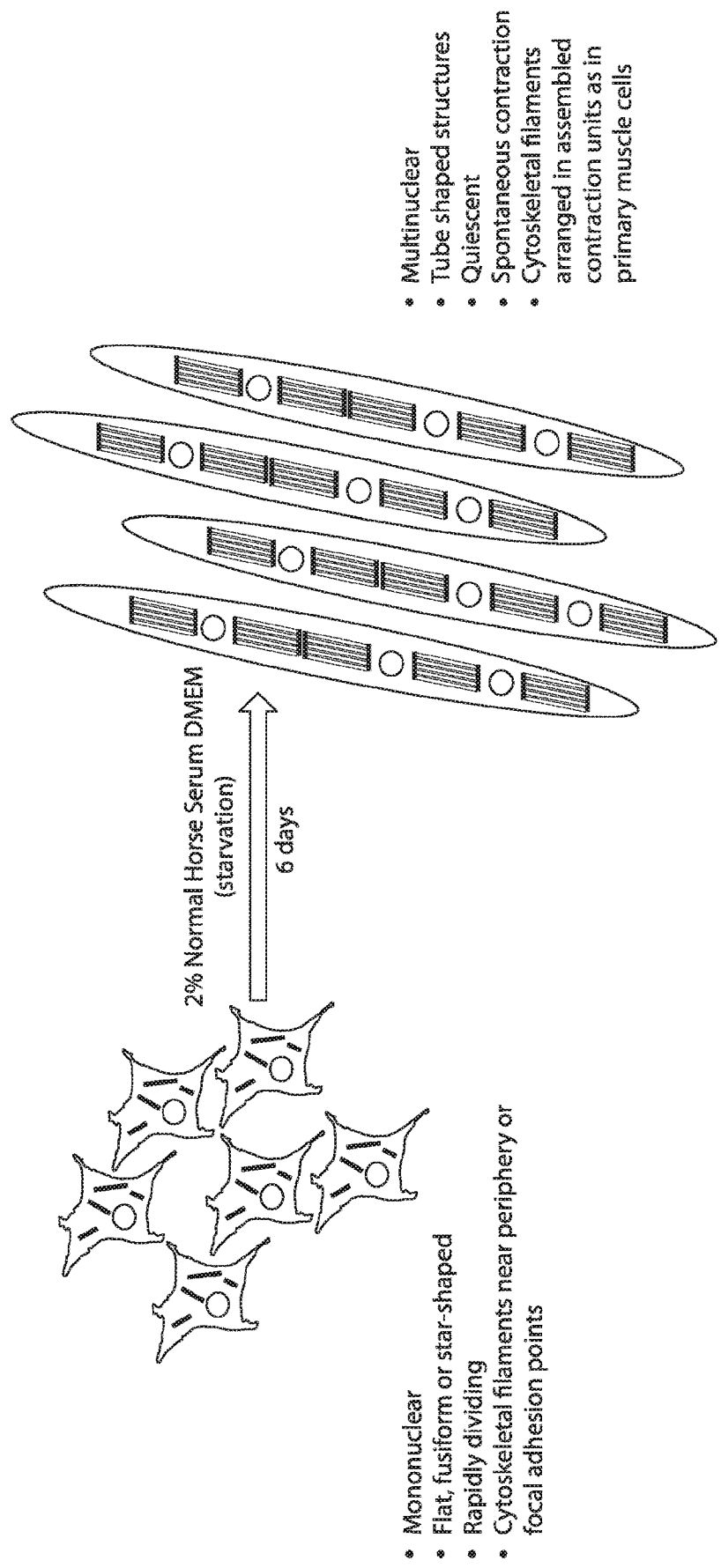
FIG. 5A-FIG. 5C depicts in accordance with various embodiments of the invention, the performance of the mouse mitoplex for tracking important changes in mitochondrial protein quantity within a relevant biological system (Mouse Mitoplex—C2C12 Myoblasts vs Myotubes). Striated/skeletal muscle C2C12 cell line provides a model for analyzing 'blast'-like or naïve cells through their differentiation into a functional, contractile cell phenotype (FIG. 5A). This transition includes a massive shift in cellular metabolic profile, including distinct changes in mitochondrial respiration (FIG. 5B). Mouse Mitoplex demonstrates significant and distinguished changes in quantity across the majority of mitochondrial proteins in the mouse mitoplex kit (FIG. 5C).
Figure 5B:
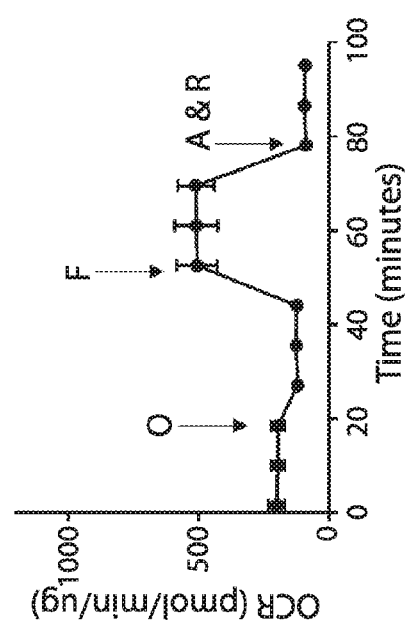
Figure 5B:
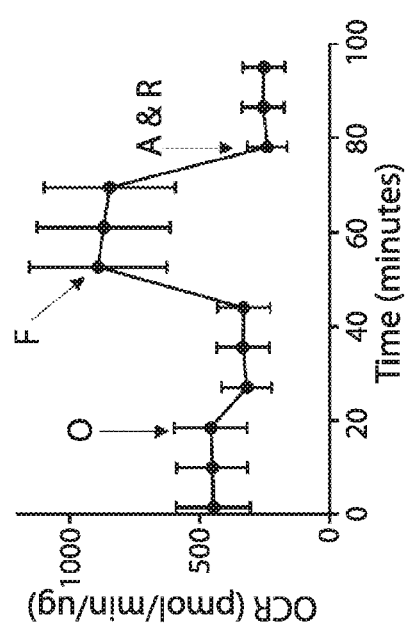
Figure 5B:
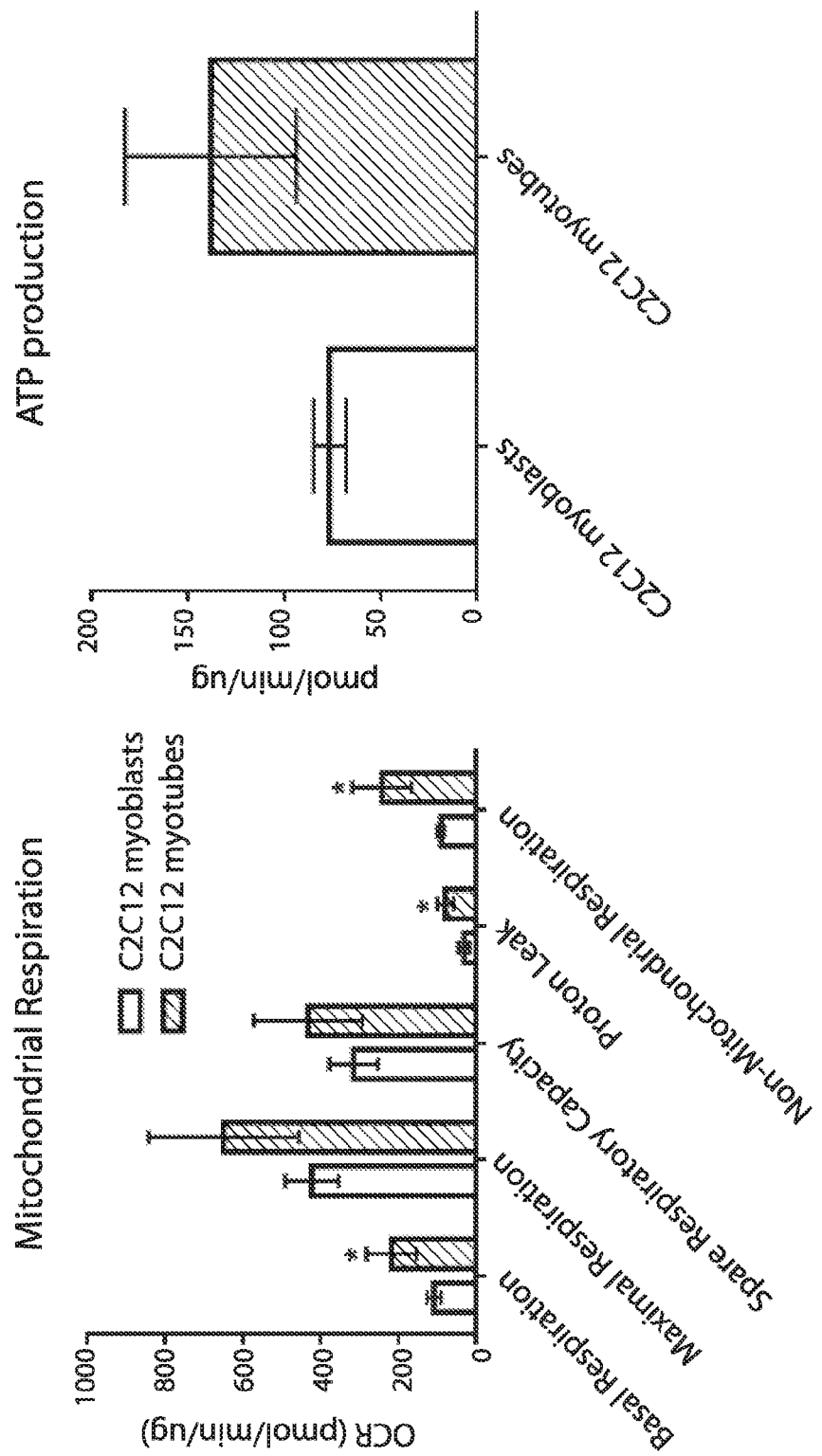
Figure 5C:
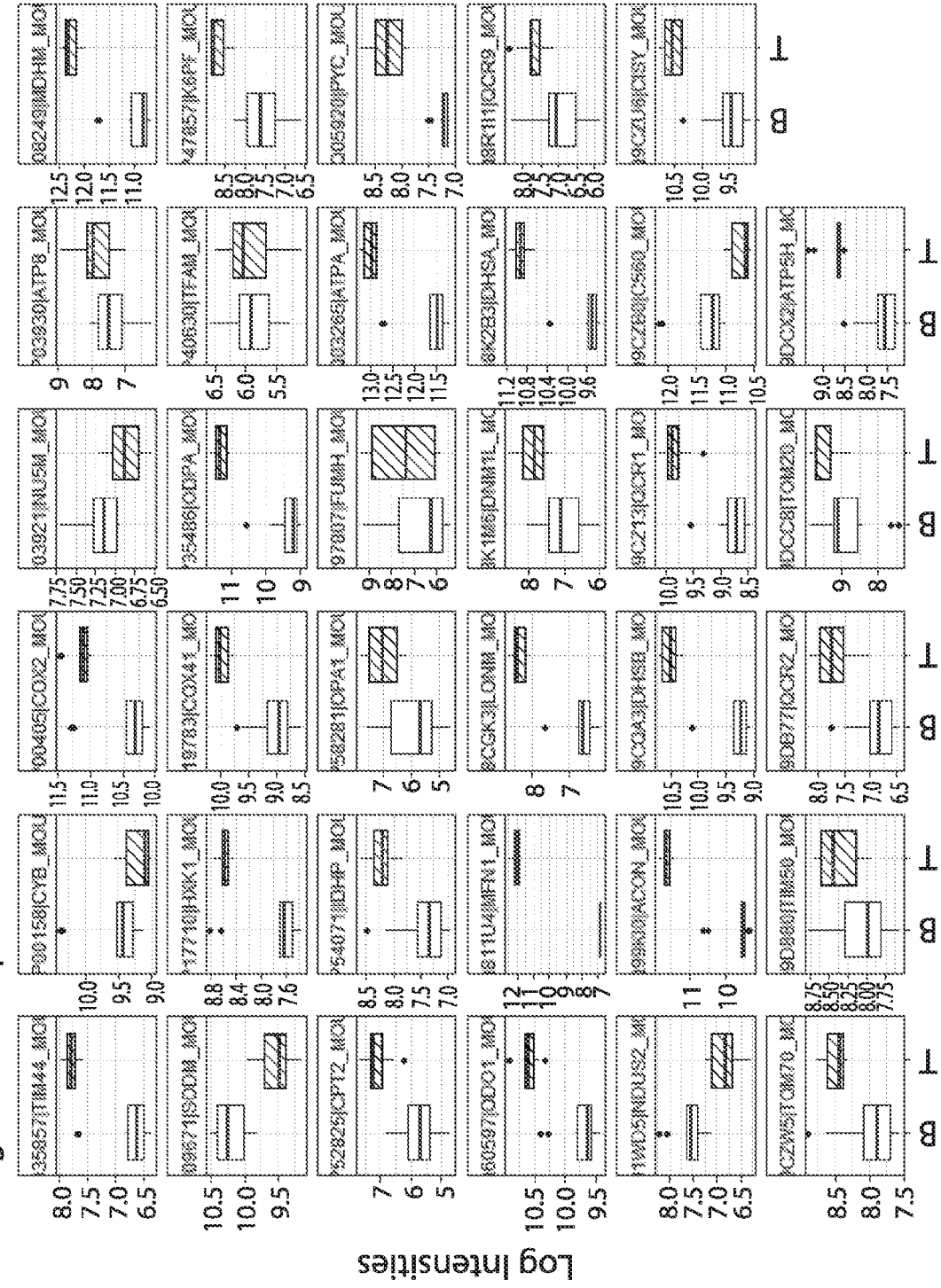
Figure 6:
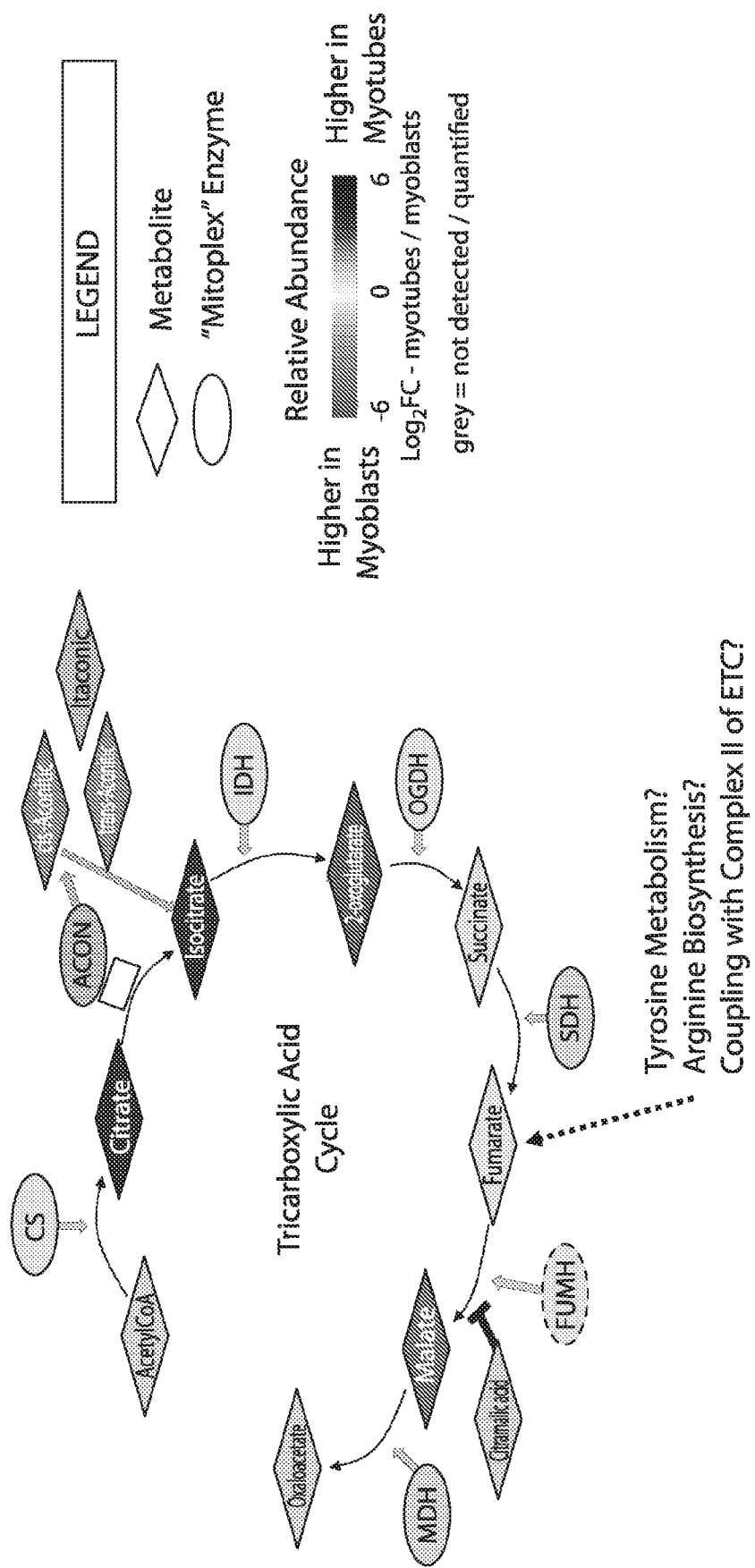
FIG. 6 depicts in accordance with various embodiments of the invention, that integration of mitoplex data with orthogonally acquired metabolite quantification enables the elucidation of instances of substrate shunting and novel biological pathways utilized in C2C12 cells in different states, thus demonstrating a core value of multiplexed mitochondrial protein profiling by the mitoplex.
Figure 7A:
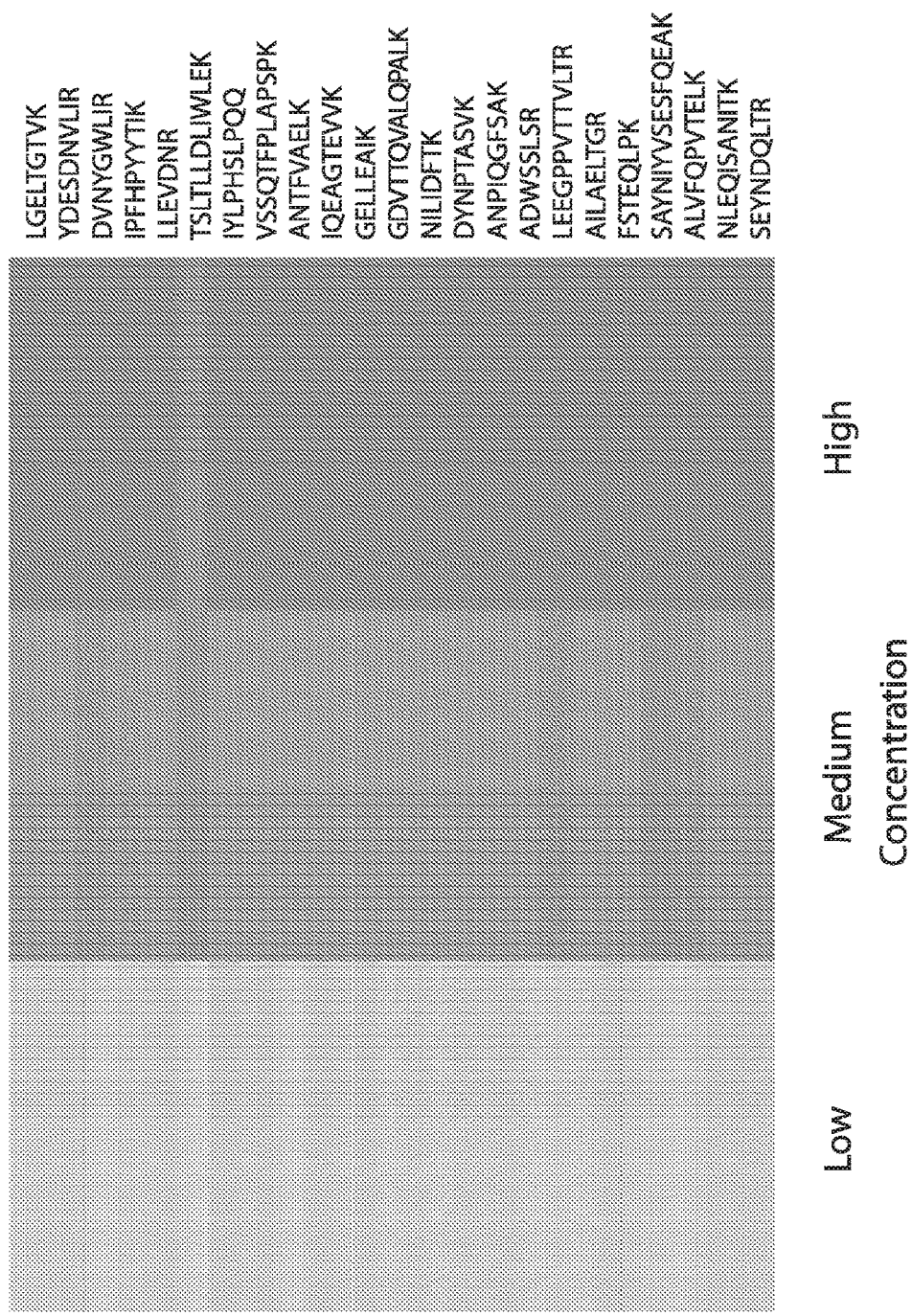
FIG. 7A-FIG. 7B depicts in accordance with various embodiments of the invention, mouse stable isotope labeled reference peptides performance in cell matrix. Performance data on Stable Isotope Labelled peptides spiked into mouse whole cell lysate at three different concentrations. Data show excellent linearity of quantified peptide data across the three concentrations, as well as the majority of peptides with technical % CVs less than 20.
Figure 7A:
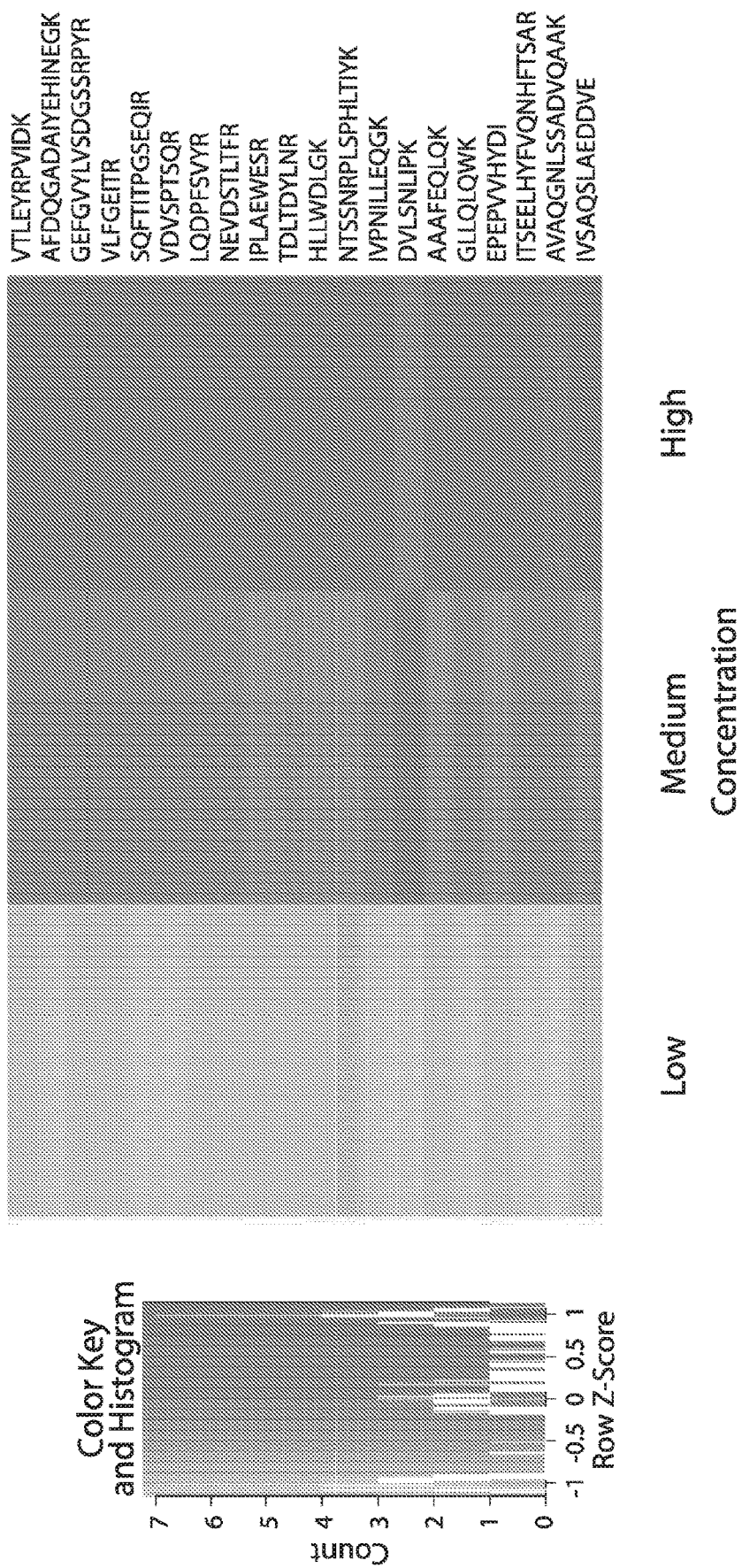
Figure 7B:
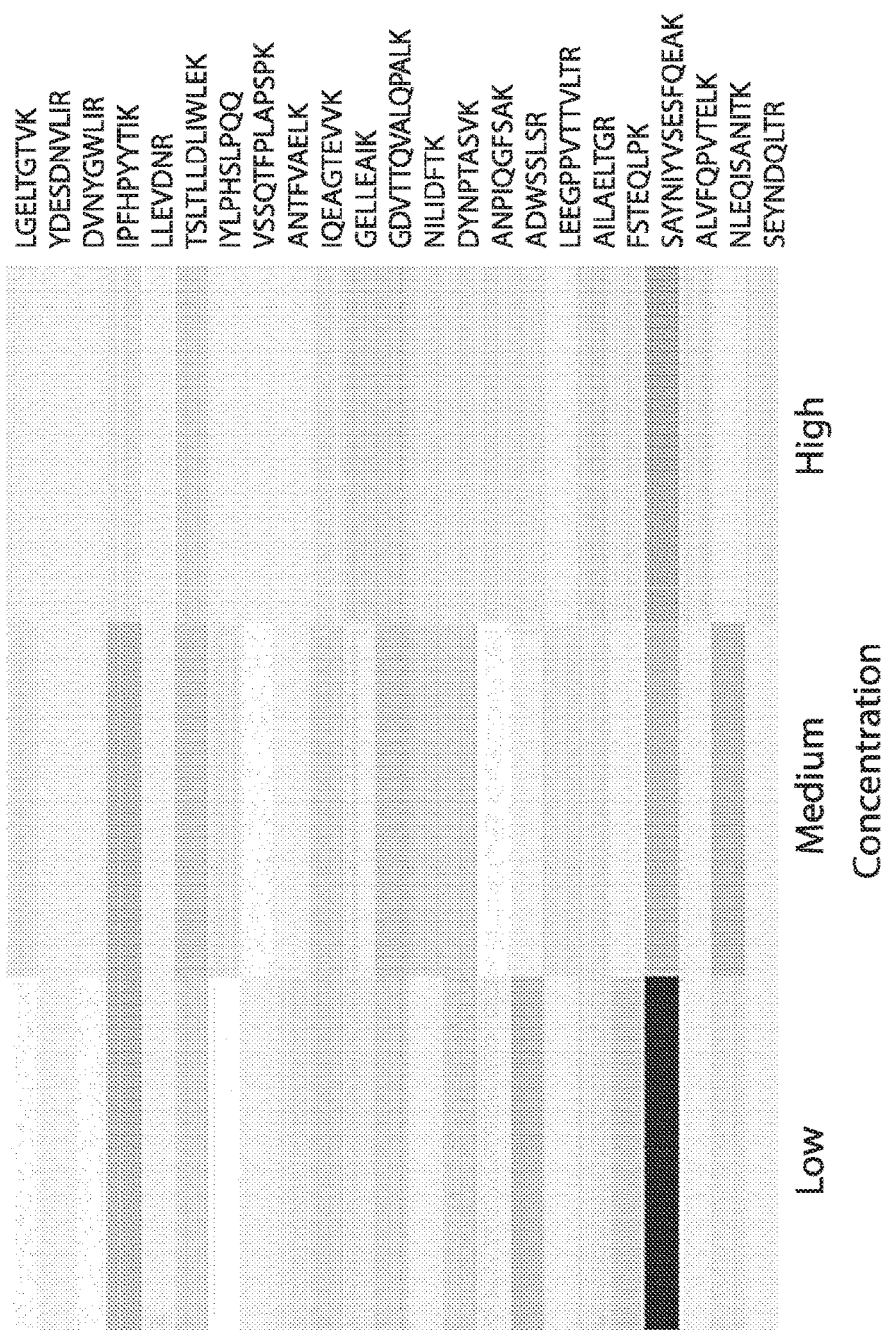
Figure 7B:
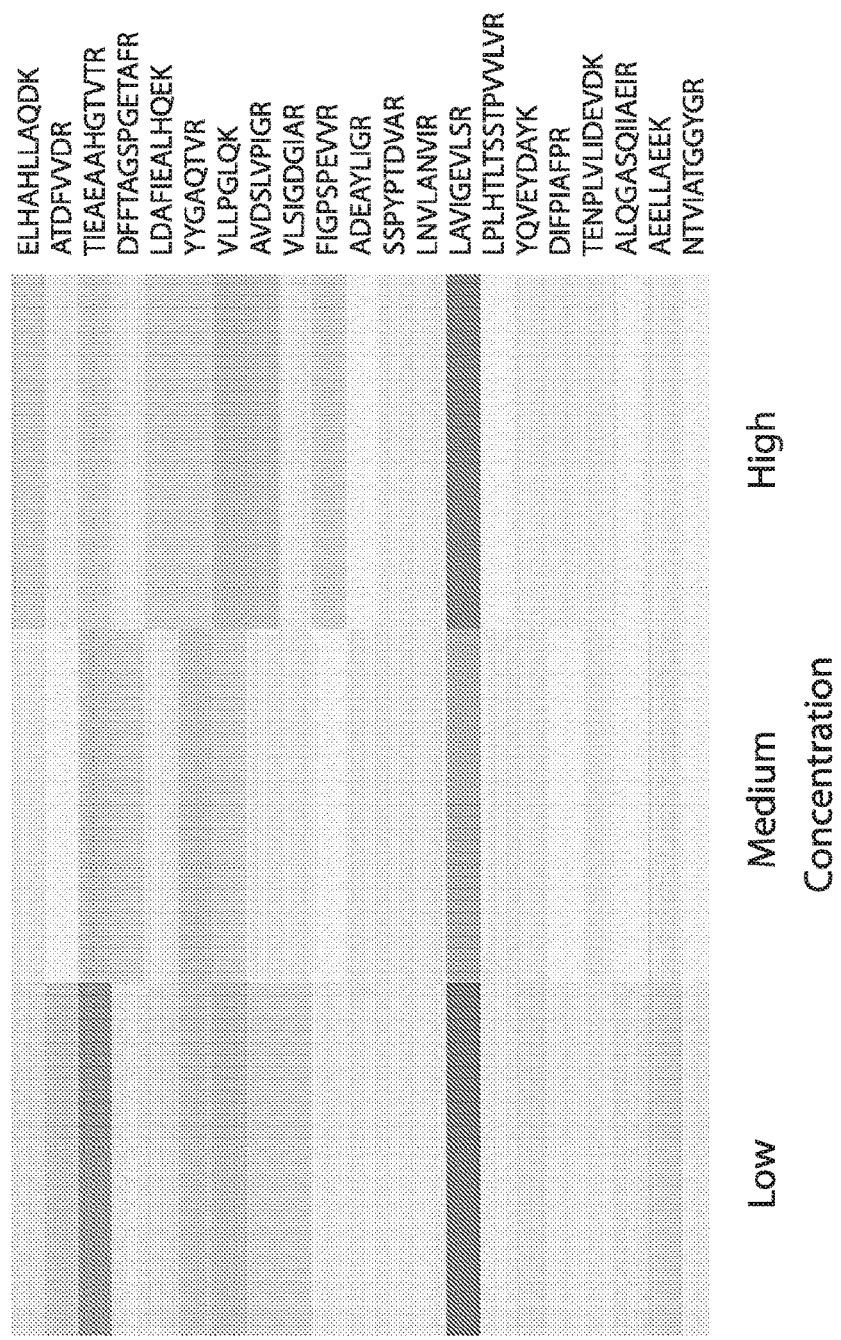
Figure 7B:
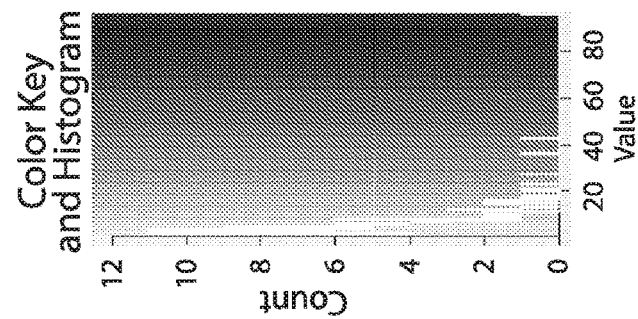
Figure 7B:
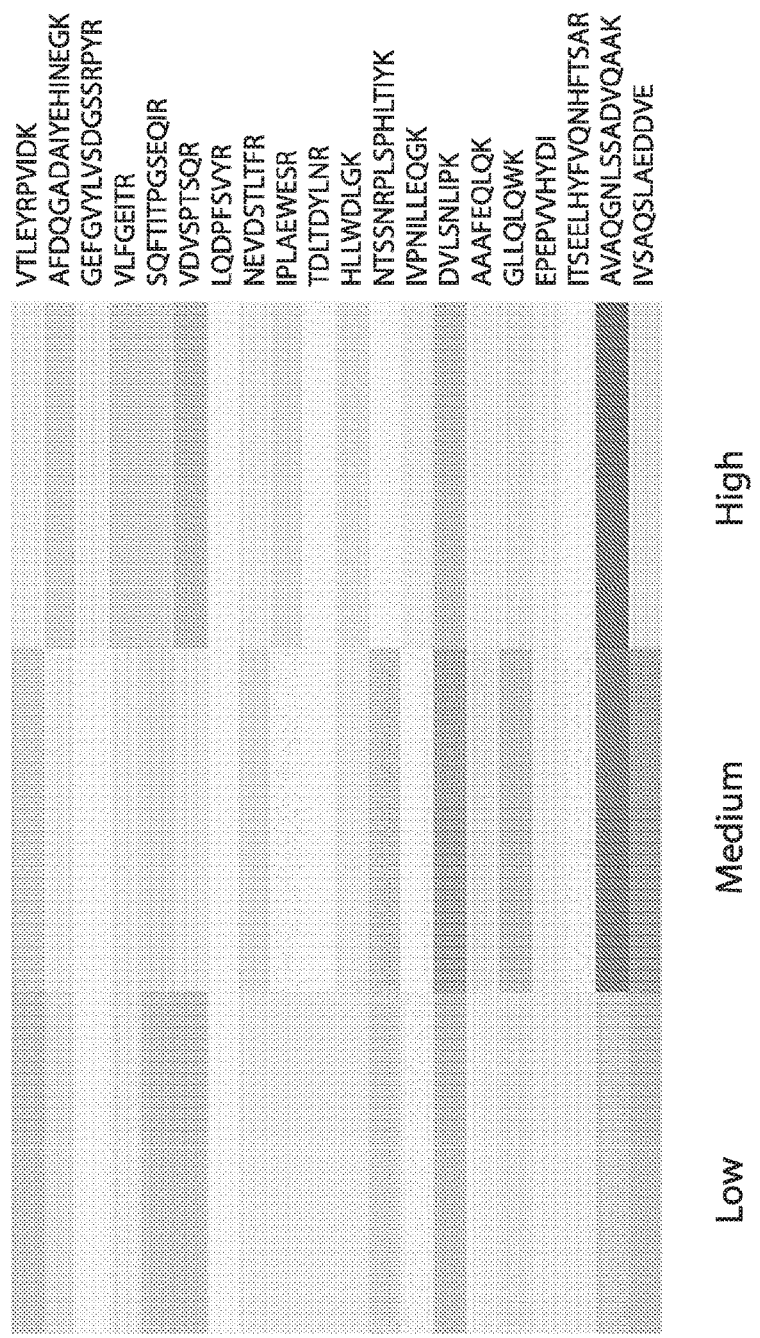
Figure 7B:
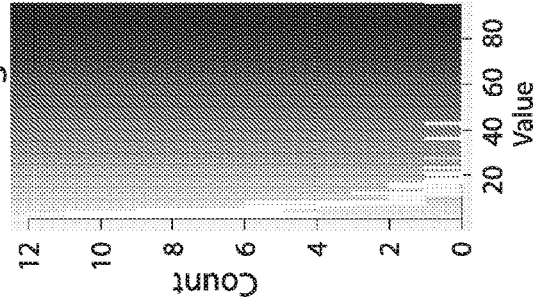

All references cited herein are incorporated by reference in their entirety as though fully set forth. Unless defined otherwise, technical and scientific terms used herein have the same meaning as commonly understood by one of ordinary skill in the art to which this invention belongs. Allen et al., *Remington: The Science and Practice of Pharmacy* 22$^{nd}$ ed., Pharmaceutical Press (Sep. 15, 2012); Hornyak et al., *Introduction to Nanoscience and Nanotechnology*, CRC Press (2008); Singleton and Sainsbury, *Dictionary of Microbiology and Molecular Biology* 3$^{rd}$ ed., revised ed., J. Wiley & Sons (New York, NY 2006); Smith, *March's Advanced Organic Chemistry Reactions, Mechanisms and Structure* 7$^{th}$ ed., J. Wiley & Sons (New York, N.Y. 2013); Singleton, *Dictionary of DNA and Genome Technology* 3$^{rd}$ ed., Wiley-Blackwell (Nov. 28, 2012); and Green and Sambrook, *Molecular Cloning: A Laboratory Manual* 4th ed., Cold Spring Harbor Laboratory Press (Cold Spring Harbor, NY 2012), provide one skilled in the art with a general guide to many of the terms used in the present application.

For references on mass spectrometry and proteomics, see e.g., Salvatore Sechi, *Quantitative Proteomics by Mass Spectrometry (Methods in Molecular Biology)* 2nd ed. 2016

Edition, Humana Press (New York, NY, 2009); Daniel Martins-de-Souza, Shotgun *Proteomics: Methods and Protocols* 2014 edition, Humana Press (New York, NY, 2014); Jörg Reinders and Albert Sickmann, *Proteomics: Methods and Protocols (Methods in Molecular Biology)* 2009 edition, Humana Press (New York, NY, 2009); and Jörg Reinders, *Proteomics in Systems Biology: Methods and Protocols (Methods in Molecular Biology)* 1$^{st}$ ed. 2016 edition, Humana Press (New York, NY, 2009).

One skilled in the art will recognize many methods and materials similar or equivalent to those described herein, which could be used in the practice of the present invention. Other features and advantages of the invention will become apparent from the following detailed description, taken in conjunction with the accompanying drawings, which illustrate, by way of example, various features of embodiments of the invention. Indeed, the present invention is in no way limited to the methods and materials described. For convenience, certain terms employed herein, in the specification, examples and appended claims are collected here.

Unless stated otherwise, or implicit from context, the following terms and phrases include the meanings provided below. Unless explicitly stated otherwise, or apparent from context, the terms and phrases below do not exclude the meaning that the term or phrase has acquired in the art to which it pertains. Unless otherwise defined, all technical and scientific terms used herein have the same meaning as commonly understood by one of ordinary skill in the art to which this invention belongs. It should be understood that this invention is not limited to the particular methodology, protocols, and reagents, etc., described herein and as such can vary. The definitions and terminology used herein are provided to aid in describing particular embodiments, and are not intended to limit the claimed invention, because the scope of the invention is limited only by the claims.

As used herein the term "comprising" or "comprises" is used in reference to compositions, methods, systems, articles of manufacture, and respective component(s) thereof, that are useful to an embodiment, yet open to the inclusion of unspecified elements, whether useful or not. It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). Although the open-ended term "comprising," as a synonym of terms such as including, containing, or having, is used herein to describe and claim the invention, the present invention, or embodiments thereof, may alternatively be described using alternative terms such as "consisting of" or "consisting essentially of."

Unless stated otherwise, the terms "a" and "an" and "the" and similar references used in the context of describing a particular embodiment of the application (especially in the context of claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. The abbreviation, "e.g." is derived from the Latin exempli gratia, and is used herein to indicate a non-limiting example. Thus, the abbreviation "e.g." is synonymous with the term "for example." No language in the specification should be construed as indicating any non-claimed element essential to the practice of the application.

"Optional" or "optionally" means that the subsequently described circumstance may or may not occur, so that the description includes instances where the circumstance occurs and instances where it does not.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The term "sample" or "biological sample" as used herein denotes a sample taken or isolated from a biological organism, e.g., a tissue sample from a subject. The tissue sample may or may not be maintained under "life" sustaining conditions in vitro for an extended to unlimited period of time. Exemplary samples or biological samples include, but are not limited to, cell sample; tissue sample; tumor sample; and/or tumor biopsy, whole blood, blood, serum; plasma; cheek swab; mucus; urine; saliva; semen; lymph; fecal extract; sputum; other body fluid or biofluid, etc. or any sample or biological sample that contains, may contain, or is thought to contain mitochondria or mitochondrial protein. The term also includes a mixture of the above-mentioned samples. The term "sample" also includes untreated or pretreated (or pre-processed) biological samples. In some embodiments, a sample comprises one or more cells from the subject. In some embodiments, a sample is a tissue sample from the subject. In some embodiments, the sample is selected from the group consisting of blood, whole blood, blood products, plasma, and serum. In some embodiments, the sample is selected from the group consisting of cells, tissue, whole blood, blood products, and combinations thereof. In some embodiments, the sample is selected from the group consisting of cells, tissue, and combinations thereof. In some embodiments, the sample is selected from cells, organ cells, tissue cells, and combinations thereof. In some embodiments, the cells are not red blood cells. In some embodiments, the cells are cultured cells, wherein the cultured cells are selected from the group of suspension cells, adherent cells, and partial adherent cells. In some embodiments, the tissue is selected from epithelial tissue, connective tissue, muscular tissue, nervous tissue, and combinations thereof. In some embodiments, the sample is selected from the group consisting of cells, tissue, and combinations thereof. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof.

The terms "body fluid" or "bodily fluids" are liquids originating from inside the bodies of organisms. Bodily fluids include amniotic fluid, aqueous humour, vitreous humour, bile, blood (e.g., serum), breast milk, cerebrospinal fluid, cerumen (earwax), chyle, chyme, endolymph and perilymph, exudates, feces, female ejaculate, gastric acid, gastric juice, pancreatic juice, lymph, mucus (e.g., nasal drainage and phlegm), pericardial fluid, peritoneal fluid, pleural fluid, pus, rheum, saliva, sebum (skin oil), serous fluid, semen, smegma, sputum, synovial fluid, sweat, tears, urine, vaginal secretion, and vomit. Extracellular bodily fluids include intravascular fluid (blood plasma), interstitial fluids, lymphatic fluid and transcellular fluid. "Biological sample" also includes a mixture of the above-mentioned body fluids. "Biological samples" may be untreated or pretreated (or pre-processed) biological samples.

Sample collection procedures and devices known in the art are suitable for use with various embodiment of the present invention. Examples of sample collection procedures and devices include but are not limited to: phlebotomy tubes (e.g., a vacutainer blood/specimen collection device for collection and/or storage of the blood/specimen), dried blood spots, Microvette CB300 Capillary Collection Device (Sarstedt), HemaXis blood collection devices (microfluidic technology, Hemaxis), Volumetric Absorptive Microsampling (such as CE-IVD Mitra microsampling device for accurate dried blood sampling (Neoteryx), HemaSpot™-HF Blood Collection Device; a cell sampling device; cell collection device; a tissue sampling device; a tissue sample collection device. Additional sample collection procedures and devices include but are not limited to: standard collection/storage device (e.g., a collection/storage device for collection and/or storage of a sample (e.g., blood, plasma, serum, urine, etc.). In some embodiments, the Volumetric Absorptive Microsampling (VAMS™) samples can be stored and mailed, and an assay can be performed remotely.

As used herein, a "subject" means a human or animal. Usually the animal is a vertebrate such as a primate, rodent, domestic animal or game animal. Primates include chimpanzees, cynomologous monkeys, spider monkeys, and macaques, e.g., Rhesus. Rodents include mice, rats, woodchucks, ferrets, rabbits and hamsters. Domestic and game animals include cows, horses, pigs, deer, bison, buffalo, feline species, e.g., domestic cat, and canine species, e.g., dog, fox, wolf. The terms, "patient", "individual" and "subject" are used interchangeably herein. In an embodiment, the subject is mammal. The mammal can be a human, non-human primate, mouse, rat, dog, cat, horse, or cow, but are not limited to these examples. In various embodiments, the subject is mouse or mice. In various embodiments, the subject is human.

"Mammal" as used herein refers to any member of the class Mammalia, including, without limitation, humans and nonhuman primates such as chimpanzees and other apes and monkey species; farm animals such as cattle, sheep, pigs, goats and horses; domestic mammals such as dogs and cats; laboratory animals including rodents such as mice, rats and guinea pigs, and the like. The term does not denote a particular age or sex. Thus, adult and newborn subjects, as well as fetuses, whether male or female, are intended to be included within the scope of this term.

As used herein, the term "amino acid" refers to naturally occurring and synthetic amino acids, as well as amino acid analogs and amino acid mimetics that function in a manner similar to the naturally occurring amino acids. Naturally occurring amino acids are those encoded by the genetic code, as well as those amino acids that are later modified, e.g., hydroxyproline, -carboxyglutamate, and O-phosphoserine. Amino acid analogs refers to compounds that have the same basic chemical structure as a naturally occurring amino acid, i.e., an carbon that is bound to a hydrogen, a carboxyl group, an amino group, and an R group, e.g., homoserine, norleucine, methionine sulfoxide, methionine methyl sulfonium. Such analogs have modified R groups (e.g., norleucine) or modified peptide backbones, but retain the same basic chemical structure as a naturally occurring amino acid. Amino acid mimetics refers to chemical compounds that have a structure that is different from the general chemical structure of an amino acid, but that functions in a manner similar to a naturally occurring amino acid. Amino acids may be referred to herein by either their commonly known three letter symbols or by the one-letter symbols recommended by the IUPAC-IUB Biochemical Nomenclature Commission. Nucleotides, likewise, may be referred to by their commonly accepted single-letter codes.

A protein refers to any of a class of nitrogenous organic compounds that comprise large molecules composed of one or more long chains of amino acids and are an essential part of all living organisms. A protein may contain various modifications to the amino acid structure such as disulfide bond formation, phosphorylations and glycosylations. A linear chain of amino acid residues may be called a "polypeptide." A protein contains at least one polypeptide.

The term "peptide" as used herein refers to any compound containing at least two amino acid residues joined by an amide bond formed from the carboxyl group of one amino acid residue and the amino group of the adjacent amino acid residue. In some embodiments, the term "peptide" as used herein refers to a polymer of amino acid residues typically ranging in length from 2 to about 12 residues, or 2 to about 20 residues, or 2 to about 30 residues, or 2 to about 40 residues, or 2 to about 50 residues, or 2 to about 60 residues, or 2 to about 70 residues.

In some embodiments, the protein is modified. In some embodiments, the protein contains a modification. In some embodiments, the modification is a chemical modification. In some embodiments, the modification is selected from the group consisting of phosphorylation, methylation, acetylation, o-GlcNAcylation, s-nitrosylation, citrullination, sumoylation, ubiquitinylation, neddylation, methyglyoxylation, post-translational modification, and combinations thereof.

In some embodiments, the peptide is modified. In some embodiments, the peptide contains a modification. In some embodiments, the modification is a chemical modification. In some embodiments, the modification is selected from the group consisting of phosphorylation, methylation, acetylation, o-GlcNAcylation, s-nitrosylation, citrullination, sumoylation, ubiquitinylation, neddylation, methyglyoxylation, post-translational modification, and combinations thereof.

In some embodiments, the amino acid is modified. In some embodiments, the amino acid contains a modification. In some embodiments, the modification is a chemical modification. In some embodiments, the modification is selected from the group consisting of phosphorylation, methylation, acetylation, o-GlycNacylation, s-nitrosylation, citrullination, sumoylation, ubiquitinylation, neddylation, methyglyoxylation, post-translational modification, and combinations thereof.

In some embodiments, cysteine is modified with iodoacetamide which generates Carboxyamidomethylcysteine. In some embodiments, methionine is modified by oxidation.

The term "threshold" as used herein refers to the magnitude or intensity that must be exceeded for a certain reaction, phenomenon, result, or condition to occur or be considered relevant. The relevance can depend on context, e.g., it may refer to a positive, reactive or statistically significant relevance.

The term "phenotype" as used herein comprises the composite of an organism's observable characteristics or traits, such as its morphology, development, biochemical or physiological properties, phenology, behavior, and products of behavior.

As used herein the term "tricarboxylic acid cycle" or "TCA cycle" refers to a series of chemical reactions that occur in the matrix of the mitochondria to release stored energy through the oxidation of acetyl-CoA derived from carbohydrates, fats, and proteins into carbon dioxide and chemical energy in the form of adenosine triphosphate (ATP).

As used herein the term "oxidative phosphorylation" or "OXPHOS" refers to the metabolic pathway in which the mitochondria use enzymes to oxidize nutrients, thereby releasing energy which is used to produce adenosine triphosphate (ATP).

As used herein the term "MitoGeneral" refers to proteins that serve as overall indices of mitochondrial content or status (e.g., core inner and outer membrane proteins like TIMM50 and TOM70, respectively, and buffering enzymes like mnSOD).

As used herein the term "MitoDynamics" refers to proteins indicative or regulatory of mitochondrial biogenesis, degradation, fusion, and/or fission.

The terms "proteases" and "peptidases" are used interchangeably herein to mean enzymes that breakdown proteins and peptides.

The terms "marker" or "biomarker" are used interchangeably herein, and in the context of the present invention refer to a protein (e.g., a mitochondrial protein, a human mitochondrial protein, a mouse mitochondrial protein) or peptide (e.g., a peptide obtained by trypsin digestion of a mitochondrial protein, a peptide obtained by trypsin digestion of a human mitochondrial protein, a peptide obtained by trypsin digestion of a mouse mitochondrial protein) that is differentially present or has a change in level in a sample obtained from a subject as compared to a reference sample. Biomarkers may be determined as specific proteins or peptides which may be detected by mass spectrometry. In some applications, for example, mass spectrometry may be used to determine one or more biomarkers, differences between individual biomarkers, and/or the partial or complete biomarker profile or biomarker signature for a subject.

A "test amount" of a marker refers to an amount of a marker present in a sample being tested. A test amount can be either in absolute amount (e.g., ug/mL) or a relative amount (e.g., relative intensity of signals).

A "control amount" of a marker can be any amount or a range of amount which is to be compared against a test amount of a marker. A control amount can be either in absolute amount (e.g., ug/mL) or a relative amount (e.g., relative intensity of signals).

The term "differentially present" or "change in level" refers to differences in the quantity and/or frequency of a marker present in a sample obtained from a subject as compared to a reference sample. For example, a marker can be present at an elevated level or at a decreased level in a sample from a subject compared to a reference sample. Alternatively, a marker can be detected at a higher frequency or at a lower frequency in a sample from a subject compared to a reference sample.

The term "mitoplex" is used herein to mean the list of human mitochondrial proteins according to Table 1 or the list of list of mouse mitochondrial proteins according to Table 2.

The term "mouse mitoplex" is used herein to mean the list of mouse mitochondrial proteins according to Table 2.

The term "human mitoplex" is used herein to mean the list of human mitochondrial proteins according to Table 1.

The term "stable isotope" refers to an isotope of a chemical element which is not spontaneously radioactive.

The terms "stable isotope-labeled" and "isotopically labeled" are used interchangeably herein to refer to material (e.g., a protein, peptide, etc.) which is modified to incorporate one or more stable isotopes, such that the modified material comprises more atoms of a given element in a particular stable isotopic form than occurs in the material naturally. For example, a peptide isotopically labeled with $^{15}N$ is a peptide which has been modified to incorporate $^{15}N$ to levels greater than those that occur in the peptide naturally.

The terms "mitochondrial function" and "mitochondrial physiology" are used interchangeably herein. Examples of mitochondrial functions include the tricarboxylic acid cycle (TCA cycle), oxidative phosphorylation (OxPhos), MitoGeneral, MitoDynamics, and combinations thereof.

The terms "normal mitochondrial function" and "normal mitochondrial physiology" are used interchangeably herein to refer to normal mitochondrial function. Examples of normal mitochondrial function include normal tricarboxylic acid cycle (TCA cycle), normal oxidative phosphorylation (OxPhos), normal MitoGeneral, normal MitoDynamics, and combinations thereof.

The terms "altered mitochondrial function" and "altered mitochondrial physiology" are used interchangeably herein to refer to mitochondrial function that is different than normal mitochondrial function or is not normal mitochondrial function. Examples of altered mitochondrial functions include altered tricarboxylic acid cycle (TCA cycle), altered oxidative phosphorylation (OxPhos), altered MitoGeneral, altered MitoDynamics, and combinations thereof.

The terms "abnormal mitochondrial function" and "abnormal mitochondrial physiology" are used interchangeably herein to refer to mitochondrial function that is different than normal mitochondrial function or is not normal mitochondrial function. Examples of abnormal mitochondrial functions include abnormal tricarboxylic acid cycle (TCA cycle), abnormal oxidative phosphorylation (OxPhos), abnormal MitoGeneral, abnormal MitoDynamics, and combinations thereof.

The terms "altered mitochondrial function" and "abnormal mitochondrial function" are used interchangeably herein. The terms "altered mitochondrial physiology" and "abnormal mitochondrial physiology" are used interchangeably herein.

General molecular biology terminology and techniques are known to those of skill in the art. See, e.g., Sambrook et al., Molecular Cloning: A Laboratory Manual, Cold Spring Harbor Press, N.Y., (3.sup.rd ed., 2000); and Brent et al., Current Protocols in Molecular Biology, John Wiley & Sons, Inc. (ringbou ed., 2003).

Abbreviations: MS, Mass Spectrometry; LC-MS, liquid chromatography-mass spectrometry; LC-MS/MS, liquid chromatography-tandem mass spectrometry; LC-SRM-MS, liquid chromatography-selected reaction monitoring-mass spectrometry; LC-PRM-MS, liquid chromatography-parallel reaction monitoring-mass spectrometry, CV %. Coefficient of variation; SL peptide, Stable Isotope-Labeled Peptide; DIA-MS, Data Independent acquisition mass spectrometry.

In various embodiments the invention provides a method to identify mitochondrial protein biomarkers and patterns that are indicative of mitochondrial function. In some embodiments these methods may provide objective rationale for further testing. In various embodiments the invention provides a method for the identification of a plurality of mitochondrial proteins from a sample, wherein each mitochondrial protein is correlated to one or more peptides, wherein each peptide is correlated to one or more transitions, wherein each transition comprises a Q1 mass value. In various embodiments the invention provides a method for the identification of a plurality of mitochondrial proteins from a sample, wherein each mitochondrial protein is correlated to one or more peptides, wherein each peptide is correlated to one or more transitions, wherein each transition comprises a Q1 mass value and a Q3 mass value. In various embodiments the invention provides a method for the identification of a plurality of mitochondrial proteins from a sample, wherein each mitochondrial protein is correlated to one or more peptides, wherein each peptide is correlated to one or more transitions, wherein each transition comprises a Q1/Q3 mass value pair.

As used herein, SRM stands for selected reaction monitoring. As used herein, MRM stands for multiple reaction monitoring. As used herein, PRM stands for parallel reaction monitoring. As used herein, SWATH stands for sequential window acquisition of all theoretical fragment ion spectra. As used herein, DIA stands for data-independent analysis. As used herein, MS stands for mass spectrometry. As used herein, SIL stands for stable isotope-labeled.

As used herein, "MS data" can be raw MS data obtained from a mass spectrometer and/or processed MS data in which peptides and their fragments (e.g., transitions and MS peaks) are already identified, analyzed and/or quantified. MS data can be Selective Reaction Monitoring (SRM) data, Multiple Reaction Monitoring (MRM) data, parallel reaction monitoring (PRM) data, Shotgun CID MS data, Original DIA MS Data, MSE MS data, p2CID MS Data, PAcIFIC MS Data, AIF MS Data, XDLA MS Data, SWATH MS data, or FT-ARM MS Data, or their combinations.

In some embodiments of the present invention, based on SRM and/or MS, and/or PRM MS, allows for the detection and accurate quantification of specific peptides in complex mixtures.

Selected Reaction Monitoring or Multiple Reaction Monitoring (SRM/MRM) mass spectrometry is a technology with the potential for reliable and comprehensive quantification of substances of low abundance in complex samples. SRM is performed on triple quadrupole-like instruments, in which increased selectivity is obtained through collision-induced dissociation. It is a non-scanning mass spectrometry technique, where two mass analyzers (Q1 and Q3) are used as static mass filters, to monitor a particular fragment of a selected precursor. On triple quadrapole instruments, various ionization methods can be used including without limitation electrospray ionization, chemical ionization, electron ionization, atmospheric pressure chemical ionization, and matrix-assisted laser desorption ionization. Both the first mass analyzer and the collision cell are continuously exposed to ions from the source in a time dependent manner. Once the ions move into the third mass analyzer time dependence becomes a factor. On triple quadrupole instruments, the first quadrapole mass filter, Q1, is the primary m/z selector after the sample leaves the ionization source. Any ions with mass-to-charge ratios other than the one selected for will not be allowed to infiltrate Q1. The collision cell, denoted as "q2", located between the first quadrapole mass filter Q1 and second quadrapole mass filter Q3, is where fragmentation of the sample occurs in the presence of an inert gas like argon, helium, or nitrogen. Upon exiting the collision cell, the fragmented ions then travel onto the second quadrapole mass filter Q3, where m/z selection can occur again. The specific pair of mass-overcharge (m/z) values associated to the precursor and fragment ions selected is referred to as a "transition". The detector acts as a counting device for the ions matching the selected transition thereby returning an intensity distribution over time. MRM is when multiple SRM transitions are measured within the same experiment on the chromatographic time scale by rapidly switching between the different precursor/fragment pairs. Typically, the triple quadrupole instrument cycles through a series of transitions and records the signal of each transition as a function of the elution time. The method allows for additional selectivity by monitoring the chromatographic co-elution of multiple transitions for a given analyte.

In addition to MRM, the choice of peptides can also be quantified through Parallel-Reaction Monitoring (PRM). Parallel reaction monitoring (PRM) is the application of SRM with parallel detection of all transitions in a single analysis using a high-resolution mass spectrometer. PRM provides high selectivity, high sensitivity and high-throughput to quantify selected peptide (Q1), hence quantify mitochondrial proteins. Again, multiple peptides can be specifically selected for each mitochondrial protein. PRM methodology uses the quadrupole of a mass spectrometer to isolate a target precursor ion, fragments the targeted precursor ion in the collision cell, and then detects the resulting product ions in the Orbitrap mass analyzer. Quantification is carried out after data acquisition by extracting one or more fragment ions with 5-10 ppm mass windows. PRM uses a quadrupole time-of-flight (QTOF) or hybrid quadrupole-orbitrap (QOrbitrap) mass spectrometer to carry out the peptides/mitochondrial proteins quantitation. Examples of QTOF include but are not limited to: TripleTOF® 6600 or 5600 System (Sciex); X500R QTOF System (Sciex); 6500 Series Accurate-Mass Quadrupole Time-of-Flight (Q-TOF) (Agilent); or Xevo G2-XS QTof Quadrupole Time-of-Flight Mass Spectrometry (Waters). Examples of QObitrap include but are not limited to: Q Exactive™ Hybrid Quadrupole-Orbitrap Mass Spectrometer (the Thermo Scientific); or Orbitrap Fusion™ Tribrid™ (the Thermo Scientifc).

Non-limiting advantages of PRM include elimination of most interferences, provides more accuracy and attomole-level limits of detection and quantification, enables the confident confirmation of the peptide identity with spectral library matching, reduces assay development time since no target transitions need to be preselected, ensures UHPLC-compatible data acquisition speeds with spectrum multiplexing and advanced signal processing.

SWATH MS is a data independent acquisition (DIA) method which aims to complement traditional mass spectrometry-based proteomics techniques such as shotgun and SRM *methods. In* essence, it allows a complete and permanent recording of all fragment ions of the detectable peptide precursors present in a biological sample. It thus combines the advantages of shotgun (high throughput) with those of SRM (high reproducibility and consistency).

In some embodiments, the developed methods herein can be applied to the quantification of mitochondrial polypeptides(s) or mitochondrial protein(s) in biological sample(s). Any kind of biological samples comprising mitochondrial polypeptides or mitochondrial proteins can be the starting point and be analyzed by the methods herein. Indeed, any mitochondrial protein/peptide containing sample can be used for and analyzed by the methods produced here (e.g., tissues, cells). The methods herein can also be used with peptide mixtures obtained by digestion. Digestion of a mitochondrial polypeptide or mitochondrial protein includes any kind of cleavage strategies, such as, enzymatic, chemical, physical or combinations thereof.

The deciding factors of which mitochondrial polypeptide or mitochondrial protein will be the one of interest varies. It can be decided by performing a literature search and identifying proteins that are functionally related, are candidate mitochondrial protein biomarkers which can be used for example, for academic research, pharmaceutical research, biomarker discovery, and biotechnology research. The mitochondrial polypeptide or mitochondrial protein of interest may be determined by experimental analysis.

According to some embodiments, the following parameters of the methods provided herein are determined: trypsin (or other protease) digestion and peptide clean up, best responding mitochondrial polypeptides, best responding mitochondrial proteins, best responding fragments, fragment intensity ratios (increased high and reproducible peak intensities), optimal collision energies, and all the optimal parameters to maximize sensitivity and/or specificity of the methods.

In other embodiments, quantification of the mitochondrial polypeptides and/or of the corresponding mitochondrial proteins or activity/regulation of the corresponding mitochondrial proteins is desired. A selected peptide is labeled with a stable-isotope and used as an internal standard to achieve absolute quantification of a mitochondrial protein of interest. The addition of a quantified stable-labeled peptide analogue of the tag to the peptide sample in known amount; and subsequently the tag and the peptide of interest is quantified by mass spectrometry and absolute quantification of the endogenous levels of the mitochondrial proteins is obtained.

The present invention supports the use of mass spectrometry as platform to identify signature mitochondrial polypeptides or mitochondrial proteins for quantitative proteomics. The approach is applicable to the analysis of mitochondrial proteins from all organisms, from cells, organs, tissues, and in the context of in vivo and/or in vitro analyses. Examples of applications of the invention include the development, use and commercialization of quantitative assays for sets of mitochondrial polypeptides or mitochondrial proteins of interest. The invention can be beneficial for example to academic research, the pharmaceutical research industry, and the biotechnology industry (e.g. assay design and development and quality control).

NON-LIMITING EMBODIMENTS OF THE INVENTION

Various Methods of the Invention

In various embodiments, the present invention provides a method for obtaining a mitochondrial protein biomarker signature for a subject, the method comprising: obtaining a sample from the subject; treating the sample with one or more proteases to obtain a digested sample comprising one or more peptides; measuring the peptides in the digested sample, wherein the measuring is performed using a mass spectrometry technique; and correlating the peptides to one or more mitochondrial proteins so as to obtain a mitochondrial protein biomarker signature for the subject.

In various embodiments, the present invention provides a method for quantifying mitochondrial protein abundance in a subject, comprising: obtaining a sample from the subject; treating the sample with one or more proteases to obtain a digested sample comprising one or more peptides; measuring the peptides in the digested sample, wherein the measuring is performed using a mass spectrometry technique; and correlating the peptides to one or more mitochondrial proteins so as to quantify mitochondrial protein abundance in a subject.

In various embodiments, the present invention provides a method for determining mitochondrial protein content in a subject, comprising: obtaining a sample from the subject; treating the sample with one or more proteases to obtain a digested sample comprising one or more peptides; measuring the peptides in the digested sample, wherein the measuring is performed using a mass spectrometry technique; and correlating the peptides to one or more mitochondrial proteins so as to determine mitochondrial protein content in a subject.

Mass Spectrometry

In some embodiments, the mass spectrometer is a triple quadrupole mass spectrometer. In some embodiments the mass spectrometer is a Triple-Time Of Flight (Triple-TOF) mass spectrometer configured for SWATH or a Q-Exactive mass spectrometer (Thermo Scientific), or any instrument with sufficiently high scan speed and a quadrupole mass filter to perform data independent acquisition. Examples of triple quadrupole mass spectrometers (TQMS) that can perform MRM/SRM/SIM include but are not limited to: QTRAP® 6500 and 5500 System (Sciex); Triple QTriple Quad 6500 System (Sciex); Agilent 6400 Series Triple Quadrupole LC/MS systems; Thermo Scientific™ TSQ™ Triple Quadrupole system; quadrupole time-of-flight (QTOF) mass spectrometers, or hybrid quadrupole-orbitrap (QOrbitrap) mass spectrometers to carry out the peptides/mitochondrial proteins quantitation. Examples of quadrupole time-of-flight (QTOF) mass spectrometers include but are not limited to: TripleTOF® 6600 or 5600 System (Sciex); X500R QTOF System (Sciex); 6500 Series Accurate-Mass Quadrupole Time-of-Flight (Q-TOF) (Agilent); or Xevo G2-XS QTof Quadrupole Time-of-Flight Mass Spectrometry (Waters). Examples of hybrid quadrupole-orbitrap (QObitrap) mass spectrometers include but are not limited to: Q Exactive™ Hybrid Quadrupole-Orbitrap Mass Spectrometer (the Thermo Scientific); or Orbitrap Fusion™ Tribrid™ (the Thermo Scientific).

In some embodiments, the mass spectrometry technique is tandem mass spectrometry (MS/MS). In some embodiments, the mass spectrometry technique is liquid chromatography-tandem mass spectrometry (LC-MS/MS). In some embodiments, the mass spectrometry technique is liquid chromatography-selected reaction monitoring-mass spectrometry (LC-SRM-MS). In some embodiments, the mass spectrometry technique is liquid chromatography-multiple reaction monitoring-mass spectrometry (LC-MRM-MS). In some embodiments, the mass spectrometry technique is selected reaction monitoring. In some embodiments, the mass spectrometry technique is multiple reaction monitoring. In some embodiments, the mass spectrometry technique is parallel reaction monitoring (PRM).

Additionally, in some embodiments, the mass spectrometry is liquid chromatography-mass spectrometry (LC-MS).

In some embodiments, the mass spectrometry is liquid chromatography-parallel reaction monitoring-mass spectrometry (LC-PRM-MS).

In some embodiments, the mass spectrometry is selected from the group consisting of liquid chromatography-mass spectrometry (LC-MS), liquid chromatography-tandom mass spectrometry (LC-MS/MS), liquid chromatography-selected reaction monitoring-mass spectrometry (LC-SRM-MS), liquid chromatography-multiple reaction monitoring-mass spectrometry (LC-MRM-MS), and liquid chromatography-parallel reaction monitoring-mass spectrometry (LC-PRM-MS). In some embodiments, the mass spectrometry is selected from the group consisting of liquid chromatography-selected reaction monitoring-mass spectrometry (LC-SRM-MS), liquid chromatography-multiple reaction monitoring-mass spectrometry (LC-MRM-MS), and liquid chromatography-parallel reaction monitoring-mass spectrometry (LC-PRM-MS).

In various embodiments, the samples are biological samples or complex biological samples. In exemplary embodiments, the complex samples include, but are not limited to tissues and/or tissue extracts, and/or cells.

In various embodiments, the peptides are derived by proteolysis or chemical cleavage of the mitochondrial polypeptide or mitochondrial protein. In an embodiment, a protease is utilized to cleave the mitochondrial polypeptide or mitochondrial protein into peptides. For example, the protease is trypsin. In additional embodiments, proteases or cleavage agents may be used including but not limited to trypsin, chymotrypsin, endoproteinase Lys-C, endoproteinase Asp-N, pepsin, thermolysin, papain, proteinase K, subtilisin, clostripain, exopeptidase, carboxypeptidase, cathepsin C, cyanogen bromide, formic acid, hydroxylamine, or NTCB, or a combination thereof. In some embodiments, the protease is trypsin.

In various other embodiments, a list of candidate peptides to be targeted for detection on the analytical instrument is generated by modeling mitochondrial protein cleavage. In exemplary embodiments, a list of candidate peptides to be targeted for detection on the analytical instrument is generated by modeling trypsin digestion of the mitochondrial polypeptide or mitochondrial protein. In some embodiments, the list of candidate peptides is narrowed by eliminating peptides that, for example, cannot be detected on the analytical instrument. In some embodiments, a list of candidate peptides is narrowed by eliminating: a peptide that has not been previously detected on a mass spectrometer, a peptide susceptible to a modification that interferes with accurate quantitation, a miscleaved peptide comprising an internal protease recognition site, a peptide with relatively inaccessible ends evidenced by the presence of miscleaved peptides, a peptide that is not unique to the sequence of the mitochondrial protein of interest, a peptide not present in the mature mitochondrial protein, or a combination thereof.

In an embodiment, the detection of a peptide is improved by changing the conditions for fragmenting that peptide prior to detecting a multiplicity of the peptides with the mass spectrometer. In exemplary embodiments, the fragmentation condition is the collision energy.

In various other embodiments, the method further comprises adding a stable isotope-labeled peptide to the sample prior to mass spectrometry. In some embodiments, the absolute amount of a peptide in the sample is determined by comparing the MS signals of natural and stable isotope-labeled peptides.

In other embodiments, the comprehensive list of candidate peptides is narrowed by eliminating peptides. In other embodiments, conventional criteria are used to eliminate peptides from the comprehensive list of candidate peptides by eliminating peptides that: (i) were never detected by MS on any instrument, (ii) are not unique to the sequence of the mitochondrial protein of interest, (iii) are not located within the mature mitochondrial protein, (iv) contain amino acid residues such as methionine, cysteine, and/or asparagine that are subjected to posttranslational modifications that interfere with accurate quantitation by mass spectrometry, (v) are miscleaved or partially cleaved, (vi) are post-translationally modified in vivo, (vii) and/or a combination thereof.

In various other embodiments, transitions for each peptide with high and reproducible peak intensities are identified. In other embodiments, the collision energy for each transition is optimized. In other embodiments, mass spectrometry comprises selected reaction monitoring (SRM), or multiple reaction monitoring (MRM). In other embodiments, SRM or MRM is performed on a triple quadrapole mass spectrometer. In other embodiments, the peptides uniquely associated with the mitochondrial polypeptide or mitochondrial protein of interest are those with high correlations, strong signals, high signal/noise and/or sequences unique to the mitochondrial protein of interest.

Selected-ion monitoring (SIM) or selected reaction monitoring (SRM) or multiple reaction monitoring (MRM) provide the simplest method set up and the most selective and sensitive quantification. SRM/MRM/SIM is a method used in tandem mass spectrometry in which an ion of a particular mass is selected in the first stage of a tandem mass spectrometer and an ion product of a fragmentation reaction of the precursor ion is selected in the second mass spectrometer stage for detection. Examples of triple quadrupole mass spectrometers (TQMS) that can perform MRM/SRM/SIM include but are not limited to: QTRAP® 6500 and 5500 System (Sciex); Agilent 6400 Series Triple Quadrupole LC/MS systems; or Thermo Scientific™ TSQ™ or Altis™ Triple Quadrupole system.

In various other embodiments, stable isotope-labeled peptide standards for absolute quantification are used. In other embodiments, the peptide labeled with a stable isotope is used as an internal standard to obtain absolute quantification of the mitochondrial polypeptide or mitochondrial protein of interest. In other embodiments, the peptides are quantified and then the amount of the parent mitochondrial protein present is inferred before digesting the sample with trypsin. In other embodiments, MS responses are used to determine an upper limit of quantification (ULOQ) and a lower limit of quantification (LLOQ).

In various embodiments, the MS data comprises raw MS data obtained from a mass spectrometer and/or processed MS data in which peptides and their fragments (e.g., transitions and MS peaks) are already identified, analyzed and/or quantified. In various embodiments, the MS data is Selective Reaction Monitoring (SRM) data or Parallel-Reaction Monitoring (PRM) data and/or Multiple Reaction Monitoring (MRM) data. In various embodiments, the MS data is Shotgun CID MS data, Original DIA MS Data, MSE MS data, p2CID MS Data, PAcIFIC MS Data, AIF MS Data, XDLA MS Data, SWATH MS data, or FT-ARM MS Data, or a combination thereof.

In various embodiments, acquiring MS data comprises operating a TripleTOF mass spectrometer, a triple quadrupole mass spectrometer, a liquid chromatography-mass spectrometry (LC-MS) system, or a tandem mass spectrometry (MS/MS) system, a dual time-of-flight (TOF-TOF) mass spectrometer, or a combination thereof.

In various embodiments, acquiring MS data comprises operating a mass spectrometer. Examples of the mass spectrometer include but are not limited to high-resolution instruments such as Triple-TOF, Orbitrap, Fourier transform, and tandem time-of-flight (TOF/TOF) mass spectrometers; and high-sensitivity instruments such as triple quadrupole, ion trap, quadrupole TOF (QTOF), and Q trap mass spectrometers; and their hybrid and/or combination. High-resolution instruments are used to maximize the detection of peptides with minute mass-to-charge ratio (m/z) differences. Conversely, because targeted proteomics emphasize sensitivity and throughput, high-sensitivity instruments are used. In some embodiments, the mass spectrometer is a TripleTOF mass spectrometer. In some embodiments, the mass spectrometer is a triple quadrupole mass spectrometer.

In various embodiments, the MS data is collected by a targeted acquisition method. Examples of the targeted acquisition method include but are not limited to Selective Reaction Monitoring (SRM) and/or Multiple Reaction Monitoring (MRM) methods. In various embodiments, acquiring MS data comprises acquiring Selective Reaction Monitoring (SRM) data and/or Multiple Reaction Monitoring (MRM) data.

In various embodiments, the MS data is collected by a data independent acquisition method. Examples of the independent acquisition (DIA) method including but not limited to Shotgun CID (see. e.g., Purvine et al. 2003), Original DIA (see e.g., Venable et al. 2004), MS$^E$(see e.g., Silva et al. 2005), p2CID (see e.g., Ramos et al. 2006), PAcIFIC (see e.g., Panchaud et al. 2009), AIF (see e.g., Geiger et al. 2010), XDLA (see e.g., Carvalho et al. 2010), SWATH (see e.g., Gillet et al. 2012), and FT-ARM (see e.g., Weisbrod et al. 2012). More information can be found in, for example, Chapman et al. (*Multiplexed and data-independent tandem mass spectrometry for global proteome profiling*, Mass Spectrom Rev. 2014 November-December; 33(6):452-70). In various embodiments, acquiring MS data comprises acquiring Shotgun CID MS data, Original DIA MS Data, MS$^E$MS data, p2CID MS Data, PAcIFIC MS Data, AIF MS Data, XDLA MS Data, SWATH MS data, or FT-ARM MS Data, or a combination thereof. In certain embodiments, acquiring MS data comprises acquiring MS data comprises acquiring SWATH MS data.

Method for Identifying and Quantifying Human Mitochondrial Proteins

In various embodiments, the present invention provides a method for identifying and quantifying at least one human mitochondrial protein in a sample, comprising: i) obtaining the sample, wherein the sample has been treated or contacted with a protease that digests the human mitochondrial protein into at least one target peptide, wherein the target peptide is selected from the group consisting of SEQ ID NOs: 1-77, and combinations thereof; wherein the protease is trypsin, and wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; ii) adding an internal standard to the sample, wherein the internal standard comprises 77 reference peptides having SEQ ID NOs: 1-77, and each reference peptide is labeled with a stable isotope, wherein each reference peptide is present in the internal standard in a known quantity, and wherein each reference peptide has a known mass-to-charge ratio (m/z) and retention time (rt); iii) analyzing the sample from step ii) by mass spectrometry; iv) identifying the target peptide by comparing the target peptide mass-to-charge ratio (m/z) and retention time (rt) to the known reference peptide mass-to-charge ratio (m/z) and retention time (rt); v) identifying the human mitochondrial protein in the sample by correlating the target peptide to the human mitochondrial protein according to Table 1; vi) calculating a peak area and an area ratio for the target peptide and for each reference peptide; vii) determining a molar ratio for the target peptide from the known quantity of the reference peptide; viii) calculating a concentration of the target peptide from the molar ratio; and ix) quantifying the human mitochondrial protein in the sample from the concentration of the target peptide. In some embodiments, the mass spectrometry is selected from the group consisting of LC-MS, LC-MS/MS, LC-SRM-MS, LC-MRM-MS and LC-PRM-MS. In some embodiments, the sample is from a human subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}$N, $^{13}$C, $^{18}$O, and $^{2}$H. In some embodiments, the method further comprises correlating the human mitochondrial protein according to Table 1 to a mitochondrial function according to Table 4.

In various embodiments, the present invention provides a method for identifying and quantifying at least one human mitochondrial protein in a sample, comprising: i) obtaining the sample, wherein the sample has been treated or contacted with a protease that digests the human mitochondrial protein into at least one target peptide, wherein the target peptide is selected from the group consisting of SEQ ID NOs: 1-77, and combinations thereof; wherein the protease is trypsin, and wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof, ii) adding an internal standard to the sample, wherein the internal standard comprises at least one reference peptide, wherein the reference peptide is selected from the group consisting of SEQ ID NOs: 1-77, and combinations thereof; and each reference peptide is labeled with a stable isotope, wherein each reference peptide is present in the internal standard in a known quantity, and wherein each reference peptide has a known mass-to-charge ratio (m/z) and retention time (rt); iii) analyzing the sample from step ii) by mass spectrometry; iv) identifying the target peptide by comparing the target peptide mass-to-charge ratio (m/z) and retention time (rt) to the known reference peptide mass-to-charge ratio (m/z) and retention time (rt); v) identifying the human mitochondrial protein in the sample by correlating the target peptide to the human mitochondrial protein according to Table 1; vi) calculating a peak area and an area ratio for the target peptide and for the reference peptide; vii) determining a molar ratio for the target peptide from the known quantity of the reference peptide; viii) calculating a concentration of the target peptide from the molar ratio; and ix) quantifying the human mitochondrial protein in the sample from the concentration of the target peptide. In some embodiments, the mass spectrometry is selected from the group consisting of LC-MS, LC-MS/MS, LC-SRM-MS, LC-MRM-MS and LC-PRM-MS. In some embodiments, the sample is from a human subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the method further comprises correlating the human mitochondrial protein according to Table 1 to a mitochondrial function according to Table 4.

In various embodiments, the present invention provides a method for identifying and quantifying at least one human mitochondrial protein in a sample, comprising: i) obtaining the sample, wherein the sample has been treated or contacted with a protease that digests the human mitochondrial protein into at least one target peptide, wherein the target peptide is selected from the group consisting of SEQ ID NOs: 1-77, and combinations thereof, wherein the protease is trypsin, and wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; ii) adding an internal standard to the sample, wherein the internal standard comprises reference peptides, and each reference peptide is labeled with a stable isotope, wherein each reference peptide is present in the internal standard in a known quantity, and wherein each reference peptide has a known mass-to-charge ratio (m/z) and retention time (rt); iii) analyzing the sample from step ii) by mass spectrometry; iv) identifying the target peptide by comparing the target peptide mass-to-charge ratio (m/z) and retention time (rt) to the known reference peptide mass-to-charge ratio (m/z) and retention time (rt); v) identifying the human mitochondrial protein in the sample by correlating the target peptide to the human mitochondrial protein according to Table 1; vi) calculating a peak area and an area ratio for the target peptide and for each reference peptide; vii) determining a molar ratio for the target peptide from the known quantity of the reference peptide; viii) calculating a concentration of the target peptide from the molar ratio; and ix) quantifying the human mitochondrial protein in the sample from the concentration of the target peptide. In some embodiments, the mass spectrometry is selected from the group consisting of LC-MS, LC-MS/MS, LC-SRM-MS, LC-MRM-MS and LC-PRM-MS. In some embodiments, the sample is from a human subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the reference peptides are 12 reference peptides having SEQ ID NOs: 1, 2, 6, 7, 8, 17, 18, 19, 63, 64, 70, 71. In some embodiments, the reference peptides are 15 reference peptides having SEQ ID NOs: 3, 4, 5, 15, 16, 30, 31, 38, 39, 42, 43, 51, 52, 68, 69. In some embodiments, the reference peptides are 31 reference peptides having SEQ ID NOs: 9, 10, 13, 14, 20, 21, 22, 23, 24, 25, 26, 27, 28, 29, 40, 41, 48, 49, 50, 53, 54, 57, 58, 76, 77, 46, 47, 55, 56, 72, 73. In some embodiments, the reference peptides are 25 reference peptides having SEQ ID NOs: 11, 12, 32, 33, 34, 35, 36, 37, 44, 45, 59, 60, 61, 62, 65, 66, 67, 74, 75, 46, 47, 55, 56, 72, 73. In some embodiments, the method further comprises correlating the human mitochondrial protein according to Table 1 to a mitochondrial function according to Table 4.

In various embodiments, the present invention provides a method for identifying and quantifying at least one human mitochondrial protein in a sample, comprising: i) obtaining the sample, wherein the sample comprises the at least one human mitochondrial protein, wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; (ii) treating or contacting the sample with a protease that digests the human mitochondrial protein into at least one target peptide, wherein the target peptide is selected from the group consisting of SEQ ID NOs: 1-77, and combinations thereof; and wherein the protease is trypsin; iii) adding an internal standard to the sample, wherein the internal standard comprises 77 reference peptides having SEQ ID NOs: 1-77, and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); vi) identifying the human mitochondrial protein in the sample by correlating the target peptide to the human mitochondrial protein according to Table 1; vii) calculating a peak area and an area ratio for the target peptide and for each reference peptide; viii) determining a molar ratio for the target peptide from the known quantity of the reference peptide; ix) calculating a concentration of the target peptide from the molar ratio; and x) quantifying the human mitochondrial protein in the sample from the concentration of the target peptide. In some embodiments, the mass spectrometry is selected from the group consisting of LC-MS, LC-MS/MS, LC-SRM-MS, LC-MRM-MS and LC-PRM-MS. In some embodiments, the sample is from a human subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the method further comprises correlating the human mitochondrial protein according to Table 1 to a mitochondrial function according to Table 4.

In various embodiments, the present invention provides a method for identifying and quantifying at least one human mitochondrial protein in a sample, comprising: i) obtaining the sample, wherein the sample comprises the at least one human mitochondrial protein, wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; (ii) treating or contacting the sample with a protease that digests the human mitochondrial protein into at least one target peptide, wherein the target peptide is selected from the group consisting of SEQ ID NOs: 1-77, and combinations thereof; and wherein the protease is trypsin; iii) adding an internal standard to the sample, wherein the internal standard comprises at least one reference peptide, wherein the reference peptide is selected from the group consisting of SEQ ID NOs: 1-77, and combinations thereof, and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); vi) identifying the human mitochondrial protein in the sample by correlating the target peptide to the human mitochondrial protein according to Table 1; vii) calculating a peak area and an area ratio for the target peptide and for the reference peptide; viii) determining a molar ratio for the target peptide from the known quantity of the reference peptide; ix) calculating a concentration of the target peptide from the molar ratio; and x) quantifying the human mitochondrial protein in the sample from the concentration of the target peptide. In some embodiments, the mass spectrometry is selected from the group consisting of LC-MS, LC-MS/MS, LC-SRM-MS, LC-MRM-MS and LC-PRM-MS. In some embodiments, the sample is from a human subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the method further comprises correlating the human mitochondrial protein according to Table 1 to a mitochondrial function according to Table 4.

In various embodiments, the present invention provides a method for identifying and quantifying at least one human mitochondrial protein in a sample, comprising: i) obtaining the sample, wherein the sample comprises the at least one human mitochondrial protein, wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; (ii) treating or contacting the sample with a protease that digests the human mitochondrial protein into at least one target peptide, wherein the target peptide is selected from the group consisting of SEQ ID NOs: 1-77, and combinations thereof; and wherein the protease is trypsin; iii) adding an internal standard to the sample, wherein the internal standard comprises reference peptides, and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); vi) identifying the human mitochondrial protein in the sample by correlating the target peptide to the human mitochondrial protein according to Table 1; vii) calculating a peak area and an area ratio for the target peptide and for each reference peptide; viii) determining a molar ratio for the target peptide from the known quantity of the reference peptide; ix) calculating a concentration of the target peptide from the molar ratio; and x) quantifying the human mitochondrial protein in the sample from the concentration of the target peptide. In some embodiments, the mass spectrometry is selected from the group consisting of LC-MS, LC-MS/MS, LC-SRM-MS, LC-MRM-MS and LC-PRM-MS. In some embodiments, the sample is from a human subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the reference peptides are 12 reference peptides having SEQ ID NOs: 1, 2, 6, 7, 8, 17, 18, 19, 63, 64, 70, 71. In some embodiments, the reference peptides are 15 reference peptides having SEQ ID NOs: 3, 4, 5, 15, 16, 30, 31, 38, 39, 42, 43, 51, 52, 68, 69. In some embodiments, the reference peptides are 31 reference peptides having SEQ ID NOs: 9, 10, 13, 14, 20, 21, 22, 23, 24, 25, 26, 27, 28, 29, 40, 41, 48, 49, 50, 53, 54, 57, 58, 76, 77, 46, 47, 55, 56, 72, 73. In some embodiments, the reference peptides are 25 reference peptides having SEQ ID NOs: 11, 12, 32, 33, 34, 35, 36, 37, 44, 45, 59, 60, 61, 62, 65, 66, 67, 74, 75, 46, 47, 55, 56, 72, 73. In some embodiments, the method further comprises correlating the human mitochondrial protein according to Table 1 to a mitochondrial function according to Table 4.

Method for Identifying Human Mitochondrial Proteins

In various embodiments, the present invention provides a method of identifying at least one human mitochondrial protein in a sample, comprising: i) obtaining the sample, wherein the sample has been treated or contacted with a protease that digests the human mitochondrial protein into at least one target peptide, wherein the target peptide is selected from the group consisting of SEQ ID NOs: 1-77, and combinations thereof; wherein the protease is trypsin, and wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; ii) adding an internal standard to the sample, wherein the internal standard comprises 77 reference peptides having SEQ ID NOs: 1-77, and each reference peptide is labeled with a stable isotope, wherein each reference peptide is present in the internal standard in a known quantity, and wherein each reference peptide has a known mass-to-charge ratio (m/z) and retention time (rt); iii) analyzing the sample from step ii) by mass spectrometry; iv) identifying the target peptide by comparing the target peptide mass-to-charge ratio (m/z) and retention time (rt) to the known reference peptide mass-to-charge ratio (m/z) and retention time (rt); and v) identifying the human mitochondrial protein in the sample by correlating the target peptide to the human mitochondrial protein according to Table 1. In some embodiments, the mass spectrometry is selected from the group consisting of LC-MS, LC-MS/MS, LC-SRM-MS, LC-MRM-MS and LC-PRM-MS. In some embodiments, the sample is from a human subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the method further comprises correlating the human mitochondrial protein according to Table 1 to a mitochondrial function according to Table 4.

In various embodiments, the present invention provides a method of identifying at least one human mitochondrial protein in a sample, comprising: i) obtaining the sample, wherein the sample has been treated or contacted with a protease that digests the human mitochondrial protein into at least one target peptide, wherein the target peptide is selected from the group consisting of SEQ ID NOs: 1-77, and combinations thereof, wherein the protease is trypsin, and wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; ii) adding an internal standard to the sample, wherein the internal standard comprises at least one reference peptide, wherein the reference peptide is selected from the group consisting of SEQ ID NOs: 1-77, and combinations thereof, and each reference peptide is labeled with a stable isotope, wherein each reference peptide is present in the internal standard in a known quantity, and wherein each reference peptide has a known mass-to-charge ratio (m/z) and retention time (rt); iii) analyzing the sample from step ii) by mass spectrometry; iv) identifying the target peptide by comparing the target peptide mass-to-charge ratio (m/z) and retention time (rt) to the known reference peptide mass-to-charge ratio (m/z) and retention time (rt); and v) identifying the human mitochondrial protein in the sample by correlating the target peptide to the human mitochondrial protein according to Table 1. In some embodiments, the mass spectrometry is selected from the group consisting of LC-MS, LC-MS/MS, LC-SRM-MS, LC-MRM-MS and LC-PRM-MS. In some embodiments, the sample is from a human subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the method further comprises correlating the human mitochondrial protein according to Table 1 to a mitochondrial function according to Table 4.

In various embodiments, the present invention provides a method of identifying at least one human mitochondrial protein in a sample, comprising: i) obtaining the sample, wherein the sample has been treated or contacted with a protease that digests the human mitochondrial protein into at least one target peptide, wherein the target peptide is selected from the group consisting of SEQ ID NOs: 1-77, and combinations thereof, wherein the protease is trypsin, and wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; ii) adding an internal standard to the sample, wherein the internal standard comprises reference peptides, and each reference peptide is labeled with a stable isotope, wherein each reference peptide is present in the internal standard in a known quantity, and wherein each reference peptide has a known mass-to-charge ratio (m/z) and retention time (rt); iii) analyzing the sample from step ii) by mass spectrometry; iv) identifying the target peptide by comparing the target peptide mass-to-charge ratio (m/z) and retention time (rt) to the known reference peptide mass-to-charge ratio (m/z) and retention time (rt); and v) identifying the human mitochondrial protein in the sample by correlating the target peptide to the human mitochondrial protein according to Table 1. In some embodiments, the mass spectrometry is selected from the group consisting of LC-MS, LC-MS/MS, LC-SRM-MS, LC-MRM-MS and LC-PRM-MS. In some embodiments, the sample is from a human subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the reference peptides are 12 reference peptides having SEQ ID NOs: 1, 2, 6, 7, 8, 17, 18, 19, 63, 64, 70, 71. In some embodiments, the reference peptides are 15 reference peptides having SEQ ID NOs: 3, 4, 5, 15, 16, 30, 31, 38, 39, 42, 43, 51, 52, 68, 69. In some embodiments, the reference peptides are 31 reference peptides having SEQ ID NOs: 9, 10, 13, 14, 20, 21, 22, 23, 24, 25, 26, 27, 28, 29, 40, 41, 48, 49, 50, 53, 54, 57, 58, 76, 77, 46, 47, 55, 56, 72, 73. In some embodiments, the reference peptides are 25 reference peptides having SEQ ID NOs: 11, 12, 32, 33, 34, 35, 36, 37, 44, 45, 59, 60, 61, 62, 65, 66, 67, 74, 75, 46, 47, 55, 56, 72, 73.

In some embodiments, the method further comprises correlating the human mitochondrial protein according to Table 1 to a mitochondrial function according to Table 4.

In various embodiments, the present invention provides a method of identifying at least one human mitochondrial protein in a sample, comprising: i) obtaining the sample, wherein the sample comprises the at least one human mitochondrial protein, wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof, (ii) treating or contacting the sample with a protease that digests the human mitochondrial protein into at least one target peptide, wherein the target peptide is selected from the group consisting of SEQ ID NOs: 1-77, and combinations thereof, and wherein the protease is trypsin; iii) adding an internal standard to the sample, wherein the internal standard comprises 77 reference peptides having SEQ ID NOs: 1-77, and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); and vi) identifying the human mitochondrial protein in the sample by correlating the target peptide to the human mitochondrial protein according to Table 1. In some embodiments, the mass spectrometry is selected from the group consisting of LC-MS, LC-MS/MS, LC-SRM-MS, LC-MRM-MS and LC-PRM-MS. In some embodiments, the sample is from a human subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the method further comprises correlating the human mitochondrial protein according to Table 1 to a mitochondrial function according to Table 4.

In various embodiments, the present invention provides a method of identifying at least one human mitochondrial protein in a sample, comprising: i) obtaining the sample, wherein the sample comprises the at least one human mitochondrial protein, wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof, (ii) treating or contacting the sample with a protease that digests the human mitochondrial protein into at least one target peptide, wherein the target peptide is selected from the group consisting of SEQ ID NOs: 1-77, and combinations thereof; and wherein the protease is trypsin; iii) adding an internal standard to the sample, wherein the internal standard comprises at least one reference peptide, wherein the reference peptide is selected from the group consisting of SEQ ID NOs: 1-77, and combinations thereof; and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); and vi) identifying the human mitochondrial protein in the sample by correlating the target peptide to the human mitochondrial protein according to Table 1. In some embodiments, the mass spectrometry is selected from the group consisting of LC-MS, LC-MS/MS, LC-SRM-MS, LC-MRM-MS and LC-PRM-MS. In some embodiments, the sample is from a human subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the method further comprises correlating the human mitochondrial protein according to Table 1 to a mitochondrial function according to Table 4.

In various embodiments, the present invention provides a method of identifying at least one human mitochondrial protein in a sample, comprising: i) obtaining the sample, wherein the sample comprises the at least one human mitochondrial protein, wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof, (ii) treating or contacting the sample with a protease that digests the human mitochondrial protein into at least one target peptide, wherein the target peptide is selected from the group consisting of SEQ ID NOs: 1-77, and combinations thereof, and wherein the protease is trypsin; iii) adding an internal standard to the sample, wherein the internal standard comprises reference peptides, and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); and vi) identifying the human mitochondrial protein in the sample by correlating the target peptide to the human mitochondrial protein according to Table 1. In some embodiments, the mass spectrometry is selected from the group consisting of LC-MS, LC-MS/MS, LC-SRM-MS, LC-MRM-MS and LC-PRM-MS. In some embodiments, the sample is from a human subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the reference peptides are 12 reference peptides having SEQ ID NOs: 1, 2, 6, 7, 8, 17, 18, 19, 63, 64, 70, 71. In some embodiments, the reference peptides are 15 reference peptides having SEQ ID NOs: 3, 4, 5, 15, 16, 30, 31, 38, 39, 42, 43, 51, 52, 68, 69. In some embodiments, the reference peptides are 31 reference peptides having SEQ ID NOs: 9, 10, 13, 14, 20, 21, 22, 23, 24, 25, 26, 27, 28, 29, 40, 41, 48, 49, 50, 53, 54, 57, 58, 76, 77, 46, 47, 55, 56, 72, 73. In some embodiments, the reference peptides are 25 reference peptides having SEQ ID NOs: 11, 12, 32, 33, 34, 35, 36, 37, 44, 45, 59, 60, 61, 62, 65, 66, 67, 74, 75, 46, 47, 55, 56, 72, 73. In some embodiments, the method further comprises correlating the human mitochondrial protein according to Table 1 to a mitochondrial function according to Table 4.

Method for Determining a Human Mitochondrial Biomarker Signature

In various embodiments, the present invention provides a method of determining a mitochondrial protein biomarker signature for a human subject, the method comprising: i) obtaining a sample from the human subject, wherein the sample comprises at least one human mitochondrial protein, wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No.

P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; ii) contacting the sample with a protease that digests the human mitochondrial protein into at least one target peptide, wherein the target peptide is selected from the group consisting of SEQ ID NOs: 1-77, and combinations thereof; and wherein the protease is trypsin; iii) adding an internal standard to the sample, wherein the internal standard comprises 77 reference peptides having SEQ ID NOs: 1-77 and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); and vi) determining the human mitochondrial protein biomarker signature for the human subject by correlating the target peptide to the human mitochondrial protein according to Table 1. In some embodiments, the method further comprises comparing the human mitochondrial protein biomarker signature from the human subject to a human mitochondrial protein biomarker signature from a reference sample, wherein a change in the human mitochondrial protein biomarker signature from the human subject compared to the human mitochondrial protein biomarker signature from the reference sample is indicative of a change in mitochondrial function in the human subject, or altered mitochondrial function or altered mitochondrial physiology in the human subject, or abnormal mitochondrial function or abnormal mitochondrial physiology in the human subject. In some embodiments, the mitochondrial function or mitochondrial physiology is selected from the group consisting of tricarboxylic acid cycle (TCA cycle), oxidative phosphorylation (OxPhos), MitoGeneral, MitoDynamics, and combinations thereof. In some embodiments, the change in mitochondrial function in the human subject is indicative of altered mitochondrial function or abnormal mitochondrial function in the human subject. In some embodiments, the altered mitochondrial function is selected from the group consisting of altered tricarboxylic acid cycle (TCA cycle), altered oxidative phosphorylation (OxPhos), altered MitoGeneral, altered MitoDynamics, and combinations thereof. In some embodiments, the abnormal mitochondrial function is selected from the group consisting of abnormal tricarboxylic acid cycle (TCA cycle), abnormal oxidative phosphorylation (OxPhos), abnormal MitoGeneral, abnormal MitoDynamics, and combinations thereof. In some embodiments, the mass spectrometry is selected from the group consisting of LC-MS, LC-MS/MS, LC-SRM-MS, LC-MRM-MS and LC-PRM-MS. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^2H$. In some embodiments, the method further comprises correlating the human mitochondrial protein according to Table 1 to a mitochondrial function according to Table 4.

In various embodiments, the present invention provides a method of determining a mitochondrial protein biomarker signature for a human subject, the method comprising: i) obtaining a sample from the human subject, wherein the sample comprises at least one human mitochondrial protein, wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; ii) contacting the sample with a protease that digests the human mitochondrial protein into at least one target peptide, wherein the target peptide is selected from the group consisting of SEQ ID NOs: 1-77, and combinations thereof; and wherein the protease is trypsin; iii) adding an internal standard to the sample, wherein the internal standard comprises at least one reference peptide, wherein the reference peptide is selected from the group consisting of SEQ ID NOs: 1-77, and combinations thereof; and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); and vi) determining the human mitochondrial protein biomarker signature for the human subject by correlating the target peptide to the human mitochondrial protein according to Table 1. In some embodiments, the method further comprises comparing the human mitochondrial protein biomarker signature from the human subject to a human mitochondrial protein biomarker signature from a reference sample, wherein a change in the human mitochondrial protein biomarker signature from the human subject compared to the human mitochondrial protein biomarker signature from the reference sample is indicative of a change in mitochondrial function in the human subject, or altered mitochondrial function or altered mitochondrial physiology in the human subject, or abnormal mitochondrial function or abnormal mitochondrial physiology in the human subject. In some embodiments, the mitochondrial function or mitochondrial physiology is selected from the group consisting of tricarboxylic acid cycle (TCA cycle), oxidative phosphorylation (OxPhos), MitoGeneral, MitoDynamics, and combinations thereof. In some embodiments, the change in mitochondrial function in the human subject is indicative of altered mitochondrial function or abnormal mitochondrial function in the human subject. In some embodiments, the altered mitochondrial function is selected from the group consisting of altered tricarboxylic acid cycle (TCA cycle), altered oxidative phosphorylation (OxPhos), altered MitoGeneral, altered MitoDynamics, and combinations thereof. In some embodiments, the abnormal mitochondrial function is selected from the group consisting of abnormal tricarboxylic acid cycle (TCA cycle), abnormal oxidative phosphorylation (OxPhos), abnormal MitoGeneral, abnormal MitoDynamics, and combinations thereof. In some embodiments, the mass spectrometry is selected from the group consisting of LC-MS, LC-MS/MS, LC-SRM-MS, LC-MRM-MS and LC-PRM-MS. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the method further comprises correlating the human mitochondrial protein according to Table 1 to a mitochondrial function according to Table 4.

In various embodiments, the present invention provides a method of determining a mitochondrial protein biomarker signature for a human subject, the method comprising: i) obtaining a sample from the human subject, wherein the sample comprises at least one human mitochondrial protein, wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof, ii) contacting the sample with a protease that digests the human mitochondrial protein into at least one target peptide, wherein the target peptide is selected from the group consisting of SEQ ID NOs: 1-77, and combinations thereof; and wherein the protease is trypsin; iii) adding an internal standard to the sample, wherein the internal standard comprises reference peptides, and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); and vi) determining the human mitochondrial protein biomarker signature for the human subject by correlating the target peptide to the human mitochondrial protein according to Table 1. In some embodiments, the method further comprises comparing the human mitochondrial protein biomarker signature from the human subject to a human mitochondrial protein biomarker signature from a reference sample, wherein a change in the human mitochondrial protein biomarker signature from the human subject compared to the human mitochondrial protein biomarker signature from the reference sample is indicative of a change in mitochondrial function in the human subject, or altered mitochondrial function or altered mitochondrial physiology in the human subject, or abnormal mitochondrial function or abnormal mitochondrial physiology in the human subject. In some embodiments, the mitochondrial function or mitochondrial physiology is selected from the group consisting of tricarboxylic acid cycle (TCA cycle), oxidative phosphorylation (OxPhos), MitoGeneral, MitoDynamics, and combinations thereof. In some embodiments, the change in mitochondrial function in the human subject is indicative of altered mitochondrial function or abnormal mitochondrial function in the human subject. In some embodiments, the altered mitochondrial function is selected from the group consisting of altered tricarboxylic acid cycle (TCA cycle), altered oxidative phosphorylation (OxPhos), altered MitoGeneral, altered MitoDynamics, and combinations thereof. In some embodiments, the abnormal mitochondrial function is selected from the group consisting of abnormal tricarboxylic acid cycle (TCA cycle), abnormal oxidative phosphorylation (OxPhos), abnormal MitoGeneral, abnormal Mito- Dynamics, and combinations thereof. In some embodiments, the mass spectrometry is selected from the group consisting of LC-MS, LC-MS/MS, LC-SRM-MS, LC-MRM-MS and LC-PRM-MS. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the reference peptides are 12 reference peptides having SEQ ID NOs: 1, 2, 6, 7, 8, 17, 18, 19, 63, 64, 70, 71. In some embodiments, the reference peptides are 15 reference peptides having SEQ ID NOs: 3, 4, 5, 15, 16, 30, 31, 38, 39, 42, 43, 51, 52, 68, 69. In some embodiments, the reference peptides are 31 reference peptides having SEQ ID NOs: 9, 10, 13, 14, 20, 21, 22, 23, 24, 25, 26, 27, 28, 29, 40, 41, 48, 49, 50, 53, 54, 57, 58, 76, 77, 46, 47, 55, 56, 72, 73. In some embodiments, the reference peptides are 25 reference peptides having SEQ ID NOs: 11, 12, 32, 33, 34, 35, 36, 37, 44, 45, 59, 60, 61, 62, 65, 66, 67, 74, 75, 46, 47, 55, 56, 72, 73. In some embodiments, the method further comprises correlating the human mitochondrial protein according to Table 1 to a mitochondrial function according to Table 4.

Method for Identifying and Quantifying Mouse Mitochondrial Proteins

In various embodiments, the present invention provides a method for identifying and quantifying at least one mouse mitochondrial protein in a sample, comprising: i) obtaining the sample, wherein the sample has been treated or contacted with a protease that digests the mouse mitochondrial protein into at least one target peptide, wherein the target peptide is selected from the group consisting of SEQ ID NOs: 78-151, and combinations thereof; wherein the protease is trypsin, and wherein the mouse mitochondrial protein is selected from the group consisting of TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof; ii) adding an internal standard to the sample, wherein the internal standard comprises 74 reference peptides having SEQ ID NOs: 78-151, and each reference peptide is labeled with a stable isotope, wherein each reference peptide is present in the internal standard in a known quantity, and wherein each reference peptide has a known mass-to-charge ratio (m/z) and retention time (rt); iii) analyzing the sample from step ii) by mass spectrometry; iv) identifying the target peptide by comparing the target peptide mass-to-charge ratio (m/z) and retention time (rt) to the known reference peptide mass-to-charge ratio (m/z) and retention time (rt); v) identifying the mouse mitochondrial protein in the sample by correlating the target peptide to the mouse mitochondrial protein according to Table 2; vi) calculating a peak area and an area ratio for the target peptide and for each reference peptide; vii) determining a molar ratio for the target peptide from the known quantity of the reference peptide; viii) calculating a concentration of the target peptide from the molar ratio; and ix) quantifying the mouse mitochondrial protein in the sample from the concentration of the target peptide. In some embodiments, the mass spectrometry is selected from the group consisting of LC-MS, LC-MS/MS, LC-SRM-MS, LC-MRM-MS and LC-PRM-MS. In some embodiments, the sample is from a mouse subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the method further comprises correlating the mouse mitochondrial protein according to Table 2 to a mitochondrial function according to Table 3.

In various embodiments, the present invention provides a method for identifying and quantifying at least one mouse mitochondrial protein in a sample, comprising: i) obtaining the sample, wherein the sample has been treated or contacted with a protease that digests the mouse mitochondrial protein into at least one target peptide, wherein the target peptide is selected from the group consisting of SEQ ID NOs: 78-151, and combinations thereof; wherein the protease is trypsin, and wherein the mouse mitochondrial protein is selected from the group consisting of TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof; ii) adding an internal standard to the sample, wherein the internal standard comprises at least one reference peptide, wherein the reference peptide is selected from the group consisting of SEQ ID NOs: 78-151, and combinations thereof, and each reference peptide is labeled with a stable isotope, wherein each reference peptide is present in the internal standard in a known quantity, and wherein each reference peptide has a known mass-to-charge ratio (m/z) and retention time (rt); iii) analyzing the sample from step ii) by mass spectrometry; iv) identifying the target peptide by comparing the target peptide mass-to-charge ratio (m/z) and retention time (rt) to the known reference peptide mass-to-charge ratio (m/z) and retention time (rt); v) identifying the mouse mitochondrial protein in the sample by correlating the target peptide to the mouse mitochondrial protein according to Table 2; vi) calculating a peak area and an area ratio for the target peptide and for each reference peptide; vii) determining a molar ratio for the target peptide from the known quantity of the reference peptide; viii) calculating a concentration of the target peptide from the molar ratio; and ix) quantifying the mouse mitochondrial protein in the sample from the concentration of the target peptide. In some embodiments, the mass spectrometry is selected from the group consisting of LC-MS, LC-MS/MS, LC-SRM-MS, LC-MRM-MS and LC-PRM-MS. In some embodiments, the sample is from a mouse subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the method further comprises correlating the mouse mitochondrial protein according to Table 2 to a mitochondrial function according to Table 3.

In various embodiments, the present invention provides a method for identifying and quantifying at least one mouse mitochondrial protein in a sample, comprising: i) obtaining the sample, wherein the sample has been treated or contacted with a protease that digests the mouse mitochondrial protein into at least one target peptide, wherein the target peptide is selected from the group consisting of SEQ ID NOs: 78-151, and combinations thereof; wherein the protease is trypsin, and wherein the mouse mitochondrial protein is selected from the group consisting of TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof; ii) adding an internal standard to the sample, wherein the internal standard comprises reference peptides, and each reference peptide is labeled with a stable isotope, wherein each reference peptide is present in the internal standard in a known quantity, and wherein each reference peptide has a known mass-to-charge ratio (m/z) and retention time (rt); iii) analyzing the sample from step ii) by mass spectrometry; iv) identifying the target peptide by comparing the target peptide mass-to-charge ratio (m/z) and retention time (rt) to the known reference peptide mass-to-charge ratio (m/z) and retention time (rt); v) identifying the mouse mitochondrial protein in the sample by correlating the target peptide to the mouse mitochondrial protein according to Table 2; vi) calculating a peak area and an area ratio for the target peptide and for each reference peptide; vii) determining a molar ratio for the target peptide from the known quantity of the reference peptide; viii) calculating a concentration of the target peptide from the molar ratio; and ix) quantifying the mouse mitochondrial protein in the sample from the concentration of the target peptide. In some embodiments, the mass spectrometry is selected from the group consisting of LC-MS, LC-MS/MS, LC-SRM-MS, LC-MRM-MS and LC-PRM-MS. In some embodiments, the sample is from a mouse subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the reference peptides are 12 reference peptides having SEQ ID NOs: 99, 100, 103, 104, 107, 108, 109, 118, 121, 122, 123, 124. In some embodiments, the reference peptides are 12 reference peptides having SEQ ID NOs: 78, 79, 91, 92, 119, 120, 140, 141, 144, 145, 148, 149. In some embodiments, the reference peptides are 30 reference peptides having SEQ ID NOs: 80, 81, 82, 83, 84, 85, 86, 87, 88, 95, 96, 112, 113, 127, 128, 129, 134, 135, 142, 143, 146, 147, 150, 151, 125, 126, 132, 133, 136, 137. In some embodiments, the reference peptides are 26 reference peptides having SEQ ID NOs: 89, 90, 93, 94, 97, 98, 101, 102, 105, 106, 110, 111, 114, 115, 116, 117, 130, 131, 138, 139, 125, 126, 132, 133, 136, 137. In some embodiments, the method further comprises correlating the mouse mitochondrial protein according to Table 2 to a mitochondrial function according to Table 3.

In various embodiments, the present invention provides a method for identifying and quantifying at least one mouse mitochondrial protein in a sample, comprising: i) obtaining the sample, wherein the sample comprises the at least one mouse mitochondrial protein, wherein the mouse mitochondrial protein is selected from the group consisting of TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof; (ii) treating or contacting the sample with a protease that digests the mouse mitochondrial protein into at least one target peptide, wherein the target peptide is selected from the group consisting of SEQ ID NOs: 78-151, and combinations thereof, and wherein the protease is trypsin; iii) adding an internal standard to the sample, wherein the internal standard comprises 74 reference peptides having SEQ ID NOs: 78-151, and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); vi) identifying the mouse mitochondrial protein in the sample by correlating the target peptide to the mouse mitochondrial protein according to Table 2; vii) calculating a peak area and an area ratio for the target peptide and for each reference peptide; viii) determining a molar ratio for the target peptide from the known quantity of the reference peptide; ix) calculating a concentration of the target peptide from the molar ratio; and x) quantifying the mouse mitochondrial protein in the sample from the concentration of the target peptide. In some embodiments, the mass spectrometry is selected from the group consisting of LC-MS, LC-MS/MS, LC-SRM-MS, LC-MRM-MS and LC-PRM-MS. In some embodiments, the sample is from a mouse subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the method further comprises correlating the mouse mitochondrial protein according to Table 2 to a mitochondrial function according to Table 3.

In various embodiments, the present invention provides a method for identifying and quantifying at least one mouse mitochondrial protein in a sample, comprising: i) obtaining the sample, wherein the sample comprises the at least one mouse mitochondrial protein, wherein the mouse mitochondrial protein is selected from the group consisting of TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof; (ii) treating or contacting the sample with a protease that digests the mouse mitochondrial protein into at least one target peptide, wherein the target peptide is selected from the group consisting of SEQ ID NOs: 78-151, and combinations thereof; and wherein the protease is trypsin; iii) adding an internal standard to the sample, wherein the internal standard comprises at least one reference peptide, wherein the reference peptide is selected from the group consisting of SEQ ID NOs: 78-151, and combinations thereof; and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); vi) identifying the mouse mitochondrial protein in the sample by correlating the target peptide to the mouse mitochondrial protein according to Table 2; vii) calculating a peak area and an area ratio for the target peptide and for each reference peptide; viii) determining a molar ratio for the target peptide from the known quantity of the reference peptide; ix) calculating a concentration of the target peptide from the molar ratio; and x) quantifying the mouse mitochondrial protein in the sample from the concentration of the target peptide. In some embodiments, the mass spectrometry is selected from the group consisting of LC-MS, LC-MS/MS, LC-SRM-MS, LC-MRM-MS and LC-PRM-MS. In some embodiments, the sample is from a mouse subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the method further comprises correlating the mouse mitochondrial protein according to Table 2 to a mitochondrial function according to Table 3.

In various embodiments, the present invention provides a method for identifying and quantifying at least one mouse mitochondrial protein in a sample, comprising: i) obtaining the sample, wherein the sample comprises the at least one mouse mitochondrial protein, wherein the mouse mitochondrial protein is selected from the group consisting of TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof; (ii) treating or contacting the sample with a protease that digests the mouse mitochondrial protein into at least one target peptide, wherein the target peptide is selected from the group consisting of SEQ ID NOs: 78-151, and combinations thereof; and wherein the protease is trypsin; iii) adding an internal standard to the sample, wherein the internal standard comprises reference peptides, and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); vi) identifying the mouse mitochondrial protein in the sample by correlating the target peptide to the mouse mitochondrial protein according to Table 2; vii) calculating a peak area and an area ratio for the target peptide and for each reference peptide; viii) determining a molar ratio for the target peptide from the known quantity of the reference peptide; ix) calculating a concentration of the target peptide from the molar ratio; and x) quantifying the mouse mitochondrial protein in the sample from the concentration of the target peptide. In some embodiments, the mass spectrometry is selected from the group consisting of LC-MS, LC-MS/MS, LC-SRM-MS, LC-MRM-MS and LC-PRM-MS. In some embodiments, the sample is from a mouse subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the reference peptides are 12 reference peptides having SEQ ID NOs: 99, 100, 103, 104, 107, 108, 109, 118, 121, 122, 123, 124. In some embodiments, the reference peptides are 12 reference peptides having SEQ ID NOs: 78, 79, 91, 92, 119, 120, 140, 141, 144, 145, 148, 149. In some embodiments, the reference peptides are 30 reference peptides having SEQ ID NOs: 80, 81, 82, 83, 84, 85, 86, 87, 88, 95, 96, 112, 113, 127, 128, 129, 134, 135, 142, 143, 146, 147, 150, 151, 125, 126, 132, 133, 136, 137. In some embodiments, the reference peptides are 26 reference peptides having SEQ ID NOs: 89, 90, 93, 94, 97, 98, 101, 102, 105, 106, 110, 111, 114, 115, 116, 117, 130, 131, 138, 139, 125, 126, 132, 133, 136, 137. In some embodiments, the method further comprises correlating the mouse mitochondrial protein according to Table 2 to a mitochondrial function according to Table 3.

Method for Identifying Mouse Mitochondrial Proteins

In various embodiments, the present invention provides a method of identifying at least one mouse mitochondrial protein in a sample, comprising: i) obtaining the sample, wherein the sample has been treated or contacted with a protease that digests the mouse mitochondrial protein into at least one target peptide, wherein the target peptide is selected from the group consisting of SEQ ID NOs: 78-151, and combinations thereof; wherein the protease is trypsin, and wherein the mouse mitochondrial protein is selected from the group consisting of, TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof, ii) adding an internal standard to the sample, wherein the internal standard comprises 74 reference peptides having SEQ ID NOs: 78-151, and each reference peptide is labeled with a stable isotope, wherein each reference peptide is present in the internal standard in a known quantity, and wherein each reference peptide has a known mass-to-charge ratio (m/z) and retention time (rt); iii) analyzing the sample from step ii) by mass spectrometry; iv) identifying the target peptide by comparing the target peptide mass-to-charge ratio (m/z) and retention time (rt) to the known reference peptide mass-to-charge ratio (m/z) and retention time (rt); and v) identifying the mouse mitochondrial protein in the sample by correlating the target peptide to the mouse mitochondrial protein according to Table 2. In some embodiments, the mass spectrometry is selected from the group consisting of LC-MS, LC-MS/MS, LC-SRM-MS, LC-MRM-MS and LC-PRM-MS. In some embodiments, the sample is from a mouse subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the method further comprises correlating the mouse mitochondrial protein according to Table 2 to a mitochondrial function according to Table 3.

In various embodiments, the present invention provides a method of identifying at least one mouse mitochondrial protein in a sample, comprising: i) obtaining the sample, wherein the sample has been treated or contacted with a protease that digests the mouse mitochondrial protein into at least one target peptide, wherein the target peptide is selected from the group consisting of SEQ ID NOs: 78-151, and combinations thereof; wherein the protease is trypsin, and wherein the mouse mitochondrial protein is selected from the group consisting of, TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof; ii) adding an internal standard to the sample, wherein the internal standard comprises at least one reference peptide, wherein the reference peptide is selected from the group consisting of SEQ ID NOs: 78-151, and combinations thereof; and each reference peptide is labeled with a stable isotope, wherein each reference peptide is present in the internal standard in a known quantity, and wherein each reference peptide has a known mass-to-charge ratio (m/z) and retention time (rt); iii) analyzing the sample from step ii) by mass spectrometry; iv) identifying the target peptide by comparing the target peptide mass-to-charge ratio (m/z) and retention time (rt) to the known reference peptide mass-to-charge ratio (m/z) and retention time (rt); and v) identifying the mouse mitochondrial protein in the sample by correlating the target peptide to the mouse mitochondrial protein according to Table 2. In some embodiments, the mass spectrometry is selected from the group consisting of LC-MS, LC-MS/MS, LC-SRM-MS, LC-MRM-MS and LC-PRM-MS. In some embodiments, the sample is from a mouse subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the method further comprises correlating the mouse mitochondrial protein according to Table 2 to a mitochondrial function according to Table 3.

In various embodiments, the present invention provides a method of identifying at least one mouse mitochondrial protein in a sample, comprising: i) obtaining the sample, wherein the sample has been treated or contacted with a protease that digests the mouse mitochondrial protein into at least one target peptide, wherein the target peptide is selected from the group consisting of SEQ ID NOs: 78-151, and combinations thereof; wherein the protease is trypsin, and wherein the mouse mitochondrial protein is selected from the group consisting of, TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof; ii) adding an internal standard to the sample, wherein the internal standard comprises reference peptides, and each reference peptide is labeled with a stable isotope, wherein each reference peptide is present in the internal standard in a known quantity, and wherein each reference peptide has a known mass-to-charge ratio (m/z) and retention time (rt); iii) analyzing the sample from step ii) by mass spectrometry; iv) identifying the target peptide by comparing the target peptide mass-to-charge ratio (m/z) and retention time (rt) to the known reference peptide mass-to-charge ratio (m/z) and retention time (rt); and v) identifying the mouse mitochondrial protein in the sample by correlating the target peptide to the mouse mitochondrial protein according to Table 2. In some embodiments, the mass spectrometry is selected from the group consisting of LC-MS, LC-MS/MS, LC-SRM-MS, LC-MRM-MS and LC-PRM-MS. In some embodiments, the sample is from a mouse subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the reference peptides are 12 reference peptides having SEQ ID NOs: 99, 100, 103, 104, 107, 108, 109, 118, 121, 122, 123, 124. In some embodiments, the reference peptides are 12 reference peptides having SEQ ID NOs: 78, 79, 91, 92, 119, 120, 140, 141, 144, 145, 148, 149. In some embodiments, the reference peptides are 30 reference peptides having SEQ ID NOs: 80, 81, 82, 83, 84, 85, 86, 87, 88, 95, 96, 112, 113, 127, 128, 129, 134, 135, 142, 143, 146, 147, 150, 151, 125, 126, 132, 133, 136, 137. In some embodiments, the reference peptides are 26 reference peptides having SEQ ID NOs: 89, 90, 93, 94, 97, 98, 101, 102, 105, 106, 110, 111, 114, 115, 116, 117, 130, 131, 138, 139, 125, 126, 132, 133, 136, 137. In some embodiments, the method further comprises correlating the mouse mitochondrial protein according to Table 2 to a mitochondrial function according to Table 3.

In various embodiments, the present invention provides a method of identifying at least one mouse mitochondrial protein in a sample, comprising: i) obtaining the sample, wherein the sample comprises the at least one mouse mitochondrial protein, wherein the mouse mitochondrial protein is selected from the group consisting of, TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof; ii) treating or contacting the sample with a protease that digests the mouse mitochondrial protein into at least one target peptide, wherein the target peptide is selected from the group consisting of SEQ ID NOs: 78-151, and combinations thereof; and wherein the protease is trypsin; iii) adding an internal standard to the sample, wherein the internal standard comprises 74 reference peptides having SEQ ID NOs: 78-151, and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); and vi) identifying the mouse mitochondrial protein in the sample by correlating the target peptide to the mouse mitochondrial protein according to Table 2. In some embodiments, the mass spectrometry is selected from the group consisting of LC-MS, LC-MS/MS, LC-SRM-MS, LC-MRM-MS and LC-PRM-MS. In some embodiments, the sample is from a mouse subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the method further comprises correlating the mouse mitochondrial protein according to Table 2 to a mitochondrial function according to Table 3.

In various embodiments, the present invention provides a method of identifying at least one mouse mitochondrial protein in a sample, comprising: i) obtaining the sample, wherein the sample comprises the at least one mouse mitochondrial protein, wherein the mouse mitochondrial protein is selected from the group consisting of, TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof, ii) treating or contacting the sample with a protease that digests the mouse mitochondrial protein into at least one target peptide, wherein the target peptide is selected from the group consisting of SEQ ID NOs: 78-151, and combinations thereof; and wherein the protease is trypsin; iii) adding an internal standard to the sample, wherein the internal standard comprises at least one reference peptide, wherein the reference peptide is selected from the group consisting of SEQ ID NOs: 78-151, and combinations thereof; and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); and vi) identifying the mouse mitochondrial protein in the sample by correlating the target peptide to the mouse mitochondrial protein according to Table 2. In some embodiments, the mass spectrometry is selected from the group consisting of LC-MS, LC-MS/MS, LC-SRM-MS, LC-MRM-MS and LC-PRM-MS. In some embodiments, the sample is from a mouse subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the method further comprises correlating the mouse mitochondrial protein according to Table 2 to a mitochondrial function according to Table 3.

In various embodiments, the present invention provides a method of identifying at least one mouse mitochondrial protein in a sample, comprising: i) obtaining the sample, wherein the sample comprises the at least one mouse mitochondrial protein, wherein the mouse mitochondrial protein is selected from the group consisting of, TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof; ii) treating or contacting the sample with a protease that digests the mouse mitochondrial protein into at least one target peptide, wherein the target peptide is selected from the group consisting of SEQ ID NOs: 78-151, and combinations thereof, and wherein the protease is trypsin; iii) adding an internal standard to the sample, wherein the internal standard comprises reference peptides, and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); and vi) identifying the mouse mitochondrial protein in the sample by correlating the target peptide to the mouse mitochondrial protein according to Table 2. In some embodiments, the mass spectrometry is selected from the group consisting of LC-MS, LC-MS/MS, LC-SRM-MS, LC-MRM-MS and LC-PRM-MS. In some embodiments, the sample is from a mouse subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the reference peptides are 12 reference peptides having SEQ ID NOs: 99, 100, 103, 104, 107, 108, 109, 118, 121, 122, 123, 124. In some embodiments, the reference peptides are 12 reference peptides having SEQ ID NOs: 78, 79, 91, 92, 119, 120, 140, 141, 144, 145, 148, 149. In some embodiments, the reference peptides are 30 reference peptides having SEQ ID NOs: 80, 81, 82, 83, 84, 85, 86, 87, 88, 95, 96, 112, 113, 127, 128, 129, 134, 135, 142, 143, 146, 147, 150, 151, 125, 126, 132, 133, 136, 137. In some embodiments, the reference peptides are 26 reference peptides having SEQ ID NOs: 89, 90, 93, 94, 97, 98, 101, 102, 105, 106, 110, 111, 114, 115, 116, 117, 130, 131, 138, 139, 125, 126, 132, 133, 136, 137. In some embodiments, the method further comprises correlating the mouse mitochondrial protein according to Table 2 to a mitochondrial function according to Table 3.

Method for Determining a Mouse Mitochondrial Biomarker Signature

In various embodiments, the present invention provides a method of determining a mitochondrial protein biomarker signature for a mouse subject, the method comprising: i) obtaining a sample from the mouse subject, wherein the sample comprises at least one mouse mitochondrial protein, wherein the mouse mitochondrial protein is selected from the group consisting of TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof; ii) contacting the sample with a protease that digests the mouse mitochondrial protein into at least one target peptide, wherein the target peptide is selected from the group consisting of SEQ ID NOs: 78-151, and combinations thereof; and wherein the protease is trypsin; iii) adding an internal standard to the sample, wherein the internal standard comprises 74 reference peptides having SEQ ID NOs: 78-151 and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); and vi) determining the mouse mitochondrial protein biomarker signature for the mouse subject by correlating the target peptide to the mouse mitochondrial protein according to Table 2. In some embodiments, the method further comprises comparing the mouse mitochondrial protein biomarker signature from the mouse subject to a mouse mitochondrial protein biomarker signature from a reference sample, wherein a change in the mouse mitochondrial protein biomarker signature from the mouse subject compared to the mouse mitochondrial protein biomarker signature from the reference sample is indicative of a change in mitochondrial function in the mouse subject, or altered mitochondrial function or altered mitochondrial physiology in the mouse subject, or abnormal mitochondrial function or abnormal mitochondrial physiology in the mouse subject In some embodiments, the mitochondrial function or mitochondrial physiology is selected from the group consisting of tricarboxylic acid cycle (TCA cycle), oxidative phosphorylation (OxPhos), MitoGeneral, MitoDynamics, and combinations thereof. In some embodiments, the change in mitochondrial function in the mouse subject is indicative of altered mitochondrial function or abnormal mitochondrial function in the mouse subject. In some embodiments, the altered mitochondrial function is selected from the group consisting of altered tricarboxylic acid cycle (TCA cycle), altered oxidative phosphorylation (OxPhos), altered MitoGeneral, altered MitoDynamics, and combinations thereof. In some embodiments, the abnormal mitochondrial function is selected from the group consisting of abnormal tricarboxylic acid cycle (TCA cycle), abnormal oxidative phosphorylation (OxPhos), abnormal MitoGeneral, abnormal MitoDynamics, and combinations thereof. In some embodiments, the mass spectrometry is selected from the group consisting of LC-MS, LC-MS/MS, LC-SRM-MS, LC-MRM-MS and LC-PRM-MS. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the method further comprises correlating the mouse mitochondrial protein according to Table 2 to a mitochondrial function according to Table 3.

In various embodiments, the present invention provides a method of determining a mitochondrial protein biomarker signature for a mouse subject, the method comprising: i) obtaining a sample from the mouse subject, wherein the sample comprises at least one mouse mitochondrial protein, wherein the mouse mitochondrial protein is selected from the group consisting of TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof; ii) contacting the sample with a protease that digests the mouse mitochondrial protein into at least one target peptide, wherein the target peptide is selected from the group consisting of SEQ ID NOs: 78-151, and combinations thereof, and wherein the protease is trypsin; iii) adding an internal standard to the sample, wherein the internal standard comprises at least one reference peptide, wherein the reference peptide is selected from the group consisting of SEQ ID NOs: 78-151, and combinations thereof; and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); and vi) determining the mouse mitochondrial protein biomarker signature for the mouse subject by correlating the target peptide to the mouse mitochondrial protein according to Table 2. In some embodiments, the method further comprises comparing the mouse mitochondrial protein biomarker signature from the mouse subject to a mouse mitochondrial protein biomarker signature from a reference sample, wherein a change in the mouse mitochondrial protein biomarker signature from the mouse subject compared to the mouse mitochondrial protein biomarker signature from the reference sample is indicative of a change in mitochondrial function in the mouse subject, or altered mitochondrial function or altered mitochondrial physiology in the mouse subject, or abnormal mitochondrial function or abnormal mitochondrial physiology in the mouse subject In some embodiments, the mitochondrial function or mitochondrial physiology is selected from the group consisting of tricarboxylic acid cycle (TCA cycle), oxidative phosphorylation (OxPhos), MitoGeneral, MitoDynamics, and combinations thereof. In some embodiments, the change in mitochondrial function in the mouse subject is indicative of altered mitochondrial function or abnormal mitochondrial function in the mouse subject. In some embodiments, the altered mitochondrial function is selected from the group consisting of altered tricarboxylic acid cycle (TCA cycle), altered oxidative phosphorylation (OxPhos), altered MitoGeneral, altered MitoDynamics, and combinations thereof. In some embodiments, the abnormal mitochondrial function is selected from the group consisting of abnormal tricarboxylic acid cycle (TCA cycle), abnormal oxidative phosphorylation (OxPhos), abnormal MitoGeneral, abnormal MitoDynamics, and combinations thereof. In some embodiments, the mass spectrometry is selected from the group consisting of LC-MS, LC-MS/MS, LC-SRM-MS, LC-MRM-MS and LC-PRM-MS. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the method further comprises correlating the mouse mitochondrial protein according to Table 2 to a mitochondrial function according to Table 3.

In various embodiments, the present invention provides a method of determining a mitochondrial protein biomarker signature for a mouse subject, the method comprising: i) obtaining a sample from the mouse subject, wherein the sample comprises at least one mouse mitochondrial protein, wherein the mouse mitochondrial protein is selected from the group consisting of TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof; ii) contacting the sample with a protease that digests the mouse mitochondrial protein into at least one target peptide, wherein the target peptide is selected from the group consisting of SEQ ID NOs: 78-151, and combinations thereof; and wherein the protease is trypsin; iii) adding an internal standard to the sample, wherein the internal standard comprises reference peptides, and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); and vi) determining the mouse mitochondrial protein biomarker signature for the mouse subject by correlating the target peptide to the mouse mitochondrial protein according to Table 2. In some embodiments, the method further comprises comparing the mouse mitochondrial protein biomarker signature from the mouse subject to a mouse mitochondrial protein biomarker signature from a reference sample, wherein a change in the mouse mitochondrial protein biomarker signature from the mouse subject compared to the mouse mitochondrial protein biomarker signature from the reference sample is indicative of a change in mitochondrial function in the mouse subject, or altered mitochondrial function or altered mitochondrial physiology in the mouse subject, or abnormal mitochondrial function or abnormal mitochondrial physiology in the mouse subject In some embodiments, the mitochondrial function or mitochondrial physiology is selected from the group consisting of tricarboxylic acid cycle (TCA cycle), oxidative phosphorylation (OxPhos), MitoGeneral, MitoDynamics, and combinations thereof. In some embodiments, the change in mitochondrial function in the mouse subject is indicative of altered mitochondrial function or abnormal mitochondrial function in the mouse subject. In some embodiments, the altered mitochondrial function is selected from the group consisting of altered tricarboxylic acid cycle (TCA cycle), altered oxidative phosphorylation (OxPhos), altered MitoGeneral, altered MitoDynamics, and combinations thereof. In some embodiments, the abnormal mitochondrial function is selected from the group consisting of abnormal tricarboxylic acid cycle (TCA cycle), abnormal oxidative phosphorylation (OxPhos), abnormal MitoGeneral, abnormal MitoDynamics, and combinations thereof. In some embodiments, the mass spectrometry is selected from the group consisting of LC-MS, LC-MS/MS, LC-SRM-MS, LC-MRM-MS and LC-PRM-MS. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the reference peptides are 12 reference peptides having SEQ ID NOs: 99, 100, 103, 104, 107, 108, 109, 118, 121, 122, 123, 124. In some embodiments, the reference peptides are 12 reference peptides having SEQ ID NOs: 78, 79, 91, 92, 119, 120, 140, 141, 144, 145, 148, 149. In some embodiments, the reference peptides are 30 reference peptides having SEQ ID NOs: 80, 81, 82, 83, 84, 85, 86, 87, 88, 95, 96, 112, 113, 127, 128, 129, 134, 135, 142, 143, 146, 147, 150, 151, 125, 126, 132, 133, 136, 137. In some embodiments, the reference peptides are 26 reference peptides having SEQ ID NOs: 89, 90, 93, 94, 97, 98, 101, 102, 105, 106, 110, 111, 114, 115, 116, 117, 130, 131, 138, 139, 125, 126, 132, 133, 136, 137. In some embodiments, the method further comprises correlating the mouse mitochondrial protein according to Table 2 to a mitochondrial function according to Table 3.

Kits

The exact nature of the components configured in the inventive kit depends on its intended purpose. In one embodiment, the kit is configured particularly for human subjects. In further embodiments, the kit is configured for research and/or veterinary applications, for subjects such as, but not limited to, farm animals, domestic animals, and laboratory animals (e.g., mouse or mice).

Instructions for use may be included in the kit. "Instructions for use" typically include a tangible expression describing the technique to be employed in using the components of the kit to effect a desired outcome. Optionally, the kit also contains other useful components, such as, measuring tools, diluents, buffers, pharmaceutical compositions, pharmaceutically acceptable carriers, syringes or other useful paraphernalia as will be readily recognized by those of skill in the art.

The materials or components assembled in the kit can be provided to the practitioner stored in any convenient and suitable ways that preserve their operability and utility. For example, the components can be in dissolved, dehydrated, or lyophilized form; they can be provided at room, refrigerated or frozen temperatures. The components are typically contained in suitable packaging material(s). As employed herein, the phrase "packaging material" refers to one or more physical structures used to house the contents of the kit, such as inventive compositions and the like. The packaging material is constructed by well-known methods, to provide a sterile, contaminant-free environment. As used herein, the term "package" refers to a suitable solid matrix or material such as glass, plastic, paper, foil, and the like, capable of holding the individual kit components. The packaging material generally has an external label which indicates the contents and/or purpose of the kit and/or its components.

In various embodiments, the invention provides a kit for obtaining a mitochondrial protein biomarker signature for a subject, the kit comprising: (a) one or more internal standards suitable for mass spectrometry; (b) one or more proteases; (c) reagents and instructions for sample processing and preparation; and (d) instructions for using the kit to obtain the mitochondrial biomarker signature for the subject. In some embodiments, the internal standard comprises one or more isotopically labeled peptides, one or more isotopically labeled proteins, or any combination thereof. In some embodiments, the instructions for using the kit to obtain the mitochondrial biomarker signature for the subject comprise a process for analyzing raw data and performing quantitative analysis.

Kits for Identifying and Quantifying Human Mitochondrial Proteins

In various embodiments, the present invention provides a kit for identifying and quantifying at least one human mitochondrial protein in a sample by mass spectrometry, comprising: (a) reagents and instructions for tryptic digestion of the human mitochondrial protein, wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No.

Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; and wherein the tryptic digestion of the human mitochondrial protein provides at least one target peptide, wherein the target peptide is selected from the group consisting of SEQ ID NOs: 1-77, and combinations thereof; (b) an internal standard, wherein the internal standard comprises 77 reference peptides having SEQ ID NOs: 1-77 and each reference peptide is labeled with a stable isotope, wherein each reference peptide is present in the internal standard in a known quantity, and wherein each reference peptide has a known mass-to-charge ratio (m/z) and retention time (rt); (c) reagents and instructions for preparing and processing the sample; and (d) reagents and instructions for using the kit to identify and quantify the human mitochondrial protein in the sample by mass spectrometry. In some embodiments, the reagents for tryptic digestion of the human mitochondrial protein comprise a reducing agent (e.g., dithiothreitol (DTT)), alkylating agent (e.g., iodoacetamide (IAA)), protease (e.g., trypsin), buffer (e.g., ammonium bicarbonate buffer), and acid (e.g. trichloroacetic acid). In some embodiments, the reagents for preparing and processing the sample comprise C18 clean up tips and/or plates, acetonitrile, and 0.1% formic acid in water. In some embodiments, the mass spectrometry is selected from the group consisting of LC-MS, LC-MS/MS, LC-SRM-MS, LC-MRM-MS and LC-PRM-MS. In some embodiments, the sample is from a human subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the instructions for using the kit to identify and quantify the human mitochondrial protein in the sample by mass spectrometry comprise a process for analyzing raw data and performing quantitative analysis. In some embodiments, the kit further comprises Table 1 and/or Table 4.

In various embodiments, the present invention provides a kit for identifying and quantifying at least one human mitochondrial protein in a sample by mass spectrometry, comprising: (a) reagents and instructions for tryptic digestion of the human mitochondrial protein, wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; and wherein the tryptic digestion of the human mitochondrial protein provides at least one target peptide, wherein the target peptide is selected from the group consisting of SEQ ID NOs: 1-77, and combinations thereof, (b) an internal standard, wherein the internal standard comprises at least one reference peptide, wherein the reference peptide is selected from the group consisting of SEQ ID NOs: 1-77, and combinations thereof; and each reference peptide is labeled with a stable isotope, wherein each reference peptide is present in the internal standard in a known quantity, and wherein each reference peptide has a known mass-to-charge ratio (m/z) and retention time (rt); (c) reagents and instructions for preparing and processing the sample; and (d) reagents and instructions for using the kit to identify and quantify the human mitochondrial protein in the sample by mass spectrometry. In some embodiments, the reagents for tryptic digestion of the human mitochondrial protein comprise a reducing agent (e.g., dithiothreitol (DTT)), alkylating agent (e.g., iodoacetamide (IAA)), protease (e.g., trypsin), buffer (e.g., ammonium bicarbonate buffer), and acid (e.g. trichloroacetic acid). In some embodiments, the reagents for preparing and processing the sample comprise C18 clean up tips and/or plates, acetonitrile, and 0.1% formic acid in water. In some embodiments, the mass spectrometry is selected from the group consisting of LC-MS, LC-MS/MS, LC-SRM-MS, LC-MRM-MS and LC-PRM-MS. In some embodiments, the sample is from a human subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the instructions for using the kit to identify and quantify the human mitochondrial protein in the sample by mass spectrometry comprise a process for analyzing raw data and performing quantitative analysis. In some embodiments, the kit further comprises Table 1 and/or Table 4.

In various embodiments, the present invention provides a kit for identifying and quantifying at least one human mitochondrial protein in a sample by mass spectrometry, comprising: (a) reagents and instructions for tryptic digestion of the human mitochondrial protein, wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; and wherein the tryptic digestion of the human mitochondrial protein provides at least one target peptide, wherein the target peptide is selected from the group consisting of SEQ ID NOs: 1-77, and combinations thereof, (b) an internal standard, wherein the internal standard comprises reference peptides, and each reference peptide is labeled with a stable isotope, wherein each reference peptide is present in the internal standard in a known quantity, and wherein each reference peptide has a known mass-to-charge ratio (m/z) and retention time (rt); (c) reagents and instructions for preparing and processing the sample; and (d) reagents and instructions for using the kit to identify and quantify the human mitochondrial protein in the sample by mass spectrometry. In some embodiments, the reagents for tryptic digestion of the human mitochondrial protein comprise a reducing agent (e.g., dithiothreitol (DTT)), alkylating agent (e.g., iodoacetamide (IAA)), protease (e.g., trypsin), buffer (e.g., ammonium bicarbonate buffer), and acid (e.g. trichloroacetic acid). In some embodiments, the reagents for preparing and processing the sample comprise C18 clean up tips and/or plates, acetonitrile, and 0.1% formic acid in water. In some embodiments, the mass spectrometry is selected from the group consisting of LC-MS, LC-MS/MS, LC-SRM-MS, LC-MRM-MS and LC-PRM-MS. In some embodiments, the sample is from a human subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the instructions for using the kit to identify and quantify the human mitochondrial protein in the sample by mass spectrometry comprise a process for analyzing raw data and performing quantitative analysis. In some embodiments, the reference peptides are 12 reference peptides having SEQ ID NOs: 1, 2, 6, 7, 8, 17, 18, 19, 63, 64, 70, 71. In some embodiments, the reference peptides are 15 reference peptides having SEQ ID NOs: 3, 4, 5, 15, 16, 30, 31, 38, 39, 42, 43, 51, 52, 68, 69. In some embodiments, the reference peptides are 31 reference peptides having SEQ ID NOs: 9, 10, 13, 14, 20, 21, 22, 23, 24, 25, 26, 27, 28, 29, 40, 41, 48, 49, 50, 53, 54, 57, 58, 76, 77, 46, 47, 55, 56, 72, 73. In some embodiments, the reference peptides are 25 reference peptides having SEQ ID NOs: 11, 12, 32, 33, 34, 35, 36, 37, 44, 45, 59, 60, 61, 62, 65, 66, 67, 74, 75, 46, 47, 55, 56, 72, 73. In some embodiments, the kit further comprises Table 1 and/or Table 4.

Kits for Identifying Human Mitochondrial Proteins

In various embodiments, the present invention provides a kit for identifying at least one human mitochondrial protein in a sample by mass spectrometry, comprising: (a) reagents and instructions for tryptic digestion of the human mitochondrial protein, wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; and wherein the tryptic digestion of the human mitochondrial protein provides at least one target peptide, wherein the target peptide is selected from the group consisting of SEQ ID NOs: 1-77, and combinations thereof, (b) an internal standard, wherein the internal standard comprises 77 reference peptides having SEQ ID NOs: 1-77, and each reference peptide is labeled with a stable isotope, wherein each reference peptide is present in the internal standard in a known quantity, and wherein each reference peptide has a known mass-to-charge ratio (m/z) and retention time (rt); (c) reagents and instructions for preparing and processing the sample; and (d) reagents and instructions for using the kit to identify the human mitochondrial protein in the sample by mass spectrometry. In some embodiments, the reagents for tryptic digestion of the human mitochondrial protein comprise a reducing agent (e.g., dithiothreitol (DTT)), alkylating agent (e.g., iodoacetamide (IAA)), protease (e.g., trypsin), buffer (e.g., ammonium bicarbonate buffer), and acid (e.g. trichloroacetic acid). In some embodiments, the reagents for preparing and processing the sample comprise C18 clean up tips and/or plates, acetonitrile, and 0.1% formic acid in water. In some embodiments, the mass spectrometry is selected from the group consisting of LC-MS, LC-MS/MS, LC-SRM-MS, LC-MRM-MS and LC-PRM-MS. In some embodiments, the sample is from a human subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the instructions for using the kit to identify the human mitochondrial protein in the sample by mass spectrometry comprise a process for analyzing raw data and performing quantitative analysis. In some embodiments, the kit further comprises Table 1 and/or Table 4.

In various embodiments, the present invention provides a kit for identifying at least one human mitochondrial protein in a sample by mass spectrometry, comprising: (a) reagents and instructions for tryptic digestion of the human mitochondrial protein, wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; and wherein the tryptic digestion of the human mitochondrial protein provides at least one target peptide, wherein the target peptide is selected from the group consisting of SEQ ID NOs: 1-77, and combinations thereof; (b) an internal standard, wherein the internal standard comprises at least one reference peptide, wherein the reference peptide is selected from the group consisting of SEQ ID NOs: 1-77, and combinations thereof; and each reference peptide is labeled with a stable isotope, wherein each reference peptide is present in the internal standard in a known quantity, and wherein each reference peptide has a known mass-to-charge ratio (m/z) and retention time (rt); (c) reagents and instructions for preparing and processing the sample; and (d) reagents and instructions for using the kit to identify the human mitochondrial protein in the sample by mass spectrometry. In some embodiments, the reagents for tryptic digestion of the human mitochondrial protein comprise a reducing agent (e.g., dithiothreitol (DTT)), alkylating agent (e.g., iodoacetamide (IAA)), protease (e.g., trypsin), buffer (e.g., ammonium bicarbonate buffer), and acid (e.g. trichloroacetic acid). In some embodiments, the reagents for preparing and processing the sample comprise C18 clean up tips and/or plates, acetonitrile, and 0.1% formic acid in water. In some embodiments, the mass spectrometry is selected from the group consisting of LC-MS, LC-MS/MS, LC-SRM-MS, LC-MRM-MS and LC-PRM-MS. In some embodiments, the sample is from a human subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the instructions for using the kit to identify the human mitochondrial protein in the sample by mass spectrometry comprise a process for analyzing raw data and performing quantitative analysis. In some embodiments, the kit further comprises Table 1 and/or Table 4.

In various embodiments, the present invention provides a kit for identifying at least one human mitochondrial protein in a sample by mass spectrometry, comprising: (a) reagents and instructions for tryptic digestion of the human mitochondrial protein, wherein the human mitochondrial protein is selected from the group consisting of DNM1L (UniProt Accession No. O00429), TIM44 (UniProt Accession No.

O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; and wherein the tryptic digestion of the human mitochondrial protein provides at least one target peptide, wherein the target peptide is selected from the group consisting of SEQ ID NOs: 1-77, and combinations thereof, (b) an internal standard, wherein the internal standard comprises reference peptides, and each reference peptide is labeled with a stable isotope, wherein each reference peptide is present in the internal standard in a known quantity, and wherein each reference peptide has a known mass-to-charge ratio (m/z) and retention time (rt); (c) reagents and instructions for preparing and processing the sample; and (d) reagents and instructions for using the kit to identify the human mitochondrial protein in the sample by mass spectrometry. In some embodiments, the reagents for tryptic digestion of the human mitochondrial protein comprise a reducing agent (e.g., dithiothreitol (DTT)), alkylating agent (e.g., iodoacetamide (IAA)), protease (e.g., trypsin), buffer (e.g., ammonium bicarbonate buffer), and acid (e.g. trichloroacetic acid). In some embodiments, the reagents for preparing and processing the sample comprise C18 clean up tips and/or plates, acetonitrile, and 0.1% formic acid in water. In some embodiments, the mass spectrometry is selected from the group consisting of LC-MS, LC-MS/MS, LC-SRM-MS, LC-MRM-MS and LC-PRM-MS. In some embodiments, the sample is from a human subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{13}$, $^{13}C$, $^{18}O$, and $^{2}H$. In some embodiments, the instructions for using the kit to identify the human mitochondrial protein in the sample by mass spectrometry comprise a process for analyzing raw data and performing quantitative analysis. In some embodiments, the reference peptides are 12 reference peptides having SEQ ID NOs: 1, 2, 6, 7, 8, 17, 18, 19, 63, 64, 70, 71. In some embodiments, the reference peptides are 15 reference peptides having SEQ ID NOs: 3, 4, 5, 15, 16, 30, 31, 38, 39, 42, 43, 51, 52, 68, 69. In some embodiments, the reference peptides are 31 reference peptides having SEQ ID NOs: 9, 10, 13, 14, 20, 21, 22, 23, 24, 25, 26, 27, 28, 29, 40, 41, 48, 49, 50, 53, 54, 57, 58, 76, 77, 46, 47, 55, 56, 72, 73. In some embodiments, the reference peptides are 25 reference peptides having SEQ ID NOs: 11, 12, 32, 33, 34, 35, 36, 37, 44, 45, 59, 60, 61, 62, 65, 66, 67, 74, 75, 46, 47, 55, 56, 72, 73. In some embodiments, the kit further comprises Table 1 and/or Table 4.

Kits for Determining a Human Mitochondrial Protein Biomarker Signature

In various embodiments, the present invention provides a kit for determining a mitochondrial protein biomarker signature for a human subject by mass spectrometry, comprising: (a) reagents and instructions for tryptic digestion of at least one human mitochondrial protein in a sample from the human subject, wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; and wherein the tryptic digestion of the human mitochondrial protein provides at least one target peptide, wherein the target peptide is selected from the group consisting of SEQ ID NOs: 1-77, and combinations thereof; (b) an internal standard, wherein the internal standard comprises 77 reference peptides having SEQ ID NOs: 1-77, and each reference peptide is labeled with a stable isotope, wherein each reference peptide is present in the internal standard in a known quantity, and wherein each reference peptide has a known mass-to-charge ratio (m/z) and retention time (rt); (c) reagents and instructions for preparing and processing the sample; and (d) reagents and instructions for using the kit to determine the mitochondrial protein biomarker signature for the subject by mass spectrometry. In some embodiments, the reagents for tryptic digestion of the human mitochondrial protein comprise a reducing agent (e.g., dithiothreitol (DTT)), alkylating agent (e.g., iodoacetamide (IAA)), protease (e.g., trypsin), buffer (e.g., ammonium bicarbonate buffer), and acid (e.g. trichloroacetic acid). In some embodiments, the reagents for preparing and processing the sample comprise C18 clean up tips and/or plates, acetonitrile, and 0.1% formic acid in water. In some embodiments, the mass spectrometry is selected from the group consisting of LC-MS, LC-MS/MS, LC-SRM-MS, LC-MRM-MS and LC-PRM-MS. In some embodiments, the sample is from a human subject, and the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}$N, $^{13}$C, $^{18}$O, and $^{2}$H. In some embodiments, the method further comprises instructions for using the kit to determine a status of a mitochondrial function or mitochondrial physiology in the subject. In some embodiments, the mitochondrial function or mitochondrial physiology is selected from the group consisting of tricarboxylic acid cycle (TCA cycle), oxidative phosphorylation (OxPhos), MitoGeneral, MitoDynamics, and combinations thereof. In some embodiments, the instructions for using the kit to determine the mitochondrial protein biomarker signature for the subject by mass spectrometry comprise a process for analyzing raw data and performing quantitative analysis. In some embodiments, the kit further comprises Table 1 and/or Table 4.

In various embodiments, the present invention provides a kit for determining a mitochondrial protein biomarker signature for a human subject by mass spectrometry, comprising: (a) reagents and instructions for tryptic digestion of at least one human mitochondrial protein in a sample from the human subject, wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; and wherein the tryptic digestion of the human mitochondrial protein provides at least one target peptide, wherein the target peptide is selected from the group consisting of SEQ ID NOs: 1-77, and combinations thereof; (b) an internal standard, wherein the internal standard comprises at least one reference peptide, wherein the reference peptide is selected from the group consisting of SEQ ID NOs: 1-77, and combinations thereof; and each reference peptide is labeled with a stable isotope, wherein each reference peptide is present in the internal standard in a known quantity, and wherein each reference peptide has a known mass-to-charge ratio (m/z) and retention time (rt); (c) reagents and instructions for preparing and processing the sample; and (d) reagents and instructions for using the kit to determine the mitochondrial protein biomarker signature for the subject by mass spectrometry. In some embodiments, the reagents for tryptic digestion of the human mitochondrial protein comprise a reducing agent (e.g., dithiothreitol (DTT)), alkylating agent (e.g., iodoacetamide (IAA)), protease (e.g., trypsin), buffer (e.g., ammonium bicarbonate buffer), and acid (e.g. trichloroacetic acid). In some embodiments, the reagents for preparing and processing the sample comprise C18 clean up tips and/or plates, acetonitrile, and 0.1% formic acid in water. In some embodiments, the mass spectrometry is selected from the group consisting of LC-MS, LC-MS/MS, LC-SRM-MS, LC-MRM-MS and LC-PRM-MS. In some embodiments, the sample is from a human subject, and the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}$N, $^{13}$C, $^{18}$O, and $^{2}$H. In some embodiments, the method further comprises instructions for using the kit to determine a status of a mitochondrial function or mitochondrial physiology in the subject. In some embodiments, the mitochondrial function or mitochondrial physiology is selected from the group consisting of tricarboxylic acid cycle (TCA cycle), oxidative phosphorylation (OxPhos), MitoGeneral, MitoDynamics, and combinations thereof. In some embodiments, the instructions for using the kit to determine the mitochondrial protein biomarker signature for the subject by mass spectrometry comprise a process for analyzing raw data and performing quantitative analysis. In some embodiments, the kit further comprises Table 1 and/or Table 4.

In various embodiments, the present invention provides a kit for determining a mitochondrial protein biomarker signature for a human subject by mass spectrometry, comprising: (a) reagents and instructions for tryptic digestion of at least one human mitochondrial protein in a sample from the human subject, wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; and wherein the tryptic digestion of the human mitochondrial protein provides at least one target peptide, wherein the target peptide is selected from the group consisting of SEQ ID NOs: 1-77, and combinations thereof; (b) an internal standard, wherein the internal standard comprises reference peptides, and each reference peptide is labeled with a stable isotope, wherein each reference peptide is present in the internal standard in a known quantity, and wherein each reference peptide has a known mass-to-charge ratio (m/z) and retention time (rt); (c) reagents and instructions for preparing and processing the sample; and (d) reagents and instructions for using the kit to determine the mitochondrial protein biomarker signature for the subject by mass spectrometry. In some embodiments, the reagents for tryptic digestion of the human mitochondrial protein comprise a reducing agent (e.g., dithiothreitol (DTT)), alkylating agent (e.g., iodoacetamide (IAA)), protease (e.g., trypsin), buffer (e.g., ammonium bicarbonate buffer), and acid (e.g. trichloroacetic acid). In some embodiments, the reagents for preparing and processing the sample comprise C18 clean up tips and/or plates, acetonitrile, and 0.1% formic acid in water. In some embodiments, the mass spectrometry is selected from the group consisting of LC-MS, LC-MS/MS, LC-SRM-MS, LC-MRM-MS and LC-PRM-MS. In some embodiments, the sample is from a human subject, and the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the method further comprises instructions for using the kit to determine a status of a mitochondrial function or mitochondrial physiology in the subject. In some embodiments, the mitochondrial function or mitochondrial physiology is selected from the group consisting of tricarboxylic acid cycle (TCA cycle), oxidative phosphorylation (OxPhos), MitoGeneral, MitoDynamics, and combinations thereof. In some embodiments, the instructions for using the kit to determine the mitochondrial protein biomarker signature for the subject by mass spectrometry comprise a process for analyzing raw data and performing quantitative analysis. In some embodiments, the reference peptides are 12 reference peptides having SEQ ID NOs: 1, 2, 6, 7, 8, 17, 18, 19, 63, 64, 70, 71. In some embodiments, the reference peptides are 15 reference peptides having SEQ ID NOs: 3, 4, 5, 15, 16, 30, 31, 38, 39, 42, 43, 51, 52, 68, 69. In some embodiments, the reference peptides are 31 reference peptides having SEQ ID NOs: 9, 10, 13, 14, 20, 21, 22, 23, 24, 25, 26, 27, 28, 29, 40, 41, 48, 49, 50, 53, 54, 57, 58, 76, 77, 46, 47, 55, 56, 72, 73. In some embodiments, the reference peptides are 25 reference peptides having SEQ ID NOs: 11, 12, 32, 33, 34, 35, 36, 37, 44, 45, 59, 60, 61, 62, 65, 66, 67, 74, 75, 46, 47, 55, 56, 72, 73. In some embodiments, the kit further comprises Table 1 and/or Table 4.

Kits for Identifying and Quantifying Mouse Mitochondrial Proteins

In various embodiments, the present invention provides a kit for identifying and quantifying at least one mouse mitochondrial protein in a sample by mass spectrometry, comprising: (a) reagents and instructions for tryptic digestion of the mouse mitochondrial protein, wherein the mouse mitochondrial protein is selected from the group consisting of TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No.

Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof; and wherein the tryptic digestion of the mouse mitochondrial protein provides at least one target peptide, wherein the target peptide is selected from the group consisting of SEQ ID NOs: 78-151, and combinations thereof; (b) an internal standard, wherein the internal standard comprises 74 reference peptides having SEQ ID NOs: 78-151 and each reference peptide is labeled with a stable isotope, wherein each reference peptide is present in the internal standard in a known quantity, and wherein each reference peptide has a known mass-to-charge ratio (m/z) and retention time (rt); (c) reagents and instructions for preparing and processing the sample; and (d) reagents and instructions for using the kit to identify and quantify the mouse mitochondrial protein in the sample by mass spectrometry. In some embodiments, the reagents for tryptic digestion of the mouse mitochondrial protein comprise a reducing agent (e.g., dithiothreitol (DTT)), alkylating agent (e.g., iodoacetamide (IAA)), protease (e.g., trypsin), buffer (e.g., ammonium bicarbonate buffer), and acid (e.g. trichloroacetic acid). In some embodiments, the reagents for preparing and processing the sample comprise C18 clean up tips and/or plates, acetonitrile, and 0.1% formic acid in water. In some embodiments, the mass spectrometry is selected from the group consisting of LC-MS, LC-MS/MS, LC-SRM-MS, LC-MRM-MS and LC-PRM-MS. In some embodiments, the sample is from a mouse subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the instructions for using the kit to identify and quantify the mouse mitochondrial protein in the sample by mass spectrometry comprise a process for analyzing raw data and performing quantitative analysis. In some embodiments, the kit further comprises Table 2 and/or Table 3.

In various embodiments, the present invention provides a kit for identifying and quantifying at least one mouse mitochondrial protein in a sample by mass spectrometry, comprising: (a) reagents and instructions for tryptic digestion of the mouse mitochondrial protein, wherein the mouse mitochondrial protein is selected from the group consisting of TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof; and wherein the tryptic digestion of the mouse mitochondrial protein provides at least one target peptide, wherein the target peptide is selected from the group consisting of SEQ ID NOs: 78-151, and combinations thereof; (b) an internal standard, wherein the internal standard comprises at least one reference peptide, wherein the reference peptide is selected from the group consisting of SEQ ID NOs: 78-151, and combinations thereof, and each reference peptide is labeled with a stable isotope, wherein each reference peptide is present in the internal standard in a known quantity, and wherein each reference peptide has a known mass-to-charge ratio (m/z) and retention time (rt); (c) reagents and instructions for preparing and processing the sample; and (d) reagents and instructions for using the kit to identify and quantify the mouse mitochondrial protein in the sample by mass spectrometry. In some embodiments, the reagents for tryptic digestion of the mouse mitochondrial protein comprise a reducing agent (e.g., dithiothreitol (DTT)), alkylating agent (e.g., iodoacetamide (IAA)), protease (e.g., trypsin), buffer (e.g., ammonium bicarbonate buffer), and acid (e.g. trichloroacetic acid). In some embodiments, the reagents for preparing and processing the sample comprise C18 clean up tips and/or plates, acetonitrile, and 0.1% formic acid in water. In some embodiments, the mass spectrometry is selected from the group consisting of LC-MS, LC-MS/MS, LC-SRM-MS, LC-MRM-MS and LC-PRM-MS. In some embodiments, the sample is from a mouse subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the instructions for using the kit to identify and quantify the mouse mitochondrial protein in the sample by mass spectrometry comprise a process for analyzing raw data and performing quantitative analysis. In some embodiments, the kit further comprises Table 2 and/or Table 3.

In various embodiments, the present invention provides a kit for identifying and quantifying at least one mouse mitochondrial protein in a sample by mass spectrometry, comprising: (a) reagents and instructions for tryptic digestion of the mouse mitochondrial protein, wherein the mouse mitochondrial protein is selected from the group consisting of TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof; and wherein the tryptic digestion of the mouse mitochondrial protein provides at least one target peptide, wherein the target peptide is selected from the group consisting of SEQ ID NOs: 78-151, and combinations thereof; (b) an internal standard, wherein the internal standard comprises reference peptides, and each reference peptide is labeled with a stable isotope, wherein each reference peptide is present in the internal standard in a known quantity, and wherein each reference peptide has a known mass-to-charge ratio (m/z) and retention time (rt); (c) reagents and instructions for preparing and processing the sample; and (d) reagents and instructions for using the kit to identify and quantify the mouse mitochondrial protein in the sample by mass spectrometry. In some embodiments, the reagents for tryptic digestion of the mouse mitochondrial protein comprise a reducing agent (e.g., dithiothreitol (DTT)), alkylating agent (e.g., iodoacetamide (IAA)), protease (e.g., trypsin), buffer (e.g., ammonium bicarbonate buffer), and acid (e.g. trichloroacetic acid). In some embodiments, the reagents for preparing and processing the sample comprise C18 clean up tips and/or plates, acetonitrile, and 0.1% formic acid in water. In some embodiments, the mass spectrometry is selected from the group consisting of LC-MS, LC-MS/MS, LC-SRM-MS, LC-MRM-MS and LC-PRM-MS. In some embodiments, the sample is from a mouse subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the instructions for using the kit to identify and quantify the mouse mitochondrial protein in the sample by mass spectrometry comprise a process for analyzing raw data and performing quantitative analysis. In some embodiments, the reference peptides are 12 reference peptides having SEQ ID NOs: 99, 100, 103, 104, 107, 108, 109, 118, 121, 122, 123, 124. In some embodiments, the reference peptides are 12 reference peptides having SEQ ID NOs: 78, 79, 91, 92, 119, 120, 140, 141, 144, 145, 148, 149. In some embodiments, the reference peptides are 30 reference peptides having SEQ ID NOs: 80, 81, 82, 83, 84, 85, 86, 87, 88, 95, 96, 112, 113, 127, 128, 129, 134, 135, 142, 143, 146, 147, 150, 151, 125, 126, 132, 133, 136, 137. In some embodiments, the reference peptides are 26 reference peptides having SEQ ID NOs: 89, 90, 93, 94, 97, 98, 101, 102, 105, 106, 110, 111, 114, 115, 116, 117, 130, 131, 138, 139, 125, 126, 132, 133, 136, 137. In some embodiments, the kit further comprises Table 2 and/or Table 3.

Kits for Identifying Mouse Mitochondrial Proteins

In some embodiments, the present invention provides a kit for identifying at least one mouse mitochondrial protein in a sample by mass spectrometry, comprising: (a) reagents and instructions for tryptic digestion of the mouse mitochondrial protein, wherein the mouse mitochondrial protein is selected from the group consisting of TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof; and wherein the tryptic digestion of the mouse mitochondrial protein provides at least one target peptide, wherein the target peptide is selected from the group consisting of SEQ ID NOs: 78-151, and combinations thereof; (b) an internal standard, wherein the internal standard comprises 74 reference peptides having SEQ ID NOs: 78-151, and each reference peptide is labeled with a stable isotope, wherein each reference peptide is present in the internal standard in a known quantity, and wherein each reference peptide has a known mass-to-charge ratio (m/z) and retention time (rt); (c) reagents and instructions for preparing and processing the sample; and (d) reagents and instructions for using the kit to identify the mouse mitochondrial protein in the sample by mass spectrometry In some embodiments, the reagents for tryptic digestion of the mouse mitochondrial protein comprise a reducing agent (e.g., dithiothreitol (DTT)), alkylating agent (e.g., iodoacetamide (IAA)), protease (e.g., trypsin), buffer (e.g., ammonium bicarbonate buffer), and acid (e.g. trichloroacetic acid). In some embodiments, the reagents for preparing and processing the sample comprise C18 clean up tips and/or plates, acetonitrile, and 0.1% formic acid in water. In some embodiments, the mass spectrometry is selected from the group consisting of LC-MS, LC-MS/MS, LC-SRM-MS, LC-MRM-MS and LC-PRM-MS. In some embodiments, the sample is from a mouse subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^2H$. In some embodiments, the instructions for using the kit to identify the mouse mitochondrial protein in the sample by mass spectrometry comprise a process for analyzing raw data and performing quantitative analysis. In some embodiments, the kit further comprises Table 2 and/or Table 3.

In some embodiments, the present invention provides a kit for identifying at least one mouse mitochondrial protein in a sample by mass spectrometry, comprising: (a) reagents and instructions for tryptic digestion of the mouse mitochondrial protein, wherein the mouse mitochondrial protein is selected from the group consisting of TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof, and wherein the tryptic digestion of the mouse mitochondrial protein provides at least one target peptide, wherein the target peptide is selected from the group consisting of SEQ ID NOs: 78-151, and combinations thereof; (b) an internal standard, wherein the internal standard comprises at least one reference peptide, wherein the reference peptide is selected from the group consisting of SEQ ID NOs: 78-151, and combinations thereof; and each reference peptide is labeled with a stable isotope, wherein each reference peptide is present in the internal standard in a known quantity, and wherein each reference peptide has a known mass-to-charge ratio (m/z) and retention time (rt); (c) reagents and instructions for preparing and processing the sample; and (d) reagents and instructions for using the kit to identify the mouse mitochondrial protein in the sample by mass spectrometry In some embodiments, the reagents for tryptic digestion of the mouse mitochondrial protein comprise a reducing agent (e.g., dithiothreitol (DTT)), alkylating agent (e.g., iodoacetamide (IAA)), protease (e.g., trypsin), buffer (e.g., ammonium bicarbonate buffer), and acid (e.g. trichloroacetic acid). In some embodiments, the reagents for preparing and processing the sample comprise C18 clean up tips and/or plates, acetonitrile, and 0.1% formic acid in water. In some embodiments, the mass spectrometry is selected from the group consisting of LC-MS, LC-MS/MS, LC-SRM-MS, LC-MRM-MS and LC-PRM-MS. In some embodiments, the sample is from a mouse subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^2H$. In some embodiments, the instructions for using the kit to identify the mouse mitochondrial protein in the sample by mass spectrometry comprise a process for analyzing raw data and performing quantitative analysis. In some embodiments, the kit further comprises Table 2 and/or Table 3.

In some embodiments, the present invention provides a kit for identifying at least one mouse mitochondrial protein in a sample by mass spectrometry, comprising: (a) reagents and instructions for tryptic digestion of the mouse mitochondrial protein, wherein the mouse mitochondrial protein is selected from the group consisting of TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof; and wherein the tryptic digestion of the mouse mitochondrial protein provides at least one target peptide, wherein the target peptide is selected from the group consisting of SEQ ID NOs: 78-151, and combinations thereof; (b) an internal standard, wherein the internal standard comprises reference peptides, and each reference peptide is labeled with a stable isotope, wherein each reference peptide is present in the internal standard in a known quantity, and wherein each reference peptide has a known mass-to-charge ratio (m/z) and retention time (rt); (c) reagents and instructions for preparing and processing the sample; and (d) reagents and instructions for using the kit to identify the mouse mitochondrial protein in the sample by mass spectrometry In some embodiments, the reagents for tryptic digestion of the mouse mitochondrial protein comprise a reducing agent (e.g., dithiothreitol (DTT)), alkylating agent (e.g., iodoacetamide (IAA)), protease (e.g., trypsin), buffer (e.g., ammonium bicarbonate buffer), and acid (e.g. trichloroacetic acid). In some embodiments, the reagents for preparing and processing the sample comprise C18 clean up tips and/or plates, acetonitrile, and 0.1% formic acid in water. In some embodiments, the mass spectrometry is selected from the group consisting of LC-MS, LC-MS/MS, LC-SRM-MS, LC-MRM-MS and LC-PRM-MS. In some embodiments, the sample is from a mouse subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the instructions for using the kit to identify the mouse mitochondrial protein in the sample by mass spectrometry comprise a process for analyzing raw data and performing quantitative analysis. In some embodiments, the reference peptides are 12 reference peptides having SEQ ID NOs: 99, 100, 103, 104, 107, 108, 109, 118, 121, 122, 123, 124. In some embodiments, the reference peptides are 12 reference peptides having SEQ ID NOs: 78, 79, 91, 92, 119, 120, 140, 141, 144, 145, 148, 149. In some embodiments, the reference peptides are 30 reference peptides having SEQ ID NOs: 80, 81, 82, 83, 84, 85, 86, 87, 88, 95, 96, 112, 113, 127, 128, 129, 134, 135, 142, 143, 146, 147, 150, 151, 125, 126, 132, 133, 136, 137. In some embodiments, the reference peptides are 26 reference peptides having SEQ ID NOs: 89, 90, 93, 94, 97, 98, 101, 102, 105, 106, 110, 111, 114, 115, 116, 117, 130, 131, 138, 139, 125, 126, 132, 133, 136, 137. In some embodiments, the kit further comprises Table 2 and/or Table 3.

Kits for Determining a Mouse Mitochondrial Protein Biomarker Signature

In some embodiments, the present invention provides a kit for determining a mitochondrial protein biomarker signature for a mouse subject by mass spectrometry, comprising: (a) reagents and instructions for tryptic digestion of at least one mouse mitochondrial protein in a sample from the mouse subject, wherein the mouse mitochondrial protein is selected from the group consisting of TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof; and wherein the tryptic digestion of the mouse mitochondrial protein provides at least one target peptide, wherein the target peptide is selected from the group consisting of SEQ ID NOs: 78-151, and combinations thereof; (b) an internal standard, wherein the internal standard comprises 74 reference peptides having SEQ ID NOs: 78-151, and each reference peptide is labeled with a stable isotope, wherein each reference peptide is present in the internal standard in a known quantity, and wherein each reference peptide has a known mass-to-charge ratio (m/z) and retention time (rt); (c) reagents and instructions for preparing and processing the sample; and (d) reagents and instructions for using the kit to determine the mitochondrial protein biomarker signature for the subject by mass spectrometry. In some embodiments, the reagents for tryptic digestion of the mouse mitochondrial protein comprise a reducing agent (e.g., dithiothreitol (DTT)), alkylating agent (e.g., iodoacetamide (IAA)), protease (e.g., trypsin), buffer (e.g., ammonium bicarbonate buffer), and acid (e.g. trichloroacetic acid). In some embodiments, the reagents for preparing and processing the sample comprise C18 clean up tips and/or plates, acetonitrile, and 0.1% formic acid in water. In some embodiments, the mass spectrometry is selected from the group consisting of LC-MS, LC-MS/MS, LC-SRM-MS, LC-MRM-MS and LC-PRM-MS. In some embodiments, the sample is from a mouse subject, and the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}$N, $^{13}$C, $^{18}$O, and $^{2}$H. In some embodiments, the kit further comprises instructions for using the kit to determine a status of a mitochondrial function or mitochondrial physiology in the subject. In some embodiments, the mitochondrial function or mitochondrial physiology is selected from the group consisting of tricarboxylic acid cycle (TCA cycle), oxidative phosphorylation (OxPhos), MitoGeneral, MitoDynamics, and combinations thereof. In some embodiments, the instructions for using the kit to determine the mitochondrial protein biomarker signature for the subject by mass spectrometry comprise a process for analyzing raw data and performing quantitative analysis. In some embodiments, the kit further comprises Table 2 and/or Table 3.

In some embodiments, the present invention provides a kit for determining a mitochondrial protein biomarker signature for a mouse subject by mass spectrometry, comprising: (a) reagents and instructions for tryptic digestion of at least one mouse mitochondrial protein in a sample from the mouse subject, wherein the mouse mitochondrial protein is selected from the group consisting of TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof, and wherein the tryptic digestion of the mouse mitochondrial protein provides at least one target peptide, wherein the target peptide is selected from the group consisting of SEQ ID NOs: 78-151, and combinations thereof; (b) an internal standard, wherein the internal standard comprises at least one reference peptide, wherein the reference peptide is selected from the group consisting of SEQ ID NOs: 78-151, and combinations thereof; and each reference peptide is labeled with a stable isotope, wherein each reference peptide is present in the internal standard in a known quantity, and wherein each reference peptide has a known mass-to-charge ratio (m/z) and retention time (rt); (c) reagents and instructions for preparing and processing the sample; and (d) reagents and instructions for using the kit to determine the mitochondrial protein biomarker signature for the subject by mass spectrometry. In some embodiments, the reagents for tryptic digestion of the mouse mitochondrial protein comprise a reducing agent (e.g., dithiothreitol (DTT)), alkylating agent (e.g., iodoacetamide (IAA)), protease (e.g., trypsin), buffer (e.g., ammonium bicarbonate buffer), and acid (e.g. trichloroacetic acid). In some embodiments, the reagents for preparing and processing the sample comprise C18 clean up tips and/or plates, acetonitrile, and 0.1% formic acid in water. In some embodiments, the mass spectrometry is selected from the group consisting of LC-MS, LC-MS/MS, LC-SRM-MS, LC-MRM-MS and LC-PRM-MS. In some embodiments, the sample is from a mouse subject, and the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}$N, $^{13}$C, $^{18}$O, and $^{2}$H. In some embodiments, the kit further comprises instructions for using the kit to determine a status of a mitochondrial function or mitochondrial physiology in the subject. In some embodiments, the mitochondrial function or mitochondrial physiology is selected from the group consisting of tricarboxylic acid cycle (TCA cycle), oxidative phosphorylation (OxPhos), MitoGeneral, MitoDynamics, and combinations thereof. In some embodiments, the instructions for using the kit to determine the mitochondrial protein biomarker signature for the subject by mass spectrometry comprise a process for analyzing raw data and performing quantitative analysis. In some embodiments, the kit further comprises Table 2 and/or Table 3.

In some embodiments, the present invention provides a kit for determining a mitochondrial protein biomarker signature for a mouse subject by mass spectrometry, comprising: (a) reagents and instructions for tryptic digestion of at least one mouse mitochondrial protein in a sample from the mouse subject, wherein the mouse mitochondrial protein is selected from the group consisting of TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof, and wherein the tryptic digestion of the mouse mitochondrial protein provides at least one target peptide, wherein the target peptide is selected from the group consisting of SEQ ID NOs: 78-151, and combinations thereof, (b) an internal standard, wherein the internal standard comprises reference peptides, and each reference peptide is labeled with a stable isotope, wherein each reference peptide is present in the internal standard in a known quantity, and wherein each reference peptide has a known mass-to-charge ratio (m/z) and retention time (rt); (c) reagents and instructions for preparing and processing the sample; and (d) reagents and instructions for using the kit to determine the mitochondrial protein biomarker signature for the subject by mass spectrometry. In some embodiments, the reagents for tryptic digestion of the mouse mitochondrial protein comprise a reducing agent (e.g., dithiothreitol (DTT)), alkylating agent (e.g., iodoacetamide (IAA)), protease (e.g., trypsin), buffer (e.g., ammonium bicarbonate buffer), and acid (e.g. trichloroacetic acid). In some embodiments, the reagents for preparing and processing the sample comprise C18 clean up tips and/or plates, acetonitrile, and 0.1% formic acid in water. In some embodiments, the mass spectrometry is selected from the group consisting of LC-MS, LC-MS/MS, LC-SRM-MS, LC-MRM-MS and LC-PRM-MS. In some embodiments, the sample is from a mouse subject, and the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the kit further comprises instructions for using the kit to determine a status of a mitochondrial function or mitochondrial physiology in the subject. In some embodiments, the mitochondrial function or mitochondrial physiology is selected from the group consisting of tricarboxylic acid cycle (TCA cycle), oxidative phosphorylation (OxPhos), MitoGeneral, MitoDynamics, and combinations thereof. In some embodiments, the instructions for using the kit to determine the mitochondrial protein biomarker signature for the subject by mass spectrometry comprise a process for analyzing raw data and performing quantitative analysis. In some embodiments, the reference peptides are 12 reference peptides having SEQ ID NOs: 99, 100, 103, 104, 107, 108, 109, 118, 121, 122, 123, 124. In some embodiments, the reference peptides are 12 reference peptides having SEQ ID NOs: 78, 79, 91, 92, 119, 120, 140, 141, 144, 145, 148, 149. In some embodiments, the reference peptides are 30 reference peptides having SEQ ID NOs: 80, 81, 82, 83, 84, 85, 86, 87, 88, 95, 96, 112, 113, 127, 128, 129, 134, 135, 142, 143, 146, 147, 150, 151, 125, 126, 132, 133, 136, 137. In some embodiments, the reference peptides are 26 reference peptides having SEQ ID NOs: 89, 90, 93, 94, 97, 98, 101, 102, 105, 106, 110, 111, 114, 115, 116, 117, 130, 131, 138, 139, 125, 126, 132, 133, 136, 137. In some embodiments, the kit further comprises Table 2 and/or Table 3.

Assays

Mass Spectrometry Multiplex Assay for Identifying and Quantifying Human Mitochondrial Proteins In various embodiments, the present invention provides a mass spectrometry multiplex assay for identifying and quantifying at least one human mitochondrial protein in a sample, comprising: i) obtaining the sample, wherein the sample has been treated or contacted with a protease that digests the human mitochondrial protein into at least one target peptide, wherein the target peptide is selected from the group consisting of SEQ ID NOs: 1-77, and combinations thereof; wherein the protease is trypsin, and wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; ii) adding an internal standard to the sample, wherein the internal standard comprises 77 reference peptides having SEQ ID NOs: 1-77, and each reference peptide is labeled with a stable isotope, wherein each reference peptide is present in the internal standard in a known quantity, and wherein each reference peptide has a known mass-to-charge ratio (m/z) and retention time (rt); iii) analyzing the sample from step ii) by mass spectrometry; iv) identifying the target peptide by comparing the target peptide mass-to-charge ratio (m/z) and retention time (rt) to the known reference peptide mass-to-charge ratio (m/z) and retention time (rt); v) identifying the human mitochondrial protein in the sample by correlating the target peptide to the human mitochondrial protein according to Table 1; vi) calculating a peak area and an area ratio for the target peptide and for each reference peptide; vii) determining a molar ratio for the target peptide from the known quantity of the reference peptide; viii) calculating a concentration of the target peptide from the molar ratio; and ix) quantifying the human mitochondrial protein in the sample from the concentration of the target peptide. In some embodiments, the mass spectrometry is selected from the group consisting of LC-MS, LC-MS/MS, LC-SRM-MS, LC-MRM-MS and LC-PRM-MS. In some embodiments, the sample is from a human subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^2H$. In some embodiments, the mass spectrometry multiplex assay further comprises correlating the human mitochondrial protein according to Table 1 to a mitochondrial function according to Table 4.

In various embodiments, the present invention provides a mass spectrometry multiplex assay for identifying and quantifying at least one human mitochondrial protein in a sample, comprising: i) obtaining the sample, wherein the sample has been treated or contacted with a protease that digests the human mitochondrial protein into at least one target peptide, wherein the target peptide is selected from the group consisting of SEQ ID NOs: 1-77, and combinations thereof; wherein the protease is trypsin, and wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof, ii) adding an internal standard to the sample, wherein the internal standard comprises at least one reference peptide, wherein the reference peptide is selected from the group consisting of SEQ ID NOs: 1-77, and combinations thereof, and each reference peptide is labeled with a stable isotope, wherein each reference peptide is present in the internal standard in a known quantity, and wherein each reference peptide has a known mass-to-charge ratio (m/z) and retention time (rt); iii) analyzing the sample from step ii) by mass spectrometry; iv) identifying the target peptide by comparing the target peptide mass-to-charge ratio (m/z) and retention time (rt) to the known reference peptide mass-to-charge ratio (m/z) and retention time (rt); v) identifying the human mitochondrial protein in the sample by correlating the target peptide to the human mitochondrial protein according to Table 1; vi) calculating a peak area and an area ratio for the target peptide and for each reference peptide; vii) determining a molar ratio for the target peptide from the known quantity of the reference peptide; viii) calculating a concentration of the target peptide from the molar ratio; and ix) quantifying the human mitochondrial protein in the sample from the concentration of the target peptide. In some embodiments, the mass spectrometry is selected from the group consisting of LC-MS, LC-MS/MS, LC-SRM-MS, LC-MRM-MS and LC-PRM-MS. In some embodiments, the sample is from a human subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the mass spectrometry multiplex assay further comprises correlating the human mitochondrial protein according to Table 1 to a mitochondrial function according to Table 4.

In various embodiments, the present invention provides a mass spectrometry multiplex assay for identifying and quantifying at least one human mitochondrial protein in a sample, comprising: i) obtaining the sample, wherein the sample has been treated or contacted with a protease that digests the human mitochondrial protein into at least one target peptide, wherein the target peptide is selected from the group consisting of SEQ ID NOs: 1-77, and combinations thereof; wherein the protease is trypsin, and wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof, ii) adding an internal standard to the sample, wherein the internal standard comprises reference peptides, and each reference peptide is labeled with a stable isotope, wherein each reference peptide is present in the internal standard in a known quantity, and wherein each reference peptide has a known mass-to-charge ratio (m/z) and retention time (rt); iii) analyzing the sample from step ii) by mass spectrometry; iv) identifying the target peptide by comparing the target peptide mass-to-charge ratio (m/z) and retention time (rt) to the known reference peptide mass-to-charge ratio (m/z) and retention time (rt); v) identifying the human mitochondrial protein in the sample by correlating the target peptide to the human mitochondrial protein according to Table 1; vi) calculating a peak area and an area ratio for the target peptide and for each reference peptide; vii) determining a molar ratio for the target peptide from the known quantity of the reference peptide; viii) calculating a concentration of the target peptide from the molar ratio; and ix) quantifying the human mitochondrial protein in the sample from the concentration of the target peptide. In some embodiments, the mass spectrometry is selected from the group consisting of LC-MS, LC-MS/MS, LC-SRM-MS, LC-MRM-MS and LC-PRM-MS. In some embodiments, the sample is from a human subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the reference peptides are 12 reference peptides having SEQ ID NOs: 1, 2, 6, 7, 8, 17, 18, 19, 63, 64, 70, 71. In some embodiments, the reference peptides are 15 reference peptides having SEQ ID NOs: 3, 4, 5, 15, 16, 30, 31, 38, 39, 42, 43, 51, 52, 68, 69. In some embodiments, the reference peptides are 31 reference peptides having SEQ ID NOs: 9, 10, 13, 14, 20, 21, 22, 23, 24, 25, 26, 27, 28, 29, 40, 41, 48, 49, 50, 53, 54, 57, 58, 76, 77, 46, 47, 55, 56, 72, 73. In some embodiments, the reference peptides are 25 reference peptides having SEQ ID NOs: 11, 12, 32, 33, 34, 35, 36, 37, 44, 45, 59, 60, 61, 62, 65, 66, 67, 74, 75, 46, 47, 55, 56, 72, 73. In some embodiments, the mass spectrometry multiplex assay further comprises correlating the human mitochondrial protein according to Table 1 to a mitochondrial function according to Table 4.

In various embodiments, the present invention provides a mass spectrometry multiplex assay for identifying and quantifying at least one human mitochondrial protein in a sample, comprising: i) obtaining the sample, wherein the sample comprises the at least one human mitochondrial protein, wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; ii) treating or contacting the sample with a protease that digests the human mitochondrial protein into at least one target peptide, wherein the target peptide is selected from the group consisting of SEQ ID NOs: 1-77, and combinations thereof; wherein the protease is trypsin; iii) adding an internal standard to the sample, wherein the internal standard comprises 77 reference peptides having SEQ ID NOs: 1-77, and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); vi) identifying the human mitochondrial protein in the sample by correlating the target peptide to the human mitochondrial protein according to Table 1; vii) calculating a peak area and an area ratio for the target peptide and for each reference peptide; viii) determining a molar ratio for the target peptide from the known quantity of the reference peptide; ix) calculating a concentration of the target peptide from the molar ratio; and x) quantifying the human mitochondrial protein in the sample from the concentration of the target peptide. In some embodiments, the mass spectrometry is selected from the group consisting of LC-MS, LC-MS/MS, LC-SRM-MS, LC-MRM-MS and LC-PRM-MS. In some embodiments, the sample is from a human subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the mass spectrometry multiplex assay further comprises correlating the human mitochondrial protein according to Table 1 to a mitochondrial function according to Table 4.

In various embodiments, the present invention provides a mass spectrometry multiplex assay for identifying and quantifying at least one human mitochondrial protein in a sample, comprising: i) obtaining the sample, wherein the sample comprises the at least one human mitochondrial protein, wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; ii) treating or contacting the sample with a protease that digests the human mitochondrial protein into at least one target peptide, wherein the target peptide is selected from the group consisting of SEQ ID NOs: 1-77, and combinations thereof; wherein the protease is trypsin; iii) adding an internal standard to the sample, wherein the internal standard comprises at least one reference peptide, wherein the reference peptide is selected from the group consisting of SEQ ID NOs: 1-77, and combinations thereof; and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); vi) identifying the human mitochondrial protein in the sample by correlating the target peptide to the human mitochondrial protein according to Table 1; vii) calculating a peak area and an area ratio for the target peptide and for each reference peptide; viii) determining a molar ratio for the target peptide from the known quantity of the reference peptide; ix) calculating a concentration of the target peptide from the molar ratio; and x) quantifying the human mitochondrial protein in the sample from the concentration of the target peptide. In some embodiments, the mass spectrometry is selected from the group consisting of LC-MS, LC-MS/MS, LC-SRM-MS, LC-MRM-MS and LC-PRM-MS. In some embodiments, the sample is from a human subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}$N, $^{13}$C, $^{18}$O, and $^{2}$H. In some embodiments, the mass spectrometry multiplex assay further comprises correlating the human mitochondrial protein according to Table 1 to a mitochondrial function according to Table 4.

In various embodiments, the present invention provides a mass spectrometry multiplex assay for identifying and quantifying at least one human mitochondrial protein in a sample, comprising: i) obtaining the sample, wherein the sample comprises the at least one human mitochondrial protein, wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; ii) treating or contacting the sample with a protease that digests the human mitochondrial protein into at least one target peptide, wherein the target peptide is selected from the group consisting of SEQ ID NOs: 1-77, and combinations thereof; wherein the protease is trypsin; iii) adding an internal standard to the sample, wherein the internal standard comprises reference peptides, and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); vi) identifying the human mitochondrial protein in the sample by correlating the target peptide to the human mitochondrial protein according to Table 1; vii) calculating a peak area and an area ratio for the target peptide and for each reference peptide; viii) determining a molar ratio for the target peptide from the known quantity of the reference peptide; ix) calculating a concentration of the target peptide from the molar ratio; and x) quantifying the human mitochondrial protein in the sample from the concentration of the target peptide. In some embodiments, the mass spectrometry is selected from the group consisting of LC-MS, LC-MS/MS, LC-SRM-MS, LC-MRM-MS and LC-PRM-MS. In some embodiments, the sample is from a human subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}$N, $^{13}$C, $^{18}$O, and $^{2}$H. In some embodiments, the reference peptides are 12 reference peptides having SEQ ID NOs: 1, 2, 6, 7, 8, 17, 18, 19, 63, 64, 70, 71. In some embodiments, the reference peptides are 15 reference peptides having SEQ ID NOs: 3, 4, 5, 15, 16, 30, 31, 38, 39, 42, 43, 51, 52, 68, 69. In some embodiments, the reference peptides are 31 reference peptides having SEQ ID NOs: 9, 10, 13, 14, 20, 21, 22, 23, 24, 25, 26, 27, 28, 29, 40, 41, 48, 49, 50, 53, 54, 57, 58, 76, 77, 46, 47, 55, 56, 72, 73. In some embodiments, the reference peptides are 25 reference peptides having SEQ ID NOs: 11, 12, 32, 33, 34, 35, 36, 37, 44, 45, 59, 60, 61, 62, 65, 66, 67, 74, 75, 46, 47, 55, 56, 72, 73. In some embodiments, the mass spectrometry multiplex assay further comprises correlating the human mitochondrial protein according to Table 1 to a mitochondrial function according to Table 4.

Mass Spectrometry Multiplex Assay for Identifying Human Mitochondrial Proteins

In various embodiments, the present invention provides a mass spectrometry multiplex assay for identifying at least one human mitochondrial protein in a sample, comprising: i) obtaining the sample, wherein the sample has been treated or contacted with a protease that digests the human mitochondrial protein into at least one target peptide, wherein the target peptide is selected from the group consisting of SEQ ID NOs: 1-77, and combinations thereof; wherein the protease is trypsin, and wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof, ii) adding an internal standard to the sample, wherein the internal standard comprises 77 reference peptides having SEQ ID NOs: 1-77, and each reference peptide is labeled with a stable isotope, wherein each reference peptide is present in the internal standard in a known quantity, and wherein each reference peptide has a known mass-to-charge ratio (m/z) and retention time (rt); iii) analyzing the sample from step ii) by mass spectrometry; iv) identifying the target peptide by comparing the target peptide mass-to-charge ratio (m/z) and retention time (rt) to the known reference peptide mass-to-charge ratio (m/z) and retention time (rt); and v) identifying the human mitochondrial protein in the sample by correlating the target peptide to the human mitochondrial protein according to Table 1. In some embodiments, the mass spectrometry is selected from the group consisting of LC-MS, LC-MS/MS, LC-SRM-MS, LC-MRM-MS and LC-PRM-MS. In some embodiments, the sample is from a human subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}$N, $^{13}$C, $^{18}$O, and $^2$H. In some embodiments, the mass spectrometry multiplex assay further comprises correlating the human mitochondrial protein according to Table 1 to a mitochondrial function according to Table 4.

In various embodiments, the present invention provides a mass spectrometry multiplex assay for identifying at least one human mitochondrial protein in a sample, comprising: i) obtaining the sample, wherein the sample has been treated or contacted with a protease that digests the human mitochondrial protein into at least one target peptide, wherein the target peptide is selected from the group consisting of SEQ ID NOs: 1-77, and combinations thereof; wherein the protease is trypsin, and wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; ii) adding an internal standard to the sample, wherein the internal standard comprises at least one reference peptide, wherein the reference peptide is selected from the group consisting of SEQ ID NOs: 1-77, and combinations thereof; and each reference peptide is labeled with a stable isotope, wherein each reference peptide is present in the internal standard in a known quantity, and wherein each reference peptide has a known mass-to-charge ratio (m/z) and retention time (rt); iii) analyzing the sample from step ii) by mass spectrometry; iv) identifying the target peptide by comparing the target peptide mass-to-charge ratio (m/z) and retention time (rt) to the known reference peptide mass-to-charge ratio (m/z) and retention time (rt); and v) identifying the human mitochondrial protein in the sample by correlating the target peptide to the human mitochondrial protein according to Table 1. In some embodiments, the mass spectrometry is selected from the group consisting of LC-MS, LC-MS/MS, LC-SRM-MS, LC-MRM-MS and LC-PRM-MS. In some embodiments, the sample is from a human subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}$N, $^{13}$C, $^{18}$O, and $^2$H. In some embodiments, the mass spectrometry multiplex assay further comprises correlating the human mitochondrial protein according to Table 1 to a mitochondrial function according to Table 4.

In various embodiments, the present invention provides a mass spectrometry multiplex assay for identifying at least one human mitochondrial protein in a sample, comprising: i) obtaining the sample, wherein the sample has been treated or contacted with a protease that digests the human mitochondrial protein into at least one target peptide, wherein the target peptide is selected from the group consisting of SEQ ID NOs: 1-77, and combinations thereof; wherein the protease is trypsin, and wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; ii) adding an internal standard to the sample, wherein the internal standard comprises reference peptides, and each reference peptide is labeled with a stable isotope, wherein each reference peptide is present in the internal standard in a known quantity, and wherein each reference peptide has a known mass-to-charge ratio (m/z) and retention time (rt); iii) analyzing the sample from step ii) by mass spectrometry; iv) identifying the target peptide by comparing the target peptide mass-to-charge ratio (m/z) and retention time (rt) to the known reference peptide mass-to-charge ratio (m/z) and retention time (rt); and v) identifying the human mitochondrial protein in the sample by correlating the target peptide to the human mitochondrial protein according to Table 1. In some embodiments, the mass spectrometry is selected from the group consisting of LC-MS, LC-MS/MS, LC-SRM-MS, LC-MRM-MS and LC-PRM-MS. In some embodiments, the sample is from a human subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the reference peptides are 12 reference peptides having SEQ ID NOs: 1, 2, 6, 7, 8, 17, 18, 19, 63, 64, 70, 71. In some embodiments, the reference peptides are 15 reference peptides having SEQ ID NOs: 3, 4, 5, 15, 16, 30, 31, 38, 39, 42, 43, 51, 52, 68, 69. In some embodiments, the reference peptides are 31 reference peptides having SEQ ID NOs: 9, 10, 13, 14, 20, 21, 22, 23, 24, 25, 26, 27, 28, 29, 40, 41, 48, 49, 50, 53, 54, 57, 58, 76, 77, 46, 47, 55, 56, 72, 73. In some embodiments, the reference peptides are 25 reference peptides having SEQ ID NOs: 11, 12, 32, 33, 34, 35, 36, 37, 44, 45, 59, 60, 61, 62, 65, 66, 67, 74, 75, 46, 47, 55, 56, 72, 73. In some embodiments, the mass spectrometry multiplex assay further comprises correlating the human mitochondrial protein according to Table 1 to a mitochondrial function according to Table 4.

In various embodiments, the present invention provides a mass spectrometry multiplex assay for identifying at least one human mitochondrial protein in a sample, comprising: i) obtaining the sample, wherein the sample comprises the at least one human mitochondrial protein, wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; ii) treating or contacting the sample with a protease that digests the human mitochondrial protein into target peptides, wherein the target peptides are SEQ ID NOs: 1-77, wherein the protease is trypsin; iii) adding an internal standard to the sample, wherein the internal standard comprises 77 reference peptides having SEQ ID NOs: 1-77, and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); and vi) identifying the human mitochondrial protein in the sample by correlating the target peptide to the human mitochondrial protein according to Table 1. In some embodiments, the mass spectrometry is selected from the group consisting of LC-MS, LC-MS/MS, LC-SRM-MS, LC-MRM-MS and LC-PRM-MS. In some embodiments, the sample is from a human subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the mass spectrometry multiplex assay further comprises correlating the human mitochondrial protein according to Table 1 to a mitochondrial function according to Table 4.

In various embodiments, the present invention provides a mass spectrometry multiplex assay for identifying at least one human mitochondrial protein in a sample, comprising: i) obtaining the sample, wherein the sample comprises the at least one human mitochondrial protein, wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; ii) treating or contacting the sample with a protease that digests the human mitochondrial protein into target peptides, wherein the target peptides are SEQ ID NOs: 1-77, wherein the protease is trypsin; iii) adding an internal standard to the sample, wherein the internal standard comprises at least one reference peptide, wherein the reference peptide is selected from the group consisting of SEQ ID NOs: 1-77, and combinations thereof; and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); and vi) identifying the human mitochondrial protein in the sample by correlating the target peptide to the human mitochondrial protein according to Table 1. In some embodiments, the mass spectrometry is selected from the group consisting of LC-MS, LC-MS/MS, LC-SRM-MS, LC-MRM-MS and LC-PRM-MS. In some embodiments, the sample is from a human subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the mass spectrometry multiplex assay further comprises correlating the human mitochondrial protein according to Table 1 to a mitochondrial function according to Table 4.

In various embodiments, the present invention provides a mass spectrometry multiplex assay for identifying at least one human mitochondrial protein in a sample, comprising: i) obtaining the sample, wherein the sample comprises the at least one human mitochondrial protein, wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; ii) treating or contacting the sample with a protease that digests the human mitochondrial protein into target peptides, wherein the target peptides are SEQ ID NOs: 1-77, wherein the protease is trypsin; iii) adding an internal standard to the sample, wherein the internal standard comprises reference peptides, and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); and vi) identifying the human mitochondrial protein in the sample by correlating the target peptide to the human mitochondrial protein according to Table 1. In some embodiments, the mass spectrometry is selected from the group consisting of LC-MS, LC-MS/MS, LC-SRM-MS, LC-MRM-MS and LC-PRM-MS. In some embodiments, the sample is from a human subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}$N, $^{13}$C, $^{18}$O, and $^{2}$H. In some embodiments, the reference peptides are 12 reference peptides having SEQ ID NOs: 1, 2, 6, 7, 8, 17, 18, 19, 63, 64, 70, 71. In some embodiments, the reference peptides are 15 reference peptides having SEQ ID NOs: 3, 4, 5, 15, 16, 30, 31, 38, 39, 42, 43, 51, 52, 68, 69. In some embodiments, the reference peptides are 31 reference peptides having SEQ ID NOs: 9, 10, 13, 14, 20, 21, 22, 23, 24, 25, 26, 27, 28, 29, 40, 41, 48, 49, 50, 53, 54, 57, 58, 76, 77, 46, 47, 55, 56, 72, 73. In some embodiments, the reference peptides are 25 reference peptides having SEQ ID NOs: 11, 12, 32, 33, 34, 35, 36, 37, 44, 45, 59, 60, 61, 62, 65, 66, 67, 74, 75, 46, 47, 55, 56, 72, 73. In some embodiments, the mass spectrometry multiplex assay further comprises correlating the human mitochondrial protein according to Table 1 to a mitochondrial function according to Table 4.

Mass Spectrometry Multiplex Assay for Determining a Human Mitochondrial Protein Biomarker Signature In various embodiments, the present invention provides a mass spectrometry multiplex assay for determining a mitochondrial protein biomarker signature for a human subject, the method comprising: i) obtaining a sample from the human subject, wherein the sample comprises at least one human mitochondrial protein, wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; ii) contacting the sample with a protease that digests the mitochondrial protein into at least one target peptide, wherein the target peptide is selected from the group consisting of SEQ ID NOs: 1-77, and combinations thereof; wherein the protease is trypsin; iii) adding an internal standard to the sample, wherein the internal standard comprises 77 reference peptides having SEQ ID NO: 1-77, and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); and vi) determining the human mitochondrial protein biomarker signature for the human subject by correlating the target peptide to the human mitochondrial protein according to Table 1. In some embodiments, the method further comprises comparing the mitochondrial protein biomarker signature from the human subject to a mitochondrial protein biomarker signature from a reference sample, wherein a change in the mitochondrial protein biomarker signature from the human subject compared to the mitochondrial protein biomarker signature from the reference sample is indicative of a change in mitochondrial function in the human subject, or altered mitochondrial function or altered mitochondrial physiology in the human subject, or abnormal mitochondrial function or abnormal mitochondrial physiology in the human subject. In some embodiments, the mitochondrial function or mitochondrial physiology is selected from the group consisting of tricarboxylic acid cycle (TCA cycle), oxidative phosphorylation (OxPhos), MitoGeneral, MitoDynamics, and combinations thereof. In some embodiments, the change in mitochondrial function in the human subject is indicative of altered mitochondrial function or abnormal mitochondrial function in the human subject. In some embodiments, the altered mitochondrial function is selected from the group consisting of altered tricarboxylic acid cycle (TCA cycle), altered oxidative phosphorylation (OxPhos), altered MitoGeneral, altered MitoDynamics, and combinations thereof. In some embodiments, the abnormal mitochondrial function is selected from the group consisting of abnormal tricarboxylic acid cycle (TCA cycle), abnormal oxidative phosphorylation (OxPhos), abnormal MitoGeneral, abnormal MitoDynamics, and combinations thereof. In some embodiments, the mass spectrometry is selected from the group consisting of LC-MS, LC-MS/MS, LC-SRM-MS, LC-MRM-MS and LC-PRM-MS. In some embodiments, the subject is a human subject, and the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}$N, $^{13}$C, $^{18}$O, and $^{2}$H. In some embodiments, the mass spectrometry multiplex assay further comprises correlating the human mitochondrial protein according to Table 1 to a mitochondrial function according to Table 4.

In various embodiments, the present invention provides a mass spectrometry multiplex assay for determining a mitochondrial protein biomarker signature for a human subject, the method comprising: i) obtaining a sample from the human subject, wherein the sample comprises at least one human mitochondrial protein, wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; ii) contacting the sample with a protease that digests the mitochondrial protein into at least one target peptide, wherein the target peptide is selected from the group consisting of SEQ ID NOs: 1-77, and combinations thereof, wherein the protease is trypsin; iii) adding an internal standard to the sample, wherein the internal standard comprises at least one reference peptide, wherein the reference peptide is selected from the group consisting of SEQ ID NO: 1-77, and combinations thereof; and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); and vi) determining the human mitochondrial protein biomarker signature for the human subject by correlating the target peptide to the human mitochondrial protein according to Table 1. In some embodiments, the method further comprises comparing the mitochondrial protein biomarker signature from the human subject to a mitochondrial protein biomarker signature from a reference sample, wherein a change in the mitochondrial protein biomarker signature from the human subject compared to the mitochondrial protein biomarker signature from the reference sample is indicative of a change in mitochondrial function in the human subject, or altered mitochondrial function or altered mitochondrial physiology in the human subject, or abnormal mitochondrial function or abnormal mitochondrial physiology in the human subject. In some embodiments, the mitochondrial function or mitochondrial physiology is selected from the group consisting of tricarboxylic acid cycle (TCA cycle), oxidative phosphorylation (OxPhos), MitoGeneral, MitoDynamics, and combinations thereof. In some embodiments, the change in mitochondrial function in the human subject is indicative of altered mitochondrial function or abnormal mitochondrial function in the human subject. In some embodiments, the altered mitochondrial function is selected from the group consisting of altered tricarboxylic acid cycle (TCA cycle), altered oxidative phosphorylation (OxPhos), altered MitoGeneral, altered MitoDynamics, and combinations thereof. In some embodiments, the abnormal mitochondrial function is selected from the group consisting of abnormal tricarboxylic acid cycle (TCA cycle), abnormal oxidative phosphorylation (OxPhos), abnormal MitoGeneral, abnormal MitoDynamics, and combinations thereof. In some embodiments, the mass spectrometry is selected from the group consisting of LC-MS, LC-MS/MS, LC-SRM-MS, LC-MRM-MS and LC-PRM-MS. In some embodiments, the subject is a human subject, and the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}$N, $^{13}$C, $^{18}$O, and $^{2}$H. In some embodiments, the mass spectrometry multiplex assay further comprises correlating the human mitochondrial protein according to Table 1 to a mitochondrial function according to Table 4.

In various embodiments, the present invention provides a mass spectrometry multiplex assay for determining a mitochondrial protein biomarker signature for a human subject, the method comprising: i) obtaining a sample from the human subject, wherein the sample comprises at least one human mitochondrial protein, wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; ii) contacting the sample with a protease that digests the mitochondrial protein into at least one target peptide, wherein the target peptide is selected from the group consisting of SEQ ID NOs: 1-77, and combinations thereof; wherein the protease is trypsin; iii) adding an internal standard to the sample, wherein the internal standard comprises reference peptides, and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); and vi) determining the human mitochondrial protein biomarker signature for the human subject by correlating the target peptide to the human mitochondrial protein according to Table 1. In some embodiments, the method further comprises comparing the mitochondrial protein biomarker signature from the human subject to a mitochondrial protein biomarker signature from a reference sample, wherein a change in the mitochondrial protein biomarker signature from the human subject compared to the mitochondrial protein biomarker signature from the reference sample is indicative of a change in mitochondrial function in the human subject, or altered mitochondrial function or altered mitochondrial physiology in the human subject, or abnormal mitochondrial function or abnormal mitochondrial physiology in the human subject. In some embodiments, the mitochondrial function or mitochondrial physiology is selected from the group consisting of tricarboxylic acid cycle (TCA cycle), oxidative phosphorylation (OxPhos), MitoGeneral, MitoDynamics, and combinations thereof. In some embodiments, the change in mitochondrial function in the human subject is indicative of altered mitochondrial function or abnormal mitochondrial function in the human subject. In some embodiments, the altered mitochondrial function is selected from the group consisting of altered tricarboxylic acid cycle (TCA cycle), altered oxidative phosphorylation (OxPhos), altered MitoGeneral, altered MitoDynamics, and combinations thereof. In some embodiments, the abnormal mitochondrial function is selected from the group consisting of abnormal tricarboxylic acid cycle (TCA cycle), abnormal oxidative phosphorylation (OxPhos), abnormal MitoGeneral, abnormal MitoDynamics, and combinations thereof. In some embodiments, the mass spectrometry is selected from the group consisting of LC-MS, LC-MS/MS, LC-SRM-MS, LC-MRM-MS and LC-PRM-MS. In some embodiments, the subject is a human subject, and the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the reference peptides are 12 reference peptides having SEQ ID NOs: 1, 2, 6, 7, 8, 17, 18, 19, 63, 64, 70, 71. In some embodiments, the reference peptides are 15 reference peptides having SEQ ID NOs: 3, 4, 5, 15, 16, 30, 31, 38, 39, 42, 43, 51, 52, 68, 69. In some embodiments, the reference peptides are 31 reference peptides having SEQ ID NOs: 9, 10, 13, 14, 20, 21, 22, 23, 24, 25, 26, 27, 28, 29, 40, 41, 48, 49, 50, 53, 54, 57, 58, 76, 77, 46, 47, 55, 56, 72, 73. In some embodiments, the reference peptides are 25 reference peptides having SEQ ID NOs: 11, 12, 32, 33, 34, 35, 36, 37, 44, 45, 59, 60, 61, 62, 65, 66, 67, 74, 75, 46, 47, 55, 56, 72, 73. In some embodiments, the mass spectrometry multiplex assay further comprises correlating the human mitochondrial protein according to Table 1 to a mitochondrial function according to Table 4.

Mass Spectrometry Multiplex Assay for Identifying and Quantifying Mouse Mitochondrial Proteins In various embodiments, the present invention provides a mass spectrometry multiplex assay for identifying and quantifying at least one mouse mitochondrial protein in a sample, comprising: i) obtaining the sample, wherein the sample has been treated or contacted with a protease that digests the mouse mitochondrial protein into at least one target peptide, wherein the target peptide is selected from the group consisting of SEQ ID NOs: 78-151, and combinations thereof; wherein the protease is trypsin, and wherein the mouse mitochondrial protein is selected from the group consisting of TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof; ii) adding an internal standard to the sample, wherein the internal standard comprises 74 reference peptides having SEQ ID NOs: 78-151, and each reference peptide is labeled with a stable isotope, wherein each reference peptide is present in the internal standard in a known quantity, and wherein each reference peptide has a known mass-to-charge ratio (m/z) and retention time (rt); iii) analyzing the sample from step ii) by mass spectrometry; iv) identifying the target peptide by comparing the target peptide mass-to-charge ratio (m/z) and retention time (rt) to the known reference peptide mass-to-charge ratio (m/z) and retention time (rt); v) identifying the mouse mitochondrial protein in the sample by correlating the target peptide to the human mitochondrial protein according to Table 2; vi) calculating a peak area and an area ratio for the target peptide and for each reference peptide; vii) determining a molar ratio for the target peptide from the known quantity of the reference peptide; viii) calculating a concentration of the target peptide from the molar ratio; and ix) quantifying the mouse mitochondrial protein in the sample from the concentration of the target peptide. In some embodiments, the mass spectrometry is selected from the group consisting of LC-MS, LC-MS/MS, LC-SRM-MS, LC-MRM-MS and LC-PRM-MS. In some embodiments, the sample is from a mouse subject, and the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the mass spectrometry multiplex assay further comprises correlating the mouse mitochondrial protein according to Table 2 to a mitochondrial function according to Table 3.

In various embodiments, the present invention provides a mass spectrometry multiplex assay for identifying and quantifying at least one mouse mitochondrial protein in a sample, comprising: i) obtaining the sample, wherein the sample has been treated or contacted with a protease that digests the mouse mitochondrial protein into at least one target peptide, wherein the target peptide is selected from the group consisting of SEQ ID NOs: 78-151, and combinations thereof; wherein the protease is trypsin, and wherein the mouse mitochondrial protein is selected from the group consisting of TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof; ii) adding an internal standard to the sample, wherein the internal standard comprises at least one reference peptide, wherein the reference peptide is selected from the group consisting of SEQ ID NOs: 78-151, and combinations thereof; and each reference peptide is labeled with a stable isotope, wherein each reference peptide is present in the internal standard in a known quantity, and wherein each reference peptide has a known mass-to-charge ratio (m/z) and retention time (rt); iii) analyzing the sample from step ii) by mass spectrometry; iv) identifying the target peptide by comparing the target peptide mass-to-charge ratio (m/z) and retention time (rt) to the known reference peptide mass-to-charge ratio (m/z) and retention time (rt); v) identifying the mouse mitochondrial protein in the sample by correlating the target peptide to the human mitochondrial protein according to Table 2; vi) calculating a peak area and an area ratio for the target peptide and for each reference peptide; vii) determining a molar ratio for the target peptide from the known quantity of the reference peptide; viii) calculating a concentration of the target peptide from the molar ratio; and ix) quantifying the mouse mitochondrial protein in the sample from the concentration of the target peptide. In some embodiments, the mass spectrometry is selected from the group consisting of LC-MS, LC-MS/MS, LC-SRM-MS, LC-MRM-MS and LC-PRM-MS. In some embodiments, the sample is from a mouse subject, and the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the mass spectrometry multiplex assay further comprises correlating the mouse mitochondrial protein according to Table 2 to a mitochondrial function according to Table 3.

In various embodiments, the present invention provides a mass spectrometry multiplex assay for identifying and quantifying at least one mouse mitochondrial protein in a sample, comprising: i) obtaining the sample, wherein the sample has been treated or contacted with a protease that digests the mouse mitochondrial protein into at least one target peptide, wherein the target peptide is selected from the group consisting of SEQ ID NOs: 78-151, and combinations thereof; wherein the protease is trypsin, and wherein the mouse mitochondrial protein is selected from the group consisting of TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof; ii) adding an internal standard to the sample, wherein the internal standard comprises reference peptides, and each reference peptide is labeled with a stable isotope, wherein each reference peptide is present in the internal standard in a known quantity, and wherein each reference peptide has a known mass-to-charge ratio (m/z) and retention time (rt); iii) analyzing the sample from step ii) by mass spectrometry; iv) identifying the target peptide by comparing the target peptide mass-to-charge ratio (m/z) and retention time (rt) to the known reference peptide mass-to-charge ratio (m/z) and retention time (rt); v) identifying the mouse mitochondrial protein in the sample by correlating the target peptide to the human mitochondrial protein according to Table 2; vi) calculating a peak area and an area ratio for the target peptide and for each reference peptide; vii) determining a molar ratio for the target peptide from the known quantity of the reference peptide; viii) calculating a concentration of the target peptide from the molar ratio; and ix) quantifying the mouse mitochondrial protein in the sample from the concentration of the target peptide. In some embodiments, the mass spectrometry is selected from the group consisting of LC-MS, LC-MS/MS, LC-SRM-MS, LC-MRM-MS and LC-PRM-MS. In some embodiments, the sample is from a mouse subject, and the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the reference peptides are 12 reference peptides having SEQ ID NOs: 99, 100, 103, 104, 107, 108, 109, 118, 121, 122, 123, 124. In some embodiments, the reference peptides are 12 reference peptides having SEQ ID NOs: 78, 79, 91, 92, 119, 120, 140, 141, 144, 145, 148, 149. In some embodiments, the reference peptides are 30 reference peptides having SEQ ID NOs: 80, 81, 82, 83, 84, 85, 86, 87, 88, 95, 96, 112, 113, 127, 128, 129, 134, 135, 142, 143, 146, 147, 150, 151, 125, 126, 132, 133, 136, 137. In some embodiments, the reference peptides are 26 reference peptides having SEQ ID NOs: 89, 90, 93, 94, 97, 98, 101, 102, 105, 106, 110, 111, 114, 115, 116, 117, 130, 131, 138, 139, 125, 126, 132, 133, 136, 137. In some embodiments, the mass spectrometry multiplex assay further comprises correlating the mouse mitochondrial protein according to Table 2 to a mitochondrial function according to Table 3.

In various embodiments, the present invention provides a mass spectrometry multiplex assay for identifying and quantifying at least one mouse mitochondrial protein in a sample, comprising: i) obtaining the sample, wherein the sample comprises the at least one mouse mitochondrial protein, wherein the mouse mitochondrial protein is selected from the group consisting of TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No.

Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof; ii) treating or contacting the sample with a protease that digests the mouse mitochondrial protein into target peptides, wherein the target peptides are SEQ ID NOs: 78-151, wherein the protease is trypsin; iii) adding an internal standard to the sample, wherein the internal standard comprises 74 reference peptides having SEQ ID NOs: 78-151, and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); vi) identifying the mouse mitochondrial protein in the sample by correlating the target peptide to the human mitochondrial protein according to Table 2; vii) calculating a peak area and an area ratio for the target peptide and for each reference peptide; viii) determining a molar ratio for the target peptide from the known quantity of the reference peptide; ix) calculating a concentration of the target peptide from the molar ratio; and x) quantifying the mouse mitochondrial protein in the sample from the concentration of the target peptide. In some embodiments, the mass spectrometry is selected from the group consisting of LC-MS, LC-MS/MS, LC-SRM-MS, LC-MRM-MS and LC-PRM-MS. In some embodiments, the sample is from a mouse subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the mass spectrometry multiplex assay further comprises correlating the mouse mitochondrial protein according to Table 2 to a mitochondrial function according to Table 3.

In various embodiments, the present invention provides a mass spectrometry multiplex assay for identifying and quantifying at least one mouse mitochondrial protein in a sample, comprising: i) obtaining the sample, wherein the sample comprises the at least one mouse mitochondrial protein, wherein the mouse mitochondrial protein is selected from the group consisting of TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof; ii) treating or contacting the sample with a protease that digests the mouse mitochondrial protein into target peptides, wherein the target peptides are SEQ ID NOs: 78-151, wherein the protease is trypsin; iii) adding an internal standard to the sample, wherein the internal standard comprises at least one reference peptide, wherein the reference peptide is selected from the group consisting of SEQ ID NOs: 78-151, and combinations thereof; and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); vi) identifying the mouse mitochondrial protein in the sample by correlating the target peptide to the human mitochondrial protein according to Table 2; vii) calculating a peak area and an area ratio for the target peptide and for each reference peptide; viii) determining a molar ratio for the target peptide from the known quantity of the reference peptide; ix) calculating a concentration of the target peptide from the molar ratio; and x) quantifying the mouse mitochondrial protein in the sample from the concentration of the target peptide. In some embodiments, the mass spectrometry is selected from the group consisting of LC-MS, LC-MS/MS, LC-SRM-MS, LC-MRM-MS and LC-PRM-MS. In some embodiments, the sample is from a mouse subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^2H$. In some embodiments, the mass spectrometry multiplex assay further comprises correlating the mouse mitochondrial protein according to Table 2 to a mitochondrial function according to Table 3.

In various embodiments, the present invention provides a mass spectrometry multiplex assay for identifying and quantifying at least one mouse mitochondrial protein in a sample, comprising: i) obtaining the sample, wherein the sample comprises the at least one mouse mitochondrial protein, wherein the mouse mitochondrial protein is selected from the group consisting of TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof; ii) treating or contacting the sample with a protease that digests the mouse mitochondrial protein into target peptides, wherein the target peptides are SEQ ID NOs: 78-151, wherein the protease is trypsin; iii) adding an internal standard to the sample, wherein the internal standard comprises reference peptides, and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); vi) identifying the mouse mitochondrial protein in the sample by correlating the target peptide to the human mitochondrial protein according to Table 2; vii) calculating a peak area and an area ratio for the target peptide and for each reference peptide; viii) determining a molar ratio for the target peptide from the known quantity of the reference peptide; ix) calculating a concentration of the target peptide from the molar ratio; and x) quantifying the mouse mitochondrial protein in the sample from the concentration of the target peptide. In some embodiments, the mass spectrometry is selected from the group consisting of LC-MS, LC-MS/MS, LC-SRM-MS, LC-MRM-MS and LC-PRM-MS. In some embodiments, the sample is from a mouse subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^2H$. In some embodiments, the reference peptides are 12 reference peptides having SEQ ID NOs: 99, 100, 103, 104, 107, 108, 109, 118, 121, 122, 123, 124. In some embodiments, the reference peptides are 12 reference peptides having SEQ ID NOs: 78, 79, 91, 92, 119, 120, 140, 141, 144, 145, 148, 149. In some embodiments, the reference peptides are 30 reference peptides having SEQ ID NOs: 80, 81, 82, 83, 84, 85, 86, 87, 88, 95, 96, 112, 113, 127, 128, 129, 134, 135, 142, 143, 146, 147, 150, 151, 125, 126, 132, 133, 136, 137. In some embodiments, the reference peptides are 26 reference peptides having SEQ ID NOs: 89, 90, 93, 94, 97, 98, 101, 102, 105, 106, 110, 111, 114, 115, 116, 117, 130, 131, 138, 139, 125, 126, 132, 133, 136, 137. In some embodiments, the mass spectrometry multiplex assay further comprises correlating the mouse mitochondrial protein according to Table 2 to a mitochondrial function according to Table 3.

Mass Spectrometry Multiplex Assay for Identifying Mouse Mitochondrial Proteins

In various embodiments, the present invention provides a mass spectrometry multiplex assay for identifying at least one mouse mitochondrial protein in a sample, comprising: i) obtaining the sample, wherein the sample comprises the at least one mouse mitochondrial protein, wherein the mouse mitochondrial protein is selected from the group consisting of TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof; ii) treating or contacting the sample with a protease that digests the mouse mitochondrial protein into target peptides, wherein the target peptides are SEQ ID NOs: 78-151, wherein the protease is trypsin; iii) adding an internal standard to the sample, wherein the internal standard comprises 74 reference peptides having SEQ ID NOs: 78-151, and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step ii) by mass spectrometry; iv) identifying the target peptide by comparing the target peptide mass-to-charge ratio (m/z) and retention time (rt) to the known reference peptide mass-to-charge ratio (m/z) and retention time (rt); and v) identifying the mouse mitochondrial protein in the sample by correlating the target peptide to the mouse mitochondrial protein according to Table 2. In some embodiments, the mass spectrometry is selected from the group consisting of LC-MS, LC-MS/MS, LC-SRM-MS, LC-MRM-MS and LC-PRM-MS. In some embodiments, the sample is from a mouse subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}$N, $^{13}$C, $^{18}$O, and $^{2}$H. In some embodiments, the mass spectrometry multiplex assay further comprises correlating the mouse mitochondrial protein according to Table 2 to a mitochondrial function according to Table 3.

In various embodiments, the present invention provides a mass spectrometry multiplex assay for identifying at least one mouse mitochondrial protein in a sample, comprising: i) obtaining the sample, wherein the sample comprises the at least one mouse mitochondrial protein, wherein the mouse mitochondrial protein is selected from the group consisting of TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof; ii) treating or contacting the sample with a protease that digests the mouse mitochondrial protein into target peptides, wherein the target peptides are SEQ ID NOs: 78-151, wherein the protease is trypsin; iii) adding an internal standard to the sample, wherein the internal standard comprises at least one reference peptide, wherein the reference peptide is selected from the group consisting of SEQ ID NOs: 78-151, and combinations thereof, and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step ii) by mass spectrometry; iv) identifying the target peptide by comparing the target peptide mass-to-charge ratio (m/z) and retention time (rt) to the known reference peptide mass-to-charge ratio (m/z) and retention time (rt); and v) identifying the mouse mitochondrial protein in the sample by correlating the target peptide to the mouse mitochondrial protein according to Table 2. In some embodiments, the mass spectrometry is selected from the group consisting of LC-MS, LC-MS/MS, LC-SRM-MS, LC-MRM-MS and LC-PRM-MS. In some embodiments, the sample is from a mouse subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}$N, $^{13}$C, $^{18}$O, and $^{2}$H. In some embodiments, the mass spectrometry multiplex assay further comprises correlating the mouse mitochondrial protein according to Table 2 to a mitochondrial function according to Table 3.

In various embodiments, the present invention provides a mass spectrometry multiplex assay for identifying at least one mouse mitochondrial protein in a sample, comprising: i)

obtaining the sample, wherein the sample comprises the at least one mouse mitochondrial protein, wherein the mouse mitochondrial protein is selected from the group consisting of TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof; ii) treating or contacting the sample with a protease that digests the mouse mitochondrial protein into target peptides, wherein the target peptides are SEQ ID NOs: 78-151, wherein the protease is trypsin; iii) adding an internal standard to the sample, wherein the internal standard comprises reference peptides, and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step ii) by mass spectrometry; iv) identifying the target peptide by comparing the target peptide mass-to-charge ratio (m/z) and retention time (rt) to the known reference peptide mass-to-charge ratio (m/z) and retention time (rt); and v) identifying the mouse mitochondrial protein in the sample by correlating the target peptide to the mouse mitochondrial protein according to Table 2. In some embodiments, the mass spectrometry is selected from the group consisting of LC-MS, LC-MS/MS, LC-SRM-MS, LC-MRM-MS and LC-PRM-MS. In some embodiments, the sample is from a mouse subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the reference peptides are 12 reference peptides having SEQ ID NOs: 99, 100, 103, 104, 107, 108, 109, 118, 121, 122, 123, 124. In some embodiments, the reference peptides are 12 reference peptides having SEQ ID NOs: 78, 79, 91, 92, 119, 120, 140, 141, 144, 145, 148, 149. In some embodiments, the reference peptides are 30 reference peptides having SEQ ID NOs: 80, 81, 82, 83, 84, 85, 86, 87, 88, 95, 96, 112, 113, 127, 128, 129, 134, 135, 142, 143, 146, 147, 150, 151, 125, 126, 132, 133, 136, 137. In some embodiments, the reference peptides are 26 reference peptides having SEQ ID NOs: 89, 90, 93, 94, 97, 98, 101, 102, 105, 106, 110, 111, 114, 115, 116, 117, 130, 131, 138, 139, 125, 126, 132, 133, 136, 137. In some embodiments, the mass spectrometry multiplex assay further comprises correlating the mouse mitochondrial protein according to Table 2 to a mitochondrial function according to Table 3.

In various embodiments, the present invention provides a mass spectrometry multiplex assay for identifying at least one mouse mitochondrial protein in a sample, comprising: i) obtaining the sample, wherein the sample has been treated or contacted with a protease that digests the mouse mitochondrial protein into at least one target peptide, wherein the target peptide is selected from the group consisting of SEQ ID NOs: 78-151, wherein the protease is trypsin, and wherein the mouse mitochondrial protein is selected from the group consisting of TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof; ii) adding an internal standard to the sample, wherein the internal standard comprises 74 reference peptides having SEQ ID NOs: 78-151, and each reference peptide is labeled with a stable isotope, wherein each reference peptide is present in the internal standard in a known quantity, and wherein each reference peptide has a known mass-to-charge ratio (m/z) and retention time (rt); iii) analyzing the sample from step ii) by mass spectrometry; iv) identifying the target peptide by comparing the target peptide mass-to-charge ratio (m/z) and retention time (rt) to the known reference peptide mass-to-charge ratio (m/z) and retention time (rt); and v)

identifying the mouse mitochondrial protein in the sample by correlating the target peptide to the mouse mitochondrial protein according to Table 2. In some embodiments, the mass spectrometry is selected from the group consisting of LC-MS, LC-MS/MS, LC-SRM-MS, LC-MRM-MS and LC-PRM-MS. In some embodiments, the sample is from a mouse subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the mass spectrometry multiplex assay further comprises correlating the mouse mitochondrial protein according to Table 2 to a mitochondrial function according to Table 3.

In various embodiments, the present invention provides a mass spectrometry multiplex assay for identifying at least one mouse mitochondrial protein in a sample, comprising: i) obtaining the sample, wherein the sample has been treated or contacted with a protease that digests the mouse mitochondrial protein into at least one target peptide, wherein the target peptide is selected from the group consisting of SEQ ID NOs: 78-151, wherein the protease is trypsin, and wherein the mouse mitochondrial protein is selected from the group consisting of TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof; ii) adding an internal standard to the sample, wherein the internal standard comprises at least one reference peptide, wherein the reference peptide is selected from the group consisting of SEQ ID NOs: 78-151, and combinations thereof; and each reference peptide is labeled with a stable isotope, wherein each reference peptide is present in the internal standard in a known quantity, and wherein each reference peptide has a known mass-to-charge ratio (m/z) and retention time (rt); iii) analyzing the sample from step ii) by mass spectrometry; iv) identifying the target peptide by comparing the target peptide mass-to-charge ratio (m/z) and retention time (rt) to the known reference peptide mass-to-charge ratio (m/z) and retention time (rt); and v) identifying the mouse mitochondrial protein in the sample by correlating the target peptide to the mouse mitochondrial protein according to Table 2. In some embodiments, the mass spectrometry is selected from the group consisting of LC-MS, LC-MS/MS, LC-SRM-MS, LC-MRM-MS and LC-PRM-MS. In some embodiments, the sample is from a mouse subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the mass spectrometry multiplex assay further comprises correlating the mouse mitochondrial protein according to Table 2 to a mitochondrial function according to Table 3.

In various embodiments, the present invention provides a mass spectrometry multiplex assay for identifying at least one mouse mitochondrial protein in a sample, comprising: i) obtaining the sample, wherein the sample has been treated or contacted with a protease that digests the mouse mitochondrial protein into at least one target peptide, wherein the target peptide is selected from the group consisting of SEQ ID NOs: 78-151, wherein the protease is trypsin, and wherein the mouse mitochondrial protein is selected from the group consisting of TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No.

Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof, ii) adding an internal standard to the sample, wherein the internal standard comprises reference peptides, and each reference peptide is labeled with a stable isotope, wherein each reference peptide is present in the internal standard in a known quantity, and wherein each reference peptide has a known mass-to-charge ratio (m/z) and retention time (rt); iii) analyzing the sample from step ii) by mass spectrometry; iv) identifying the target peptide by comparing the target peptide mass-to-charge ratio (m/z) and retention time (rt) to the known reference peptide mass-to-charge ratio (m/z) and retention time (rt); and v) identifying the mouse mitochondrial protein in the sample by correlating the target peptide to the mouse mitochondrial protein according to Table 2. In some embodiments, the mass spectrometry is selected from the group consisting of LC-MS, LC-MS/MS, LC-SRM-MS, LC-MRM-MS and LC-PRM-MS. In some embodiments, the sample is from a mouse subject. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the reference peptides are 12 reference peptides having SEQ ID NOs: 99, 100, 103, 104, 107, 108, 109, 118, 121, 122, 123, 124. In some embodiments, the reference peptides are 12 reference peptides having SEQ ID NOs: 78, 79, 91, 92, 119, 120, 140, 141, 144, 145, 148, 149. In some embodiments, the reference peptides are 30 reference peptides having SEQ ID NOs: 80, 81, 82, 83, 84, 85, 86, 87, 88, 95, 96, 112, 113, 127, 128, 129, 134, 135, 142, 143, 146, 147, 150, 151, 125, 126, 132, 133, 136, 137. In some embodiments, the reference peptides are 26 reference peptides having SEQ ID NOs: 89, 90, 93, 94, 97, 98, 101, 102, 105, 106, 110, 111, 114, 115, 116, 117, 130, 131, 138, 139, 125, 126, 132, 133, 136, 137. In some embodiments, the mass spectrometry multiplex assay further comprises correlating the mouse mitochondrial protein according to Table 2 to a mitochondrial function according to Table 3.

Mass Spectrometry Multiplex Assay for Determining a Mouse Mitochondrial Protein Biomarker Signature In various embodiments, the present invention provides a mass spectrometry multiplex assay for determining a mitochondrial protein biomarker signature for a mouse subject, the method comprising: i) obtaining a sample from the mouse subject, wherein the sample comprises at least one mouse mitochondrial protein, wherein the mouse mitochondrial protein is selected from the group consisting of TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof; ii) contacting the sample with a protease that digests the mitochondrial protein into at least one target peptide, wherein the target peptide is selected from the group consisting of SEQ ID NOs: 78-151, and combinations thereof; and wherein the protease is trypsin; iii) adding an internal standard to the sample, wherein the internal standard comprises 74 reference peptides having SEQ ID NO: 78-151, and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); and vi) determining the mouse mitochondrial protein biomarker signature for the mouse subject by correlating the target peptide to the mouse mitochondrial protein according to Table 2. In some embodiments, the mass spectrometry multiplex assay further comprises comparing the mitochondrial protein biomarker signature from the mouse subject to a mitochondrial protein biomarker signature from a reference sample, wherein a change in the mitochondrial protein biomarker signature from the mouse subject compared to the mitochondrial protein biomarker signature from the reference sample is indicative of a change in mitochondrial function in the mouse subject, or altered mitochondrial function or altered mitochondrial physiology in the mouse subject, or abnormal mitochondrial function or abnormal mitochondrial physiology in the mouse subject. In some embodiments, the mitochondrial function or mitochondrial physiology is selected from the group consisting of tricarboxylic acid cycle (TCA cycle), oxidative phosphorylation (OxPhos), MitoGeneral, MitoDynamics, and combinations thereof. In some embodiments, the change in mitochondrial function in the mouse subject is indicative of altered mitochondrial function or abnormal mitochondrial function in the mouse subject. In some embodiments, the altered mitochondrial function is selected from the group consisting of altered tricarboxylic acid cycle (TCA cycle), altered oxidative phosphorylation (OxPhos), altered MitoGeneral, altered MitoDynamics, and combinations thereof. In some embodiments, the abnormal mitochondrial function is selected from the group consisting of abnormal tricarboxylic acid cycle (TCA cycle), abnormal oxidative phosphorylation (OxPhos), abnormal MitoGeneral, abnormal MitoDynamics, and combinations thereof. In some embodiments, the mass spectrometry is selected from the group consisting of LC-MS, LC-MS/MS, LC-SRM-MS, LC-MRM-MS and LC-PRM-MS. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the mass spectrometry multiplex assay further comprises correlating the mouse mitochondrial protein according to Table 2 to a mitochondrial function according to Table 3.

In various embodiments, the present invention provides a mass spectrometry multiplex assay for determining a mitochondrial protein biomarker signature for a mouse subject, the method comprising: i) obtaining a sample from the mouse subject, wherein the sample comprises at least one mouse mitochondrial protein, wherein the mouse mitochondrial protein is selected from the group consisting of TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof; ii) contacting the sample with a protease that digests the mitochondrial protein into at least one target peptide, wherein the target peptide is selected from the group consisting of SEQ ID NOs: 78-151, and combinations thereof; and wherein the protease is trypsin; iii) adding an internal standard to the sample, wherein the internal standard comprises at least one reference peptide, wherein the reference peptide is selected from the group consisting of SEQ ID NO: 78-151, and combinations thereof, and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); and vi) determining the mouse mitochondrial protein biomarker signature for the mouse subject by correlating the target peptide to the mouse mitochondrial protein according to Table 2. In some embodiments, the mass spectrometry multiplex assay further comprises comparing the mitochondrial protein biomarker signature from the mouse subject to a mitochondrial protein biomarker signature from a reference sample, wherein a change in the mitochondrial protein biomarker signature from the mouse subject compared to the mitochondrial protein biomarker signature from the reference sample is indicative of a change in mitochondrial function in the mouse subject, or altered mitochondrial function or altered mitochondrial physiology in the mouse subject, or abnormal mitochondrial function or abnormal mitochondrial physiology in the mouse subject. In some embodiments, the mitochondrial function or mitochondrial physiology is selected from the group consisting of tricarboxylic acid cycle (TCA cycle), oxidative phosphorylation (OxPhos), MitoGeneral, MitoDynamics, and combinations thereof. In some embodiments, the change in mitochondrial function in the mouse subject is indicative of altered mitochondrial function or abnormal mitochondrial function in the mouse subject. In some embodiments, the altered mitochondrial function is selected from the group consisting of altered tricarboxylic acid cycle (TCA cycle), altered oxidative phosphorylation (OxPhos), altered MitoGeneral, altered MitoDynamics, and combinations thereof. In some embodiments, the abnormal mitochondrial function is selected from the group consisting of abnormal tricarboxylic acid cycle (TCA cycle), abnormal oxidative phosphorylation (OxPhos), abnormal MitoGeneral, abnormal MitoDynamics, and combinations thereof. In some embodiments, the mass spectrometry is selected from the group consisting of LC-MS, LC-MS/MS, LC-SRM-MS, LC-MRM-MS and LC-PRM-MS. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^2H$. In some embodiments, the mass spectrometry multiplex assay further comprises correlating the mouse mitochondrial protein according to Table 2 to a mitochondrial function according to Table 3.

In various embodiments, the present invention provides a mass spectrometry multiplex assay for determining a mitochondrial protein biomarker signature for a mouse subject, the method comprising: i) obtaining a sample from the mouse subject, wherein the sample comprises at least one mouse mitochondrial protein, wherein the mouse mitochondrial protein is selected from the group consisting of TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof; ii) contacting the sample with a protease that digests the mitochondrial protein into at least one target peptide, wherein the target peptide is selected from the group consisting of SEQ ID NOs: 78-151, and combinations thereof; and wherein the protease is trypsin; iii) adding an internal standard to the sample, wherein the internal standard comprises reference peptides, and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); and vi) determining the mouse mitochondrial protein biomarker signature for the mouse subject by correlating the target peptide to the mouse mitochondrial protein according to Table 2. In some embodiments, the mass spectrometry multiplex assay further comprises comparing the mitochondrial protein biomarker signature from the mouse subject to a mitochondrial protein biomarker signature from a reference sample, wherein a change in the mitochondrial protein biomarker signature from the mouse subject compared to the mitochondrial protein biomarker signature from the reference sample is indicative of a change in mitochondrial function in the mouse subject, or altered mitochondrial function or altered mitochondrial physiology in the mouse subject, or abnormal mitochondrial function or abnormal mitochondrial physiology in the mouse subject. In some embodiments, the mitochondrial function or mitochondrial physiology is selected from the group consisting of tricarboxylic acid cycle (TCA cycle), oxidative phosphorylation (OxPhos), MitoGeneral, MitoDynamics, and combinations thereof. In some embodiments, the change in mitochondrial function in the mouse subject is indicative of altered mitochondrial function or abnormal mitochondrial function in the mouse subject. In some embodiments, the altered mitochondrial function is selected from the group consisting of altered tricarboxylic acid cycle (TCA cycle), altered oxidative phosphorylation (OxPhos), altered MitoGeneral, altered MitoDynamics, and combinations thereof. In some embodiments, the abnormal mitochondrial function is selected from the group consisting of abnormal tricarboxylic acid cycle (TCA cycle), abnormal oxidative phosphorylation (OxPhos), abnormal MitoGeneral, abnormal MitoDynamics, and combinations thereof. In some embodiments, the mass spectrometry is selected from the group consisting of LC-MS, LC-MS/MS, LC-SRM-MS, LC-MRM-MS and LC-PRM-MS. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^2H$. In some embodiments, the reference peptides are 12 reference peptides having SEQ ID NOs: 99, 100, 103, 104, 107, 108, 109, 118, 121, 122, 123, 124. In some embodiments, the reference peptides are 12 reference peptides having SEQ ID NOs: 78, 79, 91, 92, 119, 120, 140, 141, 144, 145, 148, 149. In some embodiments, the reference peptides are 30 reference peptides having SEQ ID NOs: 80, 81, 82, 83, 84, 85, 86, 87, 88, 95, 96, 112, 113, 127, 128, 129, 134, 135, 142, 143, 146, 147, 150, 151, 125, 126, 132, 133, 136, 137. In some embodiments, the reference peptides are 26 reference peptides having SEQ ID NOs: 89, 90, 93, 94, 97, 98, 101, 102, 105, 106, 110, 111, 114, 115, 116, 117, 130, 131, 138, 139, 125, 126, 132, 133, 136, 137. In some embodiments, the mass spectrometry multiplex assay further comprises correlating the mouse mitochondrial protein according to Table 2 to a mitochondrial function according to Table 3.

Methods for Determining Mitochondrial Function in a Human Subject

In various embodiments, the present invention provides a method of assessing and/or determining mitochondrial function or mitochondrial physiology in a human subject, the method comprising: i) obtaining a sample from the human subject, wherein the sample comprises at least one human mitochondrial protein, wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; ii) contacting the sample with a protease that digests the human mitochondrial protein into at least one target peptide, wherein the target peptide is selected from the group consisting of SEQ ID NOs: 1-77, and combinations thereof; and wherein the protease is trypsin; iii) adding an internal standard to the sample, wherein the internal standard comprises 77 reference peptides having SEQ ID NOs: 1-77 and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); and vi) correlating the target peptide to the human mitochondrial protein according to Table 1; and vii) comparing the presence or amount or level of the human mitochondrial protein in the sample from the human subject to the presence or amount or level of the human mitochondrial protein in a reference sample, so as to assess and/or determine mitochondrial function or mitochondrial physiology in the human subject. In some embodiments, the method further comprises correlating the human mitochondrial protein according to Table 1 to a mitochondrial function according to Table 4.

In various embodiments, the present invention provides a method of assessing and/or determining mitochondrial function or mitochondrial physiology in a human subject, the method comprising: i) obtaining a sample from the human subject, wherein the sample comprises at least one human mitochondrial protein, wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; ii) contacting the sample with a protease that digests the human mitochondrial protein into at least one target peptide, wherein the target peptide is selected from the group consisting of SEQ ID NOs: 1-77, and combinations thereof; and wherein the protease is trypsin; iii) adding an internal standard to the sample, wherein the internal standard comprises at least one reference peptide, wherein the reference peptide is selected from the group consisting of SEQ ID NOs: 1-77, and combinations thereof; and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); and vi) correlating the target peptide to the human mitochondrial protein according to Table 1; and vii) comparing the presence or amount or level of the human mitochondrial protein in the sample from the human subject to the presence or amount or level of the human mitochondrial protein in a reference sample, so as to assess and/or determine mitochondrial function or mitochondrial physiology in the human subject. In some embodiments, the method further comprises correlating the human mitochondrial protein according to Table 1 to a mitochondrial function according to Table 4.

In various embodiments, the present invention provides a method of assessing and/or determining mitochondrial function or mitochondrial physiology in a human subject, the method comprising: i) obtaining a sample from the human subject, wherein the sample comprises at least one human mitochondrial protein, wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; ii) contacting the sample with a protease that digests the human mitochondrial protein into at least one target peptide, wherein the target peptide is selected from the group consisting of SEQ ID NOs: 1-77, and combinations thereof; and wherein the protease is trypsin; iii) adding an internal standard to the sample, wherein the internal standard comprises reference peptides, and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); and vi) correlating the target peptide to the human mitochondrial protein according to Table 1; and vii) comparing the presence or amount or level of the human mitochondrial protein in the sample from the human subject to the presence or amount or level of the human mitochondrial protein in a reference sample, so as to assess and/or determine mitochondrial function or mitochondrial physiology in the human subject. In some embodiments, the reference peptides are 12 reference peptides having SEQ ID NOs: 1, 2, 6, 7, 8, 17, 18, 19, 63, 64, 70, 71. In some embodiments, the reference peptides are 15 reference peptides having SEQ ID NOs: 3, 4, 5, 15, 16, 30, 31, 38, 39, 42, 43, 51, 52, 68, 69. In some embodiments, the reference peptides are 31 reference peptides having SEQ ID NOs: 9, 10, 13, 14, 20, 21, 22, 23, 24, 25, 26, 27, 28, 29, 40, 41, 48, 49, 50, 53, 54, 57, 58, 76, 77, 46, 47, 55, 56, 72, 73. In some embodiments, the reference peptides are 25 reference peptides having SEQ ID NOs: 11, 12, 32, 33, 34, 35, 36, 37, 44, 45, 59, 60, 61, 62, 65, 66, 67, 74, 75, 46, 47, 55, 56, 72, 73. In some embodiments, the method further comprises correlating the human mitochondrial protein according to Table 1 to a mitochondrial function according to Table 4.

In some embodiments, the presence of at least one human mitochondrial protein in the sample from the human subject relative to the reference sample is indicative of a change in mitochondrial function in the human subject, or altered mitochondrial function or altered mitochondrial physiology in the human subject, or abnormal mitochondrial function or abnormal mitochondrial physiology in the human subject. In some embodiments, the change in mitochondrial function in the human subject is indicative of altered mitochondrial function or abnormal mitochondrial function in the human subject.

In some embodiments, the absence of at least one human mitochondrial protein in the sample from the human subject relative to the reference sample is indicative of a change in mitochondrial function in the human subject, or altered mitochondrial function or altered mitochondrial physiology in the human subject, or abnormal mitochondrial function or abnormal mitochondrial physiology in the human subject. In some embodiments, the change in mitochondrial function in the human subject is indicative of altered mitochondrial function or abnormal mitochondrial function in the human subject.

In some embodiments, an increase in the amount or level of at least one human mitochondrial protein in the sample from the subject relative to the reference sample is indicative of a change in mitochondrial function in the human subject, or altered mitochondrial function or altered mitochondrial physiology in the human subject, or abnormal mitochondrial function or abnormal mitochondrial physiology in the human subject. In some embodiments, the change in mitochondrial function in the human subject is indicative of altered mitochondrial function or abnormal mitochondrial function in the human subject.

In some embodiments, a decrease in the amount or level of at least one human mitochondrial protein in the sample from the subject relative to the reference sample is indicative of a change in mitochondrial function in the human subject, or altered mitochondrial function or altered mitochondrial physiology in the human subject, or abnormal mitochondrial function or abnormal mitochondrial physiology in the human subject. In some embodiments, the change in mitochondrial function in the human subject is indicative of altered mitochondrial function or abnormal mitochondrial function in the human subject.

In some embodiments, a change in the amount or level of at least one human mitochondrial protein in the sample from the subject relative to the reference sample is indicative of a change in mitochondrial function in the human subject, or altered mitochondrial function or altered mitochondrial physiology in the human subject, or abnormal mitochondrial function or abnormal mitochondrial physiology in the human subject. In some embodiments, the change in mitochondrial function in the human subject is indicative of altered mitochondrial function or abnormal mitochondrial function in the human subject.

In some embodiments, the mitochondrial function or mitochondrial physiology is selected from the group consisting of tricarboxylic acid cycle (TCA cycle), oxidative phosphorylation (OxPhos), MitoGeneral, MitoDynamics, and combinations thereof. In some embodiments, the altered mitochondrial function is selected from the group consisting of altered tricarboxylic acid cycle (TCA cycle), altered oxidative phosphorylation (OxPhos), altered MitoGeneral, altered MitoDynamics, and combinations thereof. In some embodiments, the abnormal mitochondrial function is selected from the group consisting of abnormal tricarboxylic acid cycle (TCA cycle), abnormal oxidative phosphorylation (OxPhos), abnormal MitoGeneral, abnormal MitoDynamics, and combinations thereof. In some embodiments, the mass spectrometry is selected from the group consisting of LC-MS, LC-MS/MS, LC-SRM-MS, LC-MRM-MS and LC-PRM-MS. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the human mitochondrial protein(s) in the sample from the human subject is/are the same as the human mitochondrial protein(s) in the reference sample. In some embodiments, the human mitochondrial protein(s) in the sample from the human subject is/are different than the human mitochondrial protein(s) in the reference sample.

Methods for Determining Mitochondrial Function in a Mouse Subject

In various embodiments, the present invention provides a method of assessing and/or determining mitochondrial function or mitochondrial physiology in a mouse subject, the method comprising: i) obtaining a sample from the mouse subject, wherein the sample comprises at least one mouse mitochondrial protein, wherein the mouse mitochondrial protein is selected from the group consisting of TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof; ii) contacting the sample with a protease that digests the mouse mitochondrial protein into at least one target peptide, wherein the target peptide is selected from the group consisting of SEQ ID NOs: 78-151, and combinations thereof; and wherein the protease is trypsin; iii) adding an internal standard to the sample, wherein the internal standard comprises 74 reference peptides having SEQ ID NOs: 78-151 and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); and vi) correlating the target peptide to the mouse mitochondrial protein according to Table 2; and vii) comparing the presence or amount or level of the mouse mitochondrial protein in the sample from the mouse subject to the presence or amount or level of the mouse mitochondrial protein in a reference sample, so as to assess and/or determine mitochondrial function or mitochondrial physiology in the mouse subject. In some embodiments, the method further comprises correlating the mouse mitochondrial protein according to Table 2 to a mitochondrial function according to Table 3.

In various embodiments, the present invention provides a method of assessing and/or determining mitochondrial function or mitochondrial physiology in a mouse subject, the method comprising: i) obtaining a sample from the mouse subject, wherein the sample comprises at least one mouse mitochondrial protein, wherein the mouse mitochondrial protein is selected from the group consisting of TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof; ii) contacting the sample with a protease that digests the mouse mitochondrial protein into at least one target peptide, wherein the target peptide is selected from the group consisting of SEQ ID NOs: 78-151, and combinations thereof; and wherein the protease is trypsin; iii) adding an internal standard to the sample, wherein the internal standard comprises at least one reference peptide, wherein the reference peptide is selected from the group consisting of SEQ ID NOs: 78-151, and combinations thereof, and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); and vi) correlating the target peptide to the mouse mitochondrial protein according to Table 2; and vii) comparing the presence or amount or level of the mouse mitochondrial protein in the sample from the mouse subject to the presence or amount or level of the mouse mitochondrial protein in a reference sample, so as to assess and/or determine mitochondrial function or mitochondrial physiology in the mouse subject. In some embodiments, the method further comprises correlating the mouse mitochondrial protein according to Table 2 to a mitochondrial function according to Table 3.

In various embodiments, the present invention provides a method of assessing and/or determining mitochondrial function or mitochondrial physiology in a mouse subject, the method comprising: i) obtaining a sample from the mouse subject, wherein the sample comprises at least one mouse mitochondrial protein, wherein the mouse mitochondrial protein is selected from the group consisting of TIM44 (UniProt Accession No. O35857), CYB (UniProt Accession No. P00158), COX2 (UniProt Accession No. P00405), NU5M (UniProt Accession No. P03921), ATP8 (UniProt Accession No. P03930), MDHM (UniProt Accession No. P08249), SODM (UniProt Accession No. P09671), HXK1 (UniProt Accession No. P17710), COX41 (UniProt Accession No. P19783), PDH1 (UniProt Accession No. P35486), TFAM (UniProt Accession No. P40630), K6PF (UniProt Accession No. P47857), CPT2 (UniProt Accession No. P52825), IDHP (UniProt Accession No. P54071), OPA1 (UniProt Accession No. P58281), FUMH (UniProt Accession No. P97807), ATPA (UniProt Accession No. Q03265), PYC (UniProt Accession No. Q05920), ODO1 (UniProt Accession No. Q60597), MFN1 (UniProt Accession No. Q811U4), TMM11 (UniProt Accession No. Q8BK08), LONM (UniProt Accession No. Q8CGK3), DNM1L (UniProt Accession No. Q8K1M6), SDHA (UniProt Accession No. Q8K2B3), QCR9 (UniProt Accession No. Q8R1I1), NDUS2 (UniProt Accession No. Q91WD5), ACON (UniProt Accession No. Q99KI0), SDHB (UniProt Accession No. Q9CQA3), QCR1 (UniProt Accession No. Q9CZ13), SDHC (UniProt Accession No. Q9CZB0), CISY (UniProt Accession No. Q9CZU6), TOM70 (UniProt Accession No. Q9CZW5), NDUB8 (UniProt Accession No. Q9D6J5), TIM50 (UniProt Accession No. Q9D880), QCR2 (UniProt Accession No. Q9DB77), TOM20 (UniProt Accession No. Q9DCC8), ATP5H (UniProt Accession No. Q9DCX2), and combinations thereof; ii) contacting the sample with a protease that digests the mouse mitochondrial protein into at least one target peptide, wherein the target peptide is selected from the group consisting of SEQ ID NOs: 78-151, and combinations thereof; and wherein the protease is trypsin; iii) adding an internal standard to the sample, wherein the internal standard comprises reference peptides, and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); and vi) correlating the target peptide to the mouse mitochondrial protein according to Table 2; and vii) comparing the presence or amount or level of the mouse mitochondrial protein in the sample from the mouse subject to the presence or amount or level of the mouse mitochondrial protein in a reference sample, so as to assess and/or determine mitochondrial function or mitochondrial physiology in the mouse subject. In some embodiments, the reference peptides are 12 reference peptides having SEQ ID NOs: 99, 100, 103, 104, 107, 108, 109, 118, 121, 122, 123, 124. In some embodiments, the reference peptides are 12 reference peptides having SEQ ID NOs: 78, 79, 91, 92, 119, 120, 140, 141, 144, 145, 148, 149. In some embodiments, the reference peptides are 30 reference peptides having SEQ ID NOs: 80, 81, 82, 83, 84, 85, 86, 87, 88, 95, 96, 112, 113, 127, 128, 129, 134, 135, 142, 143, 146, 147, 150, 151, 125, 126, 132, 133, 136, 137. In some embodiments, the reference peptides are 26 reference peptides having SEQ ID NOs: 89, 90, 93, 94, 97, 98, 101, 102, 105, 106, 110, 111, 114, 115, 116, 117, 130, 131, 138, 139, 125, 126, 132, 133, 136, 137. In some embodiments, the method further comprises correlating the mouse mitochondrial protein according to Table 2 to a mitochondrial function according to Table 3.

In some embodiments, the presence of at least one mouse mitochondrial protein in the sample from the mouse subject relative to the reference sample is indicative of a change in mitochondrial function in the mouse subject, or altered mitochondrial function or altered mitochondrial physiology in the mouse subject, or abnormal mitochondrial function or abnormal mitochondrial physiology in the mouse subject. In some embodiments, the change in mitochondrial function in the mouse subject is indicative of altered mitochondrial function or abnormal mitochondrial function in the mouse subject.

In some embodiments, the absence of at least one mouse mitochondrial protein in the sample from the mouse subject relative to the reference sample is indicative of a change in mitochondrial function in the mouse subject, or altered mitochondrial function or altered mitochondrial physiology in the mouse subject, or abnormal mitochondrial function or abnormal mitochondrial physiology in the mouse subject. In some embodiments, the change in mitochondrial function in the mouse subject is indicative of altered mitochondrial function or abnormal mitochondrial function in the mouse subject.

In some embodiments, an increase in the amount or level of at least one mouse mitochondrial protein in the sample from the subject relative to the reference sample is indicative of a change in mitochondrial function in the mouse subject, or altered mitochondrial function or altered mitochondrial physiology in the mouse subject, or abnormal mitochondrial function or abnormal mitochondrial physiology in the mouse subject. In some embodiments, the change in mitochondrial function in the mouse subject is indicative of altered mitochondrial function or abnormal mitochondrial function in the mouse subject.

In some embodiments, a decrease in the amount or level of at least one mouse mitochondrial protein in the sample from the subject relative to the reference sample is indicative of a change in mitochondrial function in the mouse subject, or altered mitochondrial function or altered mitochondrial physiology in the mouse subject, or abnormal mitochondrial function or abnormal mitochondrial physiology in the mouse subject. In some embodiments, the change in mitochondrial function in the mouse subject is indicative of altered mitochondrial function or abnormal mitochondrial function in the mouse subject.

In some embodiments, a change in the amount or level of at least one mouse mitochondrial protein in the sample from the subject relative to the reference sample is indicative of a change in mitochondrial function in the human subject, or altered mitochondrial function or altered mitochondrial physiology in the mouse subject, or abnormal mitochondrial function or abnormal mitochondrial physiology in the mouse subject. In some embodiments, the change in mitochondrial function in the mouse subject is indicative of altered mitochondrial function or abnormal mitochondrial function in the mouse subject.

In some embodiments, the mitochondrial function or mitochondrial physiology is selected from the group consisting of tricarboxylic acid cycle (TCA cycle), oxidative phosphorylation (OxPhos), MitoGeneral, MitoDynamics, and combinations thereof. In some embodiments, the altered mitochondrial function is selected from the group consisting of altered tricarboxylic acid cycle (TCA cycle), altered oxidative phosphorylation (OxPhos), altered MitoGeneral, altered MitoDynamics, and combinations thereof. In some embodiments, the abnormal mitochondrial function is selected from the group consisting of abnormal tricarboxylic acid cycle (TCA cycle), abnormal oxidative phosphorylation (OxPhos), abnormal MitoGeneral, abnormal MitoDynamics, and combinations thereof. In some embodiments, the mass spectrometry is selected from the group consisting of LC-MS, LC-MS/MS, LC-SRM-MS, LC-MRM-MS and LC-PRM-MS. In some embodiments, the sample is selected from the group consisting of cells, tissue, and combinations thereof. In some embodiments, the cells are selected from the group consisting of muscle cells and macrophage cells. In some embodiments, the cells are selected from the group consisting of cells of primary origins, cells of immortalized origins, and combinations thereof. In some embodiments, the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof. In some embodiments, the leukocyte cells are selected from the group consisting of monocyte cells, macrophage cells, neutrophil cells, and combinations thereof. In some embodiments, the cells are selected from the group consisting of monocyte cells, macrophage cells, neutrophil cells, and combinations thereof. In some embodiments, the stable isotope is selected from the group consisting of $^{15}N$, $^{13}C$, $^{18}O$, and $^{2}H$. In some embodiments, the mouse mitochondrial protein(s) in the sample from the mouse subject is/are the same as the mouse mitochondrial protein(s) in the reference sample. In some embodiments, the mouse mitochondrial protein(s) in the sample from the mouse subject is/are different than the mouse mitochondrial protein(s) in the reference sample.

Samples

In some embodiments, the sample comprises at least 1, at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 21, at least 22, at least 23, at least 24, at least 25, at least 26, at least 27, at least 28, at least 29, at least 30, at least 31, at least 32, at least 33, at least 34, at least 35, at least 36, or all of the human mitochondrial proteins listed in Table 1. In some embodiments, the sample is from a human subject.

In some embodiments, the sample comprises 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, or all of the human mitochondrial proteins listed in Table 1. In some embodiments, the sample is from a human subject.

In some embodiments, the sample comprises at least 1, at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 21, at least 22, at least 23, at least 24, at least 25, at least 26, at least 27, at least 28, at least 29, at least 30, at least 31, at least 32, at least 33, at least 34, at least 35, at least 36, at least 37, or all of the mouse mitochondrial proteins listed in Table 2. In some embodiments, the sample is from a mouse subject.

In some embodiments, the sample comprises 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37 or all of the mouse mitochondrial proteins listed in Table 2. In some embodiments, the sample is from a mouse subject.

In some embodiments, the sample has also been acidified following protease treatment. In some embodiments, the target peptides in the sample have also been isolated following acidification of the sample. In some embodiments, the target peptides in the sample have also been isolated following protease treatment of the sample. In some embodiments, the target peptides in the sample have also been purified following isolation. In some embodiments, the purification is desalting. In some embodiments, the target peptides have also been lyophilized following purification.

Reference Samples

In some embodiments, the reference sample is from the subject at an earlier point in time. In some embodiments, the reference sample is from the human subject at an earlier point in time. In some embodiments, the reference sample is from the mouse subject at an earlier point in time.

In some embodiments, the reference sample is from a control subject, wherein the control subject has normal mitochondrial function. In some embodiments, the reference sample is from a mouse control subject, wherein the mouse control subject has normal mitochondrial function. In some embodiments, the reference sample is from a human control subject, wherein the human control subject has normal mitochondrial function.

Target Peptides

In some embodiments, the target peptides are not labeled with a stable isotope. In some embodiments, the human target peptides are not labeled with a stable isotope. In some embodiments, the mouse target peptides are not labeled with a stable isotope.

In some embodiments, the target peptide is a human target peptide. In some embodiments, the target peptide is a mouse target peptide.

In some embodiments, the sample treated or contacted with trypsin comprises at least 1, at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 21, at least 22, at least 23, at least 24, at least 25, at least 26, at least 27, at least 28, at least 29, at least 30, at least 31, at least 32, at least 33, at least 34, at least 35, at least 36, at least 37, at least 38, at least 39, at least 40, at least 41, at least 42, at least 43, at least 44, at least 45, at least 46, at least 47, at least 48, at least 49, at least 50, at least 51, at least 52, at least 53, at least 54, at least 55, at least 56, at least 57, at least 58, at least 59, at least 60, at least 61, at least 62, at least 63, at least 64, at least 65, at least 66, at least 67, at least 68, at least 69, at least 70, at least 71, at least 72, at least 73, at least 74, at least 75, at least 76, at least 77, or all of the target peptides selected from SEQ ID NOs 1-77. In some embodiments, the sample is from a human subject.

In some embodiments, the sample treated or contacted with trypsin comprises 1, 2, 3, 4, 5, 6, 7, 8, 9, 10, 11, 12, 13, 14, 15, 16, 17, 18, 19, 29, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, or all of the target peptides selected from SEQ ID NOs 1-77. In some embodiments, the sample is from a human subject.

In some embodiments, the sample treated or contacted with trypsin comprises at least 1, at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 21, at least 22, at least 23, at least 24, at least 25, at least 26, at least 27, at least 28, at least 29, at least 30, at least 31, at least 32, at least 33, at least 34, at least 35, at least 36, at least 37, at least 38, at least 39, at least 40, at least 41, at least 42, at least 43, at least 44, at least 45, at least 46, at least 47, at least 48, at least 49, at least 50, at least 51, at least 52, at least 53, at least 54, at least 55, at least 56, at least 57, at least 58, at least 59, at least 60, at least 61, at least 62, at least 63, at least 64, at least 65, at least 66, at least 67, at least 68, at least 69, at least 70, at least 71, at least 72, at least 73, at least 74, or all of the target peptides selected from SEQ ID NOs 78-151. In some embodiments, the sample is from a mouse subject.

In some embodiments, the sample treated or contacted with trypsin comprises 1, 2, 3, 4, 5, 6, 7, 8, 9, 10, 11, 12, 13, 14, 15, 16, 17, 18, 19, 29, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, or all of the target peptides selected from SEQ ID NOs 78-151. In some embodiments, the sample is from a mouse subject.

In some embodiments, the target peptide is selected from at least 1, at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 21, at least 22, at least 23, at least 24, at least 25, at least 26, at least 27, at least 28, at least 29, at least 30, at least 31, at least 32, at least 33, at least 34, at least 35, at least 36, at least 37, at least 38, at least 39, at least 40, at least 41, at least 42, at least 43, at least 44, at least 45, at least 46, at least 47, at least 48, at least 49, at least 50, at least 51, at least 52, at least 53, at least 54, at least 55, at least 56, at least 57, at least 58, at least 59, at least 60, at least 61, at least 62, at least 63, at least 64, at least 65, at least 66, at least 67, at least 68, at least 69, at least 70, at least 71, at least 72, at least 73, at least 74, at least 75, at least 76, at least 77, or all of the target peptides selected from SEQ ID NOs 1-77.

In some embodiments, the target peptide is selected from 1, 2, 3, 4, 5, 6, 7, 8, 9, 10, 11, 12, 13, 14, 15, 16, 17, 18, 19, 29, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, or all of the target peptides selected from SEQ ID NOs 1-77.

In some embodiments, the target peptide is selected from at least 1, at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 21, at least 22, at least 23, at least 24, at least 25, at least 26, at least 27, at least 28, at least 29, at least 30, at least 31, at least 32, at least 33, at least 34, at least 35, at least 36, at least 37, at least 38, at least 39, at least 40, at least 41, at least 42, at least 43, at least 44, at least 45, at least 46, at least 47, at least 48, at least 49, at least 50, at least 51, at least 52, at least 53, at least 54, at least 55, at least 56, at least 57, at least 58, at least 59, at least 60, at least 61, at least 62, at least 63, at least 64, at least 65, at least 66, at least 67, at least 68, at least 69, at least 70, at least 71, at least 72, at least 73, at least 74, or all of the target peptides selected from SEQ ID NOs 78-151.

In some embodiments, the target peptide is selected from 1, 2, 3, 4, 5, 6, 7, 8, 9, 10, 11, 12, 13, 14, 15, 16, 17, 18, 19, 29, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, or all of the target peptides selected from SEQ ID NOs 78-151.

Reference Peptides

In some embodiments, the reference peptide is a human reference peptide. In some embodiments, the reference peptide is a mouse reference peptide.

In some embodiments, the internal standard comprises at least 1, at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 21, at least 22, at least 23, at least 24, at least 25, at least 26, at least 27, at least 28, at least 29, at least 30, at least 31, at least 32, at least 33, at least 34, at least 35, at least 36, at least 37, at least 38, at least 39, at least 40, at least 41, at least 42, at least 43, at least 44, at least 45, at least 46, at least 47, at least 48, at least 49, at least 50, at least 51, at least 52, at least 53, at least 54, at least 55, at least 56, at least 57, at least 58, at least 59, at least 60, at least 61, at least 62, at least 63, at least 64, at least 65, at least 66, at least 67, at least 68, at least 69, at least 70, at least 71, at least 72, at least 73, at least 74, at least 75, at least 76, at least 77, or all of the reference peptides selected from SEQ ID NOs 1-77, wherein each reference peptide is labeled with a stable isotope. In some embodiments, each reference peptide is present in the internal standard in a known quantity. In some embodiments, each reference peptide has a known mass-to-charge ratio (m/z) and retention time (rt). In some embodiments, the stable isotope is selected from the group consisting of $^{15}N$, $^{13}C$, $^{18}O$, and $^{2}H$.

In some embodiments, the internal standard comprises 1, 2, 3, 4, 5, 6, 7, 8, 9, 10, 11, 12, 13, 14, 15, 16, 17, 18, 19, 29, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, or all of the reference peptides selected from SEQ ID NOs 1-77, wherein each reference peptide is labeled with a stable isotope. In some embodiments, each reference peptide is present in the internal standard in a known quantity. In some embodiments, each reference peptide has a known mass-to-charge ratio (m/z) and retention time (rt). In some embodiments, the stable isotope is selected from the group consisting of $^{15}N$, $^{13}C$, $^{18}O$, and $^{2}H$.

In some embodiments, the internal standard comprises at least 1, at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 21, at least 22, at least 23, at least 24, at least 25, at least 26, at least 27, at least 28, at least 29, at least 30, at least 31, at least 32, at least 33, at least 34, at least 35, at least 36, at least 37, at least 38, at least 39, at least 40, at least 41, at least 42, at least 43, at least 44, at least 45, at least 46, at least 47, at least 48, at least 49, at least 50, at least 51, at least 52, at least 53, at least 54, at least 55, at least 56, at least 57, at least 58, at least 59, at least 60, at least 61, at least 62, at least 63, at least 64, at least 65, at least 66, at least 67, at least 68, at least 69, at least 70, at least 71, at least 72, at least 73, at least 74, or all of the reference peptides selected from SEQ ID NOs 78-151, wherein each reference peptide is labeled with a stable isotope. In some embodiments, each reference peptide is present in the internal standard in a known quantity. In some embodiments, each reference peptide has a known mass-to-charge ratio (m/z) and retention time (rt). In some embodiments, the stable isotope is selected from the group consisting of $^{15}N$, $^{13}C$, $^{18}O$, and $^{2}H$.

In some embodiments, the internal standard comprises 1, 2, 3, 4, 5, 6, 7, 8, 9, 10, 11, 12, 13, 14, 15, 16, 17, 18, 19, 29, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, or all of the reference peptides selected from SEQ ID NOs 78-151, wherein each reference peptide is labeled with a stable isotope. In some embodiments, each reference peptide is present in the internal standard in a known quantity. In some embodiments, each reference peptide has a known mass-to-charge ratio (m/z) and retention time (rt). In some embodiments, the stable isotope is selected from the group consisting of $^{15}N$, $^{13}C$, $^{18}O$, and $^{2}H$.

In some embodiments, the reference peptide is selected from at least 1, at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 21, at least 22, at least 23, at least 24, at least 25, at least 26, at least 27, at least 28, at least 29, at least 30, at least 31, at least 32, at least 33, at least 34, at least 35, at least 36, at least 37, at least 38, at least 39, at least 40, at least 41, at least 42, at least 43, at least 44, at least 45, at least 46, at least 47, at least 48, at least 49, at least 50, at least 51, at least 52, at least 53, at least 54, at least 55, at least 56, at least 57, at least 58, at least 59, at least 60, at least 61, at least 62, at least 63, at least 64, at least 65, at least 66, at least 67, at least 68, at least 69, at least 70, at least 71, at least 72, at least 73, at least 74, at least 75, at least 76, at least 77, or all of the reference peptides selected from SEQ ID NOs 1-77, wherein each reference peptide is labeled with a stable isotope. In some embodiments, each reference peptide has a known mass-to-charge ratio (m/z) and retention time (rt). In some embodiments, the stable isotope is selected from the group consisting of $^{15}N$, $^{13}C$, $^{18}O$, and $^{2}H$.

In some embodiments, the reference peptide is selected from 1, 2, 3, 4, 5, 6, 7, 8, 9, 10, 11, 12, 13, 14, 15, 16, 17, 18, 19, 29, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, or all of the reference peptides selected from SEQ ID NOs 1-77, wherein each reference peptide is labeled with a stable isotope. In some embodiments, each reference peptide has a known mass-to-charge ratio (m/z) and retention time (rt). In some embodiments, the stable isotope is selected from the group consisting of $^{15}N$, $^{13}C$, $^{18}O$, and $^{2}H$.

In some embodiments, the reference peptide is selected from at least 1, at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 21, at least 22, at least 23, at least 24, at least 25, at least 26, at least 27, at least 28, at least 29, at least 30, at least 31, at least 32, at least 33, at least 34, at least 35, at least 36, at least 37, at least 38, at least 39, at least 40, at least 41, at least 42, at least 43, at least 44, at least 45, at least 46, at least 47, at least 48, at least 49, at least 50, at least 51, at least 52, at least 53, at least 54, at least 55, at least 56, at least 57, at least 58, at least 59, at least 60, at least 61, at least 62, at least 63, at least 64, at least 65, at least 66, at least 67, at least 68, at least 69, at least 70, at least 71, at least 72, at least 73, at least 74, or all of the reference peptides selected from SEQ ID NOs 78-151, wherein each reference peptide is labeled with a stable isotope. In some embodiments, each reference peptide has a known mass-to-charge ratio (m/z) and retention time (rt). In some embodiments, the stable isotope is selected from the group consisting of $^{15}N$, $^{13}C$, $^{18}O$, and $^{2}H$.

In some embodiments, the reference peptide is selected from 1, 2, 3, 4, 5, 6, 7, 8, 9, 10, 11, 12, 13, 14, 15, 16, 17, 18, 19, 29, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, or all of the reference peptides selected from SEQ ID NOs 78-151, wherein each reference peptide is labeled with a stable isotope. In some embodiments, each reference peptide has a known mass-to-charge ratio (m/z) and retention time (rt). In some embodiments, the stable isotope is selected from the group consisting of $^{15}N$, $^{13}C$, $^{18}O$, and $^{2}H$.

In some embodiments, the reference peptides are 12 reference peptides having SEQ ID NOs: 1, 2, 6, 7, 8, 17, 18, 19, 63, 64, 70, 71. In some embodiments, the reference peptides are 15 reference peptides having SEQ ID NOs: 3, 4, 5, 15, 16, 30, 31, 38, 39, 42, 43, 51, 52, 68, 69. In some embodiments, the reference peptides are 31 reference peptides having SEQ ID NOs: 9, 10, 13, 14, 20, 21, 22, 23, 24, 25, 26, 27, 28, 29, 40, 41, 48, 49, 50, 53, 54, 57, 58, 76, 77, 46, 47, 55, 56, 72, 73. In some embodiments, the reference peptides are 25 reference peptides having SEQ ID NOs: 11, 12, 32, 33, 34, 35, 36, 37, 44, 45, 59, 60, 61, 62, 65, 66, 67, 74, 75, 46, 47, 55, 56, 72, 73.

In some embodiments, the reference peptides are 12 reference peptides having SEQ ID NOs: 99, 100, 103, 104, 107, 108, 109, 118, 121, 122, 123, 124. In some embodiments, the reference peptides are 12 reference peptides having SEQ ID NOs: 78, 79, 91, 92, 119, 120, 140, 141, 144, 145, 148, 149. In some embodiments, the reference peptides are 30 reference peptides having SEQ ID NOs: 80, 81, 82, 83, 84, 85, 86, 87, 88, 95, 96, 112, 113, 127, 128, 129, 134, 135, 142, 143, 146, 147, 150, 151, 125, 126, 132, 133, 136, 137. In some embodiments, the reference peptides are 26 reference peptides having SEQ ID NOs: 89, 90, 93, 94, 97, 98, 101, 102, 105, 106, 110, 111, 114, 115, 116, 117, 130, 131, 138, 139, 125, 126, 132, 133, 136, 137.

TABLE 1

List of human mitochondrial proteins and the peptides correlated to each human mitochondrial protein.

| Human Mitochondrial Protein and UniProt Accession No. | Human Mitochondrial Protein Common Name | Peptide Sequence | SEQ ID NO. |
| --- | --- | --- | --- |
| sp\|O00429\|DNM1L_HUMAN | DNM1L or DRP1 | LGIIGVVNR | 1 |
| sp\|O00429\|DNM1L_HUMAN | DNM1L or DRP1 | SATLLQLITK | 2 |

TABLE 1-continued

List of human mitochondrial proteins and the peptides correlated to each human mitochondrial protein.

| Human Mitochondrial Protein and UniProt Accession No. | Human Mitochondrial Protein Common Name | Peptide Sequence | SEQ ID NO. |
|---|---|---|---|
| sp\|O43615\|TIM44_HUMAN | TIM44 | LGELTGTVK | 3 |
| sp\|O43615\|TIM44_HUMAN | TIM44 | VTDLLGGLFSK | 4 |
| sp\|O43615\|TIM44_HUMAN | TIM44 | ALGLQFHSR | 5 |
| sp\|O60313\|OPA1_HUMAN | OPA1 | LQRPQLR | 6 |
| sp\|O60313\|OPA1_HUMAN | OPA1 | VVVVGDQSAGK | 7 |
| sp\|O60313\|OPA1_HUMAN | OPA1 | EVLEDFAEDGEK | 8 |
| sp\|O75306\|NDUS2_HUMAN | NDUS2 | LPIQPSR | 9 |
| sp\|O75306\|NDUS2_HUMAN | NDUS2 | ETAHWKPPPWNDVDPPK | 10 |
| sp\|O75390\|CISY_HUMAN | CISY | DILADLIPK | 11 |
| sp\|O75390\|CISY_HUMAN | CISY | AYAQGISR | 12 |
| sp\|O75947\|ATP5H_HUMAN | ATP5H | SWNETLTSR | 13 |
| sp\|O75947\|ATP5H_HUMAN | ATP5H | AGLVDDFEK | 14 |
| sp\|O94826\|TOM70_HUMAN | TOM70 | AAAFEQLQK | 15 |
| sp\|O94826\|TOM70_HUMAN | TOM70 | GLLQLQWK | 16 |
| sp\|O95140\|MFN2_HUMAN | MFN2 | QITEEVER | 17 |
| sp\|O95140\|MFN2_HUMAN | MFN2 | HIEEGLGR | 18 |
| sp\|O95140\|MFN2_HUMAN | MFN2 | IEVLDSLQSK | 19 |
| sp\|O95169\|NDUB8_HUMAN | NDUB8 | DPWYSWDQPGLR | 20 |
| sp\|O95169\|NDUB8_HUMAN | NDUB8 | QYPYNNLYER | 21 |
| sp\|P00156\|CYB_HUMAN | CYB | ITFHPYYTIK | 22 |
| sp\|P00156\|CYB_HUMAN | CYB | DVNYGWIIR | 23 |
| sp\|P00403\|COX2_HUMAN | COX2 | LLDVDNR | 24 |
| sp\|P00403\|COX2_HUMAN | COX2 | VVLPIEAPIR | 25 |
| sp\|P03915\|NU5M_HUMAN | NU5M | NSYPHYVK | 26 |
| sp\|P03915\|NU5M_HUMAN | NU5M | TISQHQISTSIITSTQK | 27 |
| sp\|P03928\|ATP8_HUMAN | ATP8 | NYNKPWEPK | 28 |
| sp\|P03928\|ATP8_HUMAN | ATP8 | IC[CAM]SLHSLPPQS | 29 |
| sp\|P04179\|SODM_HUMAN | SODM | GDVTAQIALQPALK | 30 |
| sp\|P04179\|SODM_HUMAN | SODM | GELLEAIK | 31 |
| sp\|P07954\|FUMH_HUMAN | FUMH | YYGAQTVR | 32 |
| sp\|P07954\|FUMH_HUMAN | FUMH | IPVHPNDHVNK | 33 |
| sp\|P08237\|PFKAM_HUMAN | PFK | VGIFTGAR | 34 |
| sp\|P08237\|PFKAM_HUMAN | PFK | VLVVHDGFEGLAK | 35 |
| sp\|P08559\|ODPA_HUMAN | PDH1 | LEEGPPVTTVLTR | 36 |
| sp\|P08559\|ODPA_HUMAN | PDH1 | EILAELTGR | 37 |
| sp\|P11498\|PYC_HUMAN | PYC | FIGPSPEVVR | 38 |

TABLE 1-continued

List of human mitochondrial proteins and the peptides correlated to each human mitochondrial protein.

| Human Mitochondrial Protein and UniProt Accession No. | Human Mitochondrial Protein Common Name | Peptide Sequence | SEQ ID NO. |
|---|---|---|---|
| sp\|P11498\|PYC_HUMAN | PYC | SVVEFLQGYIGVPHGGFPEPFR | 39 |
| sp\|P13073\|COX41_HUMAN | COX41 | DHPLPEVAHVK | 40 |
| sp\|P13073\|COX41_HUMAN | COX41 | VNPIQGLASK | 41 |
| sp\|P17152\|TMM11_HUMAN | TMM11 | YIVIEPTR | 42 |
| sp\|P17152\|TMM11_HUMAN | TMM11 | YQVEYDAYK | 43 |
| sp\|P19367\|HXK1_HUMAN | HXK1 | TTVGVDGSLYK | 44 |
| sp\|P19367\|HXK1_HUMAN | HXK1 | LVDEYSLNAGK | 45 |
| sp\|P21912\|SDHB_HUMAN | SDHB | NEVDSTLTFR | 46 |
| sp\|P21912\|SDHB_HUMAN | SDHB | LQDPFSLYR | 47 |
| sp\|P22695\|QCR2_HUMAN | QCR2 | YEDFSNLGTTHLLR | 48 |
| sp\|P22695\|QCR2_HUMAN | QCR2 | WEVADLQPQLK | 49 |
| sp\|P22695\|QCR2_HUMAN | QCR2 | TIAQGNLSNTDVQAAK | 50 |
| sp\|P23786\|CPT2_HUMAN | CPT2 | LNFELTDALK | 51 |
| sp\|P23786\|CPT2_HUMAN | CPT2 | TETIRPASVYTK | 52 |
| sp\|P25705\|ATPA_HUMAN | ATPA | VVDALGNAIDGK | 53 |
| sp\|P25705\|ATPA_HUMAN | ATPA | AVDSLVPIGR | 54 |
| sp\|P31040\|SDHA_HUMAN | SDHA | NTVVATGGYGR | 55 |
| sp\|P31040\|SDHA_HUMAN | SDHA | GEGGILINSQGER | 56 |
| sp\|P31930\|QCR1_HUMAN | QCR1 | NNGAGYFLEHLAFK | 57 |
| sp\|P31930\|QCR1_HUMAN | QCR1 | SLLTYGR | 58 |
| sp\|P40926\|MDHM_HUMAN | MDHM | IFGVTTLDIVR | 59 |
| sp\|P40926\|MDHM_HUMAN | MDHM | VAVLGASGGIGQPLSLLLK | 60 |
| sp\|P48735\|IDHP_HUMAN | IDHP | LILPHVDIQLK | 61 |
| sp\|P48735\|IDHP_HUMAN | IDHP | ATDFVADR | 62 |
| sp\|Q00059\|TFAM_HUMAN | TFAM | EQLPIFK | 63 |
| sp\|Q00059\|TFAM_HUMAN | TFAM | IYQDAYR | 64 |
| sp\|Q02218\|ODO1_HUMAN | ODO1 | LGFYGLDESDLDK | 65 |
| sp\|Q02218\|ODO1_HUMAN | ODO1 | SSPYPTDVAR | 66 |
| sp\|Q02218\|ODO1_HUMAN | ODO1 | DPAAAPATGNK | 67 |
| sp\|Q3ZCQ8\|TIM50_HUMAN | TIM50 | TIALNGVEDVR | 68 |
| sp\|Q3ZCQ8\|TIM50_HUMAN | TIM50 | TVLEHYALEDDPLAAFK | 69 |
| sp\|Q8IWA4\|MFN1_HUMAN | MFN1 | VVNALEAQNR | 70 |
| sp\|Q8IWA4\|MFN1_HUMAN | MFN1 | QLEEEIAR | 71 |
| sp\|Q99643\|C560_HUMAN | SDHC | NAVPLGTTAK | 72 |
| sp\|Q99643\|C560_HUMAN | SDHC | SLC[CAM]LGPALIHTAK | 73 |
| sp\|Q99798\|ACON_HUMAN | ACON | EGWPLDIR | 74 |

TABLE 1-continued

List of human mitochondrial proteins and the peptides correlated to each human mitochondrial protein.

| Human Mitochondrial Protein and UniProt Accession No. | Human Mitochondrial Protein Common Name | Peptide Sequence | SEQ ID NO. |
|---|---|---|---|
| sp\|Q99798\|ACON_HUMAN | ACON | NTIVTSYNR | 75 |
| sp\|Q9UDW1\|QCR9_HUMAN | QCR9 | LYSLLFR | 76 |
| sp\|Q9UDW1\|QCR9_HUMAN | QCR9 | AFDQGADAIYDHINEGK | 77 |

The peptides in Table 1 were obtained by trypsin digestion of the corresponding human mitochondrial proteins. In Table 1, [CAM] stands for Carboxyamidomethylcysteine.

TABLE 2

Mouse mitochondrial proteins and the peptides correlated to each mouse mitochondrial protein.

| Mouse Mitochondrial Protein and UniProt Accession No. | Mouse Mitochondrial Protein Common Name | Peptide Sequence | SEQ ID NO. |
|---|---|---|---|
| sp\|O35857\|TIM44_MOUSE | TIM44 | LGELTGTVK | 78 |
| sp\|O35857\|TIM44_MOUSE | TIM44 | YDESDNVLIR | 79 |
| sp\|P00158\|CYB_MOUSE | CYB | IPFHPYYTIK | 80 |
| sp\|P00158\|CYB_MOUSE | CYB | DVNYGWLIR | 81 |
| sp\|P00405\|COX2_MOUSE | COX2 | LLEVDNR | 82 |
| sp\|P00405\|COX2_MOUSE | COX2 | MLISSEDVLHSWAVPSLGLK | 83 |
| sp\|P00405\|COX2_MOUSE | COX2 | M[Oxi]LISSEDVLHSWAVPSLGLK | 84 |
| sp\|P03921\|NU5M_MOUSE | NU5M | ANPYSSFSTLLGFFPSIIHR | 85 |
| sp\|P03921\|NU5M_MOUSE | NU5M | TSLTLLDLIWLEK | 86 |
| sp\|P03930\|ATP8_MOUSE | ATP8 | VSSQTFPLAPSPK | 87 |
| sp\|P03930\|ATP8_MOUSE | ATP8 | IYLPHSLPQQ | 88 |
| sp\|P08249\|MDHM_MOUSE | MDHM | ANTFVAELK | 89 |
| sp\|P08249\|MDHM_MOUSE | MDHM | IQEAGTEVVK | 90 |
| sp\|P09671\|SODM_MOUSE | SODM | GDVTTQVALQPALK | 91 |
| sp\|P09671\|SODM_MOUSE | SODM | GELLEAIK | 92 |
| sp\|P17710\|HXK1_MOUSE | HXK1 | DYNPTASVK | 93 |
| sp\|P17710\|HXK1_MOUSE | HXK1 | NILIDFTK | 94 |
| sp\|P19783\|COX41_MOUSE | COX41 | ADWSSLSR | 95 |
| sp\|P19783\|COX41_MOUSE | COX41 | ANPIQGFSAK | 96 |
| sp\|P35486\|ODPA_MOUSE | PDH1 | LEEGPPVTTVLTR | 97 |
| sp\|P35486\|ODPA_MOUSE | PDH1 | AILAELTGR | 98 |
| sp\|P40630\|TFAM_MOUSE | TFAM | FSTEQLPK | 99 |
| sp\|P40630\|TFAM_MOUSE | TFAM | SAYNIYVSESFQEAK | 100 |
| sp\|P47857\|K6PF_MOUSE | K6PF | NLEQISANITK | 101 |

TABLE 2-continued

Mouse mitochondrial proteins and the peptides correlated to each mouse mitochondrial protein.

| Mouse Mitochondrial Protein and UniProt Accession No. | Mouse Mitochondrial Protein Common Name | Peptide Sequence | SEQ ID NO. |
|---|---|---|---|
| sp\|P47857\|K6PF_MOUSE | K6PF | ALVFQPVTELK | 102 |
| sp\|P52825\|CPT2_MOUSE | CPT2 | ELHAHLLAQDK | 103 |
| sp\|P52825\|CPT2_MOUSE | CPT2 | SEYNDQLTR | 104 |
| sp\|P54071\|IDHP_MOUSE | IDHP | ATDFVVDR | 105 |
| sp\|P54071\|IDHP_MOUSE | IDHP | TIEAEAAHGTVTR | 106 |
| sp\|P58281\|OPA1_MOUSE | OPA1 | DFFTAGSPGETAFR | 107 |
| sp\|P58281\|OPA1_MOUSE | OPA1 | VVVVGDQSAGK | 108 |
| sp\|P58281\|OPA1_MOUSE | OPA1 | LDAFIEALHQEK | 109 |
| sp\|P97807\|FUMH_MOUSE | FUMH | YYGAQTVR | 110 |
| sp\|P97807\|FUMH_MOUSE | FUMH | VLLPGLQK | 111 |
| sp\|Q03265\|ATPA_MOUSE | ATPA | VLSIGDGIAR | 112 |
| sp\|Q03265\|ATPA_MOUSE | ATPA | AVDSLVPIGR | 113 |
| sp\|Q05920\|PYC_MOUSE | PYC | ADEAYLIGR | 114 |
| sp\|Q05920\|PYC_MOUSE | PYC | FIGPSPEVVR | 115 |
| sp\|Q60597\|ODO1_MOUSE | ODO1 | LNVLANVIR | 116 |
| sp\|Q60597\|OD01_MOUSE | ODO1 | SSPYPTDVAR | 117 |
| sp\|Q811U4\|MFN1_MOUSE | MFN1 | LAVIGEVLSR | 118 |
| sp\|Q8BK08\|TMM11_MOUSE | TMM11 | YQVEYDAYK | 119 |
| sp\|Q8BK08\|TMM11_MOUSE | TMM11 | LPLHTLTSSTPVVLVR | 120 |
| sp\|Q8CGK3\|LONM_MOUSE | LONM | TENPLVLIDEVDK | 121 |
| sp\|Q8CGK3\|LONM_MOUSE | LONM | DIFPIAFPR | 122 |
| sp\|Q8K1M6\|DNM1L_MOUSE | DNM1L or DRP1 | AEELLAEEK | 123 |
| sp\|Q8K1M6\|DNM1L_MOUSE | DNM1L or DRP1 | ALQGASQIIAEIR | 124 |
| sp\|Q8K2B3\|DHSA_MOUSE | SDHA | NTVIATGGYGR | 125 |
| sp\|Q8K2B3\|DHSA_MOUSE | SDHA | VTLEYRPVIDK | 126 |
| sp\|Q8R1I1\|QCR9_MOUSE | QCR9 | AFDQGADAIYEHINEGK | 127 |
| sp\|Q91WD5\|NDUS2_MOUSE | NDUS2 | VLFGEITR | 128 |
| sp\|Q91WD5\|NDUS2_MOUSE | NDUS2 | GEFGVYLVSDGSSRPYR | 129 |
| sp\|Q99KI0\|ACON_MOUSE | ACON | SQFTITPGSEQIR | 130 |
| sp\|Q99KI0\|ACON_MOUSE | ACON | VDVSPTSQR | 131 |
| sp\|Q9CQA3\|DHSB_MOUSE | SDHB | NEVDSTLTFR | 132 |
| sp\|Q9CQA3\|DHSB_MOUSE | SDHB | LQDPFSVYR | 133 |
| sp\|Q9CZ13\|QCR1_MOUSE | QCR1 | TDLTDYLNR | 134 |
| sp\|Q9CZ13\|QCR1_MOUSE | QCR1 | IPLAEWESR | 135 |
| sp\|Q9CZB0\|C560_MOUSE | SDHC | NTSSNRPLSPHLTIYK | 136 |

TABLE 2-continued

Mouse mitochondrial proteins and the peptides correlated to each mouse mitochondrial protein.

| Mouse Mitochondrial Protein and UniProt Accession No. | Mouse Mitochondrial Protein Common Name | Peptide Sequence | SEQ ID NO. |
|---|---|---|---|
| sp\|Q9CZB0\|C560_MOUSE | SDHC | HLLWDLGK | 137 |
| sp\|Q9CZU6\|CISY_MOUSE | CISY | DVLSNLIPK | 138 |
| sp\|Q9CZU6\|CISY_MOUSE | CISY | IVPNILLEQGK | 139 |
| sp\|Q9CZW5\|TOM70_MOUSE | TOM70 | AAAFEQLQK | 140 |
| sp\|Q9CZW5\|TOM70_MOUSE | TOM70 | GLLQLQWK | 141 |
| sp\|Q9D6J5\|NDUB8_MOUSE | NDUB8 | GVVPLEAR | 142 |
| sp\|Q9D6J5\|NDUB8_MOUSE | NDUB8 | EPEPVVHYDI | 143 |
| sp\|Q9D880\|TIM50_MOUSE | TIM50 | TPEQVTEIANR | 144 |
| sp\|Q9D880\|TIM50_MOUSE | TIM50 | QGLSFGSLASR | 145 |
| sp\|Q9DB77\|QCR2_MOUSE | QCR2 | ITSEELHYFVQNHFTSAR | 146 |
| sp\|Q9DB77\|QCR2_MOUSE | QCR2 | AVAQGNLSSADVQAAK | 147 |
| sp\|Q9DCC8\|TOM20_MOUSE | TOM20 | LPTISQR | 148 |
| sp\|Q9DCC8\|TOM20_MOUSE | TOM20 | IVSAQSLAEDDVE | 149 |
| sp\|Q9DCX2\|ATP5H_MOUSE | ATP5H | SWNETFHAR | 150 |
| sp\|Q9DCX2\|ATP5H_MOUSE | ATP5H | ANVAKPGLVDDFEK | 151 |

The peptides in Table 2 were obtained by trypsin digestion of the corresponding mouse mitochondrial proteins. In Table 2, [Oxi] stands for oxidation of Methionine.

TABLE 3

List of mouse mitochondrial proteins and the mitochondrial function correlated to each mouse mitochondrial protein.

| Mouse Mitochondrial Protein | Mitochondrial Function |
|---|---|
| sp\|P08249\|MDHM_MOUSE | TCA |
| sp\|P17710\|HXK1_MOUSE | TCA |
| sp\|P35486\|ODPA_MOUSE | TCA |
| sp\|P47857\|K6PF_MOUSE | TCA |
| sp\|P54071\|IDHP_MOUSE | TCA |
| sp\|P97807\|FUMH_MOUSE | TCA |
| sp\|Q05920\|PYC_MOUSE | TCA |
| sp\|Q60597\|ODO1_MOUSE | TCA |
| sp\|Q99KI0\|ACON_MOUSE | TCA |
| sp\|Q9CZU6\|CISY_MOUSE | TCA |
| sp\|Q8K2B3\|DHSA_MOUSE | TCA/OxPhos |
| sp\|Q9CQA3\|DHSB_MOUSE | TCA/OxPhos |
| sp\|Q9CZB0\|C560_MOUSE | TCA/OxPhos |
| sp\|P00158\|CYB_MOUSE | OxPhos |
| sp\|P00405\|COX2_MOUSE | OxPhos |
| sp\|P03921\|NU5M_MOUSE | OxPhos |
| sp\|P03930\|ATP8_MOUSE | OxPhos |
| sp\|P19783\|COX41_MOUSE | OxPhos |
| sp\|Q03265\|ATPA_MOUSE | OxPhos |
| sp\|Q8R1I1\|QCR9_MOUSE | OxPhos |
| sp\|Q91WD5\|NDUS2_MOUSE | OxPhos |
| sp\|Q9CZ13\|QCR1_MOUSE | OxPhos |
| sp\|Q9D6J5\|NDUB8_MOUSE | OxPhos |
| sp\|Q9DB77\|QCR2_MOUSE | OxPhos |
| sp\|Q9DCX2\|ATP5H_MOUSE | OxPhos |
| sp\|O35857\|TIM44_MOUSE | MitoGeneral |
| sp\|P09671\|SODM_MOUSE | MitoGeneral |
| sp\|Q8BK08\|TMM11_MOUSE | MitoGeneral |
| sp\|Q9CZW5\|TOM70_MOUSE | MitoGeneral |
| sp\|Q9D880\|TIM50_MOUSE | MitoGeneral |
| sp\|Q9DCC8\|TOM20_MOUSE | MitoGeneral |
| sp\|P40630\|TFAM_MOUSE | MitoDynamics |
| sp\|P52825\|CPT2_MOUSE | MitoDynamics |
| sp\|P58281\|OPA1_MOUSE | MitoDynamics |
| sp\|Q811U4\|MFN1_MOUSE | MitoDynamics |
| sp\|Q8CGK3\|LONM_MOUSE | MitoDynamics |
| sp\|Q8K1M6\|DNM1L_MOUSE | MitoDynamics |

TABLE 4

List of human mitochondrial proteins and the mitochondrial function correlated to each human mitochondrial protein.

| Human Mitochondrial Protein | Mitochondrial Function |
|---|---|
| sp\|O75390\|CISY_HUMAN | TCA |
| sp\|P07954\|FUMH_HUMAN | TCA |
| sp\|P08237\|PFKAM_HUMAN | TCA |
| sp\|P08559\|ODPA_HUMAN | TCA |
| sp\|P19367\|HXK1_HUMAN | TCA |
| sp\|P40926\|MDHM_HUMAN | TCA |
| sp\|P48735\|IDHP_HUMAN | TCA |
| sp\|Q02218\|ODO1_HUMAN | TCA |
| sp\|Q99798\|ACON_HUMAN | TCA |
| sp\|P21912\|SDHB_HUMAN | TCA/OxPhos |
| sp\|P31040\|SDHA_HUMAN | TCA/OxPhos |
| sp\|Q99643\|C560_HUMAN | TCA/OxPhos |
| sp\|O75306\|NDUS2_HUMAN | OxPhos |

TABLE 4-continued

List of human mitochondrial proteins and the mitochondrial function correlated to each human mitochondrial protein.

| Human Mitochondrial Protein | Mitochondrial Function |
| --- | --- |
| sp\|O75947\|ATP5H_HUMAN | OxPhos |
| sp\|O95169\|NDUB8_HUMAN | OxPhos |
| sp\|P00156\|CYB_HUMAN | OxPhos |
| sp\|P00403\|COX2_HUMAN | OxPhos |
| sp\|P03915\|NU5M_HUMAN | OxPhos |
| sp\|P03928\|ATP8_HUMAN | OxPhos |
| sp\|P13073\|COX41_HUMAN | OxPhos |
| sp\|P22695\|QCR2_HUMAN | OxPhos |
| sp\|P25705\|ATPA_HUMAN | OxPhos |
| sp\|P31930\|QCR1_HUMAN | OxPhos |
| sp\|Q9UDW1\|QCR9_HUMAN | OxPhos |
| sp\|O00429\|DNM1L_HUMAN | MitoDynamics |
| sp\|O60313\|OPA1_HUMAN | MitoDynamics |
| sp\|O95140\|MFN2_HUMAN | MitoDynamics |
| sp\|Q00059\|TFAM_HUMAN | MitoDynamics |
| sp\|Q8IWA4\|MFN1_HUMAN | MitoDynamics |
| sp\|O43615\|TIM44_HUMAN | MitoGeneral |
| sp\|O94826\|TOM70_HUMAN | MitoGeneral |
| sp\|P04179\|SODM_HUMAN | MitoGeneral |
| sp\|P11498\|PYC_HUMAN | MitoGeneral |
| sp\|P17152\|TMM11_HUMAN | MitoGeneral |
| sp\|P23786\|CPT2_HUMAN | MitoGeneral |
| sp\|Q3ZCQ8\|TIM50_HUMAN | MitoGeneral |

Some embodiments of the present invention can be defined as any of the following numbered paragraphs:

1. A method for obtaining a mitochondrial protein biomarker signature for a subject, the method comprising:
   obtaining a sample from the subject;
   treating the sample with one or more proteases to obtain a digested sample comprising one or more peptides;
   measuring the peptides in the digested sample, wherein the measuring is performed using a mass spectrometry technique; and
   correlating the peptides to one or more mitochondrial proteins so as to obtain a mitochondrial protein biomarker signature for the subject.
2. The method of paragraph 1, wherein the one or more peptides are correlated to one or more mitochondrial proteins according to Table 1 or Table 2.
3. The method of paragraph 1, wherein the mitochondrial protein biomarker signature is correlated to one or more mitochondrial functions.
4. The method of paragraph 3, wherein the mitochondrial functions are selected from one or more of tricarboxylic acid cycle (TCA cycle), oxidative phosphorylation (OxPhos), MitoGeneral, and MitoDynamics.
5. The method of paragraph 1, wherein the one or more peptides are correlated to one or more mitochondrial proteins according to Table 1.
6. The method of paragraph 1, wherein the one or more peptides are correlated to one or more mitochondrial proteins according to Table 2.
7. The method of paragraph 6, wherein the one or more mitochondrial proteins according to Table 2 are correlated to one or more mitochondrial functions according to Table 3.
8. The method of paragraph 1, wherein the subject is a mouse.
9. The method of paragraph 1, wherein the subject is a human.
10. The method of paragraph 1, wherein the protease is trypsin, chymotrypsin, endoproteinase Lys-C, endoproteinase Asp-N, pepsin, thermolysin, papain, proteinase K, subtilisin, clostripain, exopeptidase, carboxypeptidase, cathepsin C, cyanogen bromide, formic acid, hydroxylamine, or NTCB, or a combination thereof.
11. The method of paragraph 1, wherein the mass spectrometry technique is multiple reaction monitoring (MRM) or parallel reaction monitoring (PRM).
12. The method of paragraph 1, wherein the one or more mitochondrial proteins and/or the one or more peptides in the sample are modified.
13. The method of paragraph 12, wherein the one or more mitochondrial proteins and/or the one or more peptides in the sample are chemically modified.
14. The method of paragraph 12, wherein the modification is any one or more of phosphorylation, methylation, acetylation, o-GlycNacylation, s-nitrosylation, citrullination, sumoylation, ubiquitinylation, neddylation, methyglyoxylation, or a post-translational modification.
15. The method of paragraph 1, further comprising adding one or more internal standards to the sample.
16. The method of paragraph 15, wherein the internal standard comprises one or more isotopically labeled peptides, one or more isotopically labeled proteins, or any combination thereof.
17. The method of paragraph 1, further comprising: comparing the mitochondrial protein biomarker signature from the subject to a mitochondrial protein biomarker signature from a reference sample.
18. The method of paragraph 17, wherein a change in the mitochondrial protein biomarker signature from the subject relative to the mitochondrial protein biomarker signature from the reference sample is indicative of mitochondrial function in the subject.
19. The method of paragraph 17, further comprising making an assessment of the subject based on the comparison, wherein the assessment is a determination of one or more mitochondrial functions in the subject relative to one or more mitochondrial functions in the reference sample.
20. The method of paragraph 1, wherein the sample is a tissue sample.
21. A kit for obtaining a mitochondrial protein biomarker signature for a subject, the kit comprising:
   (a) one or more internal standards suitable for mass spectrometry;
   (b) one or more proteases;
   (c) reagents and instructions for sample processing and preparation; and
   (d) instructions for using the kit to obtain the mitochondrial biomarker signature for the subject.
22. The kit of paragraph 21, wherein the internal standard comprises one or more isotopically labeled peptides, one or more isotopically labeled proteins, or any combination thereof.
23. The kit of paragraph 21, wherein the protease is trypsin, chymotrypsin, endoproteinase Lys-C, endoproteinase Asp-N, pepsin, thermolysin, papain, proteinase K, subtilisin, clostripain, exopeptidase, carboxypeptidase, cathepsin C, cyanogen bromide, formic acid, hydroxylamine, or NTCB, or a combination thereof.
24. A method for quantifying mitochondrial protein abundance in a subject, comprising:
   obtaining a sample from the subject;
   treating the sample with one or more proteases to obtain a digested sample comprising one or more peptides;
   measuring the peptides in the digested sample, wherein the measuring is performed using a mass spectrometry technique; and correlating the peptides to one or more mitochondrial proteins so as to quantify mitochondrial protein abundance in the subject.

25. The method of paragraph 24, wherein the one or more peptides are correlated to one or more mitochondrial proteins according to Table 1 or Table 2.

26. The method of paragraph 24, wherein the subject is a mouse.

27. The method of paragraph 24, wherein the subject is a human.

28. The method of paragraph 24, wherein the protease is trypsin, chymotrypsin, endoproteinase Lys-C, endoproteinase Asp-N, pepsin, thermolysin, papain, proteinase K, subtilisin, clostripain, exopeptidase, carboxypeptidase, cathepsin C, cyanogen bromide, formic acid, hydroxylamine, or NTCB, or a combination thereof.

29. The method of paragraph 24, wherein the mass spectrometry technique is multiple reaction monitoring (MRM) or parallel reaction monitoring (PRM).

30. The method of paragraph 24, wherein the one or more mitochondrial proteins and/or the one or more peptides in the sample are modified.

31. The method of paragraph 30, wherein the one or more mitochondrial proteins and/or the one or more peptides in the sample are chemically modified.

32. The method of paragraph 30, wherein the modification is any one or more of phosphorylation, methylation, acetylation, o-GlycNacylation, s-nitrosylation, citrullination, sumoylation, ubiquitinylation, neddylation, methyglyoxylation, or a post-translational modification.

33. The method of paragraph 24, further comprising adding one or more internal standards to the sample.

34. The method of paragraph 33, wherein the internal standard comprises one or more isotopically labeled peptides, one or more isotopically labeled proteins, or any combination thereof.

35. A method for determining mitochondrial protein content in a subject, comprising:
obtaining a sample from the subject;
treating the sample with one or more proteases to obtain a digested sample comprising one or more peptides;
measuring the peptides in the digested sample, wherein the measuring is performed using a mass spectrometry technique; and
correlating the peptides to one or more mitochondrial proteins so as to determine mitochondrial protein content in the subject.

36. The method of paragraph 35, wherein the one or more peptides are correlated to one or more mitochondrial proteins according to Table 1 or Table 2.

37. The method of paragraph 35, wherein the subject is a mouse.

38. The method of paragraph 35, wherein the subject is a human.

39. The method of paragraph 35, wherein the protease is trypsin, chymotrypsin, endoproteinase Lys-C, endoproteinase Asp-N, pepsin, thermolysin, papain, proteinase K, subtilisin, clostripain, exopeptidase, carboxypeptidase, cathepsin C, cyanogen bromide, formic acid, hydroxylamine, or NTCB, or a combination thereof.

40. The method of paragraph 35, wherein the mass spectrometry technique is multiple reaction monitoring (MRM) or parallel reaction monitoring (PRM).

41. The method of paragraph 35, wherein the one or more mitochondrial proteins and/or the one or more peptides in the sample are modified.

42. The method of paragraph 41, wherein the one or more mitochondrial proteins and/or the one or more peptides in the sample are chemically modified.

43. The method of paragraph 41, wherein the modification is any one or more of phosphorylation, methylation, acetylation, o-GlycNacylation, s-nitrosylation, citrullination, sumoylation, ubiquitinylation, neddylation, methyglyoxylation, or a post-translational modification.

44. The method of paragraph 35, further comprising adding one or more internal standards to the sample.

45. The method of paragraph 44, wherein the internal standard comprises one or more isotopically labeled peptides, one or more isotopically labeled proteins, or any combination thereof.

46. The method according to any one of paragraphs 16, 22, 34 or 45, wherein the isotopically labeled proteins is an isotopically labeled mitochondrial protein.

46a. The method of paragraph 5, wherein the one or more mitochondrial proteins according to Table 1 are correlated to one or more mitochondrial functions according to Table 4.

Some embodiments of the present invention can be defined as any of the following numbered paragraphs:

47. A method for identifying and quantifying at least one human mitochondrial protein in a sample, comprising: i) obtaining the sample, wherein the sample has been treated with a protease that digests the human mitochondrial protein into at least one target peptide, wherein the target peptide is selected from the group consisting of SEQ ID NOs: 1-77, and combinations thereof; wherein the protease is trypsin, and wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; ii) adding an internal standard to the sample, wherein the internal standard comprises 77 reference peptides having SEQ ID NOs: 1-77, and each reference peptide is labeled with a stable isotope, wherein each reference peptide is present in the internal standard in a known quantity, and wherein each reference peptide has a known mass-to-charge ratio (m/z) and retention time (rt); iii) analyzing the sample from step ii) by mass spectrometry; iv) identifying the target peptide by comparing the target peptide mass-to-charge ratio (m/z) and retention time (rt) to the known reference peptide mass-to-charge ratio (m/z) and retention time (rt); v) identifying the human mitochondrial protein in the sample by correlating the target peptide to the human mitochondrial protein according to Table 1; vi) calculating a peak area and an area ratio for the target peptide and for each reference peptide; vii) determining a molar ratio for the target peptide from the known quantity of the reference peptide; viii) calculating a concentration of the target peptide from the molar ratio; and ix) quantifying the human mitochondrial protein in the sample from the concentration of the target peptide.

48. The method of paragraph 47, wherein the mass spectrometry is selected from the group consisting of LC-MS, LC-MS/MS, LC-SRM-MS, LC-MRM-MS, and LC-PRM-MS.

49. The method of paragraph 47, wherein the sample is from a human subject, and the sample is selected from the group consisting of cells, tissue, and combinations thereof.

50. The method of paragraph 49, wherein the cells are selected from the group consisting of cells of primary origins, cells of immortalized origins, and combinations thereof.

51. The method of paragraph 49, wherein the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof.

52. The method of paragraph 51, wherein the leukocyte cells are selected from the group consisting of monocyte cells, macrophage cells, neutrophil cells, and combinations thereof.

53. The method of paragraph 49, wherein the cells are selected from the group consisting of monocyte cells, macrophage cells, neutrophil cells, and combinations thereof.

54. The method of paragraph 47, wherein the stable isotope is selected from the group consisting of $^{15}N$, $^{13}C$, $^{18}O$, and $^{2}H$.

55. A method of determining a mitochondrial protein biomarker signature for a human subject, the method comprising: i) obtaining a sample from the human subject, wherein the sample comprises at least one human mitochondrial protein, wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; ii) contacting the sample with a protease that digests the human mitochondrial protein into at least one target peptide, wherein the target peptide is selected from the group consisting of SEQ ID NOs: 1-77, and combinations thereof; and wherein the protease is trypsin; iii) adding an internal standard to the sample, wherein the internal standard comprises 77 reference peptides having SEQ ID NOs: 1-77 and each reference peptide is labeled with a stable isotope, wherein each reference peptide is present in the internal standard in a known quantity, and wherein each reference peptide has a known mass-to-charge ratio (m/z) and retention time (rt); iv) analyzing the sample from step iii) by mass spectrometry; v) identifying the target peptide by comparing the target peptide mass-to-charge ratio (m/z) and retention time (rt) to the known reference peptide mass-to-charge ratio (m/z) and retention time (rt); and vi) determining the human mitochondrial protein biomarker signature for the human subject by correlating the target peptide to the human mitochondrial protein according to Table 1.

56. The method of paragraph 55, further comprising comparing the human mitochondrial protein biomarker signature from the human subject to a human mitochondrial protein biomarker signature from a reference sample, wherein a change in the human mitochondrial protein biomarker signature from the human subject compared to the human mitochondrial protein biomarker signature from the reference sample is indicative of a change in mitochondrial function in the human subject.

57. The method of paragraph 56, wherein the mitochondrial function is selected from the group consisting of tricarboxylic acid cycle (TCA cycle), oxidative phosphorylation (OxPhos), MitoGeneral, MitoDynamics, and combinations thereof.

58. The method of paragraph 55, wherein the mass spectrometry is selected from the group consisting of LC-MS, LC-MS/MS, LC-SRM-MS, LC-MRM-MS, and LC-PRM-MS.

59. The method of paragraph 55, wherein the sample is selected from the group consisting of cells, tissue, and combinations thereof.

60. The method of paragraph 59, wherein the cells are selected from the group consisting of cells of primary origins, cells of immortalized origins, and combinations thereof.

61. The method of paragraph 60, wherein the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof.

62. The method of paragraph 61, wherein the leukocyte cells are selected from the group consisting of monocyte cells, macrophage cells, neutrophil cells, and combinations thereof.

63. The method of paragraph 59, wherein the cells are selected from the group consisting of monocyte cells, macrophage cells, neutrophil cells, and combinations thereof.

64. The method of paragraph 55, wherein the stable isotope is selected from the group consisting of $^{15}N$, $^{13}C$, $^{18}O$, and $^{2}H$.

65. A kit for identifying and quantifying at least one human mitochondrial protein in a sample by mass spectrometry, comprising: (a) reagents and instructions for tryptic digestion of the human mitochondrial protein, wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; and wherein the tryptic digestion of the human mitochondrial protein provides at least one target peptide, wherein the target peptide is selected from the group consisting of SEQ ID NOs: 1-77, and combinations thereof; (b) an internal standard, wherein the internal standard comprises 77 reference peptides having SEQ ID NOs: 1-77 and each reference peptide is labeled with a stable isotope, wherein each reference peptide is present in the internal standard in a known quantity, and wherein each reference peptide has a known mass-to-charge ratio (m/z) and retention time (rt); (c) reagents and instructions for preparing and processing the sample; and (d) reagents and instructions for using the kit to identify and quantify the human mitochondrial protein in the sample by mass spectrometry.

66. The kit of paragraph 65, wherein the reagents for tryptic digestion of the human mitochondrial protein comprise a reducing agent, an alkylating agent, trypsin, a buffer, and an acid.

67. The kit of paragraph 65, wherein the reagents for preparing and processing the sample comprise C18 clean up tips and/or plates, acetonitrile, and 0.1% formic acid in water.

68. The kit of paragraph 65, wherein the mass spectrometry is selected from the group consisting of LC-MS, LC-MS/MS, LC-SRM-MS, LC-MRM-MS, and LC-PRM-MS.

69. The kit of paragraph 65, wherein the sample is from a human subject, and the sample is selected from the group consisting of cells, tissue, and combinations thereof.

70. The kit of paragraph 69, wherein the cells are selected from the group consisting of cells of primary origins, cells of immortalized origins, and combinations thereof.

71. The kit of paragraph 69, wherein the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof.

72. The kit of paragraph 71, wherein the leukocyte cells are selected from the group consisting of monocyte cells, macrophage cells, neutrophil cells, and combinations thereof.

73. The kit of paragraph 69, wherein the cells are selected from the group consisting of monocyte cells, macrophage cells, neutrophil cells, and combinations thereof.

74. The kit of paragraph 65, wherein the stable isotope is selected from the group consisting of $^{15}$N, $^{13}$C, $^{18}$O, and $^{2}$H.

75. A mass spectrometry multiplex assay for identifying and quantifying at least one human mitochondrial protein in a sample, comprising: i) obtaining the sample, wherein the sample has been treated or contacted with a protease that digests the human mitochondrial protein into at least one target peptide, wherein the target peptide is selected from the group consisting of SEQ ID NOs: 1-77, and combinations thereof; wherein the protease is trypsin, and wherein the human mitochondrial protein is selected from the group consisting of DNM1L (UniProt Accession No. O00429), TIM44 (UniProt Accession No. O43615), OPA1 (UniProt Accession No. O60313), NDUS2 (UniProt Accession No. O75306), CISY (UniProt Accession No. O75390), ATP5H (UniProt Accession No. O75947), TOM70 (UniProt Accession No. O94826), MFN2 (UniProt Accession No. O95140), NDUB8 (UniProt Accession No. O95169), CYB (UniProt Accession No. P00156), COX2 (UniProt Accession No. P00403), NU5M (UniProt Accession No. P03915), ATP8 (UniProt Accession No. P03928), SODM (UniProt Accession No. P04179), FUMH (UniProt Accession No. P07954), PFK (UniProt Accession No. P08237), PDH1 (UniProt Accession No. P08559), PYC (UniProt Accession No. P11498), COX41 (UniProt Accession No. P13073), TMM11 (UniProt Accession No. P17152), HXK1 (UniProt Accession No. P19367), SDHB (UniProt Accession No. P21912), QCR2 (UniProt Accession No. P22695), CPT2 (UniProt Accession No. P23786), ATPA (UniProt Accession No. P25705), SDHA (UniProt Accession No. P31040), QCR1 (UniProt Accession No. P31930), MDHM (UniProt Accession No. P40926), IDHP (UniProt Accession No. P48735), TFAM (UniProt Accession No. Q00059), ODO1 (UniProt Accession No. Q02218), TIM50 (UniProt Accession No. Q3ZCQ8), MFN1 (UniProt Accession No. Q8IWA4), SDHC (UniProt Accession No. Q99643), ACON (UniProt Accession No. Q99798), QCR9 (UniProt Accession No. Q9UDW1), and combinations thereof; ii) adding an internal standard to the sample, wherein the internal standard comprises 77 reference peptides having SEQ ID NOs: 1-77, and each reference peptide is labeled with a stable isotope, wherein each reference peptide is present in the internal standard in a known quantity, and wherein each reference peptide has a known mass-to-charge ratio (m/z) and retention time (rt); iii) analyzing the sample from step ii) by mass spectrometry; iv) identifying the target peptide by comparing the target peptide mass-to-charge ratio (m/z) and retention time (rt) to the known reference peptide mass-to-charge ratio (m/z) and retention time (rt);) identifying the human mitochondrial protein in the sample by correlating the target peptide to the human mitochondrial protein according to Table 1; vi) calculating a peak area and an area ratio for the target peptide and for each reference peptide; vii) determining a molar ratio for the target peptide from the known quantity of the reference peptide; viii) calculating a concentration of the target peptide from the molar ratio; and ix) quantifying the human mitochondrial protein in the sample from the concentration of the target peptide.

76. The mass spectrometry multiplex assay of paragraph 75, wherein the mass spectrometry is selected from the group consisting of LC-MS, LC-MS/MS, LC-SRM-MS, LC-MRM-MS, and LC-PRM-MS.

77. The mass spectrometry multiplex assay of paragraph 75, wherein the sample is from a human subject.

78. The mass spectrometry multiplex assay of paragraph 75, wherein the sample is selected from the group consisting of cells, tissue, and combinations thereof.

79. The mass spectrometry multiplex assay of paragraph 78, wherein the cells are selected from the group consisting of cells of primary origins, cells of immortalized origins, and combinations thereof.

80. The mass spectrometry multiplex assay of paragraph 78, wherein the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof.

81. The mass spectrometry multiplex assay of paragraph 80, wherein the leukocyte cells are selected from the group consisting of monocyte cells, macrophage cells, neutrophil cells, and combinations thereof.

82. The mass spectrometry multiplex assay of paragraph 78, wherein the cells are selected from the group consisting of monocyte cells, macrophage cells, neutrophil cells, and combinations thereof.

The disclosure is further illustrated by the following examples which should not be construed as limiting. The examples are illustrative only, and are not intended to limit, in any manner, any of the aspects described herein. The following examples do not in any way limit the invention.

EXAMPLES

Human Mitoplex Kit (Version 1)

A. Components: Vials containing 77 stable isotope labeled reference peptides having SEQ ID NOs: 1-77 for identification and quantification of peptides and human mitochondrial proteins in analytical samples according to Table 1. The SIL-reference peptides are lyophilized. Instructions for resuspension of the lyophilized SIL-reference peptides and addition to analytical samples.

B. Buffers and Reagents for: 1) Tryptic digestion: dithiothreitol (DTT), iodoacetamide (IAA), trypsin, ammonium bicarbonate buffer, and trichloroacetic acid. 2) Sample clean up: C18 clean up tips and/or plates, acetonitrile, and 0.1% formic acid in water. 3) Resuspension of SIL-reference peptides and addition to analytical samples: 0.1% formic acid in water.

C. Analysis Options: A) Table 1: List of human mitochondrial proteins and the peptides correlated to each human mitochondrial protein. The peptides in Table 1 were obtained by trypsin digestion of the corresponding human mitochondrial proteins. In Table 1, [CAM] stands for Carboxyamidomethylcysteine.

D. Instructions for: 1) Sample homogenization/lysis. 2) Tryptic digestion. 3) Sample clean up. 4) Mass Spectrometry (MS) acquisition: A) Initial optimization on the SIL-reference peptides. B) Data acquisition of peptides in analytical sample and SIL-reference peptides. 5) Data analysis, identification, and quantification of sample peptides and correlation of the sample peptides to human mitochondrial proteins according to Table 1.

Human Mitoplex Kit (Version 2)

A. Components: Vials containing at least one stable isotope labeled reference peptide selected from the group consisting of SEQ ID NOs: 1-77 for identification and quantification of peptides and human mitochondrial proteins in analytical samples according to Table 1. The SIL-reference peptides are lyophilized. Instructions for resuspension of the lyophilized SIL-reference peptides and addition to analytical samples.

B. Buffers and Reagents for: 1) Tryptic digestion: dithiothreitol (DTT), iodoacetamide (IAA), trypsin, ammonium bicarbonate buffer, and trichloroacetic acid. 2) Sample clean up: C18 clean up tips and/or plates, acetonitrile, and 0.1% formic acid in water. 3) Resuspension of SIL-reference peptides and addition to analytical samples: 0.1% formic acid in water.

C. Analysis Options: A) Table 1: List of human mitochondrial proteins and the peptides correlated to each human mitochondrial protein. The peptides in Table 1 were obtained by trypsin digestion of the corresponding human mitochondrial proteins. In Table 1, [CAM] stands for Carboxyamidomethylcysteine.

D. Instructions for: 1) Sample homogenization/lysis. 2) Tryptic digestion. 3) Sample clean up. 4) Mass Spectrometry (MS) acquisition: A) Initial optimization on the SIL-reference peptides. B) Data acquisition of peptides in analytical sample and SIL-reference peptides. 5) Data analysis, identification, and quantification of sample peptides and correlation of the sample peptides to human mitochondrial proteins according to Table 1.

Mouse Mitoplex Kit (Version 1)

A. Components: Vials containing 74 stable isotope labeled reference peptides having SEQ ID NOs: 78-151 for identification and quantification of peptides and mouse mitochondrial proteins in analytical samples according to Table 2. The SIL-reference peptides are lyophilized. Instructions for resuspension of the lyophilized SIL-reference peptides and addition to analytical samples.

B. Buffers and Reagents for: 1) Tryptic digestion: dithiothreitol (DTT), iodoacetamide (IAA), trypsin, ammonium bicarbonate buffer, and trichloroacetic acid. 2) Sample clean up: C18 clean up tips and/or plates, acetonitrile, and 0.1% formic acid in water. 3) Resuspension of SIL-reference peptides and addition to analytical samples: 0.1% formic acid in water.

C. Analysis Options: A) Table 2: List of mouse mitochondrial proteins and the peptides correlated to each mouse mitochondrial protein. The peptides in Table 2 were obtained by trypsin digestion of the corresponding mouse mitochondrial proteins. In Table 2, [Oxi] stands for oxidation of Methionine.

D. Instructions for: 1) Sample homogenization/lysis. 2) Tryptic digestion. 3) Sample clean up. 4) Mass Spectrometry (MS) acquisition: A) Initial optimization on the SIL-reference peptides. B) Data acquisition of peptides in analytical sample and SIL-reference peptides. 5) Data analysis, identification, and quantification of sample peptides and correlation of the sample peptides to mouse mitochondrial proteins according to Table 2.

Mouse Mitoplex Kit (Version 2)

A. Components: Vials containing at least one stable isotope labeled reference peptide selected from the group consisting of SEQ ID NOs: 78-151 for identification and quantification of peptides and mouse mitochondrial proteins in analytical samples according to Table 2. The SIL-reference peptides are lyophilized. Instructions for resuspension of the lyophilized SIL-reference peptides and addition to analytical samples.

B. Buffers and Reagents for: 1) Tryptic digestion: dithiothreitol (DTT), iodoacetamide (IAA), trypsin, ammonium bicarbonate buffer, and trichloroacetic acid. 2) Sample clean up: C18 clean up tips and/or plates, acetonitrile, and 0.1% formic acid in water. 3) Resuspension of SIL-reference peptides and addition to analytical samples: 0.1% formic acid in water.

C. Analysis Options: A) Table 2: List of mouse mitochondrial proteins and the peptides correlated to each mouse mitochondrial protein. The peptides in Table 2 were obtained by trypsin digestion of the corresponding mouse mitochondrial proteins. In Table 2, [Oxi] stands for oxidation of Methionine.

D. Instructions for: 1) Sample homogenization/lysis. 2) Tryptic digestion. 3) Sample clean up. 4) Mass Spectrometry (MS) acquisition: A) Initial optimization on the SIL-reference peptides. B) Data acquisition of peptides in analytical sample and SIL-reference peptides. 5) Data analysis, identification, and quantification of sample peptides and correlation of the sample peptides to mouse mitochondrial proteins according to Table 2.

General Protocol for Mitoplex Analysis

A. Sample Processing for Mitoplex Analysis
1. For adherent cells, plate seed at least $3 \times 10^5$ cells 24 h prior to collecting the sample.
2. Remove growth media and rinse the wells twice with 2 ml of phosphate-buffered saline.
3. If using non-adherent cells, $5 \times 10^5$ cells should be pelleted at 300 g for 5 min at 4° C., media removed, and cells denatured by the addition of 200 ul of 8M Urea, 50 mM Tris-HCl pH 8.0.
4. The denatured lysate is homogenized with either 3 pulses (10 seconds at 70% power followed by 10 seconds on ice) with a Fisher Scientific Qsonica Sonicator Q125 (or equivalent probe sonicator) or 2 minutes of 10 second pulse/rest cycle in the Qsonica Q800R3.
5. For tissue, place fresh or frozen sample (10-100 mg) into a 12×75 mm polystyrene test tube containing 200-1 ml of 8M Urea, 50 mM Tris-HCl pH 8.0. The tissue is homogenized with 3 pulses (5 sec, 50% power) from Fisher Scientific PowerGen 125 homogenizer with a 7 mm diameter saw tooth probe.
6. Homogenized lysate can be stored at −80° C.

B. Generation of Peptides for Mitoplex Analysis
1. Aliquot a known amount (typically 50 ug) of protein lysate into a fresh tube.
2. Dilute 1:2 in 200 mM Ammonium Bicarbonate buffer containing 20 mM Ditriothreitol (DTT) reducing agent, incubate 15-30 minutes at 37 degrees Celsius.
3. Dilute an additional 1:2 in 200 mM Ammonium Bicarbonate buffer containing 200 mM iodoacetamide, incubate 15-30 minutes at room temperature in the dark.
4. Add acetonitrile to a final of 20% total volume of digestion reaction.
5. Add 1 ug of trypsin per 50 ug of protein and digest the sample for 4-16 hours at 37 degrees Celsius (time depends on sample complexity and is optimized on a per sample basis).
6. Acidify samples to 1% Trifluoroacetic acid (TFA).
7. Perform a C18 resin based desalting clean up, dry completely (can be stored at −20 as dried peptides).

C. Acquisition of Data on LC-MS
1. Load transition list for heavy and light peptide sets into acquisition instrument software.
2. Perform an injection of the SIL-reference peptides only to verify acquisition settings and chromatography set up is optimized. Adjust settings and retention times as needed.
3. Resuspend dried peptides using a 1:500 dilution of SIL-reference peptide pool in 0.1% Formic Acid in ultrapure water at a concentration of 2 ug/uL.
4. Inject each sample for acquisition (typically 8-12 ug of protein lysate on column, but this should be optimized on a per sample/experiment basis) using the human (Table 1) or mouse (Table 2) mitoplex acquisition library.

D. Data Analysis
1. Currently mitoplex is analyzed using the open source Skyline data analysis tool.
2. Upload the appropriate mitoplex transition list into Skyline.
3. Import data files and inspect peaks as per typical targeted mass spectrometry data analysis protocol.
4. Export peak areas and perform peptide-level and protein level quantification and statistical analysis as per typical proteomic approaches and experimental design/demands.

Example 1

Figure 8A:
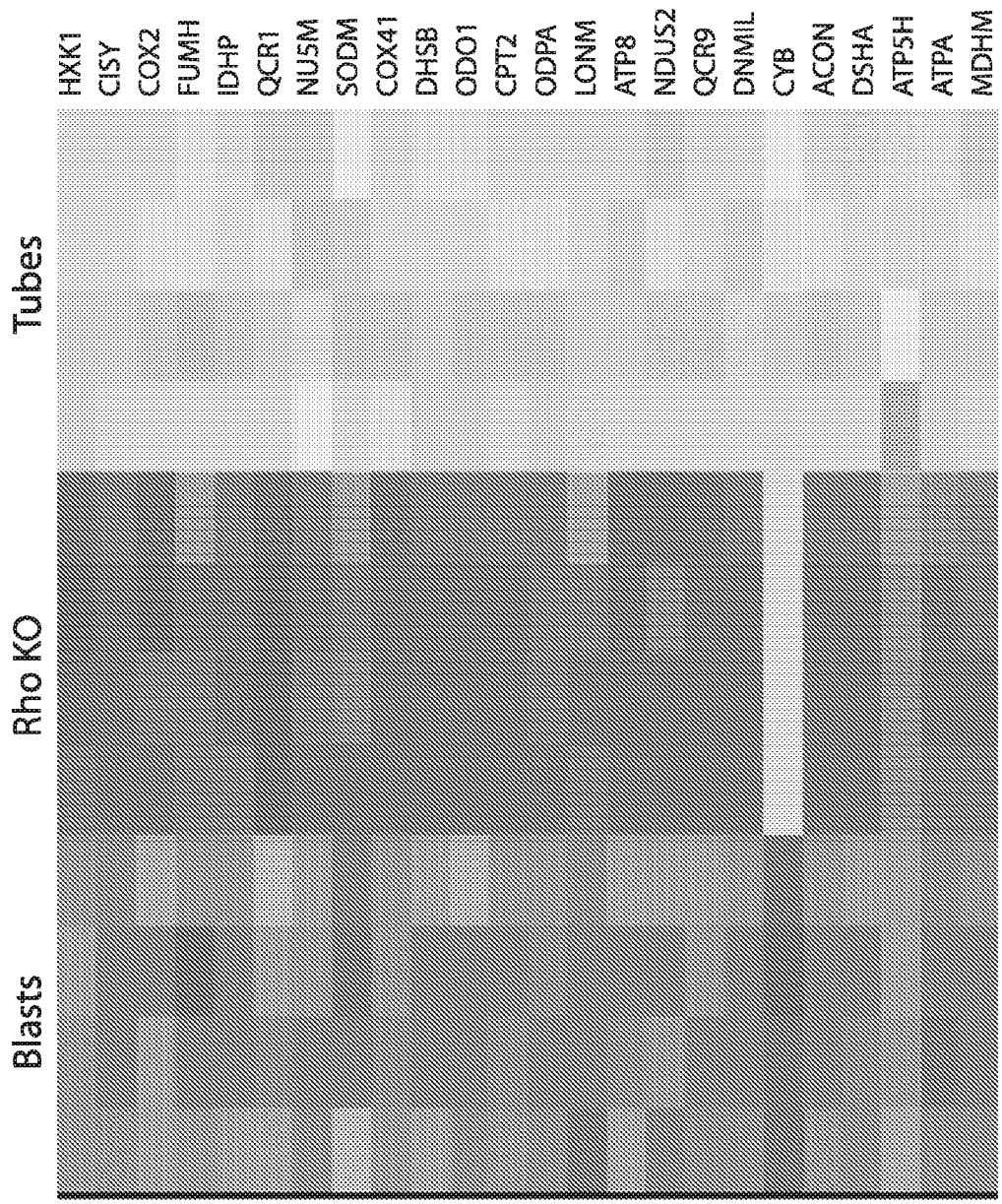
Figure 8B:
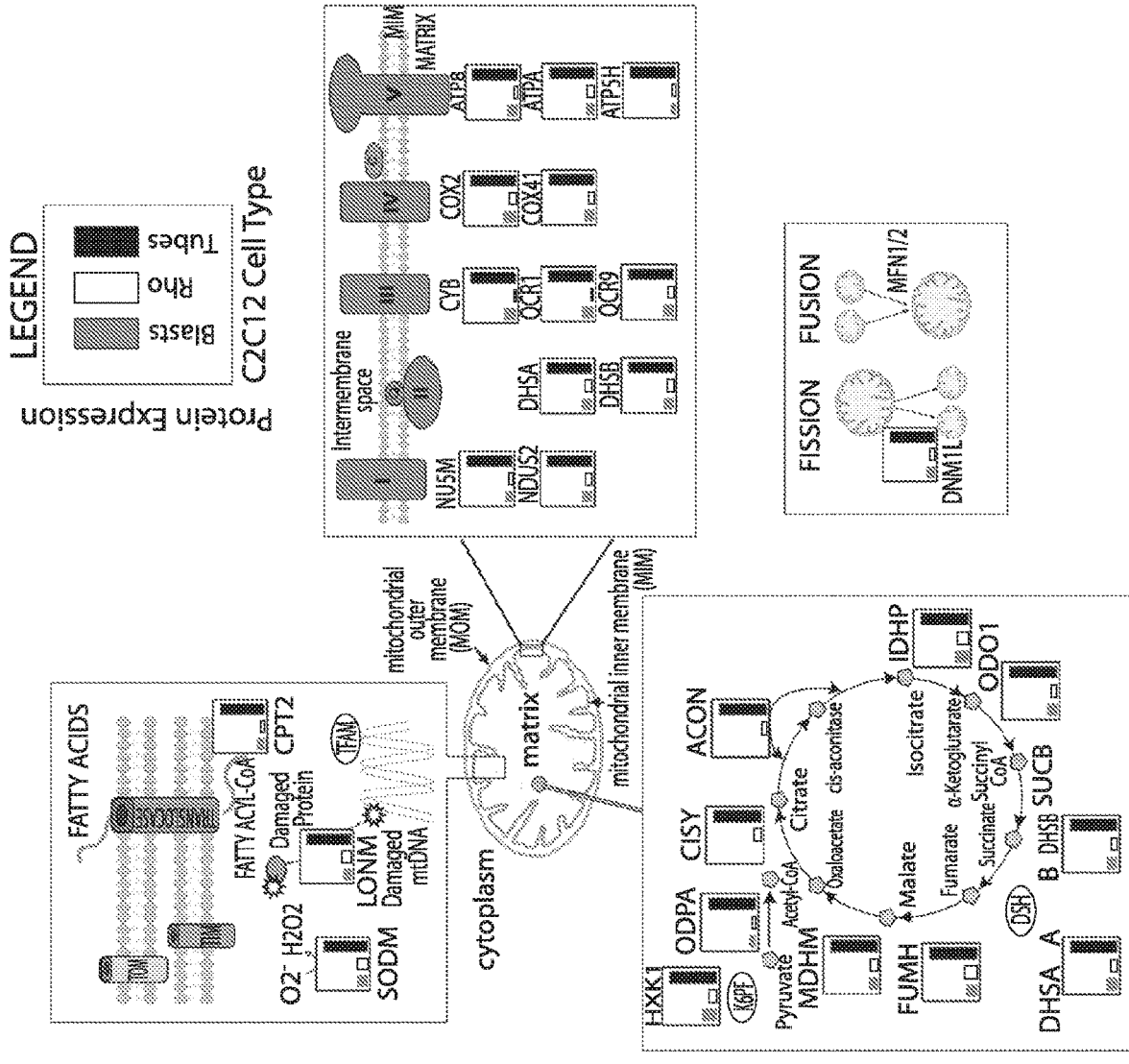
Figure 9A:
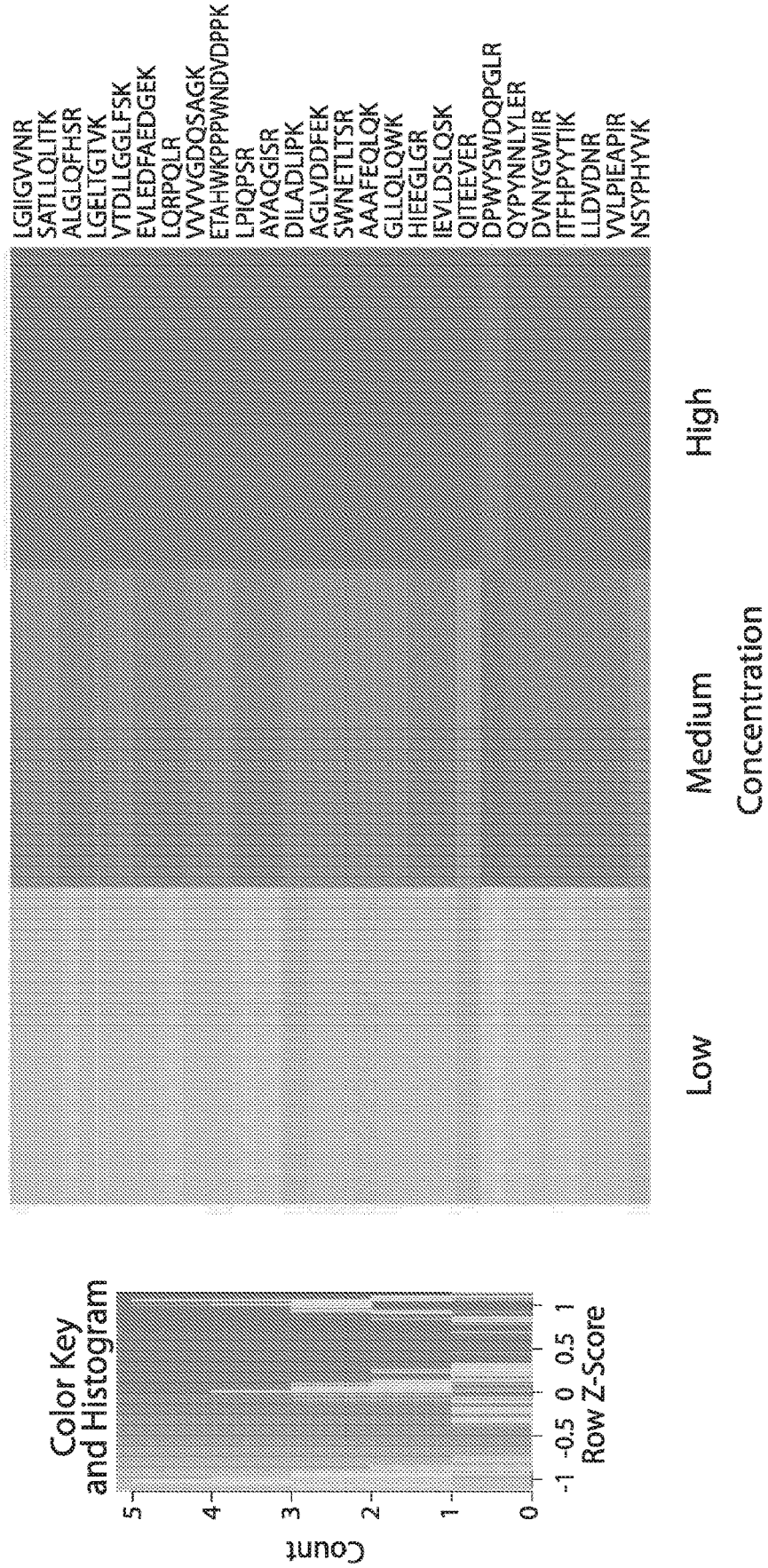
FIG. 9A-FIG. 9B depicts in accordance with various embodiments of the invention, human stable isotope labeled reference peptides performance in cell matrix. Performance data on Stable Isotope Labelled peptides spiked into human whole cell lysate at three different concentrations. Data show excellent linearity of quantified peptide data across the three concentrations, as well as the majority of peptides with technical %/CVs less than 20.
Figure 9A:
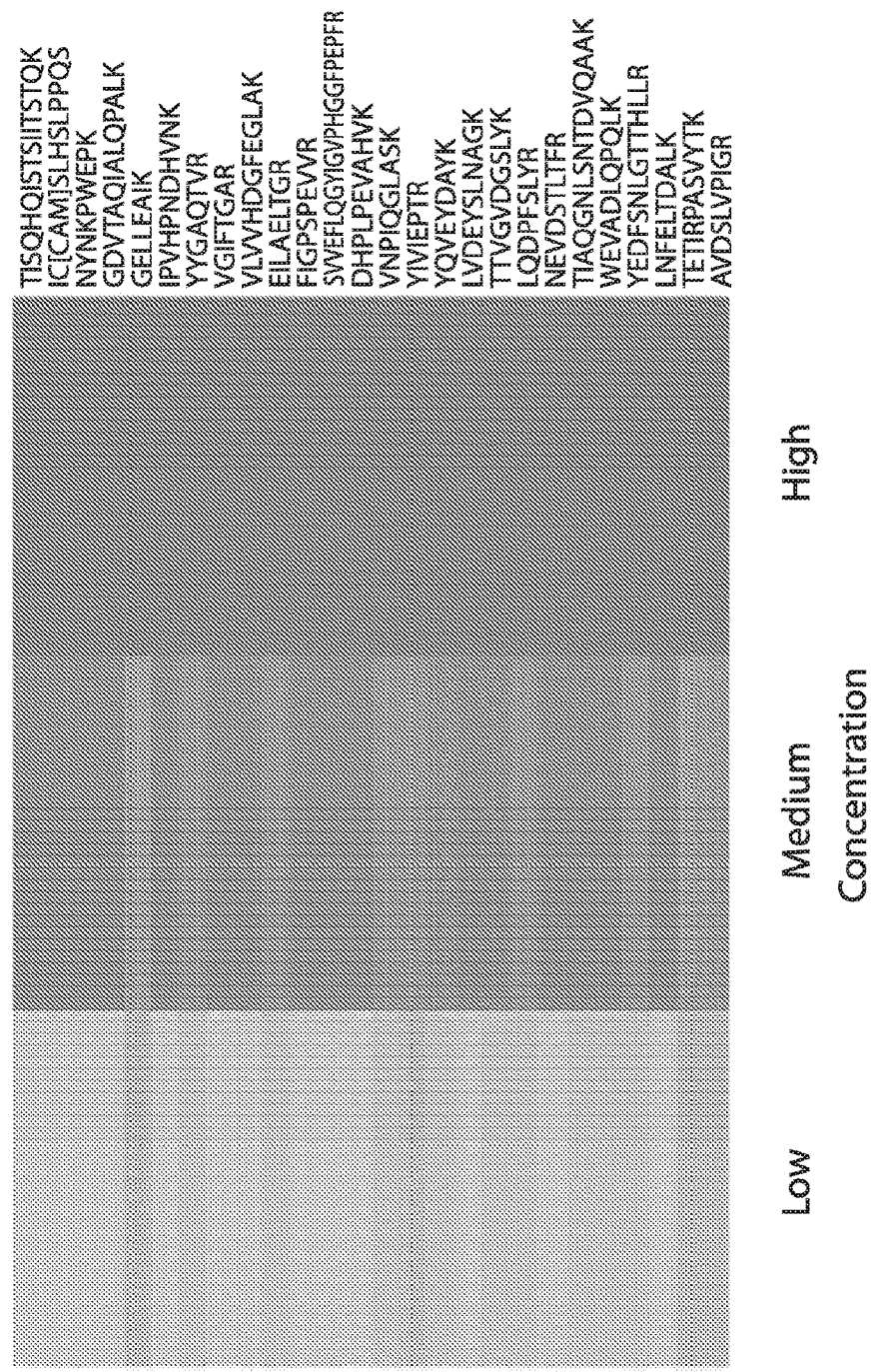
Figure 9A:
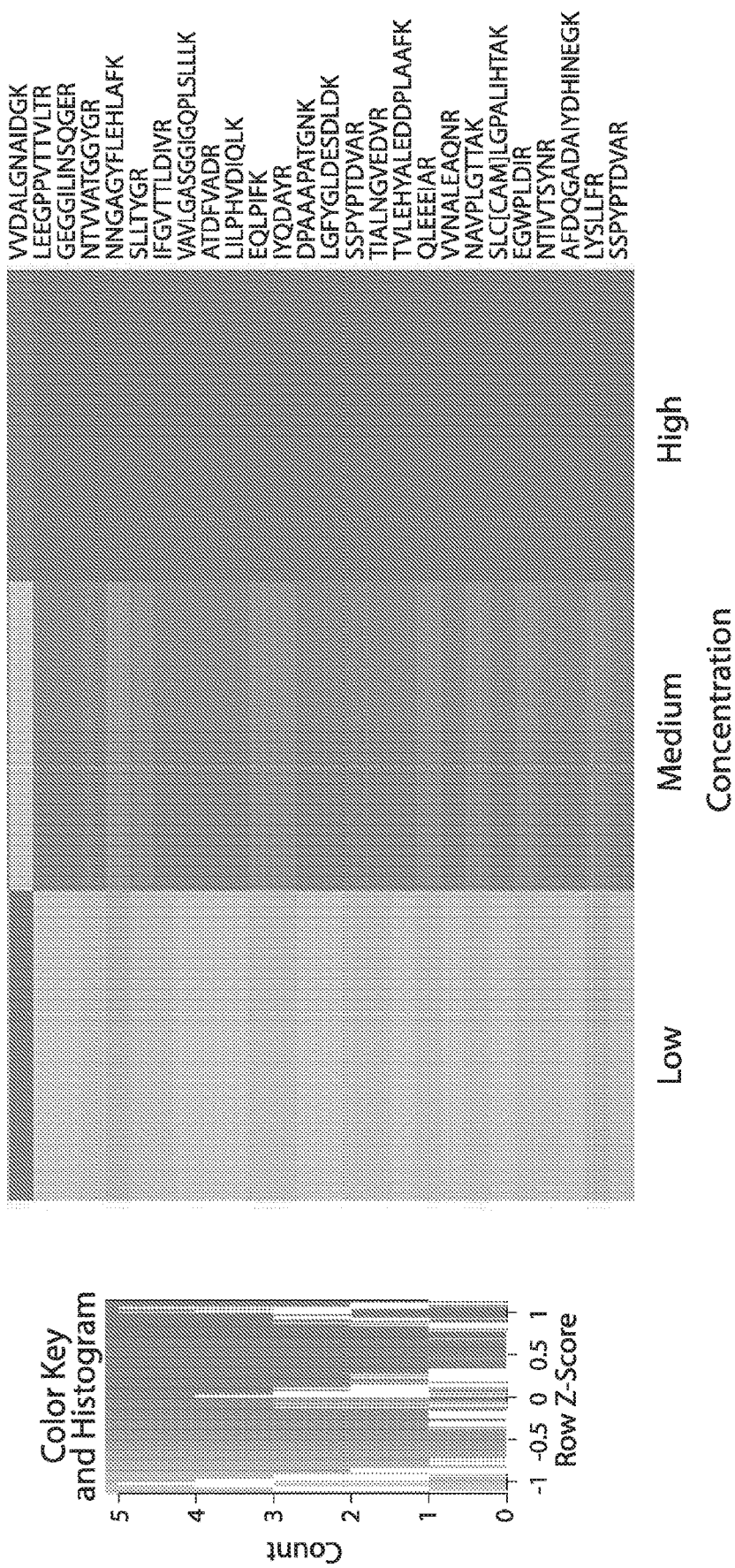
Figure 9B:
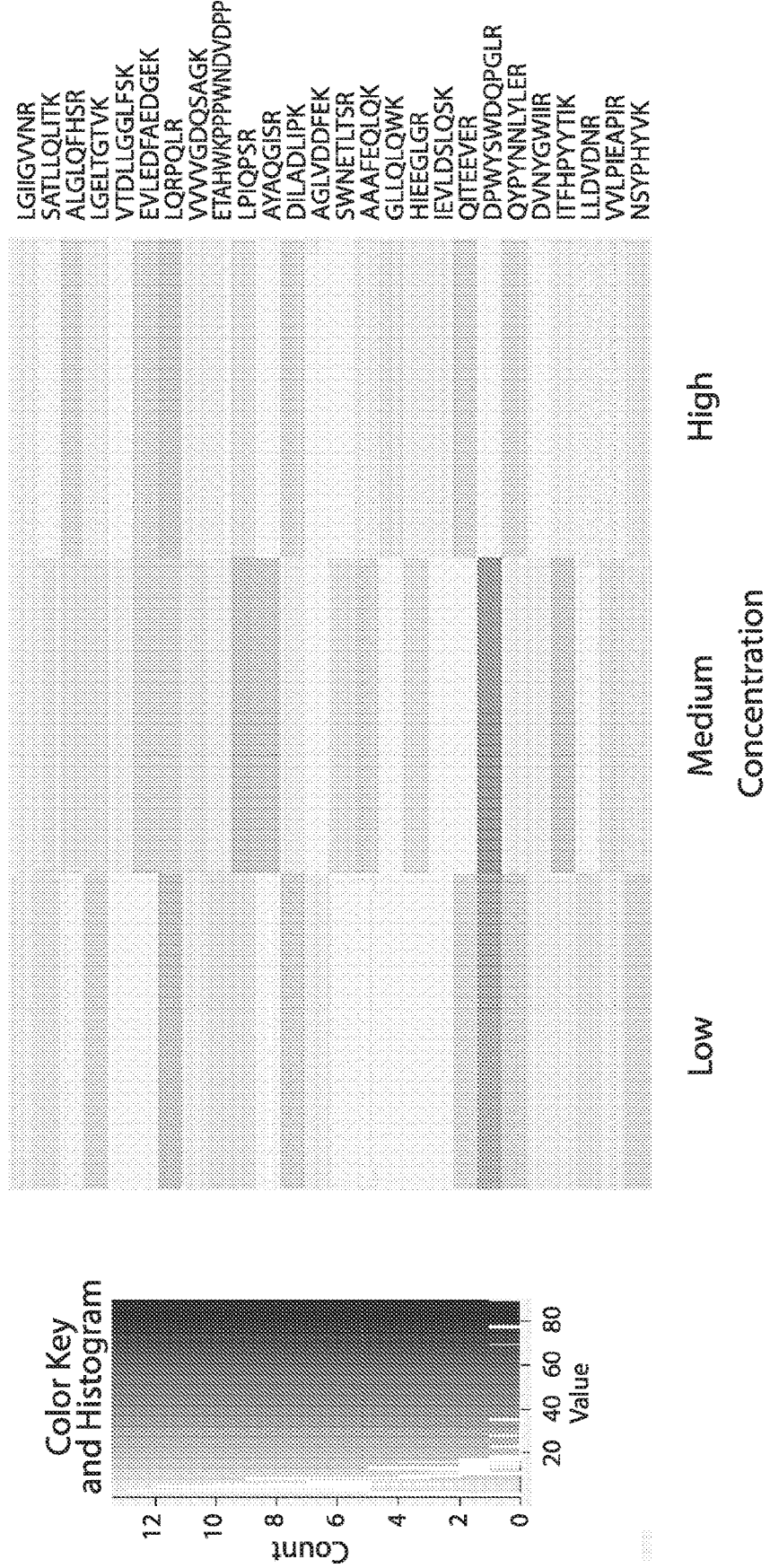
Figure 9B:
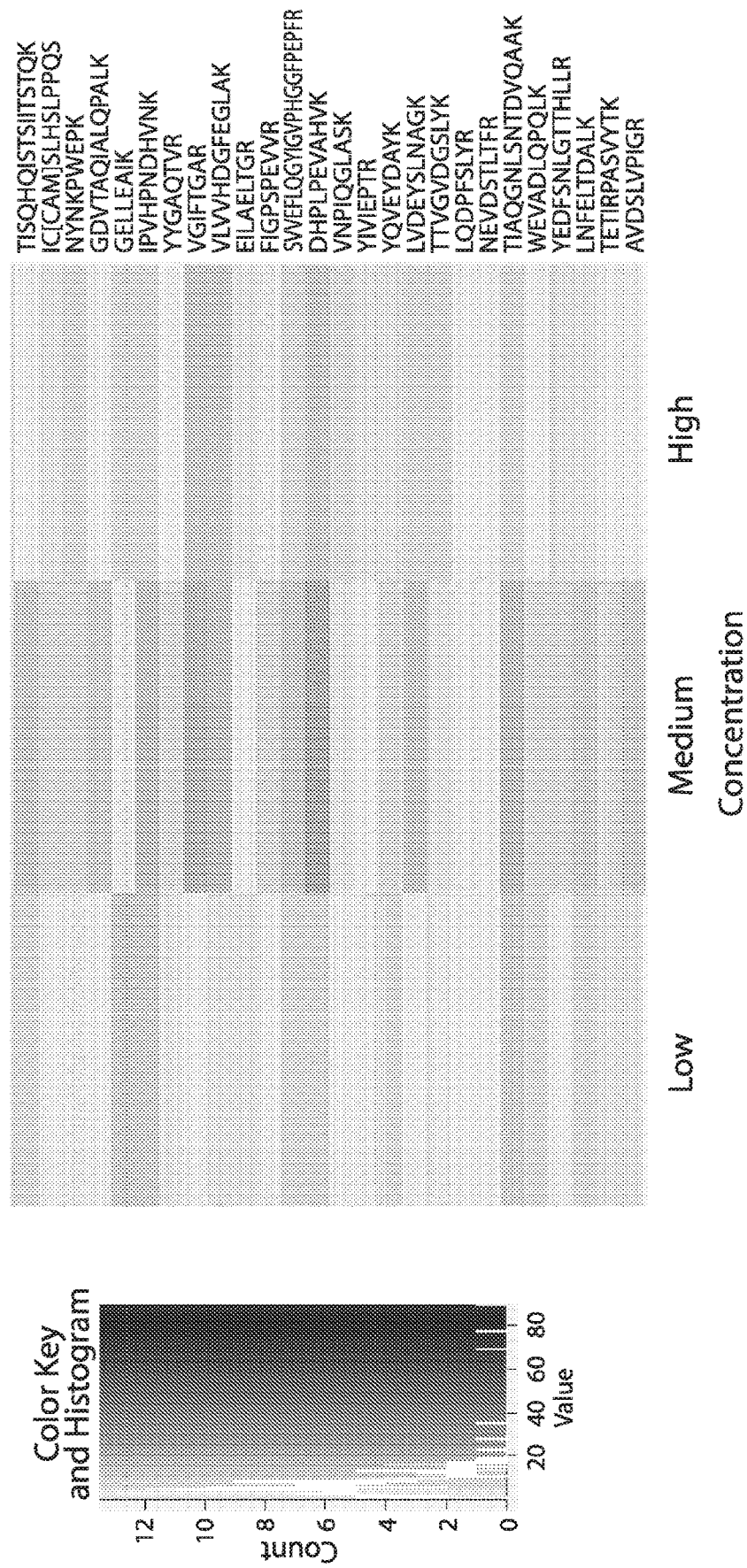

Three cell types were used to test the performance of the mouse mitoplex in terms of quantifying meaningful biology in mice whole cell lysate as shown in FIG. 8A-FIG. 8C. C2C12s 'Rho⁰' cells lack mitochondrial DNA and therefore are unable to undergo mitochondrial biogenesis, have very low mitochondrial protein expression, and minimal respiration. C2C12 'myoblasts' are in a proliferative, non-contractile stage that is well known to exhibit low mitochondrial content, and C2C12 myotubes which have a large upregulation of mitochondria relative to C2C12 myoblast cells. The mitochondrial data across these three cell types was also assayed by western blot, the otherwise 'state of the art' in which only 5 proteins could be quantified in the antibody-based 'multiplex' (Sin et al., Autophagy, 2016, 12(2), 369-380). While in general the western blot data corroborate the mitoplex data, the mouse mitoplex confirms these expression patterns across a substantially larger number of targets (in this study, N=26 proteins) all acquired simultaneously for each sample.

Example 2

Figure 10A:
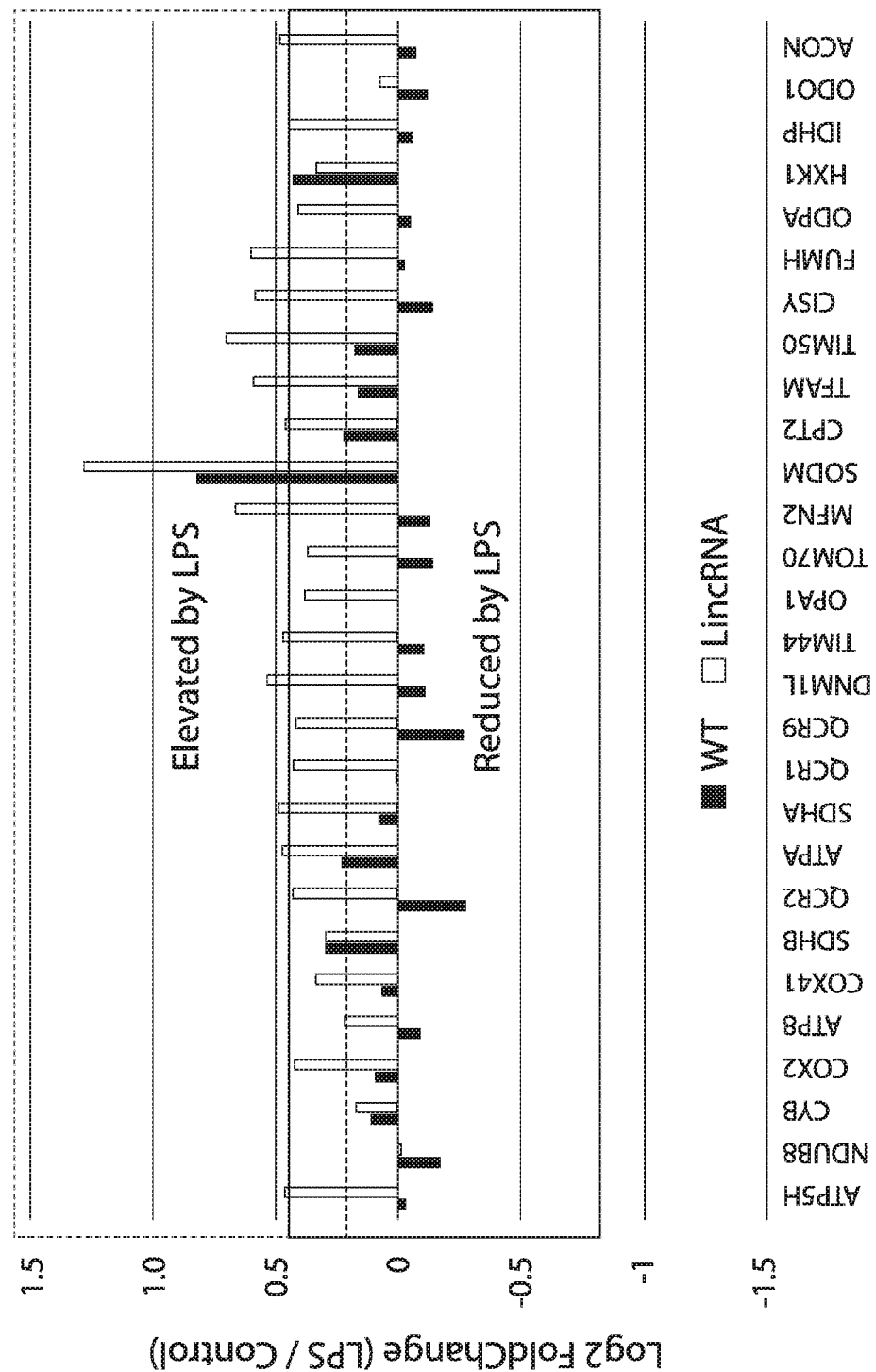
FIG. 10A-FIG. 10B depicts in accordance with various embodiments of the invention, the ability of the human mitoplex to detect meaningful changes in human whole cell lysates. Normal and genetically modified (a specific nonconding lincRNA overexpressing) human monocytes were contacted with lipopolysaccharide (LPS), which has been shown to promote mitochondrial biogenesis in some contexts. In control human leukemic monocytes (THP1 human cell line, ATCC 88081201 stably transfected with a scrambled lincRNA construct) little response to LPS was observed in terms of mitochondrial protein expression. However, in monocytes stably transfected with an interferon gamma inducible linc RNA, Linc1050, the human mitoplex profiled a notable reduction in several mitochondrial proteins that was restored to normal levels by contacting with LPS.
Figure 10B:
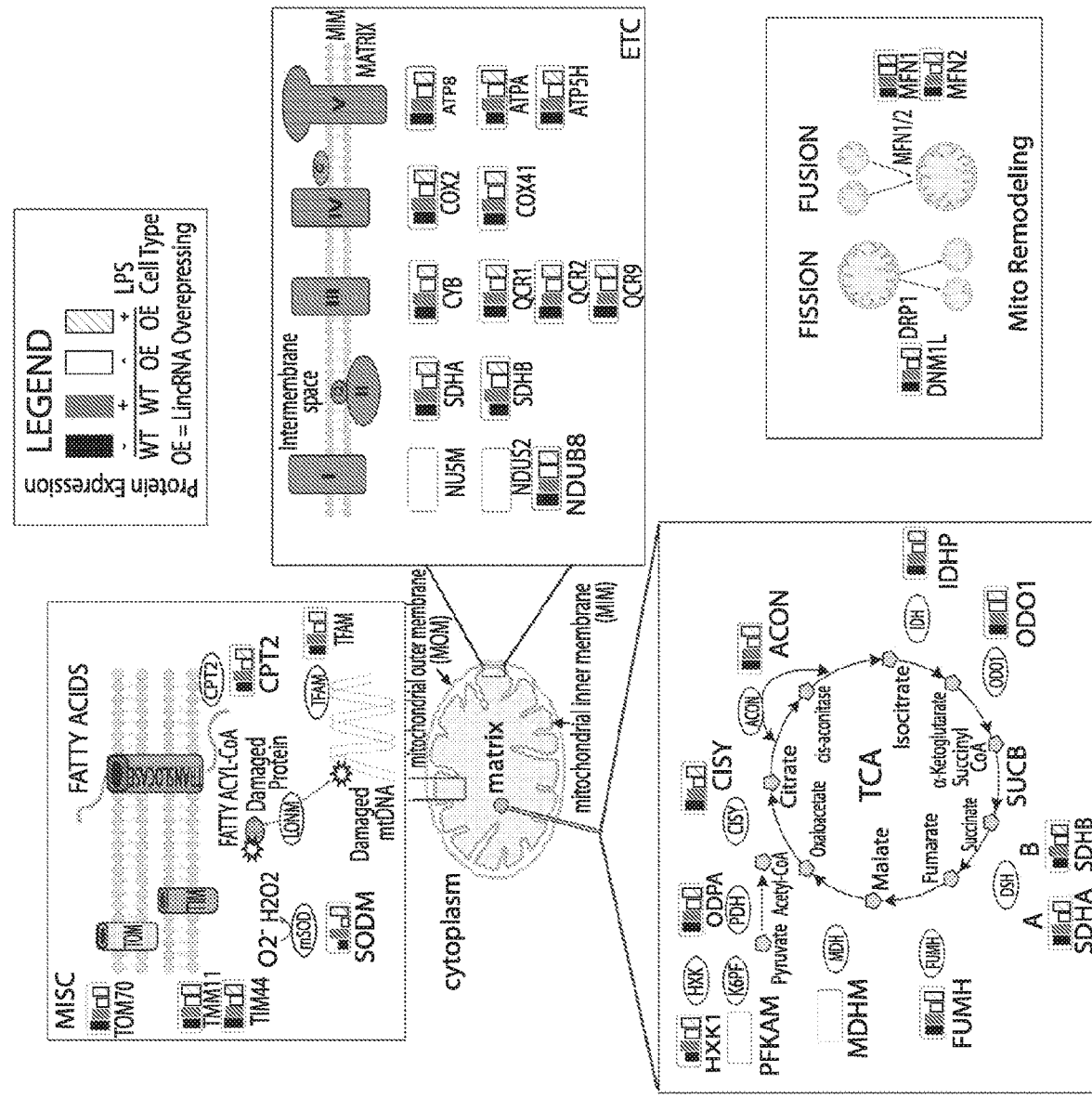

The ability of the human mitoplex to detect meaningful changes in human whole cell lysates was demonstrated as shown in FIG. 10A-FIG. 10B. Normal and genetically modified (a specific non-conding lincRNA overexpressing) human monocytes were contacted with lipopolysaccharide (LPS), which has been shown to promote mitochondrial biogenesis in some contexts. In normal human leukemic monocytes (THP1 human cell line, ATCC 88081201 stably transfected with a scrambled lincRNA construct) little response to LPS was observed in terms of mitochondrial protein expression. However, in monocytes stably transfected with an interferon gamma inducible linc RNA, Linc1050, the human mitoplex profiled a notable reduction in several mitochondrial proteins that was restored to normal levels by contacting with LPS.

The various methods and techniques described above provide a number of ways to carry out the application. Of course, it is to be understood that not necessarily all objectives or advantages described can be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. A variety of alternatives are mentioned herein. It is to be understood that some embodiments specifically include one, another, or several features, while others specifically exclude one, another, or several features, while still others mitigate a particular feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be employed in various combinations by one of ordinary skill in this art to perform methods in accordance with the principles described herein. Among the various elements, features, and steps some will be specifically included and others specifically excluded in diverse embodiments.

Although the application has been disclosed in the context of certain embodiments and examples, it will be understood by those skilled in the art that the embodiments of the application extend beyond the specifically disclosed embodiments to other alternative embodiments and/or uses and modifications and equivalents thereof.

Various embodiments of this application are described herein, including the best mode known to the inventors for carrying out the application. Variations on embodiments will become apparent to those of ordinary skill in the art upon reading the foregoing description. It is contemplated that skilled artisans can employ such variations as appropriate, and the application can be practiced otherwise than specifically described herein. Accordingly, many embodiments of this application include all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

All patents, patent applications, publications of patent applications, and other material, such as articles, books, specifications, publications, documents, things, and/or the like, referenced herein are hereby incorporated herein by this reference in their entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

It is to be understood that the embodiments of the application disclosed herein are illustrative of the principles of the embodiments of the application. Other modifications that can be employed can be within the scope of the application. Thus, by way of example, but not of limitation, alternative configurations of the embodiments of the application can be utilized in accordance with the teachings herein. Accordingly, embodiments of the present application are not limited to that precisely as shown and described.

Various embodiments of the invention are described above in the Detailed Description. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventors that the words and phrases in the specification and claims be given the ordinary and accustomed meanings to those of ordinary skill in the applicable art(s).

The foregoing description of various embodiments of the invention known to the applicant at this time of filing the application has been presented and is intended for the purposes of illustration and description. The present description is not intended to be exhaustive nor limit the invention to the precise form disclosed and many modifications and variations are possible in the light of the above teachings. The embodiments described serve to explain the principles of the invention and its practical application and to enable others skilled in the art to utilize the invention in various embodiments and with various modifications as are suited to the particular use contemplated. Therefore, it is intended that the invention not be limited to the particular embodiments disclosed for carrying out the invention.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

What is claimed is:

1. A kit for identifying and quantifying at least 26 human mitochondrial proteins in a sample by mass spectrometry, comprising:
   (a) reagents and instructions for tryptic digestion of the at least 26 human mitochondrial proteins, wherein the at least 26 human mitochondrial proteins comprise Mitochondrial import inner membrane translocase subunit TIM44 (UniProt Accession No. O43615), NADH dehydrogenase [ubiquinone] iron-sulfur protein 2 (UniProt Accession No. O75306), Citrate synthase (UniProt Accession No. O75390), ATP synthase subunit d (UniProt Accession No. O75947), Mitochondrial import receptor subunit TOM70 (UniProt Accession No. O94826), Mitofusin-2 (UniProt Accession No. O95140), NADH dehydrogenase [ubiquinone] 1 beta subcomplex subunit 8 (UniProt Accession No. O95169), Cytochrome b (UniProt Accession No. P00156), Cytochrome c oxidase subunit 2 (UniProt Accession No. P00403), ATP synthase protein 8 (UniProt Accession No. P03928), Superoxide dismutase [Mn] (UniProt Accession No. P04179), Fumarate hydratase (UniProt Accession No. P07954), ATP-dependent 6-phosphofructokinase (UniProt Accession No. P08237), Pyruvate dehydrogenase E1 component subunit alpha somatic form (UniProt Accession No. P08559), Pyruvate carboxylase (UniProt Accession No. P11498), Cytochrome c oxidase subunit 4 isoform 1 (UniProt Accession No. P13073), Transmembrane protein 11 (UniProt Accession No. P17152), Hexokinase-1 (UniProt Accession No. P19367), Succinate dehydrogenase [ubiquinone] iron-sulfur subunit (UniProt Accession No. P21912), Cytochrome b-c1 complex subunit 2 (UniProt Accession No. P22695), Carnitine O-palmitoyltransferase 2 (UniProt Accession No. P23786), ATP synthase subunit alpha (UniProt Accession No. P25705), Cytochrome b-c1 complex subunit 1 (UniProt Accession No. P31930), Succinate dehydrogenase cytochrome b560 subunit (UniProt Accession No. Q99643), Aconitate hydratase (UniProt Accession No. Q99798), and Cytochrome b-c1 complex subunit 9 (UniProt Accession No. Q9UDW1); and wherein the tryptic digestion of the at least 26 human mitochondrial proteins provides at least 41 target peptides, the at least 41 target peptides having amino acid sequences of SEQ ID NOs: 3, 9, 11, 12, 13, 14, 16, 17, 19, 21, 22, 23, 24, 25, 28, 30, 31, 33, 34, 36, 37, 39, 40, 41, 42, 43, 44, 45, 47, 48, 49, 51, 53, 54, 57, 58, 72, 74, 75, 76, and 77;
   (b) an internal standard provided in vials and to be added to the sample, wherein the internal standard comprises at least 41 reference peptides, the at least 41 reference peptides having amino acid sequences of SEQ ID NOs: 3, 9, 11, 12, 13, 14, 16, 17, 19, 21, 22, 23, 24, 25, 28, 30, 31, 33, 34, 36, 37, 39, 40, 41, 42, 43, 44, 45, 47, 48, 49, 51, 53, 54, 57, 58, 72, 74, 75, 76, and 77, and wherein each reference peptide is labeled with a stable isotope, present in the internal standard in a known quantity, and has a known mass-to-charge ratio (m/z) and retention time (rt) for comparison to a mass-to-charge ratio (m/z) and retention time (rt) of a corresponding one of the at least 41 target peptides;
   (c) reagents and instructions for preparing and processing the sample; and
   (d) reagents and instructions for using the kit to identify and quantify the at least 26 human mitochondrial proteins in the sample by mass spectrometry.

2. The kit of claim 1, wherein the reagents for tryptic digestion of the at least 26 human mitochondrial proteins comprise a reducing agent, an alkylating agent, trypsin, a buffer, and an acid.

3. The kit of claim 1, wherein the reagents for preparing and processing the sample comprise acetonitrile, and 0.1% formic acid in water.

4. The kit of claim 1, wherein the kit further comprises C18 clean up tips and/or plates.

5. The kit of claim 1, wherein each stable isotope labeled reference peptide provided in the vials is lyophilized.

6. A method for identifying and quantifying at least 26 human mitochondrial proteins in a sample by mass spectrometry using the kit of claim 1, comprising:
   i) obtaining the sample, wherein the sample has been treated with reagents for tryptic digestion provided in the kit and digesting the at least 26 human mitochondrial proteins into at least 41 target peptides having the amino acid sequences of SEQ ID NOs: 3, 9, 11, 12, 13, 14, 16, 17, 19, 21, 22, 23, 24, 25, 28, 30, 31, 33, 34, 36, 37, 39, 40, 41, 42, 43, 44, 45, 47, 48, 49, 51, 53, 54, 57, 58, 72, 74, 75, 76, and 77, and wherein the at least 26 human mitochondrial proteins comprise Mitochondrial import inner membrane translocase subunit TIM44 (UniProt Accession No. O43615), NADH dehydrogenase [ubiquinone] iron-sulfur protein 2 (UniProt Accession No. O75306), Citrate synthase (UniProt Accession No. O75390), ATP synthase subunit d (UniProt Accession No. O75947), Mitochondrial import receptor subunit TOM70 (UniProt Accession No. O94826), Mitofusin-2 (UniProt Accession No. O95140), NADH dehydrogenase [ubiquinone] 1 beta subcomplex subunit 8 (UniProt Accession No. O95169), Cytochrome b (UniProt Accession No. P00156), Cytochrome c oxidase subunit 2 (UniProt Accession No. P00403), ATP synthase protein 8 (UniProt Accession No. P03928), Superoxide dismutase [Mn] (UniProt Accession No. P04179), Fumarate hydratase (UniProt Accession No. P07954), ATP-dependent 6-phosphofructokinase (UniProt Accession No. P08237), Pyruvate dehydrogenase E1 component subunit alpha somatic form (UniProt Accession No. P08559), Pyruvate carboxylase (UniProt Accession No. P11498), Cytochrome c oxidase subunit 4 isoform 1 (UniProt Accession No. P13073), Transmembrane protein 11 (UniProt Accession No. P17152), Hexokinase-1 (UniProt Accession No. P19367), Succinate dehydrogenase [ubiquinone] iron-sulfur subunit (UniProt Accession No. P21912), Cytochrome b-c1 complex subunit 2 (UniProt Accession No. P22695), Carnitine O-palmitoyltransferase 2 (UniProt Accession No. P23786), ATP synthase subunit alpha (UniProt Accession No. P25705), Cytochrome b-c1 complex subunit 1 (UniProt Accession No. P31930), Succinate dehydrogenase cytochrome b560 subunit (UniProt Accession No. Q99643), Aconitate hydratase (UniProt Accession No. Q99798), and Cytochrome b-c1 complex subunit 9 (UniProt Accession No. Q9UDW1);

ii) adding the internal standard of the kit to the sample;
iii) analyzing the sample from step ii) by mass spectrometry;
iv) performing the following steps for each of the at least 41 target peptides:
identifying a target peptide by comparing the mass-to-charge ratio (m/z) and retention time (rt) of the target peptide to the known mass-to-charge ratio (m/z) and retention time (rt) of a reference peptide of the kit;
identifying a human mitochondrial protein in the sample by correlating the target peptide to the human mitochondrial protein;
calculating a peak area and an area ratio for the target peptide and for the reference peptide;
determining a molar ratio for the target peptide from the known quantity of the reference peptide;
calculating a concentration of the target peptide from the molar ratio; and
quantifying the human mitochondrial protein in the sample from the concentration of the target peptide.

7. The method of claim 6, wherein the mass spectrometry is selected from the group consisting of LC-MS, LC-MS/MS, LC-SRM-MS, LC-MRM-MS, and LC-PRM-MS.

8. The method of claim 6, wherein the sample is from a human subject, and the sample is selected from the group consisting of cells, tissue, and combinations thereof.

9. The method of claim 8, wherein
the cells are selected from the group consisting of cells of primary origins, cells of immortalized origins, and combinations thereof, or
the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof, or
the cells are selected from the group consisting of monocyte cells, macrophage cells, neutrophil cells, and combinations thereof.

10. The method of claim 6, wherein the stable isotope that labels each reference peptide is selected from the group consisting of $^{15}N$, $^{13}C$, $^{18}O$, and $^{2}H$.

11. A method of determining a mitochondrial protein biomarker signature for a human subject using the kit of claim 1, the method comprising:
i) obtaining a sample from the human subject, wherein the sample comprises at least 26 human mitochondrial proteins, wherein the at least 26 human mitochondrial proteins comprise Mitochondrial import inner membrane translocase subunit TIM44 (UniProt Accession No. O43615), NADH dehydrogenase [ubiquinone] iron-sulfur protein 2 (UniProt Accession No. O75306), Citrate synthase (UniProt Accession No. O75390), ATP synthase subunit d (UniProt Accession No. O75947), Mitochondrial import receptor subunit TOM70 (UniProt Accession No. O94826), Mitofusin-2 (UniProt Accession No. O95140), NADH dehydrogenase [ubiquinone] 1 beta subcomplex subunit 8 (UniProt Accession No. O95169), Cytochrome b (UniProt Accession No. P00156), Cytochrome c oxidase subunit 2 (UniProt Accession No. P00403), ATP synthase protein 8 (UniProt Accession No. P03928), Superoxide dismutase [Mn] (UniProt Accession No. P04179), Fumarate hydratase (UniProt Accession No. P07954), ATP-dependent 6-phosphofructokinase (UniProt Accession No. P08237), Pyruvate dehydrogenase E1 component subunit alpha somatic form (UniProt Accession No. P08559), Pyruvate carboxylase (UniProt Accession No. P11498), Cytochrome c oxidase subunit 4 isoform 1 (UniProt Accession No. P13073), Transmembrane protein 11 (UniProt Accession No. P17152), Hexokinase-1 (UniProt Accession No. P19367), Succinate dehydrogenase [ubiquinone] iron-sulfur subunit (UniProt Accession No. P21912), Cytochrome b-c1 complex subunit 2 (UniProt Accession No. P22695), Carnitine O-palmitoyltransferase 2 (UniProt Accession No. P23786), ATP synthase subunit alpha (UniProt Accession No. P25705), Cytochrome b-c1 complex subunit 1 (UniProt Accession No. P31930), Succinate dehydrogenase cytochrome b560 subunit (UniProt Accession No. Q99643), Aconitate hydratase (UniProt Accession No. Q99798), and Cytochrome b-c1 complex subunit 9 (UniProt Accession No. Q9UDW1);
ii) contacting the sample with reagents for tryptic digestion provided in the kit and digesting the at least 26 human mitochondrial proteins into at least 41 target peptides having the amino acid sequences of SEQ ID NOs: 3, 9, 11, 12, 13, 14, 16, 17, 19, 21, 22, 23, 24, 25, 28, 30, 31, 33, 34, 36, 37, 39, 40, 41, 42, 43, 44, 45, 47, 48, 49, 51, 53, 54, 57, 58, 72, 74, 75, 76, and 77;
iii) adding the internal standard of the kit to the sample;
iv) analyzing the sample from step iii) by mass spectrometry;

v) identifying each target peptide of the at least 41 target peptides by comparing the mass-to-charge ratio (m/z) and retention time (rt) of each target peptide to the known mass-to-charge ratio (m/z) and retention time (rt) of a reference peptide of the kit; and vi) determining the human mitochondrial protein biomarker signature for the human subject by correlating each target peptide to a human mitochondrial protein.

12. The method of claim 11, further comprising comparing the human mitochondrial protein biomarker signature from the human subject to a human mitochondrial protein biomarker signature from a reference sample, wherein a change in the human mitochondrial protein biomarker signature from the human subject compared to the human mitochondrial protein biomarker signature from the reference sample is indicative of a change in mitochondrial function in the human subject.

13. The method of claim 12, wherein the mitochondrial function is selected from the group consisting of tricarboxylic acid cycle (TCA cycle), oxidative phosphorylation (OxPhos), MitoGeneral, MitoDynamics, and combinations thereof.

14. The method of claim 11, wherein the mass spectrometry is selected from the group consisting of LC-MS, LC-MS/MS, LC-SRM-MS, LC-MRM-MS, and LC-PRM-MS.

15. The method of claim 11, wherein the sample is selected from the group consisting of cells, tissue, and combinations thereof.

16. The method of claim 15, wherein
the cells are selected from the group consisting of cells of primary origins, cells of immortalized origins, and combinations thereof, or
the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof, or
the cells are selected from the group consisting of monocyte cells, macrophage cells, neutrophil cells, and combinations thereof.

17. The method of claim 11, wherein the stable isotope that labels each reference peptide is selected from the group consisting of $^{15}N$, $^{13}C$, $^{18}O$, and $^{2}H$.

18. A mass spectrometry multiplex assay for identifying and quantifying at least 26 human mitochondrial proteins in a sample, comprising: i) obtaining the sample, wherein the sample has been treated or contacted with reagents for tryptic digestion provided in the kit of claim 1 and digesting the at least 26 human mitochondrial proteins into at least 41 target peptides, the at least 41 target peptides having amino acid sequences of SEQ ID NOs: 3, 9, 11, 12, 13, 14, 16, 17, 19, 21, 22, 23, 24, 25, 28, 30, 31, 33, 34, 36, 37, 39, 40, 41, 42, 43, 44, 45, 47, 48, 49, 51, 53, 54, 57, 58, 72, 74, 75, 76, and 77, and wherein the at least 26 human mitochondrial proteins comprise Mitochondrial import inner membrane translocase subunit TIM44 (UniProt Accession No. O43615), NADH dehydrogenase [ubiquinone] iron-sulfur protein 2 (UniProt Accession No. O75306), Citrate synthase (UniProt Accession No. O75390), ATP synthase subunit d (UniProt Accession No. O75947), Mitochondrial import receptor subunit TOM70 (UniProt Accession No. O94826), Mitofusin-2 (UniProt Accession No. O95140), NADH dehydrogenase [ubiquinone] 1 beta subcomplex subunit 8 (UniProt Accession No. O95169), Cytochrome b (UniProt Accession No. P00156), Cytochrome c oxidase subunit 2 (UniProt Accession No. P00403), ATP synthase protein 8 (UniProt Accession No. P03928), Superoxide dismutase [Mn] (UniProt Accession No. P04179), Fumarate hydratase (UniProt Accession No. P07954), ATP-dependent 6-phosphofructokinase (UniProt Accession No. P08237), Pyruvate dehydrogenase E1 component subunit alpha somatic form (UniProt Accession No. P08559), Pyruvate carboxylase (UniProt Accession No. P11498), Cytochrome c oxidase subunit 4 isoform 1 (UniProt Accession No. P13073), Transmembrane protein 11 (UniProt Accession No. P17152), Hexokinase-1 (UniProt Accession No. P19367), Succinate dehydrogenase [ubiquinone] iron-sulfur subunit (UniProt Accession No. P21912), Cytochrome b-c1 complex subunit 2 (UniProt Accession No. P22695), Carnitine O-palmitoyltransferase 2 (UniProt Accession No. P23786), ATP synthase subunit alpha (UniProt Accession No. P25705), Cytochrome b-c1 complex subunit 1 (UniProt Accession No. P31930), Succinate dehydrogenase cytochrome b560 subunit (UniProt Accession No. Q99643), Aconitate hydratase (UniProt Accession No. Q99798), and Cytochrome b-c1 complex subunit 9 (UniProt Accession No. Q9UDW1);

ii) adding the internal standard of the kit to the sample;
iii) analyzing the sample from step ii) by mass spectrometry;
iv) performing the following steps for each of the at least 41 target peptides:
identifying a target peptide by comparing the mass-to-charge ratio (m/z) and retention time (rt) of the target peptide to the known mass-to-charge ratio (m/z) and retention time (rt) of a reference peptide of the kit;
identifying a human mitochondrial protein in the sample by correlating the target peptide to the human mitochondrial protein;
calculating a peak area and an area ratio for the target peptide and for the reference peptide;
determining a molar ratio for the target peptide from the known quantity of the reference peptide;
calculating a concentration of the target peptide from the molar ratio; and
quantifying the human mitochondrial protein in the sample from the concentration of the target peptide.

19. The mass spectrometry multiplex assay of claim 18, wherein the mass spectrometry is selected from the group consisting of LC-MS, LC-MS/MS, LC-SRM-MS, LC-MRM-MS, and LC-PRM-MS.

20. The mass spectrometry multiplex assay of claim 18, wherein the sample is from a human subject.

21. The mass spectrometry multiplex assay of claim 18, wherein the sample is selected from the group consisting of cells, tissue, and combinations thereof.

22. The mass spectrometry multiplex assay of claim 21, wherein
the cells are selected from the group consisting of cells of primary origins, cells of immortalized origins, and combinations thereof, or
the cells are selected from the group consisting of muscle cells, neural cells, epithelial cells, secretory cells, fibroblast cells, induced pluripotent stem cells, differentiated/induced pluripotent stem cell derived cells, leukocyte cells, and combinations thereof, or
the cells are selected from the group consisting of monocyte cells, macrophage cells, neutrophil cells, and combinations thereof.

23. The mass spectrometry multiplex assay of claim 18, wherein the stable isotope that labels each reference peptide is selected from the group consisting of $^{13}N$, $^{13}C$, $^{18}O$, and $^{2}H$.

* * * * *

SEQUENCE LISTING

```
<160> NUMBER OF SEQ ID NOS: 151

<210> SEQ ID NO 1
<211> LENGTH: 9
<212> TYPE: PRT
<213> ORGANISM: Homo sapiens

<400> SEQUENCE: 1

Leu Gly Ile Ile Gly Val Val Asn Arg
1               5

<210> SEQ ID NO 2
<211> LENGTH: 10
<212> TYPE: PRT
<213> ORGANISM: Homo sapiens
```

```
<400> SEQUENCE: 2

Ser Ala Thr Leu Leu Gln Leu Ile Thr Lys
1               5                   10

<210> SEQ ID NO 3
<211> LENGTH: 9
<212> TYPE: PRT
<213> ORGANISM: Homo sapiens

<400> SEQUENCE: 3

Leu Gly Glu Leu Thr Gly Thr Val Lys
1               5

<210> SEQ ID NO 4
<211> LENGTH: 11
<212> TYPE: PRT
<213> ORGANISM: Homo sapiens

<400> SEQUENCE: 4

Val Thr Asp Leu Leu Gly Gly Leu Phe Ser Lys
1               5                   10

<210> SEQ ID NO 5
<211> LENGTH: 9
<212> TYPE: PRT
<213> ORGANISM: Homo sapiens

<400> SEQUENCE: 5

Ala Leu Gly Leu Gln Phe His Ser Arg
1               5

<210> SEQ ID NO 6
<211> LENGTH: 7
<212> TYPE: PRT
<213> ORGANISM: Homo sapiens

<400> SEQUENCE: 6

Leu Gln Arg Pro Gln Leu Arg
1               5

<210> SEQ ID NO 7
<211> LENGTH: 11
<212> TYPE: PRT
<213> ORGANISM: Homo sapiens

<400> SEQUENCE: 7

Val Val Val Val Gly Asp Gln Ser Ala Gly Lys
1               5                   10

<210> SEQ ID NO 8
<211> LENGTH: 12
<212> TYPE: PRT
<213> ORGANISM: Homo sapiens

<400> SEQUENCE: 8

Glu Val Leu Glu Asp Phe Ala Glu Asp Gly Glu Lys
1               5                   10

<210> SEQ ID NO 9
<211> LENGTH: 7
<212> TYPE: PRT
<213> ORGANISM: Homo sapiens

<400> SEQUENCE: 9
```

```
Leu Pro Ile Gln Pro Ser Arg
1               5

<210> SEQ ID NO 10
<211> LENGTH: 17
<212> TYPE: PRT
<213> ORGANISM: Homo sapiens

<400> SEQUENCE: 10

Glu Thr Ala His Trp Lys Pro Pro Trp Asn Asp Val Asp Pro Pro
1               5                   10                  15

Lys

<210> SEQ ID NO 11
<211> LENGTH: 9
<212> TYPE: PRT
<213> ORGANISM: Homo sapiens

<400> SEQUENCE: 11

Asp Ile Leu Ala Asp Leu Ile Pro Lys
1               5

<210> SEQ ID NO 12
<211> LENGTH: 8
<212> TYPE: PRT
<213> ORGANISM: Homo sapiens

<400> SEQUENCE: 12

Ala Tyr Ala Gln Gly Ile Ser Arg
1               5

<210> SEQ ID NO 13
<211> LENGTH: 9
<212> TYPE: PRT
<213> ORGANISM: Homo sapiens

<400> SEQUENCE: 13

Ser Trp Asn Glu Thr Leu Thr Ser Arg
1               5

<210> SEQ ID NO 14
<211> LENGTH: 9
<212> TYPE: PRT
<213> ORGANISM: Homo sapiens

<400> SEQUENCE: 14

Ala Gly Leu Val Asp Asp Phe Glu Lys
1               5

<210> SEQ ID NO 15
<211> LENGTH: 9
<212> TYPE: PRT
<213> ORGANISM: Homo sapiens

<400> SEQUENCE: 15

Ala Ala Ala Phe Glu Gln Leu Gln Lys
1               5

<210> SEQ ID NO 16
<211> LENGTH: 8
<212> TYPE: PRT
<213> ORGANISM: Homo sapiens

<400> SEQUENCE: 16
```

```
Gly Leu Leu Gln Leu Gln Trp Lys
1               5
```

<210> SEQ ID NO 17
<211> LENGTH: 8
<212> TYPE: PRT
<213> ORGANISM: Homo sapiens

<400> SEQUENCE: 17

```
Gln Ile Thr Glu Glu Val Glu Arg
1               5
```

<210> SEQ ID NO 18
<211> LENGTH: 8
<212> TYPE: PRT
<213> ORGANISM: Homo sapiens

<400> SEQUENCE: 18

```
His Ile Glu Glu Gly Leu Gly Arg
1               5
```

<210> SEQ ID NO 19
<211> LENGTH: 10
<212> TYPE: PRT
<213> ORGANISM: Homo sapiens

<400> SEQUENCE: 19

```
Ile Glu Val Leu Asp Ser Leu Gln Ser Lys
1               5                   10
```

<210> SEQ ID NO 20
<211> LENGTH: 12
<212> TYPE: PRT
<213> ORGANISM: Homo sapiens

<400> SEQUENCE: 20

```
Asp Pro Trp Tyr Ser Trp Asp Gln Pro Gly Leu Arg
1               5                   10
```

<210> SEQ ID NO 21
<211> LENGTH: 11
<212> TYPE: PRT
<213> ORGANISM: Homo sapiens

<400> SEQUENCE: 21

```
Gln Tyr Pro Tyr Asn Asn Leu Tyr Leu Glu Arg
1               5                   10
```

<210> SEQ ID NO 22
<211> LENGTH: 10
<212> TYPE: PRT
<213> ORGANISM: Homo sapiens

<400> SEQUENCE: 22

```
Ile Thr Phe His Pro Tyr Tyr Thr Ile Lys
1               5                   10
```

<210> SEQ ID NO 23
<211> LENGTH: 9
<212> TYPE: PRT
<213> ORGANISM: Homo sapiens

<400> SEQUENCE: 23

```
Asp Val Asn Tyr Gly Trp Ile Ile Arg
1               5
```

```
<210> SEQ ID NO 24
<211> LENGTH: 7
<212> TYPE: PRT
<213> ORGANISM: Homo sapiens

<400> SEQUENCE: 24

Leu Leu Asp Val Asp Asn Arg
1               5

<210> SEQ ID NO 25
<211> LENGTH: 10
<212> TYPE: PRT
<213> ORGANISM: Homo sapiens

<400> SEQUENCE: 25

Val Val Leu Pro Ile Glu Ala Pro Ile Arg
1               5                   10

<210> SEQ ID NO 26
<211> LENGTH: 8
<212> TYPE: PRT
<213> ORGANISM: Homo sapiens

<400> SEQUENCE: 26

Asn Ser Tyr Pro His Tyr Val Lys
1               5

<210> SEQ ID NO 27
<211> LENGTH: 17
<212> TYPE: PRT
<213> ORGANISM: Homo sapiens

<400> SEQUENCE: 27

Thr Ile Ser Gln His Gln Ile Ser Thr Ser Ile Ile Thr Ser Thr Gln
1               5                   10                  15

Lys

<210> SEQ ID NO 28
<211> LENGTH: 9
<212> TYPE: PRT
<213> ORGANISM: Homo sapiens

<400> SEQUENCE: 28

Asn Tyr Asn Lys Pro Trp Glu Pro Lys
1               5

<210> SEQ ID NO 29
<211> LENGTH: 11
<212> TYPE: PRT
<213> ORGANISM: Homo sapiens
<220> FEATURE:
<221> NAME/KEY: MOD_RES
<222> LOCATION: (2)..(2)
<223> OTHER INFORMATION: Carboxyamidomethylcysteine

<400> SEQUENCE: 29

Ile Cys Ser Leu His Ser Leu Pro Pro Gln Ser
1               5                   10

<210> SEQ ID NO 30
<211> LENGTH: 14
<212> TYPE: PRT
<213> ORGANISM: Homo sapiens
```

```
<400> SEQUENCE: 30

Gly Asp Val Thr Ala Gln Ile Ala Leu Gln Pro Ala Leu Lys
1               5                   10

<210> SEQ ID NO 31
<211> LENGTH: 8
<212> TYPE: PRT
<213> ORGANISM: Homo sapiens

<400> SEQUENCE: 31

Gly Glu Leu Leu Glu Ala Ile Lys
1               5

<210> SEQ ID NO 32
<211> LENGTH: 8
<212> TYPE: PRT
<213> ORGANISM: Homo sapiens

<400> SEQUENCE: 32

Tyr Tyr Gly Ala Gln Thr Val Arg
1               5

<210> SEQ ID NO 33
<211> LENGTH: 11
<212> TYPE: PRT
<213> ORGANISM: Homo sapiens

<400> SEQUENCE: 33

Ile Pro Val His Pro Asn Asp His Val Asn Lys
1               5                   10

<210> SEQ ID NO 34
<211> LENGTH: 8
<212> TYPE: PRT
<213> ORGANISM: Homo sapiens

<400> SEQUENCE: 34

Val Gly Ile Phe Thr Gly Ala Arg
1               5

<210> SEQ ID NO 35
<211> LENGTH: 13
<212> TYPE: PRT
<213> ORGANISM: Homo sapiens

<400> SEQUENCE: 35

Val Leu Val Val His Asp Gly Phe Glu Gly Leu Ala Lys
1               5                   10

<210> SEQ ID NO 36
<211> LENGTH: 13
<212> TYPE: PRT
<213> ORGANISM: Homo sapiens

<400> SEQUENCE: 36

Leu Glu Glu Gly Pro Pro Val Thr Thr Val Leu Thr Arg
1               5                   10

<210> SEQ ID NO 37
<211> LENGTH: 9
<212> TYPE: PRT
<213> ORGANISM: Homo sapiens

<400> SEQUENCE: 37
```

```
Glu Ile Leu Ala Glu Leu Thr Gly Arg
1               5
```

<210> SEQ ID NO 38
<211> LENGTH: 10
<212> TYPE: PRT
<213> ORGANISM: Homo sapiens

<400> SEQUENCE: 38

```
Phe Ile Gly Pro Ser Pro Glu Val Val Arg
1               5                   10
```

<210> SEQ ID NO 39
<211> LENGTH: 22
<212> TYPE: PRT
<213> ORGANISM: Homo sapiens

<400> SEQUENCE: 39

```
Ser Val Val Glu Phe Leu Gln Gly Tyr Ile Gly Val Pro His Gly Gly
1               5                   10                  15

Phe Pro Glu Pro Phe Arg
            20
```

<210> SEQ ID NO 40
<211> LENGTH: 11
<212> TYPE: PRT
<213> ORGANISM: Homo sapiens

<400> SEQUENCE: 40

```
Asp His Pro Leu Pro Glu Val Ala His Val Lys
1               5                   10
```

<210> SEQ ID NO 41
<211> LENGTH: 10
<212> TYPE: PRT
<213> ORGANISM: Homo sapiens

<400> SEQUENCE: 41

```
Val Asn Pro Ile Gln Gly Leu Ala Ser Lys
1               5                   10
```

<210> SEQ ID NO 42
<211> LENGTH: 8
<212> TYPE: PRT
<213> ORGANISM: Homo sapiens

<400> SEQUENCE: 42

```
Tyr Ile Val Ile Glu Pro Thr Arg
1               5
```

<210> SEQ ID NO 43
<211> LENGTH: 9
<212> TYPE: PRT
<213> ORGANISM: Homo sapiens

<400> SEQUENCE: 43

```
Tyr Gln Val Glu Tyr Asp Ala Tyr Lys
1               5
```

<210> SEQ ID NO 44
<211> LENGTH: 11
<212> TYPE: PRT
<213> ORGANISM: Homo sapiens

<400> SEQUENCE: 44

```
Thr Thr Val Gly Val Asp Gly Ser Leu Tyr Lys
1               5                   10

<210> SEQ ID NO 45
<211> LENGTH: 11
<212> TYPE: PRT
<213> ORGANISM: Homo sapiens

<400> SEQUENCE: 45

Leu Val Asp Glu Tyr Ser Leu Asn Ala Gly Lys
1               5                   10

<210> SEQ ID NO 46
<211> LENGTH: 10
<212> TYPE: PRT
<213> ORGANISM: Homo sapiens

<400> SEQUENCE: 46

Asn Glu Val Asp Ser Thr Leu Thr Phe Arg
1               5                   10

<210> SEQ ID NO 47
<211> LENGTH: 9
<212> TYPE: PRT
<213> ORGANISM: Homo sapiens

<400> SEQUENCE: 47

Leu Gln Asp Pro Phe Ser Leu Tyr Arg
1               5

<210> SEQ ID NO 48
<211> LENGTH: 14
<212> TYPE: PRT
<213> ORGANISM: Homo sapiens

<400> SEQUENCE: 48

Tyr Glu Asp Phe Ser Asn Leu Gly Thr Thr His Leu Leu Arg
1               5                   10

<210> SEQ ID NO 49
<211> LENGTH: 11
<212> TYPE: PRT
<213> ORGANISM: Homo sapiens

<400> SEQUENCE: 49

Trp Glu Val Ala Asp Leu Gln Pro Gln Leu Lys
1               5                   10

<210> SEQ ID NO 50
<211> LENGTH: 16
<212> TYPE: PRT
<213> ORGANISM: Homo sapiens

<400> SEQUENCE: 50

Thr Ile Ala Gln Gly Asn Leu Ser Asn Thr Asp Val Gln Ala Ala Lys
1               5                   10                  15

<210> SEQ ID NO 51
<211> LENGTH: 10
<212> TYPE: PRT
<213> ORGANISM: Homo sapiens

<400> SEQUENCE: 51

Leu Asn Phe Glu Leu Thr Asp Ala Leu Lys
```

<210> SEQ ID NO 52
<211> LENGTH: 12
<212> TYPE: PRT
<213> ORGANISM: Homo sapiens

<400> SEQUENCE: 52

Thr Glu Thr Ile Arg Pro Ala Ser Val Tyr Thr Lys
1               5                   10

<210> SEQ ID NO 53
<211> LENGTH: 12
<212> TYPE: PRT
<213> ORGANISM: Homo sapiens

<400> SEQUENCE: 53

Val Val Asp Ala Leu Gly Asn Ala Ile Asp Gly Lys
1               5                   10

<210> SEQ ID NO 54
<211> LENGTH: 10
<212> TYPE: PRT
<213> ORGANISM: Homo sapiens

<400> SEQUENCE: 54

Ala Val Asp Ser Leu Val Pro Ile Gly Arg
1               5                   10

<210> SEQ ID NO 55
<211> LENGTH: 11
<212> TYPE: PRT
<213> ORGANISM: Homo sapiens

<400> SEQUENCE: 55

Asn Thr Val Val Ala Thr Gly Gly Tyr Gly Arg
1               5                   10

<210> SEQ ID NO 56
<211> LENGTH: 13
<212> TYPE: PRT
<213> ORGANISM: Homo sapiens

<400> SEQUENCE: 56

Gly Glu Gly Gly Ile Leu Ile Asn Ser Gln Gly Glu Arg
1               5                   10

<210> SEQ ID NO 57
<211> LENGTH: 14
<212> TYPE: PRT
<213> ORGANISM: Homo sapiens

<400> SEQUENCE: 57

Asn Asn Gly Ala Gly Tyr Phe Leu Glu His Leu Ala Phe Lys
1               5                   10

<210> SEQ ID NO 58
<211> LENGTH: 7
<212> TYPE: PRT
<213> ORGANISM: Homo sapiens

<400> SEQUENCE: 58

Ser Leu Leu Thr Tyr Gly Arg
1               5

<210> SEQ ID NO 59
<211> LENGTH: 11
<212> TYPE: PRT
<213> ORGANISM: Homo sapiens

<400> SEQUENCE: 59

Ile Phe Gly Val Thr Thr Leu Asp Ile Val Arg
1               5                   10

<210> SEQ ID NO 60
<211> LENGTH: 19
<212> TYPE: PRT
<213> ORGANISM: Homo sapiens

<400> SEQUENCE: 60

Val Ala Val Leu Gly Ala Ser Gly Gly Ile Gly Gln Pro Leu Ser Leu
1               5                   10                  15

Leu Leu Lys

<210> SEQ ID NO 61
<211> LENGTH: 11
<212> TYPE: PRT
<213> ORGANISM: Homo sapiens

<400> SEQUENCE: 61

Leu Ile Leu Pro His Val Asp Ile Gln Leu Lys
1               5                   10

<210> SEQ ID NO 62
<211> LENGTH: 8
<212> TYPE: PRT
<213> ORGANISM: Homo sapiens

<400> SEQUENCE: 62

Ala Thr Asp Phe Val Ala Asp Arg
1               5

<210> SEQ ID NO 63
<211> LENGTH: 7
<212> TYPE: PRT
<213> ORGANISM: Homo sapiens

<400> SEQUENCE: 63

Glu Gln Leu Pro Ile Phe Lys
1               5

<210> SEQ ID NO 64
<211> LENGTH: 7
<212> TYPE: PRT
<213> ORGANISM: Homo sapiens

<400> SEQUENCE: 64

Ile Tyr Gln Asp Ala Tyr Arg
1               5

<210> SEQ ID NO 65
<211> LENGTH: 13
<212> TYPE: PRT
<213> ORGANISM: Homo sapiens

<400> SEQUENCE: 65

Leu Gly Phe Tyr Gly Leu Asp Glu Ser Asp Leu Asp Lys
1               5                   10

```
<210> SEQ ID NO 66
<211> LENGTH: 10
<212> TYPE: PRT
<213> ORGANISM: Homo sapiens

<400> SEQUENCE: 66

Ser Ser Pro Tyr Pro Thr Asp Val Ala Arg
1               5                   10

<210> SEQ ID NO 67
<211> LENGTH: 11
<212> TYPE: PRT
<213> ORGANISM: Homo sapiens

<400> SEQUENCE: 67

Asp Pro Ala Ala Ala Pro Ala Thr Gly Asn Lys
1               5                   10

<210> SEQ ID NO 68
<211> LENGTH: 11
<212> TYPE: PRT
<213> ORGANISM: Homo sapiens

<400> SEQUENCE: 68

Thr Ile Ala Leu Asn Gly Val Glu Asp Val Arg
1               5                   10

<210> SEQ ID NO 69
<211> LENGTH: 17
<212> TYPE: PRT
<213> ORGANISM: Homo sapiens

<400> SEQUENCE: 69

Thr Val Leu Glu His Tyr Ala Leu Glu Asp Asp Pro Leu Ala Ala Phe
1               5                   10                  15

Lys

<210> SEQ ID NO 70
<211> LENGTH: 10
<212> TYPE: PRT
<213> ORGANISM: Homo sapiens

<400> SEQUENCE: 70

Val Val Asn Ala Leu Glu Ala Gln Asn Arg
1               5                   10

<210> SEQ ID NO 71
<211> LENGTH: 8
<212> TYPE: PRT
<213> ORGANISM: Homo sapiens

<400> SEQUENCE: 71

Gln Leu Glu Glu Glu Ile Ala Arg
1               5

<210> SEQ ID NO 72
<211> LENGTH: 10
<212> TYPE: PRT
<213> ORGANISM: Homo sapiens

<400> SEQUENCE: 72

Asn Ala Val Pro Leu Gly Thr Thr Ala Lys
1               5                   10
```

<210> SEQ ID NO 73
<211> LENGTH: 13
<212> TYPE: PRT
<213> ORGANISM: Homo sapiens
<220> FEATURE:
<221> NAME/KEY: MOD_RES
<222> LOCATION: (3)..(3)
<223> OTHER INFORMATION: Carboxyamidomethylcysteine

<400> SEQUENCE: 73

Ser Leu Cys Leu Gly Pro Ala Leu Ile His Thr Ala Lys
1               5                   10

<210> SEQ ID NO 74
<211> LENGTH: 8
<212> TYPE: PRT
<213> ORGANISM: Homo sapiens

<400> SEQUENCE: 74

Glu Gly Trp Pro Leu Asp Ile Arg
1               5

<210> SEQ ID NO 75
<211> LENGTH: 9
<212> TYPE: PRT
<213> ORGANISM: Homo sapiens

<400> SEQUENCE: 75

Asn Thr Ile Val Thr Ser Tyr Asn Arg
1               5

<210> SEQ ID NO 76
<211> LENGTH: 7
<212> TYPE: PRT
<213> ORGANISM: Homo sapiens

<400> SEQUENCE: 76

Leu Tyr Ser Leu Leu Phe Arg
1               5

<210> SEQ ID NO 77
<211> LENGTH: 17
<212> TYPE: PRT
<213> ORGANISM: Homo sapiens

<400> SEQUENCE: 77

Ala Phe Asp Gln Gly Ala Asp Ala Ile Tyr Asp His Ile Asn Glu Gly
1               5                   10                  15

Lys

<210> SEQ ID NO 78
<211> LENGTH: 9
<212> TYPE: PRT
<213> ORGANISM: Mus musculus

<400> SEQUENCE: 78

Leu Gly Glu Leu Thr Gly Thr Val Lys
1               5

<210> SEQ ID NO 79
<211> LENGTH: 10
<212> TYPE: PRT
<213> ORGANISM: Mus musculus

<400> SEQUENCE: 79

Tyr Asp Glu Ser Asp Asn Val Leu Ile Arg
1               5                   10

<210> SEQ ID NO 80
<211> LENGTH: 10
<212> TYPE: PRT
<213> ORGANISM: Mus musculus

<400> SEQUENCE: 80

Ile Pro Phe His Pro Tyr Tyr Thr Ile Lys
1               5                   10

<210> SEQ ID NO 81
<211> LENGTH: 9
<212> TYPE: PRT
<213> ORGANISM: Mus musculus

<400> SEQUENCE: 81

Asp Val Asn Tyr Gly Trp Leu Ile Arg
1               5

<210> SEQ ID NO 82
<211> LENGTH: 7
<212> TYPE: PRT
<213> ORGANISM: Mus musculus

<400> SEQUENCE: 82

Leu Leu Glu Val Asp Asn Arg
1               5

<210> SEQ ID NO 83
<211> LENGTH: 20
<212> TYPE: PRT
<213> ORGANISM: Mus musculus

<400> SEQUENCE: 83

Met Leu Ile Ser Ser Glu Asp Val Leu His Ser Trp Ala Val Pro Ser
1               5                   10                  15

Leu Gly Leu Lys
            20

<210> SEQ ID NO 84
<211> LENGTH: 20
<212> TYPE: PRT
<213> ORGANISM: Mus musculus
<220> FEATURE:
<221> NAME/KEY: MOD_RES
<222> LOCATION: (1)..(1)
<223> OTHER INFORMATION: Oxidized methionine

<400> SEQUENCE: 84

Met Leu Ile Ser Ser Glu Asp Val Leu His Ser Trp Ala Val Pro Ser
1               5                   10                  15

Leu Gly Leu Lys
            20

<210> SEQ ID NO 85
<211> LENGTH: 20
<212> TYPE: PRT
<213> ORGANISM: Mus musculus

<400> SEQUENCE: 85

Ala Asn Pro Tyr Ser Ser Phe Ser Thr Leu Leu Gly Phe Phe Pro Ser
1               5                   10                  15

Ile Ile His Arg
            20

<210> SEQ ID NO 86
<211> LENGTH: 13
<212> TYPE: PRT
<213> ORGANISM: Mus musculus

<400> SEQUENCE: 86

Thr Ser Leu Thr Leu Leu Asp Leu Ile Trp Leu Glu Lys
1               5                   10

<210> SEQ ID NO 87
<211> LENGTH: 13
<212> TYPE: PRT
<213> ORGANISM: Mus musculus

<400> SEQUENCE: 87

Val Ser Ser Gln Thr Phe Pro Leu Ala Pro Ser Pro Lys
1               5                   10

<210> SEQ ID NO 88
<211> LENGTH: 10
<212> TYPE: PRT
<213> ORGANISM: Mus musculus

<400> SEQUENCE: 88

Ile Tyr Leu Pro His Ser Leu Pro Gln Gln
1               5                   10

<210> SEQ ID NO 89
<211> LENGTH: 9
<212> TYPE: PRT
<213> ORGANISM: Mus musculus

<400> SEQUENCE: 89

Ala Asn Thr Phe Val Ala Glu Leu Lys
1               5

<210> SEQ ID NO 90
<211> LENGTH: 10
<212> TYPE: PRT
<213> ORGANISM: Mus musculus

<400> SEQUENCE: 90

Ile Gln Glu Ala Gly Thr Glu Val Val Lys
1               5                   10

<210> SEQ ID NO 91
<211> LENGTH: 14
<212> TYPE: PRT
<213> ORGANISM: Mus musculus

<400> SEQUENCE: 91

Gly Asp Val Thr Thr Gln Val Ala Leu Gln Pro Ala Leu Lys
1               5                   10

<210> SEQ ID NO 92
<211> LENGTH: 8
<212> TYPE: PRT
<213> ORGANISM: Mus musculus

<400> SEQUENCE: 92

Gly Glu Leu Leu Glu Ala Ile Lys

<210> SEQ ID NO 93
<211> LENGTH: 9
<212> TYPE: PRT
<213> ORGANISM: Mus musculus

<400> SEQUENCE: 93

Asp Tyr Asn Pro Thr Ala Ser Val Lys
1               5

<210> SEQ ID NO 94
<211> LENGTH: 8
<212> TYPE: PRT
<213> ORGANISM: Mus musculus

<400> SEQUENCE: 94

Asn Ile Leu Ile Asp Phe Thr Lys
1               5

<210> SEQ ID NO 95
<211> LENGTH: 8
<212> TYPE: PRT
<213> ORGANISM: Mus musculus

<400> SEQUENCE: 95

Ala Asp Trp Ser Ser Leu Ser Arg
1               5

<210> SEQ ID NO 96
<211> LENGTH: 10
<212> TYPE: PRT
<213> ORGANISM: Mus musculus

<400> SEQUENCE: 96

Ala Asn Pro Ile Gln Gly Phe Ser Ala Lys
1               5                   10

<210> SEQ ID NO 97
<211> LENGTH: 13
<212> TYPE: PRT
<213> ORGANISM: Mus musculus

<400> SEQUENCE: 97

Leu Glu Glu Gly Pro Pro Val Thr Thr Val Leu Thr Arg
1               5                   10

<210> SEQ ID NO 98
<211> LENGTH: 9
<212> TYPE: PRT
<213> ORGANISM: Mus musculus

<400> SEQUENCE: 98

Ala Ile Leu Ala Glu Leu Thr Gly Arg
1               5

<210> SEQ ID NO 99
<211> LENGTH: 8
<212> TYPE: PRT
<213> ORGANISM: Mus musculus

<400> SEQUENCE: 99

Phe Ser Thr Glu Gln Leu Pro Lys
1               5

-continued

<210> SEQ ID NO 100
<211> LENGTH: 15
<212> TYPE: PRT
<213> ORGANISM: Mus musculus

<400> SEQUENCE: 100

Ser Ala Tyr Asn Ile Tyr Val Ser Glu Ser Phe Gln Glu Ala Lys
1               5                   10                  15

<210> SEQ ID NO 101
<211> LENGTH: 11
<212> TYPE: PRT
<213> ORGANISM: Mus musculus

<400> SEQUENCE: 101

Asn Leu Glu Gln Ile Ser Ala Asn Ile Thr Lys
1               5                   10

<210> SEQ ID NO 102
<211> LENGTH: 11
<212> TYPE: PRT
<213> ORGANISM: Mus musculus

<400> SEQUENCE: 102

Ala Leu Val Phe Gln Pro Val Thr Glu Leu Lys
1               5                   10

<210> SEQ ID NO 103
<211> LENGTH: 11
<212> TYPE: PRT
<213> ORGANISM: Mus musculus

<400> SEQUENCE: 103

Glu Leu His Ala His Leu Leu Ala Gln Asp Lys
1               5                   10

<210> SEQ ID NO 104
<211> LENGTH: 9
<212> TYPE: PRT
<213> ORGANISM: Mus musculus

<400> SEQUENCE: 104

Ser Glu Tyr Asn Asp Gln Leu Thr Arg
1               5

<210> SEQ ID NO 105
<211> LENGTH: 8
<212> TYPE: PRT
<213> ORGANISM: Mus musculus

<400> SEQUENCE: 105

Ala Thr Asp Phe Val Val Asp Arg
1               5

<210> SEQ ID NO 106
<211> LENGTH: 13
<212> TYPE: PRT
<213> ORGANISM: Mus musculus

<400> SEQUENCE: 106

Thr Ile Glu Ala Glu Ala Ala His Gly Thr Val Thr Arg
1               5                   10

<210> SEQ ID NO 107

```
<210> SEQ ID NO 107
<211> LENGTH: 14
<212> TYPE: PRT
<213> ORGANISM: Mus musculus

<400> SEQUENCE: 107

Asp Phe Phe Thr Ala Gly Ser Pro Gly Glu Thr Ala Phe Arg
1               5                   10

<210> SEQ ID NO 108
<211> LENGTH: 11
<212> TYPE: PRT
<213> ORGANISM: Mus musculus

<400> SEQUENCE: 108

Val Val Val Val Gly Asp Gln Ser Ala Gly Lys
1               5                   10

<210> SEQ ID NO 109
<211> LENGTH: 12
<212> TYPE: PRT
<213> ORGANISM: Mus musculus

<400> SEQUENCE: 109

Leu Asp Ala Phe Ile Glu Ala Leu His Gln Glu Lys
1               5                   10

<210> SEQ ID NO 110
<211> LENGTH: 8
<212> TYPE: PRT
<213> ORGANISM: Mus musculus

<400> SEQUENCE: 110

Tyr Tyr Gly Ala Gln Thr Val Arg
1               5

<210> SEQ ID NO 111
<211> LENGTH: 8
<212> TYPE: PRT
<213> ORGANISM: Mus musculus

<400> SEQUENCE: 111

Val Leu Leu Pro Gly Leu Gln Lys
1               5

<210> SEQ ID NO 112
<211> LENGTH: 10
<212> TYPE: PRT
<213> ORGANISM: Mus musculus

<400> SEQUENCE: 112

Val Leu Ser Ile Gly Asp Gly Ile Ala Arg
1               5                   10

<210> SEQ ID NO 113
<211> LENGTH: 10
<212> TYPE: PRT
<213> ORGANISM: Mus musculus

<400> SEQUENCE: 113

Ala Val Asp Ser Leu Val Pro Ile Gly Arg
1               5                   10

<210> SEQ ID NO 114
<211> LENGTH: 9
<212> TYPE: PRT
```

<213> ORGANISM: Mus musculus

<400> SEQUENCE: 114

Ala Asp Glu Ala Tyr Leu Ile Gly Arg
1               5

<210> SEQ ID NO 115
<211> LENGTH: 10
<212> TYPE: PRT
<213> ORGANISM: Mus musculus

<400> SEQUENCE: 115

Phe Ile Gly Pro Ser Pro Glu Val Val Arg
1               5                   10

<210> SEQ ID NO 116
<211> LENGTH: 9
<212> TYPE: PRT
<213> ORGANISM: Mus musculus

<400> SEQUENCE: 116

Leu Asn Val Leu Ala Asn Val Ile Arg
1               5

<210> SEQ ID NO 117
<211> LENGTH: 10
<212> TYPE: PRT
<213> ORGANISM: Mus musculus

<400> SEQUENCE: 117

Ser Ser Pro Tyr Pro Thr Asp Val Ala Arg
1               5                   10

<210> SEQ ID NO 118
<211> LENGTH: 10
<212> TYPE: PRT
<213> ORGANISM: Mus musculus

<400> SEQUENCE: 118

Leu Ala Val Ile Gly Glu Val Leu Ser Arg
1               5                   10

<210> SEQ ID NO 119
<211> LENGTH: 9
<212> TYPE: PRT
<213> ORGANISM: Mus musculus

<400> SEQUENCE: 119

Tyr Gln Val Glu Tyr Asp Ala Tyr Lys
1               5

<210> SEQ ID NO 120
<211> LENGTH: 16
<212> TYPE: PRT
<213> ORGANISM: Mus musculus

<400> SEQUENCE: 120

Leu Pro Leu His Thr Leu Thr Ser Ser Thr Pro Val Val Leu Val Arg
1               5                   10                  15

<210> SEQ ID NO 121
<211> LENGTH: 13
<212> TYPE: PRT
<213> ORGANISM: Mus musculus

<400> SEQUENCE: 121

Thr Glu Asn Pro Leu Val Leu Ile Asp Glu Val Asp Lys
1               5                   10

<210> SEQ ID NO 122
<211> LENGTH: 9
<212> TYPE: PRT
<213> ORGANISM: Mus musculus

<400> SEQUENCE: 122

Asp Ile Phe Pro Ile Ala Phe Pro Arg
1               5

<210> SEQ ID NO 123
<211> LENGTH: 9
<212> TYPE: PRT
<213> ORGANISM: Mus musculus

<400> SEQUENCE: 123

Ala Glu Glu Leu Leu Ala Glu Glu Lys
1               5

<210> SEQ ID NO 124
<211> LENGTH: 13
<212> TYPE: PRT
<213> ORGANISM: Mus musculus

<400> SEQUENCE: 124

Ala Leu Gln Gly Ala Ser Gln Ile Ile Ala Glu Ile Arg
1               5                   10

<210> SEQ ID NO 125
<211> LENGTH: 11
<212> TYPE: PRT
<213> ORGANISM: Mus musculus

<400> SEQUENCE: 125

Asn Thr Val Ile Ala Thr Gly Gly Tyr Gly Arg
1               5                   10

<210> SEQ ID NO 126
<211> LENGTH: 11
<212> TYPE: PRT
<213> ORGANISM: Mus musculus

<400> SEQUENCE: 126

Val Thr Leu Glu Tyr Arg Pro Val Ile Asp Lys
1               5                   10

<210> SEQ ID NO 127
<211> LENGTH: 17
<212> TYPE: PRT
<213> ORGANISM: Mus musculus

<400> SEQUENCE: 127

Ala Phe Asp Gln Gly Ala Asp Ala Ile Tyr Glu His Ile Asn Glu Gly
1               5                   10                  15

Lys

<210> SEQ ID NO 128
<211> LENGTH: 8
<212> TYPE: PRT
<213> ORGANISM: Mus musculus

```
<400> SEQUENCE: 128

Val Leu Phe Gly Glu Ile Thr Arg
1               5

<210> SEQ ID NO 129
<211> LENGTH: 17
<212> TYPE: PRT
<213> ORGANISM: Mus musculus

<400> SEQUENCE: 129

Gly Glu Phe Gly Val Tyr Leu Val Ser Asp Gly Ser Ser Arg Pro Tyr
1               5                   10                  15

Arg

<210> SEQ ID NO 130
<211> LENGTH: 13
<212> TYPE: PRT
<213> ORGANISM: Mus musculus

<400> SEQUENCE: 130

Ser Gln Phe Thr Ile Thr Pro Gly Ser Glu Gln Ile Arg
1               5                   10

<210> SEQ ID NO 131
<211> LENGTH: 9
<212> TYPE: PRT
<213> ORGANISM: Mus musculus

<400> SEQUENCE: 131

Val Asp Val Ser Pro Thr Ser Gln Arg
1               5

<210> SEQ ID NO 132
<211> LENGTH: 10
<212> TYPE: PRT
<213> ORGANISM: Mus musculus

<400> SEQUENCE: 132

Asn Glu Val Asp Ser Thr Leu Thr Phe Arg
1               5                   10

<210> SEQ ID NO 133
<211> LENGTH: 9
<212> TYPE: PRT
<213> ORGANISM: Mus musculus

<400> SEQUENCE: 133

Leu Gln Asp Pro Phe Ser Val Tyr Arg
1               5

<210> SEQ ID NO 134
<211> LENGTH: 9
<212> TYPE: PRT
<213> ORGANISM: Mus musculus

<400> SEQUENCE: 134

Thr Asp Leu Thr Asp Tyr Leu Asn Arg
1               5

<210> SEQ ID NO 135
<211> LENGTH: 9
<212> TYPE: PRT
<213> ORGANISM: Mus musculus
```

```
<400> SEQUENCE: 135

Ile Pro Leu Ala Glu Trp Glu Ser Arg
1               5

<210> SEQ ID NO 136
<211> LENGTH: 16
<212> TYPE: PRT
<213> ORGANISM: Mus musculus

<400> SEQUENCE: 136

Asn Thr Ser Ser Asn Arg Pro Leu Ser Pro His Leu Thr Ile Tyr Lys
1               5                   10                  15

<210> SEQ ID NO 137
<211> LENGTH: 8
<212> TYPE: PRT
<213> ORGANISM: Mus musculus

<400> SEQUENCE: 137

His Leu Leu Trp Asp Leu Gly Lys
1               5

<210> SEQ ID NO 138
<211> LENGTH: 9
<212> TYPE: PRT
<213> ORGANISM: Mus musculus

<400> SEQUENCE: 138

Asp Val Leu Ser Asn Leu Ile Pro Lys
1               5

<210> SEQ ID NO 139
<211> LENGTH: 11
<212> TYPE: PRT
<213> ORGANISM: Mus musculus

<400> SEQUENCE: 139

Ile Val Pro Asn Ile Leu Leu Glu Gln Gly Lys
1               5                   10

<210> SEQ ID NO 140
<211> LENGTH: 9
<212> TYPE: PRT
<213> ORGANISM: Mus musculus

<400> SEQUENCE: 140

Ala Ala Ala Phe Glu Gln Leu Gln Lys
1               5

<210> SEQ ID NO 141
<211> LENGTH: 8
<212> TYPE: PRT
<213> ORGANISM: Mus musculus

<400> SEQUENCE: 141

Gly Leu Leu Gln Leu Gln Trp Lys
1               5

<210> SEQ ID NO 142
<211> LENGTH: 8
<212> TYPE: PRT
<213> ORGANISM: Mus musculus

<400> SEQUENCE: 142
```

```
Gly Val Val Pro Leu Glu Ala Arg
1               5

<210> SEQ ID NO 143
<211> LENGTH: 10
<212> TYPE: PRT
<213> ORGANISM: Mus musculus

<400> SEQUENCE: 143

Glu Pro Glu Pro Val Val His Tyr Asp Ile
1               5                   10

<210> SEQ ID NO 144
<211> LENGTH: 11
<212> TYPE: PRT
<213> ORGANISM: Mus musculus

<400> SEQUENCE: 144

Thr Pro Glu Gln Val Thr Glu Ile Ala Asn Arg
1               5                   10

<210> SEQ ID NO 145
<211> LENGTH: 11
<212> TYPE: PRT
<213> ORGANISM: Mus musculus

<400> SEQUENCE: 145

Gln Gly Leu Ser Phe Gly Ser Leu Ala Ser Arg
1               5                   10

<210> SEQ ID NO 146
<211> LENGTH: 18
<212> TYPE: PRT
<213> ORGANISM: Mus musculus

<400> SEQUENCE: 146

Ile Thr Ser Glu Glu Leu His Tyr Phe Val Gln Asn His Phe Thr Ser
1               5                   10                  15

Ala Arg

<210> SEQ ID NO 147
<211> LENGTH: 16
<212> TYPE: PRT
<213> ORGANISM: Mus musculus

<400> SEQUENCE: 147

Ala Val Ala Gln Gly Asn Leu Ser Ser Ala Asp Val Gln Ala Ala Lys
1               5                   10                  15

<210> SEQ ID NO 148
<211> LENGTH: 7
<212> TYPE: PRT
<213> ORGANISM: Mus musculus

<400> SEQUENCE: 148

Leu Pro Thr Ile Ser Gln Arg
1               5

<210> SEQ ID NO 149
<211> LENGTH: 13
<212> TYPE: PRT
<213> ORGANISM: Mus musculus

<400> SEQUENCE: 149
```

```
Ile Val Ser Ala Gln Ser Leu Ala Glu Asp Asp Val Glu
1               5                   10

<210> SEQ ID NO 150
<211> LENGTH: 9
<212> TYPE: PRT
<213> ORGANISM: Mus musculus

<400> SEQUENCE: 150

Ser Trp Asn Glu Thr Phe His Ala Arg
1               5

<210> SEQ ID NO 151
<211> LENGTH: 14
<212> TYPE: PRT
<213> ORGANISM: Mus musculus

<400> SEQUENCE: 151

Ala Asn Val Ala Lys Pro Gly Leu Val Asp Asp Phe Glu Lys
1               5                   10
```